(12) United States Patent
Kimura et al.

(10) Patent No.: US 11,509,433 B2
(45) Date of Patent: Nov. 22, 2022

(54) COMMUNICATION DEVICE AND COMMUNICATION METHOD

(71) Applicant: Sony Corporation, Tokyo (JP)

(72) Inventors: Ryota Kimura, Tokyo (JP); Kazuyuki Shimezawa, Kanagawa (JP); Naoki Kusashima, Kanagawa (JP); Hiroki Matsuda, Tokyo (JP); Hiromasa Uchiyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 63 days.

(21) Appl. No.: 16/324,426

(22) PCT Filed: Jul. 28, 2017

(86) PCT No.: PCT/JP2017/027504
§ 371 (c)(1),
(2) Date: Feb. 8, 2019

(87) PCT Pub. No.: WO2018/030185
PCT Pub. Date: Feb. 15, 2018

(65) Prior Publication Data
US 2019/0173612 A1 Jun. 6, 2019

(30) Foreign Application Priority Data

Aug. 10, 2016 (JP) ............................ JP2016-157805
Nov. 2, 2016 (JP) ............................ JP2016-214963

(51) Int. Cl.
*H04L 5/00* (2006.01)
*H04W 56/00* (2009.01)
(Continued)

(52) U.S. Cl.
CPC .......... *H04L 5/0044* (2013.01); *H04L 1/0026* (2013.01); *H04L 1/0063* (2013.01);
(Continued)

(58) Field of Classification Search
None
See application file for complete search history.

(56) References Cited

U.S. PATENT DOCUMENTS

2011/0317647 A1   12/2011   Cho et al.
2015/0319724 A1   11/2015   Chae et al.
(Continued)

FOREIGN PATENT DOCUMENTS

CN    103924911 A    4/2013
CN    103581877 A    2/2014
(Continued)

OTHER PUBLICATIONS

3GPP, "Technical Specification Group Radio Access Network; Study on Scenarios and Requirements for Next Generation Access Technologies", 3GPP TR 38.913 V0. 2.0, Feb. 2016, Release 14, pp. 1-19.
(Continued)

*Primary Examiner* — Alex Skripnikov
(74) *Attorney, Agent, or Firm* — Xsensus LLP

(57) ABSTRACT

[Object] To provide a communication device that enables degradation in the quality of communication between a base station device and a terminal device to be avoided when a sidelink channel is set.
[Solution] There is provided a communication device including: a control unit configured to allocate a predetermined gap to a boundary of a resource of a channel to be used in inter-device communication with a resource other than the resource of the channel in a communication system in which signals from different transmission sources are mixed and placed.

15 Claims, 69 Drawing Sheets

(51) Int. Cl.
*H04L 1/00* (2006.01)
*H04L 1/18* (2006.01)
*H04L 25/02* (2006.01)
*H04L 27/26* (2006.01)
*H04W 72/04* (2009.01)

(52) U.S. Cl.
CPC .......... *H04L 1/1819* (2013.01); *H04L 5/0048* (2013.01); *H04L 5/0055* (2013.01); *H04L 25/0226* (2013.01); *H04L 27/2607* (2013.01); *H04W 56/00* (2013.01); *H04W 56/001* (2013.01); *H04W 72/042* (2013.01); *H04W 72/0473* (2013.01); *H04L 27/2602* (2013.01)

(56) References Cited

U.S. PATENT DOCUMENTS

| | | | | |
|---|---|---|---|---|
| 2015/0381378 | A1* | 12/2015 | Zhang | H04W 72/005 370/312 |
| 2016/0044619 | A1 | 2/2016 | Ryu | |
| 2016/0352551 | A1* | 12/2016 | Zhang | H04L 27/2646 |
| 2017/0230956 | A1* | 8/2017 | Kim | H04B 1/713 |
| 2019/0159138 | A1* | 5/2019 | Lee | H04W 52/146 |
| 2019/0229867 | A1* | 7/2019 | Yi | H04L 5/0048 |

FOREIGN PATENT DOCUMENTS

| | | |
|---|---|---|
| CN | 103796317 A | 5/2014 |
| JP | 2014-504830 A | 2/2014 |
| JP | 2016-504860 A | 2/2016 |
| WO | 2015/065085 A1 | 5/2015 |
| WO | 2015/115793 A1 | 8/2015 |
| WO | 2015/141709 A1 | 9/2015 |
| WO | WO-2017213386 A1 * 12/2017 ......... H04L 27/2607 |

OTHER PUBLICATIONS

3GPP, "Technical Specification Group Radio Access Network; Study on Licensed-Assisted Access to Unlicensed Spectrum", 3GPP TR 36.889 V13.0.0, Jun. 2015, Release 13, 285 pages.
International Search Report dated Oct. 24, 2017 for PCT/JP2017/027504 filed on Jul. 28, 2017, 9 pages including English translation.
Extended Search Report issued in European Application 17839258.5-1219 dated Oct. 15, 2019.
Partial Supplementary European Search report dated Jul. 5, 2019 in European Application No. 17839258.5.
Qualcomm Incorporated: "Draft TP for D2D for TS 36.300", 3GPP Draft; RI-142966 QC D2D TP 36 300, 3rd Generation Partnership Project (3GPP), vol. RAN WG1, Aug. 18, 2014-Aug. 22, 2014, Retrieved from the Internet: URL:http ://www.3gpp.org/ftp/Meetings 3GPPSYNC/RANI/Docs/.
Huawei et al: "Support for UE Cooperation in NR", 3GPP Draft; RI-164379, 3rd Generation Partnership Project (3GPP), vol. RAN WG1, May 23, 2016-May 27, 2016, (May 15, 2016), Retrieved from the Internet: URL:http://www.3gpp.org/ftp/tsg ran/WGI RL I/TSGRI_85/Docs/.
3GPP TSG RAN WG1 meeting #84bis R1-163273 Sony "Further Considerations on UL Transmission Gaps" Apr. 5, 2016.
3GPP TSG RAN WG1 Meeting #85 R1-165131 ZTE "Issue on NPRACH UL Gap configuration" May 13, 2016.

* cited by examiner

FIG. 3

| | SUB CARRIER INTERVAL | MAXIMUM BANDWIDTH OF COMPONENT CARRIER | CP LENGTH TYPE | NUMBER OF SYMBOLS PER SUB FRAME | SUB FRAME LENGTH | WIRELESS FRAME LENGTH | NUMBER OF SUB CARRIERS PER RESOURCE BLOCK IN NR CELL |
|---|---|---|---|---|---|---|---|
| PARAMETER SET 0 | 15 kHz | 20MHz | TYPE 1 | 14 | 1ms | 10ms | 12 |
| PARAMETER SET 1 | 7.5 kHz | 1.4MHz | TYPE 1 | 70 | 10ms | 10ms | 24 |
| PARAMETER SET 2 | 30 kHz | 80MHz | TYPE 1 | 7 | 0.25ms | 10ms | 6 |
| PARAMETER SET 3 | 15 kHz | 20MHz | TYPE 2 | 12 | 1ms | 10ms | 12 |
| ... | ... | ... | ... | ... | ... | ... | ... |

RECEPTION POWER OF UE3

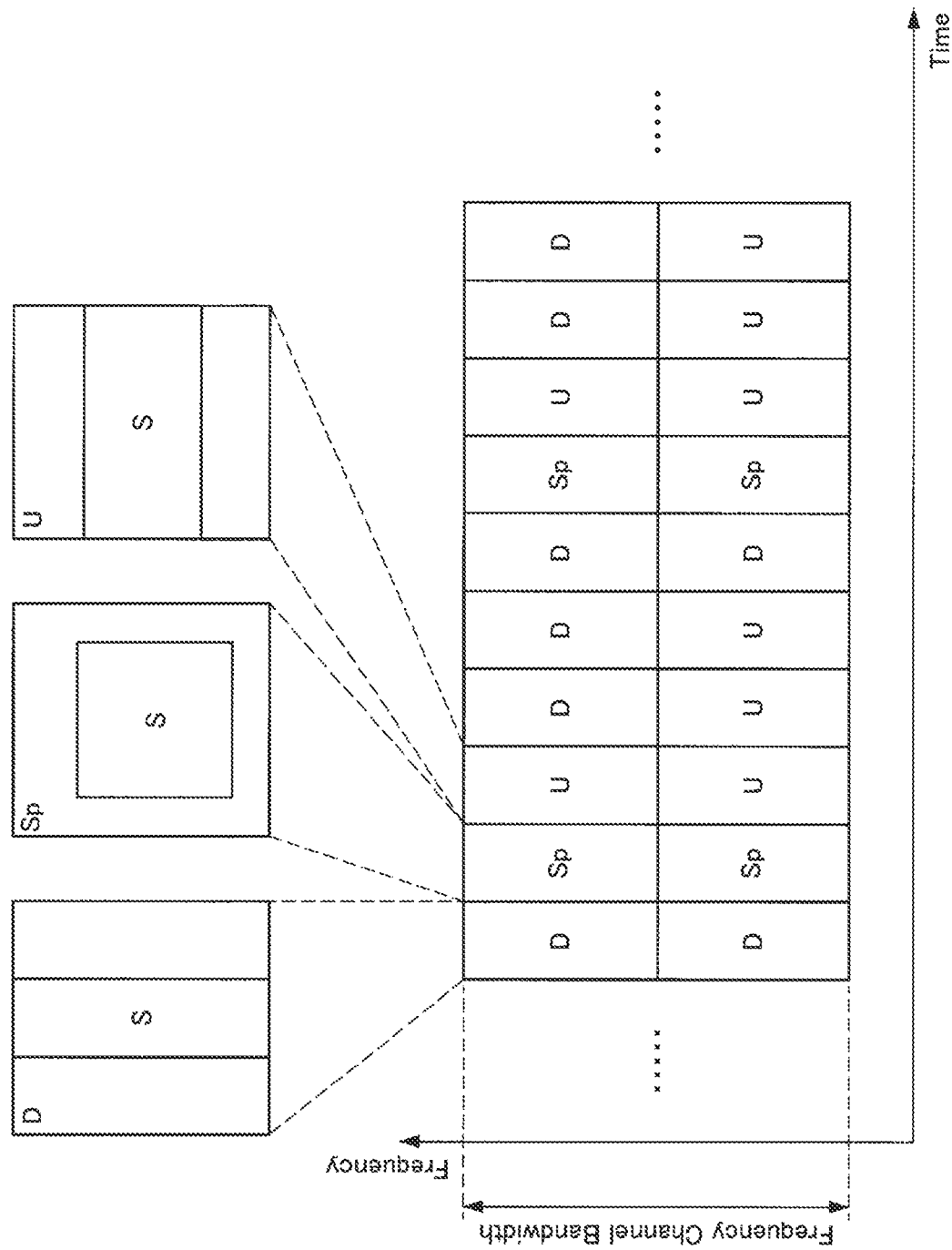

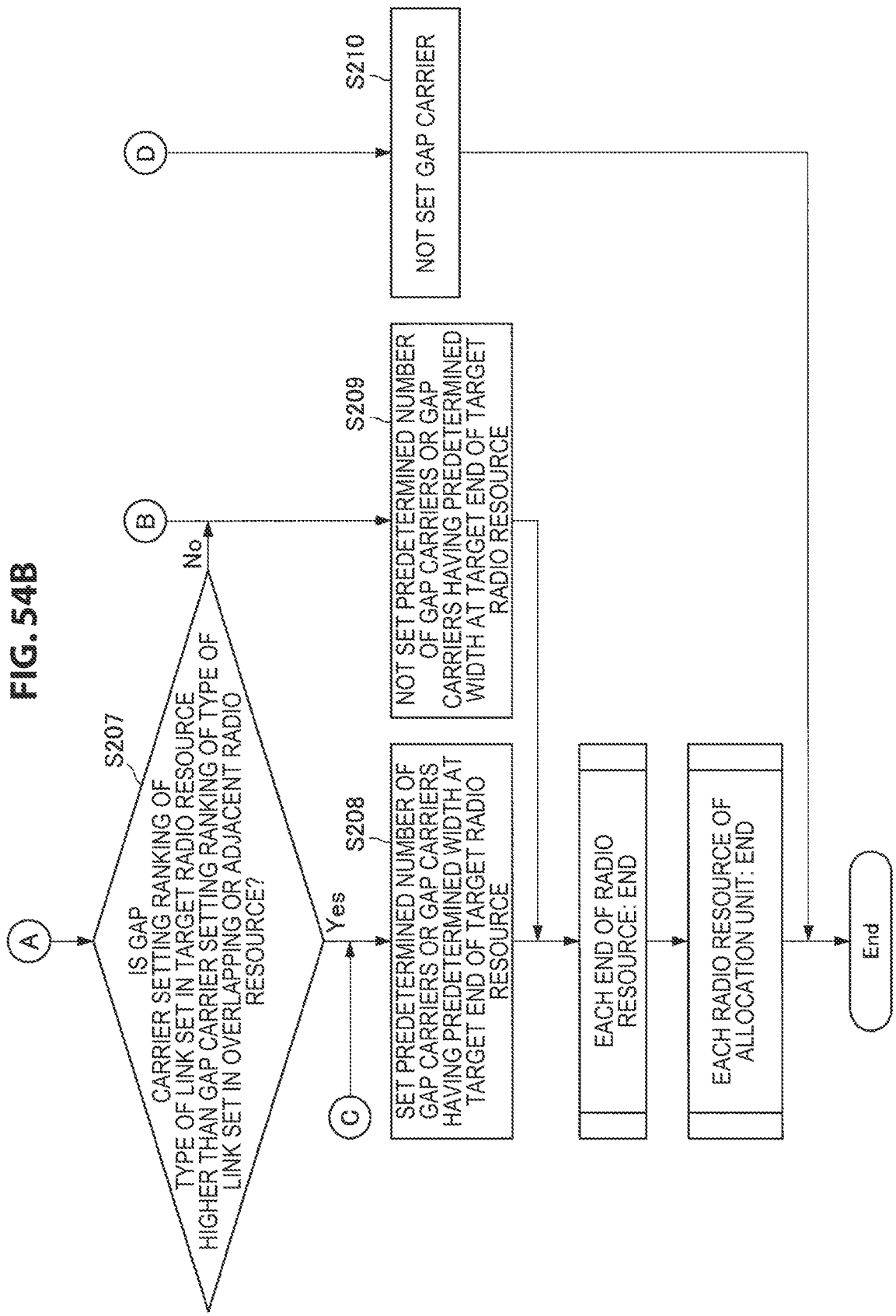

COMMUNICATION DEVICE AND COMMUNICATION METHOD

CROSS-REFERENCE TO RELATED APPLICATIONS

The present application is based on PCT filing PCT/JP2017/027504, filed Jul. 28, 2017, and claims priority to 2016-157805, filed in the Japanese Patent Office on Aug. 10, 2016, and claims priority to 2016-214963, filed in the Japanese Patent Office on Nov. 2, 2016, the entire contents of each of which being incorporated herein by reference.

TECHNICAL FIELD

The present disclosure relates to a communication device and a communication method.

BACKGROUND ART

Wireless access schemes and wireless networks of cellular mobile communication (hereinafter also referred to as Long Term Evolution (LTE), LTE-Advanced (LTE-A), LTE-Advanced Pro (LTE-A Pro), New Radio (NR), New Radio Access Technology (NRAT), Evolved Universal Terrestrial Radio Access (EUTRA), or Further EUTRA (FEUTRA)) are under review in 3rd Generation Partnership Project (3GPP). Further, in the following description, LTE includes LTE-A, LTE-A Pro, and EUTRA, and NR includes NRAT and FEUTRA. In LTE and NR, a base station device (base station) is also referred to as an evolved Node B (eNodeB), and a terminal device (a mobile station, a mobile station device, or a terminal) is also referred to as a user equipment (UE). LTE and NR are cellular communication systems in which a plurality of areas covered by a base station device is arranged in a cell form. A single base station device may manage a plurality of cells.

NR is a different Radio Access Technology (RAT) from LTE as a wireless access scheme of the next generation of LTE. NR is an access technology capable of handling various use cases including Enhanced Mobile broadband (eMBB), Massive Machine Type Communications (mMTC), and ultra reliable and Low Latency Communications (URLLC). NR is reviewed for the purpose of a technology framework corresponding to use scenarios, request conditions, placement scenarios, and the like in such use cases. The details of the scenarios or request conditions of NR are disclosed in Non-Patent Literature 1.

CITATION LIST

Non-Patent Literature

Non-Patent Literature 1: 3rd Generation Partnership Project; Technical Specification Group Radio Access Network; Study on Scenarios and Requirements for Next Generation Access Technologies; (Release 14), 3GPP TR 38.913 V0.2.0 (2016-02). <http://www.3gpp.org/ftp//Specs/archive/38_series/38.913/38913-020.zip>

DISCLOSURE OF INVENTION

Technical Problem

When a sidelink channel for D2D (Device to Device) or ProSe (Proximity Services) is set to a downlink radio resource of a cellular system or a radio resource of an unlicensed band, degradation of communication quality caused by the influence of in-band emission or interference between links is concerned.

Therefore, the present disclosure proposes a novel and improved communication device and communication method that enable degradation in the quality of communication between a base station device and a terminal device to be avoided when a sidelink channel is set.

Solution to Problem

According to the present disclosure, there is provided a communication device including: a control unit configured to allocate a predetermined gap to a boundary of a resource of a channel to be used in inter-device communication with a resource other than the resource of the channel in a communication system in which signals from different transmission sources are mixed and placed.

In addition, according to the present disclosure, there is provided a communication device including: a control unit configured to control communication using a resource to which a predetermined gap is allocated on a boundary of a channel to be used in inter-device communication with a resource other than a resource of the channel in a communication system in which signals front different transmission sources are mixed and placed.

In addition, according to the present disclosure, there is provided a communication device including: a control unit configured to perform control of transmission at a time obtained by adding a predetermined offset to a timing designated by a base station when inter-device communication is performed using a downlink radio resource in a communication system in which signals from different transmission sources are mixed and placed.

In addition, according to the present disclosure, there is provided a communication device including: a control unit configured to set transmission power individually in each of an uplink radio resource, a downlink radio resource, and a radio resource of an unlicensed band when a channel to be used in the inter-device communication is set using at least part of the uplink radio resource, the downlink radio resource, and the radio resource of the unlicensed band in a communication system in which signals from different transmission sources are nixed and placed.

In addition, according to the present disclosure, there is provided a communication device including: a control unit configured to set a control channel individually in each of an uplink radio resource, a downlink radio resource, and a radio resource of an unlicensed band when a channel to be used in the inter-device communication is set using at least part of the uplink radio resource, the downlink radio resource, and the radio resource of the unlicensed band in a communication system in which signals from different transmission sources are mixed and placed.

In addition, according to the present disclosure, there is provided a communication method including: allocating a predetermined gap to a boundary of a resource of a channel to be used in inter-device communication with a resource other than the resource of the channel in a communication system in which signals from different transmission sources are mixed and placed.

In addition, according to the present disclosure, there is provided a communication method including: controlling communication using a resource to which a predetermined gap is allocated on a boundary of a channel to be used in inter-device communication with a resource other than a resource of the channel in a communication system in which signals from different transmission sources are mixed and placed.

In addition, according to the present disclosure, there is provided a communication method including: performing control of transmission at a time obtained by adding a predetermined offset to a timing designated by a base station when inter-device communication is performed using a downlink radio resource in a communication system in which signals from different transmission sources are mixed and placed.

In addition, according to the present disclosure, there is provided a communication method including: setting transmission power individually in each of an uplink radio resource, a downlink radio resource, and a radio resource of an unlicensed band when a channel to be used in inter-device communication is set using at least part of the uplink radio resource, the downlink radio resource, and the radio resource of the unlicensed band in a communication system in which signals from different transmission sources are mixed and placed.

In addition, according to the present disclosure, there is provided a communication method including: setting a control channel individually in each of an uplink radio resource, a downlink radio resource, and a radio resource of an unlicensed band when a channel to be used in inter-device communication is set using at least part of the uplink radio resource, the downlink radio resource, and the radio resource of the unlicensed band in a communication system in which signals from different transmission sources are mixed and placed.

In addition, according to the present disclosure, there is provided a communication device including: a control unit configured to allocate a predetermined gap to a boundary of resources adjacent in a frequency direction in a communication system in which signals from different transmission sources are multiplexed in the frequency direction within one frequency channel.

In addition, according to the present disclosure, there is provided a communication control method including: allocating a predetermined gap to a boundary of resources adjacent in a frequency direction in a communication system in which signals from different transmission sources are multiplexed in the frequency direction within one frequency channel.

Advantageous Effects of Invention

According to the present disclosure described above, a novel and improved communication device and communication method that enable degradation in the quality of communication between a base station device and a terminal device to be avoided when a sidelink channel is set can be provided.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 is a diagram illustrating examples of parameter sets related to a transmission signal in an NR cell.

FIG. 48B is an explanatory diagram illustrating an example of multiplexing also including sidelink channels according to the embodiment.

FIG. 54B is a flowchart showing an operation example of the base station device 1 according to the embodiment.

MODE(S) FOR CARRYING OUT THE INVENTION

Figure 1:
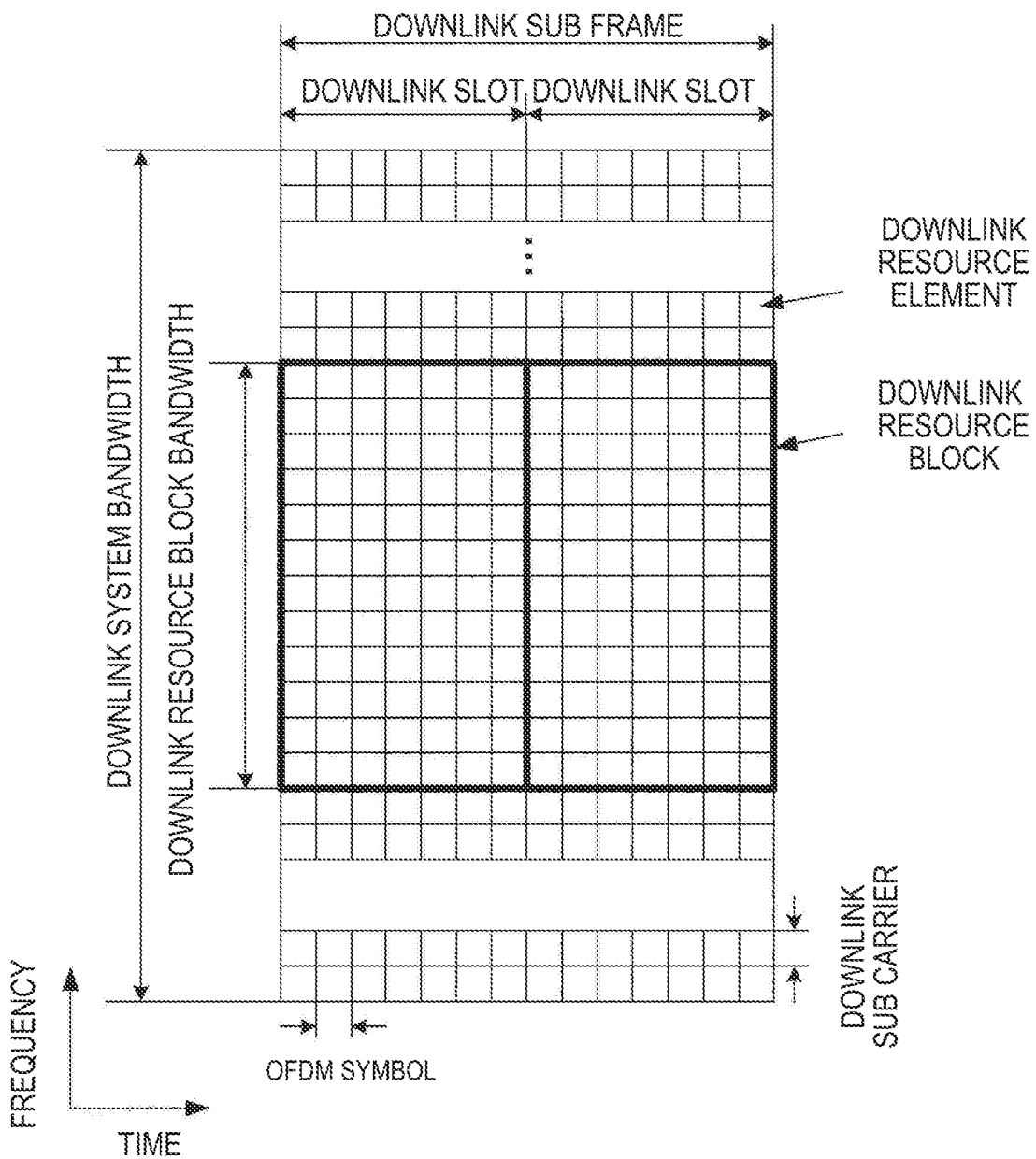
FIG. 1 is a diagram illustrating an example of a downlink subframe of LTE according to the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, technologies, functions, methods, configurations, and procedures to be described below and all other descriptions can be applied to LTE and NR unless particularly stated otherwise.

Note that the description will be made in the following order.

1. Embodiment of present disclosure
2. Application examples
3. Conclusion

1. EMBODIMENT OF PRESENT DISCLOSURE

<Wireless Communication System in the Present Embodiment>

In the present embodiment, a wireless communication system includes at least a base station device 1 and a terminal device 2. The base station device 1 can accommodate multiple terminal devices. The base station device 1 can be connected with another base station device by means of an X2 interface. Further, the base station device 1 can be connected to an evolved packet core (EPC) by means of an S1 interface. Further, the base station device 1 can be connected to a mobility management entity (MME) by means of an S1-MME interface and can be connected to a serving gateway (S-GW) by means of an S i-U interface. The S1 interface supports many-to-many connection between the MME and/or the S-GW and the base station device 1. Further, in the present embodiment, the base station device 1 and the terminal device 2 each support LTE and/or NR.

<Wireless Access Technology According to Present Embodiment>

In the present embodiment, the base station device 1 and the terminal device 2 each support one or more wireless access technologies (RATs). For example, an RAT includes LTE and NR. A single RAT corresponds to a single cell (component carrier). That is, in a case in which a plurality of RATs is supported, the RATs each correspond to different cells. In the present embodiment, a cell is a combination of a downlink resource, an uplink resource, and/or a sidelink. Further, in the following description, a cell corresponding to LTE is referred to as an LTE cell and a cell corresponding to NR is referred to as an NR cell.

Downlink communication is communication from the base station device 1 to the terminal device 2. Downlink transmission is transmission from the base station device 1 to the terminal device 2 and is transmission of a downlink physical channel and/or a downlink physical signal. Uplink communication is communication from the terminal device 2 to the base station device 1. Uplink transmission is transmission from the terminal device 2 to the base station device 1 and is transmission of an uplink physical channel and/or an uplink physical signal. Sidelink communication is communication from the terminal device 2 to another terminal device 2. Sidelink transmission is transmission from the terminal device 2 to another terminal device 2 and is transmission of a sidelink physical channel and/or a sidelink physical signal.

The sidelink communication is defined for contiguous direct detection and contiguous direct communication between terminal devices. The sidelink communication, a frame configuration similar to that of the uplink and downlink can be used. Further, the sidelink communication can be restricted to some (sub sets) of uplink resources and/or downlink resources.

<Radio Frame Configuration in Present Embodiment>

In the present embodiment, a radio frame configured with 10 ms (milliseconds) is specified. Each radio frame includes two half frames. A time interval of the half frame is 5 ms. Each half frame includes 5 subframes. The time interval of the subframe is 1 ms and is defined by two successive slots. The time interval of the slot is 0.5 ms. An i-th subframe in the radio frame includes a (2×i)-th slot and a (2×i+1)-th slot. In other words, 10 subframes are specified in each of the radio frames.

Subframes include a downlink subframe, an uplink subframe, a special subframe, a sidelink subframe, and the like.

The downlink subframe is a subframe reserved for downlink transmission. The uplink subframe is a subframe reserved for uplink transmission. The special subframe includes three fields. The three fields are a Downlink Pilot Time Slot (DwPTS), a Guard Period (GP), and an Uplink Pilot Time Slot (UpPTS). A total length of DwPTS, GP, and UpPTS is 1 ms. The DwPTS is a field reserved for downlink transmission. The UpPTS is a field reserved for uplink transmission. The GP is a field in which downlink transmission and uplink transmission are not performed. Further, the special subframe may include only the DwPTS and the GP or may include only the GP and the UpPTS. The special subframe is placed between the downlink subframe and the uplink subframe in TDD and used to perform switching from the downlink subframe to the uplink subframe. The sidelink subframe is a subframe reserved or set for sidelink communication. The sidelink is used for contiguous direct communication and contiguous direct detection between terminal devices.

A single radio frame includes a downlink subframe, an uplink subframe, a special subframe, and/or a sidelink subframe. Further, a single radio frame includes only a downlink subframe, an uplink subframe, a special subframe, or a sidelink subframe.

A plurality of radio frame configurations is supported. The radio frame configuration is specified by the frame configuration type. The frame configuration type 1 can be applied only to FDD. The frame configuration type 2 can be applied only to TDD. The frame configuration type 3 can be applied only to an operation of a licensed assisted access (LAA) secondary cell.

In the frame configuration type 2, a plurality of uplink-downlink configurations is specified. In the uplink-downlink configuration, each of 10 subframes in one radio frame corresponds to one of the downlink subframe, the uplink subframe, and the special subframe. The subframe 0, the subframe 5 and the DwPTS are constantly reserved for downlink transmission. The UpPTS and the subframe just after the special subframe are constantly reserved for uplink transmission.

In the frame configuration type 3, 10 subframes in one radio frame are reserved for downlink transmission. The terminal device 2 treats a subframe by which PDSCH or a detection signal is not transmitted, as an empty subframe. Unless a predetermined signal, channel and/or downlink transmission is detected in a certain subframe, the terminal device 2 assumes that there is no signal and/or channel in the subframe. The downlink transmission is exclusively occupied by one or more consecutive subframes. The first subframe of the downlink transmission may be started from any one in that subframe. The last subframe of the downlink transmission may be either completely exclusively occupied or exclusively occupied by a time interval specified in the DwPTS.

Further, in the frame configuration type 3, 10 subframes in one radio frame may be reserved for uplink transmission. Further, each of 10 subframes in one radio frame may correspond to any one of the downlink subframe, the uplink subframe, the special subframe, and the sidelink subframe.

The base station device 1 may transmit a downlink physical channel and a downlink physical signal in the DwPTS of the special subframe. The base station device 1 can restrict transmission of the PBCH in the DwPTS of the special subframe, The terminal device 2 may transmit uplink physical channels and uplink physical signals in the UpPTS of the special subframe. The terminal device 2 can restrict transmission of some of the uplink physical channels and the uplink physical signals in the UpPTS of the special subframe.

Note that a time interval in single transmission is referred to as a transmission time interval (TTI) and 1 ms (1 subframe) is defined as 1 TTI in LTE.

<Frame Configuration of LTE in Present Embodiment>

FIG. 1 is a diagram illustrating an example of a downlink subframe of LTE according to the present embodiment. The diagram illustrated in FIG. 1 is referred to as a downlink resource grid of LTE. The base station device 1 can transmit a downlink physical channel of LTE and/or a downlink physical signal of LTE in a downlink subframe to the terminal device 2. The terminal device 2 can receive a downlink physical channel of LTE and/or a downlink physical signal of LTE in a downlink subframe from the base station device 1.

Figure 2:
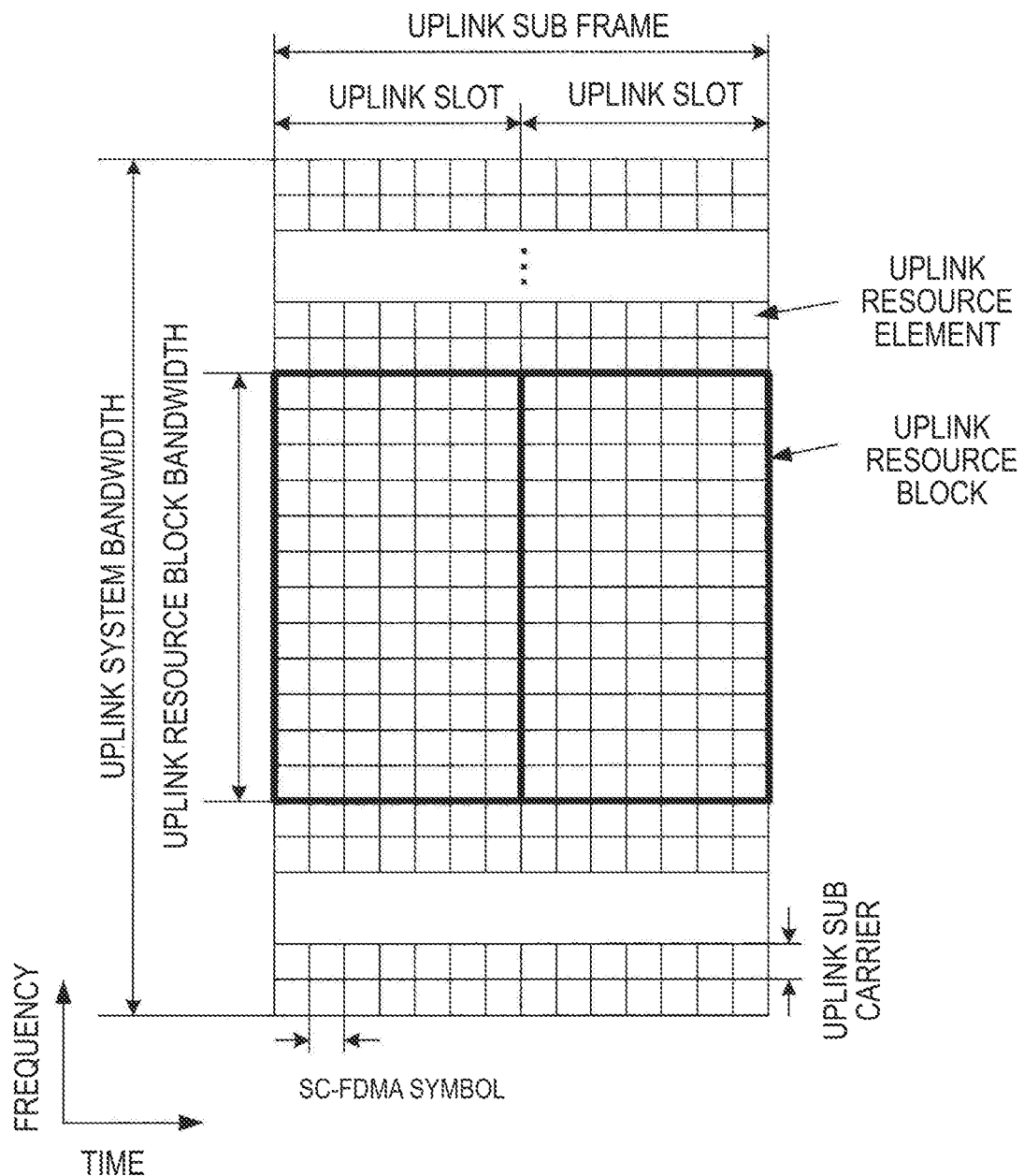
FIG. 2 is a diagram illustrating an example of an uplink subframe of LTE according to the present embodiment.

FIG. 2 is a diagram illustrating an example of an uplink subframe of LTE according to the present embodiment. The diagram illustrated in FIG. 2 is referred to as an uplink resource grid of LTE. The terminal device 2 can transmit an uplink physical channel of LTE and/or an uplink physical signal of LTE in an uplink subframe to the base station device 1. The base station device 1 can receive an uplink physical channel of LTE and/or an uplink physical signal of LTE in an uplink subframe from the terminal device 2.

In the present embodiment, the LTE physical resources can be defined as follows. One slot is defined by a plurality of symbols. The physical signal or the physical channel transmitted in each of the slots is represented by a resource grid. In the downlink, the resource grid is defined by a plurality of subcarriers in a frequency direction and a plurality of OFDM symbols in a time direction. In the uplink, the resource grid is defined by a plurality of subcarriers in the frequency direction and a plurality of SC-FDMA symbols in the time direction. The number of subcarriers or the number of resource blocks may be decided depending on a bandwidth of a cell. The number of symbols in one slot is decided by a type of cyclic prefix (CP). The type of CP is a normal CP or an extended CP. In the normal CP, the number of OFDM symbols or SC-FDMA symbols constituting one slot is 7. In the extended CP, the number of OFDM symbols or SC-FDMA symbols constituting one slot is 6. Each element in the resource grid is referred to as a resource element. The resource element is identified using an index (number) of a subcarrier and an index (number) of a symbol. Further, in the description of the present embodiment, the OFDM symbol or SC-FDMA symbol is also referred to simply as a symbol.

The resource blocks are used for mapping a certain physical channel (the PDSCH, the PUSCH, or the like) to resource elements. The resource blocks include virtual resource blocks and physical resource blocks. A certain physical channel is mapped to a virtual resource block. The virtual resource blocks are mapped to physical resource blocks. One physical resource block is defined by a predetermined number of consecutive symbols in the time domain. One physical resource block is defined from a predetermined number of consecutive subcarriers in the frequency domain. The number of symbols and the number of subcarriers in one physical resource block are decided on the basis of a parameter set in accordance with a type of CP, a subcarrier interval, and/or a higher layer in the cell. For example, in a case in which the type of CP is the normal CP, and the subcarrier interval is 15 kHz, the number of symbols in one physical resource block is 7, and the number of subcarriers is 12. In this case, one physical resource block includes (7×12) resource elements. The physical resource blocks are numbered from 0 in the frequency domain. Further, two resource blocks in one subframe corresponding to the same physical resource block number are defined as a physical resource block pair (a PRB pair or an RB pair).

In each LTE cell, one predetermined parameter is used in a certain subframe. For example, the predetermined parameter is a parameter (physical parameter) related to a transmission signal. Parameters related to the transmission signal include a CP length, a subcarrier interval, the number of symbols in one subframe (predetermined time length), the number of subcarriers in one resource block (predetermined frequency band), a multiple access scheme, a signal waveform, and the like.

That is, in the LTE cell, a downlink signal and an uplink signal are each generated using one predetermined parameter in a predetermined time length (for example, a subframe). In other words, in the terminal device 2, it is assumed that a downlink signal to be transmitted from the base station device 1 and an uplink signal to be transmitted to the base station device 1 are each generated with a predetermined time length with one predetermined parameter. Further, the base station device 1 is set such that a downlink signal to be transmitted to the terminal device 2 and an uplink signal to be transmitted from the terminal device 2 are each generated with a predetermined time length with one predetermined parameter.

<Frame Configuration of NR in Present Embodiment>

In each NR cell, one or more predetermined parameters are used in a certain predetermined time length (for example, a subframe). That is, in the NR cell, a downlink signal and an uplink signal are each generated using or more predetermined parameters in a predetermined time length. In other words, in the terminal device 2, it is assumed that a downlink signal to be transmitted from the base station device 1 and an uplink signal to be transmitted to the base station device 1 are each generated with one or more predetermined parameters in a predetermined time length. Further, the base station device 1 is set such that a downlink signal to be transmitted to the terminal device 2 and an uplink signal to be transmitted from the terminal device 2 are each generated with a predetermined time length using one or more predetermined parameters. In a case in which the plurality of predetermined parameters are used, a signal generated using the predetermined parameters is multiplexed in accordance with a predetermined method. For example, the predetermined method includes Frequency Division Multiplexing (FDM), Time Division Multiplexing (TDM), Code Division Multiplexing (CDM), and/or Spatial Division Multiplexing (SIM).

In a combination of the predetermined parameters set in the NR cell, a plurality of kinds of parameter sets can be specified in advance.

FIG. 3 is a diagram illustrating examples of the parameter sets related to a transmission signal in the NR cell. In the example of FIG. 3, parameters of the transmission signal included in the parameter sets include a subcarrier interval, the number of subcarriers per resource block in the NR cell, the number of symbols per subframe, and a CP length type. The CP length type is a type of CP length used in the NR cell. For example, CP length type 1 is equivalent to a normal CP in LTE and CP length type 2 is equivalent to an extended CP in LTE.

The parameter sets related to a transmission signal in the NR cell can be specified individually with a downlink and an uplink. Further, the parameter sets related to a transmission signal in the NR cell can be set independently with a downlink and an uplink.

Figure 4:
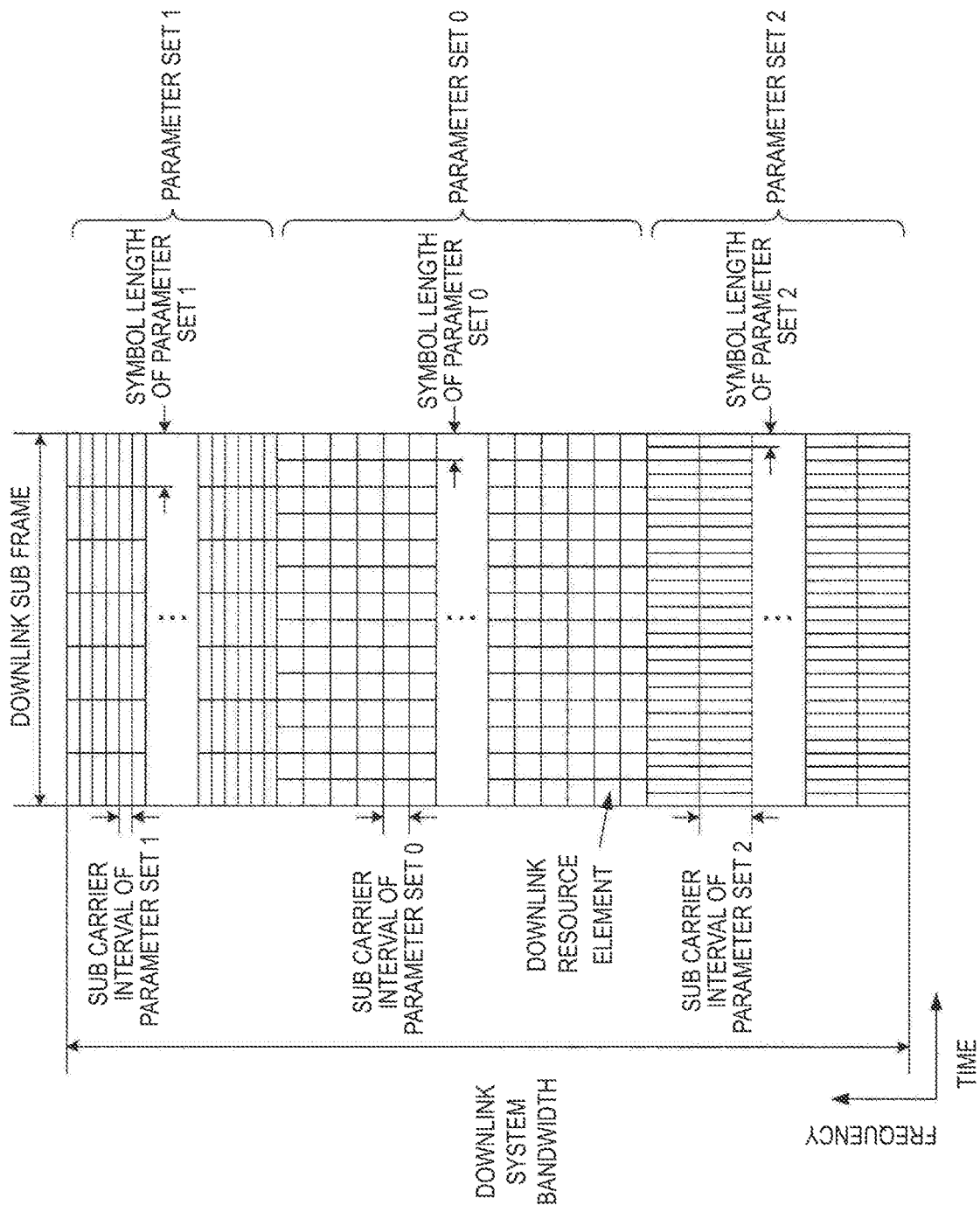
FIG. 4 is a diagram illustrating an example of an NR downlink subframe of the present embodiment.

FIG. 4 is a diagram illustrating an example of an NR downlink subframe of the present embodiment. In the example of FIG. 4, signals generated using parameter set 1, parameter set 0, and parameter set 2 are subjected to FDM in a cell (system bandwidth). The diagram illustrated in FIG. 4 is also referred to as a downlink resource grid of NR. The base station device 1 can transmit the downlink physical channel of NR and/or the downlink physical signal of NR in a downlink subframe to the terminal device 2. The terminal device 2 can receive a downlink physical channel of NR and/or the downlink physical signal of NR in a downlink subframe from the base station device 1.

Figure 5:
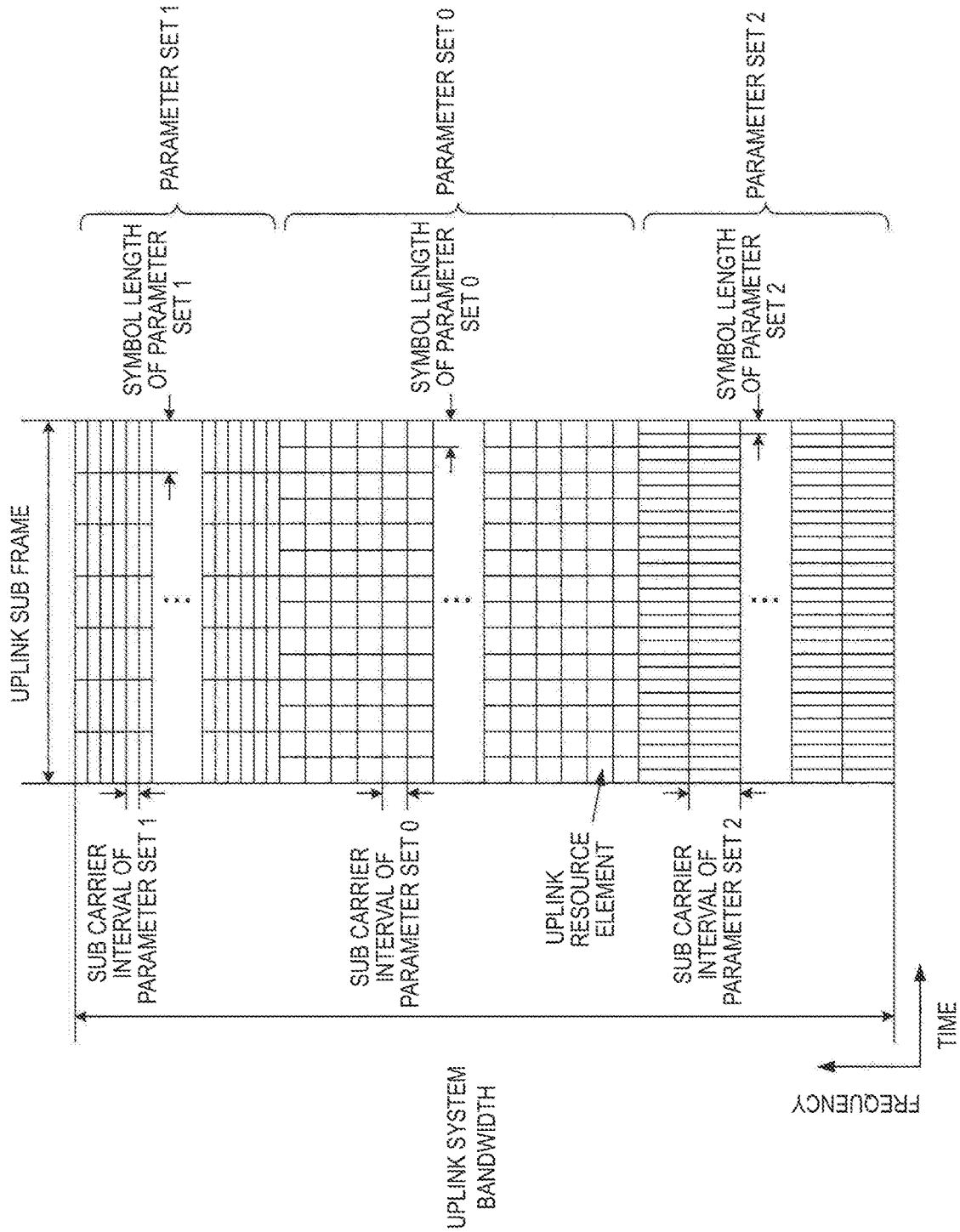
FIG. 5 is a diagram illustrating an example of an NR uplink subframe of the present embodiment.

FIG. 5 is a diagram illustrating an example of an NR uplink subframe of the present embodiment. In the example of FIG. 5, signals generated using parameter set 1, parameter set 0, and parameter set 2 are subjected to FDM in a cell (system bandwidth). The diagram illustrated in FIG. 4 is also referred to as an uplink resource grid of NR. The base station device 1 can transmit the uplink physical channel of NR and/or the uplink physical signal of NR in an uplink subframe to the terminal device 2. The terminal device 2 can receive an uplink physical channel of NR and/or the uplink physical signal of NR in an uplink subframe from the base station device 1.

<Antenna Port in Present Embodiment>

An antenna port is defined so that a propagation channel carrying a certain symbol can be inferred from a propagation channel carrying another symbol in the same antenna port. For example, different physical resources in the same antenna port can be assumed to be transmitted through the same propagation channel. In other words, for a symbol in a certain antenna port, it is possible to estimate and demodulate a propagation channel in accordance with the reference signal in the antenna port. Further, there is one resource grid for each antenna port. The antenna port is defined by the reference signal. Further, each reference signal can define a plurality of antenna ports.

The antenna port is specified or identified with an antenna port number. For example, antenna ports 0 to 3 are antenna ports with which CRS is transmitted. That is, the PDSCH transmitted with antenna ports 0 to 3 can be demodulated to CRS corresponding to antenna ports 0 to 3.

In a case in which two antenna ports satisfy a predetermined condition, the two antenna ports can be regarded as being a quasi co-location (QCL). The predetermined condition is that a wide area characteristic of a propagation channel carrying a symbol in one antenna port can be inferred from a propagation channel carrying a symbol in another antenna port. The wide area characteristic includes a delay dispersion, a Doppler spread, a Doppler shift, an average gain, and/or an average delay.

In the present embodiment, the antenna port numbers may be defined differently for each RAT or may be defined commonly between RATs. For example, antenna ports 0 to 3 in LTE are antenna ports with which CRS is transmitted. In the NR, antenna ports 0 to 3 can be set as antenna ports with which CRS similar to that of LTE is transmitted. Further, in NR, the antenna ports with which CRS is transmitted like LTE can be set as different antenna port numbers from antenna ports 0 to 3. In the description of the present embodiment, predetermined antenna port numbers can be applied to LTE and/or NR.

<Physical Channel and Physical Signal in Present Embodiment>

In the present embodiment, physical channels and physical signals are used.

The physical channels include a physical downlink channel, a physical uplink channel, and a physical sidelink channel. The physical signals include a physical downlink signal, a physical uplink signal, and a sidelink physical signal.

In LTE, a physical channel and a physical signal are referred to as an LTE physical channel and an LTE physical signal. In NR, a physical channel and a physical signal are referred to as an NR physical channel and an NR physical signal. The LTE physical channel and the NR physical channel can be defined as different physical channels, respectively. The LTE physical signal and the NR physical signal can be defined as different physical signals, respectively. In the description of the present embodiment, the LTE physical channel and the NR physical channel are also simply referred to as physical channels, and the LTE physical signal and the NR physical signal are also simply referred to as physical signals. That is, the description of the physical channels can be applied to any of the LTE physical channel and the NR physical channel. The description of the physical signals can be applied to any of the LTE physical signal and the NR physical signal.

The physical downlink channel includes a Physical Broadcast Channel (PBCH), a Physical Control Format Indicator Channel (PCFICH), a Physical Hybrid automatic repeat request Indicator Channel (PHICH), a Physical Downlink Control Channel (PDCCH), an Enhanced PDCCH (EPDCCH), a Machine Type Communication (MTC) PDCCH (MTC MPDCCH), a Relay PDCCH (R-PDCCH), a Physical Downlink Shared. Channel (PDSCH), a Physical Multicast Channel (PMCH), and the like.

The physical downlink signal includes a Synchronization Signal (SS), a Downlink Reference Signal (DL-RS), a Discovery Signal (DS), and the like.

The synchronization signal includes a primary synchronization signal (PSS), a secondary synchronization signal (SSS), and the like.

The reference signal in the downlink includes a cell-specific reference signal (CRS), a UE-specific reference signal associated with the PDSCH (PDSCH-DMRS), a demodulation reference signal associated with the EPDCCH (EPDCCH-DMRS), a positioning reference signal (PRS), a channel state information (CSI) reference signal (CSI-RS), a tracking reference signal (IRS), and the like. The PDSCH-DMRS is also referred to as a UE-specific reference signal (URS) associated with the PDSCH or referred to simply as a URS. The EPDCCH-DMRS is also referred to as a DMRS associated with the EPDCCH or referred to simply as DMRS. The PDSCH-DMRS and the EPDCCH-DMRS are also referred to simply as a DL-DMRS or a downlink demodulation reference signal. The CSI-RS includes a non-zero power CSI-RS (NZP CSI-RS). Further, the downlink resources include a zero power CSI-RS (ZP CSI-RS), a channel state information-interference measurement (CSI-IM), and the like.

The physical uplink channel includes a physical uplink shared channel (PUSCH), a physical uplink control channel (PDCCH), a physical random access channel (PRACH), and the like.

The physical uplink signal includes an uplink reference signal (UL-RS).

The uplink reference signal includes an uplink demodulation signal (DL-DMRS), a sounding reference signal (SRS), and the like. The UL-DMRS is associated with transmission of the PUSCH or the PUCCH. The SRS is not associated with transmission of the PUSCH or the PUCCH.

The physical sidelink channel includes a Physical Sidelink Broadcast Channel (PSBCH), a Physical Sidelink Control Channel (PSBCH), a Physical Sidelink Discovery Channel (PSDCH), a Physical Sidelink Shared Channel (PSBCH), and the like.

The physical channel and the physical signal are also simply referred to a channel and a signal. That is, the physical downlink channel, the physical uplink channel, and the physical sidelink channel are also referred to as a downlink channel, an uplink channel, and a sidelink channel, respectively. The physical downlink signal, the physical uplink signal, and the physical sidelink signal are also referred to as a downlink signal, an uplink signal, and a sidelink signal, respectively.

The BCH, the MCH, the UL-SCH, the DL-SCH, the SL-DCH, the SL-BCH, and the SL-SCH are transport channels. The channel used in the medium access control (MAC) layer is referred to as a transport channel. A unit of the transport channel used in the MAC layer is also referred to as a transport block (TB) or a MAC protocol data unit (MAC PDU). In the MAC layer, control of a hybrid automatic repeat request (HARQ) is performed for each transport block. The transport block is a unit of data that the MAC layer transfers (delivers) to the physical layer. In the physical layer, the transport block is mapped to a codeword, and an encoding process is performed for each codeword.

Note that the downlink reference signal and the uplink reference signal are also simply referred to as reference signals (RSs).

<LTE Physical Channel and LTE Physical Signal in Present Embodiment>

As described above, the description of the physical channel and the physical signal can also be applied to the LTE physical channel and the LTE physical signal, respectively. The LTE physical channel and the LTE physical signal are referred to as the following.

The LTE physical downlink channel includes an LTE-PBCH, an LTE-PCFICH, an LTE-PHICH, an LTE-PDCCH, an LTE-EPDCCH, an LTE-MPDCCH, an LTE-R-PDCCH, an LTE-PDSCH, an LTE-PMCH, and the like.

The LTE physical downlink signal an LTE-SS, an LTE-DL-RS, an LTE-DS, and the like. The LTE-SS includes an LTE-PSS, an LTE-SSS, and the like. The LTE-RS includes an LTE-CRS, an LTE-PDSCH-DMRS, an LTE-EPDCCH-DMRS, an LTE-RRS, an LTE-CSI-RS, an LTE-TRS, and the like.

The LTE physical uplink channel includes an LTE-PUSCH, an LTE-PUCCH, an LTE-PRACH, and the like.

The LTE physical uplink signal includes an LTE-UL-RS. The LTE-UL-RS includes an LTE-UL-DMRS, an LTE-SRS, and the like.

The LTE physical sidelink channel includes an LTE-PSBCH, an LTE-PSCCH, an LTE-PSDCH, an LTE-PSSCH, and the like.

The LTE physical sidelink signal includes an LTE-SL-SS, an LTE-SL-DS, and an LTE-SL-RS, and the like. The LTE-SL-SS includes an LTE-SL-PSS, an LTE-SL-SSS, and the like. The LTE-SL-RS includes an LTE-SL-DMRS, an LTE-SL-SRS, an LTE-SL-CSI-RS, and the like.

<NR Physical Channel and NR Physical Signal in Present Embodiment>

As described above, the description of the physical channel and the physical signal can also be applied to the NR physical channel and the NR physical signal, respectively. The NR physical channel and the NR physical signal are referred to as the following.

The NR physical downlink channel includes an NR-PBCH, an NR-PCFICH, an NR-PHICH, an NR-PDCCH, an NR-EPDCCH, an NR-MPDCCH, an NR-R-PDCCH, an NR-PDSCH, an NR-PMCH, and the like.

The NR physical downlink signal includes an NR-SS, an NR-DL-RS, an NR-DS, and the like. The NR-SS includes an NR-PSS, an NR-SSS, and the like. The NR-RS includes an NR-CRS, an NR-PDSCH-DIMS, an NR-EPDCCH-DMRS, an NR-PRS, an NR-CSI-RS, an NR-TRS, and the like.

The NR physical uplink channel includes an NR-PUSCH, an NR-PUCCH, an NR-PRACH, and the like.

The NR physical uplink signal includes an NR-UL-RS. The NR-UL-RS includes an NR-UL-DMRS, an NR-SRS, and the like.

The NR physical sidelink channel includes an NR-PSBCH, an NR-PSCCH, an NR-PSDCH, an NR-PSSCH, and the like.

The NR physical sidelink signal includes an NR-SL-SS, an NR-SL-DS, an NR-SL-RS, and the like. The NR-SL-SS includes an NR-SL-PSS, an NR-SL-SSS, and the like. The NR-SL-RS includes an NR-SL-DMRS, an NR-SL-SRS, an NR-SL-CSI-RS, and the like.

<Downlink Physical Channel in Present Embodiment>

The PBCH is used to broadcast a master information block (MIB) which is broadcast information specific to a serving cell of the base station device 1. The PBCH is transmitted only through the subframe 0 in the radio frame. The MIB can be updated at intervals of 40 ms. The PBCH is repeatedly transmitted with a cycle of 10 ms. Specifically, initial transmission of the MIB is performed in the subframe 0 in the radio frame satisfying a condition that a remainder obtained by dividing a system frame number (SFN) by 4 is 0, and retransmission (repetition) of the MIB is performed in the subframe 0 in all the other radio frames. The SFN is a radio frame number (system frame number). The MIB is system information. For example, the MIB includes information indicating the SFN.

The PHICH is used to transmit an HARQ-ACK (an HARQ indicator, HARQ feedback, and response information)) indicating ACKnowledgment (ACK) or negative ACKnowledgment (NACK) of uplink data (an uplink shared channel (UL-SCH)) received by the base station device 1. For example, in a case in which the HARQ-ACK indicating ACK is received by the terminal device 2, corresponding uplink data is not retransmitted. For example, in a case in which the terminal device 2 receives the HARQ-ACK indicating NACK, the terminal device retransmits corresponding uplink data through a predetermined uplink subframe. A certain PHICH transmits the HARQ-ACK for certain uplink data. The base station device 1 transmits each HARQ-ACK to a plurality of pieces of uplink data included in the same PUSCH using a plurality of PHICHs.

The PDCCH and the EPDCCH are used to transmit downlink control information (DCI). Mapping of an information bit of the downlink control information is defined as a DCI format. The downlink control information includes a downlink grant and an uplink grant. The downlink grant is also referred to as a downlink assignment or a downlink allocation.

The PDCCH is transmitted by a set of one or more consecutive control channel elements (CCEs). The CCE includes 9 resource element groups (REGs). An REG includes 4 resource elements. In a case in which the PDCCH is constituted by n consecutive CCEs, the PDCCH starts with a CCE satisfying a condition that a remainder after dividing an index (number) i of the CCE by n is 0.

The EPDCCH is transmitted by a set of one or more consecutive enhanced control channel elements (ECCEs). The ECCE is constituted by a plurality of enhanced resource element groups (EREGs).

The downlink grant is used for scheduling of the PDSCH in a certain cell. The downlink grant is used for scheduling of the PDSCH in the same subframe as a subframe in which the downlink grant is transmitted. The uplink grant is used for scheduling of the PUSCH in a certain cell. The uplink grant is used for scheduling of a single PUSCH in a fourth subframe from a subframe in which the uplink grant is transmitted or later.

A cyclic redundancy check (CRC) parity bit is added to the DCI. The CRC parity bit is scrambled using a radio network temporary identifier (RNTI). The RNTI is an identifier that can be specified or set in accordance with a purpose of the DCI or the like. The RNTI is an identifier specified in a specification in advance, an identifier set as information specific to a cell, an identifier set as information specific to the terminal device 2, or an identifier set as information specific to a group to which the terminal device 2 belongs. For example, in monitoring of the PDCCH or the EPDCCH, the terminal device 2 descrambles the CRC parity bit added to the DCI with a predetermined RNTI and identifies whether or not the CRC is correct. In a case in which the CRC is correct, the DCI is understood to be a DCI for the terminal device 2.

The PDSCH is used to transmit downlink data (a downlink shared channel (DL-SCH)). Further, the PDSCH is also used to transmit control information of a higher layer.

The PMCH is used to transmit multicast data (a multicast channel (MCH)).

In the PDCCH region, a plurality of PDCCHs may be multiplexed according to frequency, time, and/or space. In the EPDCCH region, a plurality of EPDCCHs may be multiplexed according to frequency, time, and/or space. In the PDSCH region, a plurality of PDSCHs may be multiplexed according to frequency, time, and/or space. The PDCCH, the PDSCH, and/or the EPDCCH may be multiplexed according to frequency, time, and/or space.

< Downlink Physical Signal in Present Embodiment>

A synchronization signal is used for the terminal device 2 to obtain downlink synchronization in the frequency domain and/or the time domain. The synchronization signal includes a primary synchronization signal (PSS) and a secondary synchronization signal (SSS). The synchronization signal is placed in a predetermined subframe in the radio frame. For example, in the TDD scheme, the synchronization signal is placed in the subframes 0, 1, 5, and 6 in the radio frame. In the FDD scheme, the synchronization signal is placed in the subframes 0 and 5 in the radio frame.

The PSS may be used for coarse frame/symbol timing synchronization (synchronization in the time domain) or identification of a cell identification group. The SSS may be used for more accurate frame timing synchronization, cell identification, or CP length detection. In other words, frame timing synchronization and cell identification can be performed using the PSS and the SSS.

The downlink reference signal is used for the terminal device 2 to perform propagation path estimation of the downlink physical channel, propagation path correction, calculation of downlink channel state information (CSI), and/or measurement of positioning of the terminal device 2.

The CRS is transmitted in the entire band of the subframe. The CRS is used for receiving (demodulating) the PBCH, the PDCCH, the PHICH, the PCFICH, and the PDSCH. The CRS may be used for the terminal device 2 to calculate the downlink channel state information. The PBCH, the PDCCH, the PHICH, and the PCFICH are transmitted through the antenna port used for transmission of the CRS. The CRS supports the antenna port configurations of 1, 2, or 4. The CRS is transmitted through one or more of the antenna ports 0 to 3.

The URS associated with the PDSCH is transmitted through a subframe and a band used for transmission of the PDSCH with which the URS is associated. The URS is used for demodulation of the PDSCH to which the URS is associated. The URS associated with the PDSCH is transmitted through one or more of the antenna ports 5 and 7 to 14.

The PDSCH is transmitted through an antenna port used for transmission of the CRS or the URS on the basis of the transmission mode and the DCI format. A DCI format 1A is used for scheduling of the PDSCH transmitted through an antenna port used for transmission of the CRS. A DCI format 2D is used for scheduling of the PDSCH transmitted through an antenna port used for transmission of the URS.

The DMRS associated with the EPDCCH is transmitted through a subframe and a band used for transmission of the EPDCCH to which the DMRS is associated. The DMRS is used for demodulation of the EPDCCH with which the DMRS is associated. The EPDCCH is transmitted through an antenna port used for transmission of the DMRS. The DMRS associated with the EPDCCH is transmitted through one or more of the antenna ports 107 to 114.

The CSI-RS is transmitted through a set subframe. The resources in which the CSI-RS is transmitted are set by the base station device 1. The CSI-RS is used for the terminal device 2 to calculate the downlink channel state information. The terminal device 2 performs signal measurement (channel measurement) using the CSI-RS. The CSI-RS supports setting of some or all of the antenna ports 1, 2, 4, 8, 12, 16, 24, and 32. The CSI-RS is transmitted through one or more of the antenna ports 15 to 46. Further, an antenna port to be supported may be decided on the basis of a terminal device capability of the terminal device 2, setting of an RRC parameter, and/or a transmission mode to be set.

Resources of the ZP CSI-RS are set by a higher layer. Resources of the ZP CSI-RS may be transmitted with zero output power. In other words, the resources of the ZP CSI-RS may transmit nothing. The ZP PDSCH and the EPDCCH are not transmitted in the resources in which the ZP CSI-RS is set. For example, the resources of the ZP CSI-RS are used for a neighbor cell to transmit the NZP CSI-RS. Further, for example, the resources of the ZP CSI-RS are used to measure the CSI-IM. Further, for example, the resources of the ZP CSI-RS are resources with which a predetermined channel such as the PDSCH is not transmitted. In other words, the predetermined channel is mapped (to be rate-matched or punctured) except for the resources of the ZP CSI-RS.

Resources of the CSI-IM are set by the base station device 1. The resources of the CSI-IM are resources used for measuring interference in CSI measurement. The resources of the CSI-IM can be set to overlap some of the resources of the ZP CSI-RS. For example, in a case in which the resources of the CSI-IM are set to overlap some of the resources of the ZP CSI-RS, a signal from a cell performing the CSI measurement is not transmitted in the resources. In other words, the base station device 1 does not transmit the PDSCH, the EPDCCH, or the like in the resources set by the CSI-IM. Therefore, the terminal device 2 can perform the CSI measurement efficiently.

The MBSFN RS is transmitted in the entire band of the subframe used for transmission of the PMCH. The MBSFN RS is used for demodulation of the PMCH. The PMCH is transmitted through an antenna port used for transmission of the MBSFN RS. The MBSFN RS is transmitted through the antenna port 4.

The PRS is used for the terminal device 2 to measure positioning of the terminal device 2. The PRS is transmitted through the antenna port 6.

The TRS can be mapped only to predetermined subframes. For example, the TRS is mapped to the subframes 0 and 5. Further, the IRS can use a configuration similar to a part or all of the CRS. For example, in each resource block, a position of a resource element to which the IRS is mapped can be caused to coincide with a position of a resource element to which the CRS of the antenna port 0 is mapped. Further, a sequence (value) used for the IRS can be decided on the basis of information set through the PBCH, the PDCCH, the EPDCCH, or the PDSCH (RRC signaling). A sequence (value) used for the IRS can be decided on the basis of a parameter such as a cell ID (for example, a physical layer cell identifier), a slot number, or the like. A sequence (value) used for the IRS can be decided by a method (formula) different from that of a sequence (value) used for the CRS of the antenna port 0.

<Uplink Physical Signal in Present Embodiment>

The PUCCH is a physical channel used for transmitting uplink control information (UCI). The uplink control information includes downlink channel state information (CSI), a scheduling request (SR) indicating a request for PUSCH resources, and a HARQ-ACK to downlink data (a transport block (TB) or a downlink-shared channel (DL-SCH)). The HARQ-ACK is also referred to as ACK/NACK, HARQ feedback, or response information. Further, the HARQ-ACK to downlink data indicates ACK, NACK, or DTX.

The PUSCH is a physical channel used for transmitting uplink data (uplink-shared channel (UL-SCH)). Further, the PUSCH may be used to transmit the HARQ-ACK and/or the channel state information together with uplink data. Further, the PUSCH may be used to transmit only the channel state information or only the HARQ-ACK and the channel state information.

The PRACH is a physical channel used for transmitting a random access preamble. The PRACH can be used for the terminal device 2 to obtain synchronization in the time domain with the base station device 1. Further, the PRACH is also used to indicate an initial connection establishment procedure (process), a handover procedure, a connection re-establishment procedure, synchronization (timing adjustment) for uplink transmission, and/or a request for PUSCH resources.

In the PUCCH region, a plurality of PUCCHs is frequency, time, space, and/or code multiplexed. In the PUSCH region, a plurality of PUSCHs may be frequency, time, space, and/or code multiplexed. The PUCCH and the PUSCH may be frequency, time, space, and/or code multiplexed. The PRACH may be placed over a single subframe or two subframes. A plurality of PRACHs may be code-multiplexed.

<Physical Uplink Signal in Present Embodiment>

The uplink DMRS is associated with transmission of the PUSCH or the PUCCH. The DMRS is time-multiplexed with the PUSCH or the PUCCH. The base station device 1 may use the DMRS to perform the propagation path correction of the PUTSCH or the PUCCH. In the description of the present embodiment, the transmission of the PUSCH also includes multiplexing and transmitting the PUSCH and DMRS. In the description of the present embodiment, the transmission of the PUCCH also includes multiplexing and transmitting the PUCCH and the DMRS. Further, the uplink DMRS is also referred to as an UL-DMRS. The SRS is not associated with the transmission of the PUSCH or the PUCCH. The base station device 1 may use the SRS to measure the uplink channel state.

The SRS is transmitted using the last SC-TDMA symbol in the uplink subframe. In other words, the SRS is placed in the last SC-TDMA symbol in the uplink subframe. The terminal device 2 can restrict simultaneous transmission of the SRS, the PUCCH, the PUSCH, and/or the PRACH in a certain SC-FDMA symbol of a certain cell. The terminal device 2 can transmit the PUSCH and/or the PUCCH using the SC-TDMA symbol excluding the last SC-FDMA symbol in a certain uplink subframe of a certain cell in the uplink subframe and transmit the SRS using the last SC-FDMA symbol in the uplink subframe. In other words, the terminal device 2 can transmit the SRS, the PUSCH, and the PUCCH in a certain uplink subframe of a certain cell.

In the SRS, a trigger type 0 SRS and a trigger type 1 SRS are defined as SRSs having different trigger types. The trigger type 0 SRS is transmitted in a case in which a parameter related to the trigger type 0 SRS is set by signaling of a higher layer. The trigger type 1 SRS is transmitted in a case in which a parameter related to the trigger type 1 SRS is set by signaling of the higher layer, and transmission is requested by an SRS request included in the DCI format 0, 1A, 2B, 2C, 2D, or 4. Further, the SRS request is included in both FDD and TDD for the DCI format 0, 1A, or 4 and included only in TDD for the DCI format 2B, 2C, or 2D. In a case in which the transmission of the trigger type 0 SRS and the transmission of the trigger type 1 SRS occur in the same subframe of the same serving cell, a priority is given to the transmission of the trigger type 1 SRS.

<Physical Sidelink Channel in Present Embodiment>

The PSBCH is used to broadcast a master information block-sidelink (MIB-SL) which is broadcast information specific to a physical sidelink channel of a serving cell of the base station device. The PSBCH is transmitted along with a PSSS, an SSSS, an SL-DMRS as sidelink synchronization subframe (SLSS) in a radio frame. An MIB-SL is system information. For example, the MIB-SL includes information indicating an SFN (a direct frame number, a direct subframe number, or the like), information indicating a frequency bandwidth of a physical sidelink channel, (a SL-bandwidth, or the like), information indicating a cell coverage in which a transmission terminal device is located (in-coverage, or the like), and information indicating a physical sidelink channel configuration in the case of TDD (tdd-ConfigSL, or the like).

The PSCCH is used to transmit sidelink control information (SCI). Mapping of an information bit of sidelink control information is defined as an SCI format. The sidelink control information includes a sidelink grant. The sidelink grant is also referred to as a sidelink assignment or sidelink allocation.

The PSCCH is transmitted by a set of one or more consecutive control channel elements (CCEs). The CCE includes 9 resource element groups (REGs). An REG includes 4 resource elements. In a case in which the PSCCH is constituted by n consecutive CCEs, the PSCCH starts with a CCE satisfying a condition that a remainder after dividing an index (number) i of the CCE by n is 0.

The sidelink grant is used for scheduling of a PSSCH within a cell. The sidelink grant is used for scheduling of a PSSCH within the same subframe as the subframe in which the sidelink grant is transmitted.

A cyclic redundancy check (CRC) parity bit is added to the SCI. The CRC parity bit is scrambled using a radio network temporary identifier (RNTI). The RNTI is an identifier that can be specified or set in accordance with a purpose of the SCI or the like. The RNTI is an identifier specified in a specification in advance, an identifier set as information specific to a cell, an identifier set as information specific to the terminal device, an identifier set as information specific to a group to which the terminal device belongs, or an identifier set as information specific to a sidelink. For example, in monitoring of the PSCCH, the terminal device descrambles the CRC parity bit added to the SCI with a predetermined RNTI and identifies whether or not the CRC is correct. In a case in which the CRC is correct, the SCI is understood to be a SCI for the terminal device.

The PSSCH is used to transmit sidelink data (a sidelink shared channel (SL-SCH)). Further, the PSSCH is also used to transmit control information of a higher lager.

In the PSCCH region, a plurality of PSCCHs may be multiplexed according to frequency, time, and/or space. In the PSSCH region, a plurality of PSSCH s may be multiplexed according to frequency, time, and/or space. The PSSCH and/or the PSCCH may be multiplexed according to frequency, time, and/or space.

<Physical Sidelink Signal in Present Embodiment>

The sidelink synchronization signal is used by the terminal device to achieve synchronization of the frequency domain and/or time domain of the sidelink. The synchronization signal includes a primary sidelink synchronization signal (PSSS) and a secondary sidelink synchronization signal (SSSS). The synchronization signal is placed in a predetermined subframe within a radio frame. In the frequency domain, for example, the signal is placed in 62 resource elements around the center of the target frequency domain. In addition, in the time domain, the signal is placed in one or more consecutive symbols. For example, a PSSS is placed in the first and second symbols (or the first and second symbols of the first slot) in a subframe, and an SSSS is placed in the eleventh and twelfth symbols (or the fourth and fifth symbols of the second slot) in the subframe.

The PSSS may be used in coarse frame/symbol timing synchronization (synchronization of the time domain). The SSSS may be used for more accurate frame timing synchronization than the PSSS.

The sidelink reference signal is used for the terminal device to perform propagation path estimation (channel estimation) and propagation path correction (channel equalization/compensation) of the physical sidelink channel, calculation of channel state information (CSI) of the sidelink, and/or measurement of positioning of the terminal device.

The SL-DMRS is transmitted in a subframe and a frequency band to be used for transmission of channels with which the SL-DMRS is associated (PSBCH, PSCCH, PSCCH, PSSCH, and the like). The SL-DMRS is used for demodulation of the channels with which the SL-DMRS is associated.

The SL-CSI-RS is transmitted through a set subframe. The resources in which the SL-CSI-RS is transmitted are set by the base station device or the terminal device. The SL-CSI-RS is used for the terminal device to calculate the sidelink channel state information. The terminal device performs signal measurement (channel measurement) using the SL-CSI-RS. The SL-CSI-RS supports setting of some or all of the antenna ports 1, 2, 4, 8, 12, 16, 24, and 32. The SL-CSI-RS is transmitted through one or more of the antenna ports 15 to 46. Further, an antenna port to be supported may be decided on the basis of a terminal device capability of the terminal device, setting of an RRC parameter, and/or a transmission mode to be set.

The SL-SRS is transmitted using a predetermined symbol in a sidelink subframe. For example, the SL-SRS is placed in the last symbol of the subframe. Using a certain sidelink subframe of a certain cell, the terminal device can transmit the PSSCH and/or PSCCH using symbols excluding the last symbol included in the certain sidelink subframe and transmit the SL-SRS using the last symbol of the sidelink subframe. That is, the terminal device can transmit the SL-SRS, PSSCH, and PSCCH using sidelink subframes of a certain cell.

In the SL-SRS, a trigger type 0 SL-SRS and a trigger type 1 SL-SRS are defined as SL-SRS s having different trigger types. The trigger type 0 SL-SRS is transmitted in a case in which a parameter related to the trigger type 0 SL-SRS is set by signaling of a higher layer. The trigger type 1 SL-SRS is transmitted in a case in which a parameter related to the trigger type 1 SL-SRS is set by signaling of the higher layer, and transmission is requested by an SL-SRS request included in the DCI format. In a case in which the transmission of the trigger type 0 SL-SRS and the transmission of the trigger type 1 SL-SRS occur in the same subframe of the same serving cell, a priority is given to the transmission of the trigger type 1 SL-SRS.

The PSSCH is transmitted through an antenna port used for transmission of the SL-DMRS on the basis of a transmission mode and a DSI format.

<Physical Sidelink Channel Setting in Present Embodiment>

Allocation of resource pools of the sidelink in NR will be described below in detail.

In sidelink communication performed within cell coverage, it is possible to dynamically set resource pools of the sidelink in NR. A resource pool of the sidelink in NR is instructed by a base station using an NR-PDCCH. That is, NR-DCI included in the NR-PDCCH instructs a resource block and a subframe in which an NR-PSCCH, an NR-PSSCH, and sidelink ACK/NACK channels are transmitted and received.

Figure 6:
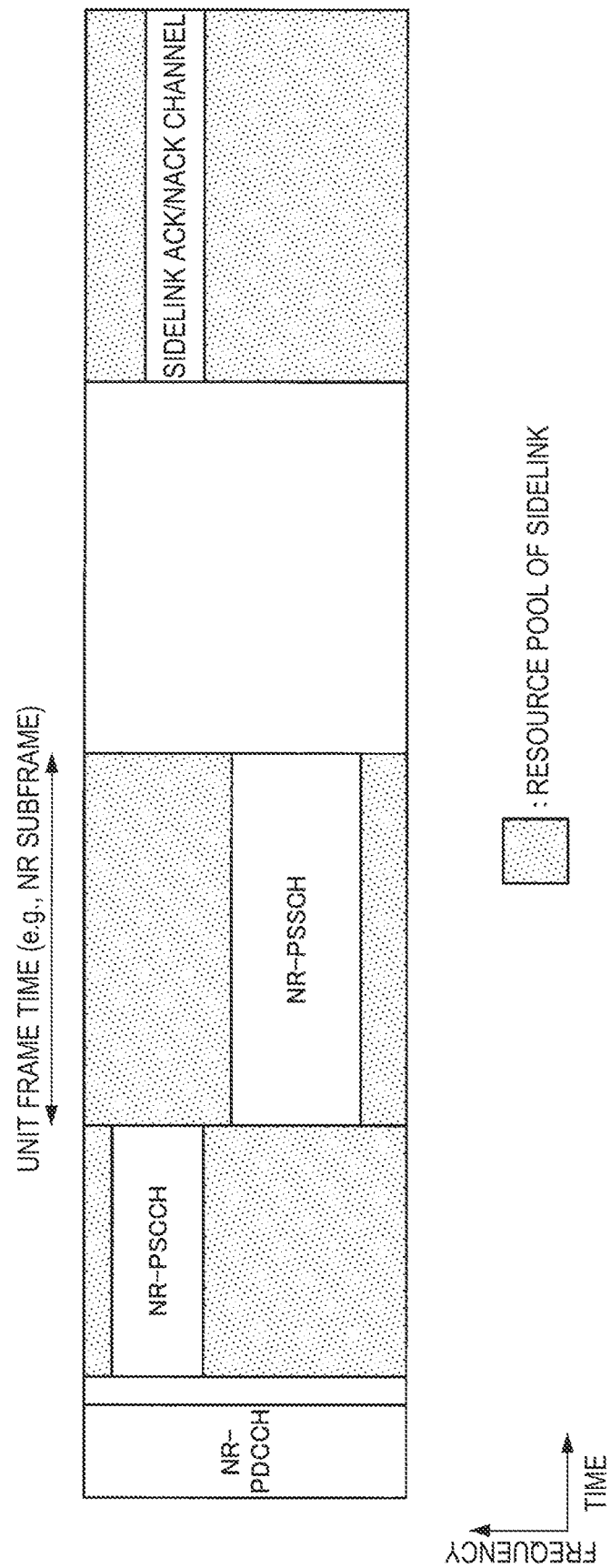
FIG. 6 is a diagram illustrating an example of dynamic resource pool allocation of a sidelink.

FIG. 6 is a diagram illustrating an example of dynamic resource pool allocation of a sidelink. A first terminal device sets the three last subframes including the subframe in which the NR-PDCCH is transmitted as a resource pool for sidelink communication with the NR-PDCCH. The first terminal device waits for a gap time for reception/transmission switch and a generation process of the NR-PSCCH and NR-PSSCH, and then transmits the NR-PSCCH to a second terminal device using the resource pool specified using the NR-PDCCH. Further, the first terminal device transmits the NR-PSCCH scheduled with an NR-SCI format included in the NR-PSCCH to the second terminal device using the resource pool designated with the NR-PDCCH. Finally, the second terminal device loads information regarding an ACK/NACK response to the NR-PSSCH transmitted from the first terminal device in a channel for the sidelink ACK/NACK to transmit the information regarding the ACK/NACK response to the first terminal device using the resource pool designated with the NR-PDCCH after waiting a gap time for a process of generating the channel for the sidelink ACK/NACK.

As an example of an instruction of a time resource pool by an NR-PDCCH, in a case in which a DCI for instructing the sidelink communication is included in an NR-PDCCH, the NR-PDCCH to a predetermined sub frame is instructed as a resource pool of the sidelink with regard to a time resource used for the sidelink communication. The first terminal device recognizes a time resource pool from the sub frame with which the DCI for instructing the sidelink communication is received. Note that the predetermined sub frame may be set in advance as, for example, three sub frames or the like or may be set from a higher layer by an SIB, a dedicated RRC message, or the like.

As an example of an instruction of a time resource pool using the NR-PDCCH, information for instructing a subframe is included in DCI included in NR-PDCCH for instructing sidelink communication, and thereby a time resource pool to be used in sidelink communication is instructed on the basis of the information. The first terminal device recognizes the time resource pool from the information for instructing the subframe. Methods of instructing a subframe include, for example, those using a subframe number, the number of subframes from the NR-PDCCH to the time resource pool, and the like.

As an example of an instruction of a frequency resource using the NR-PDCCH, a frequency resource to be used in sidelink communication is instructed on the basis of resource allocation information that is one of parameter of DCI included in the NR-PDCCH for instructing sidelink communication. The first terminal device recognizes the resource block instructed by the resource allocation information as a resource pool. The resource allocation information is information indicating a resource in which at least the NR-PSCCH is transmitted.

Note that the resource allocation information may be individually notified of with information indicating a resource transmitted with the NR-PSCCH, information indicating a resource transmitted with the NR-PSSCH, and information indicating a resource transmitted with a channel for the sidelink ACK/NACK.

In addition, the resource transmitted with the NR-PSSCH and the resource transmitted with the channel for the sidelink ACK/NACK may be associated with the information indicating the resource transmitted with the NR-PSCCH. For example, the frequency resource transmitted with the NR-PSSCH may be the same as the frequency resource transmitted with the NR-PSCCH. For example, the resource transmitted with the channel for the sidelink ACK/NACK In addition, a resource pool of a plurality of NR component carriers may be instructed from one NR-PDCCH. For example, a resource pool used for sidelink communication of a primary cell and a secondary cell of NR may be set from an NR-PDCCH transmitted with the primary cell of the NR.

In addition, a sub frame and a resource block with which an instruction of the resource pool by the NR-PDCCH is possible may be limited by higher layer information. The higher layer information is, for example, setting information specific to a terminal device in accordance with a dedicated RRC message or the like or broadcast information such as SIB. Candidates for the time and frequency resource pools are set with the higher layer information, and sub frames and resource blocks which can actually be used as the resource pools from the candidates are instructed with the DCI included in the NR-PDCCH and used to instruct the sidelink communication.

The NR-PDCCH including information regarding the resource pools of the sidelink is preferably transmitted in a manner specific to a terminal device or a terminal device group. That is, the NR-PDCCH including the resource pool information of the sidelink is preferably disposed in a search space decided with information specific to the terminal device, such as a C-RNTI, or is preferably disposed in a search space decided with information specific to the terminal device group.

As an example of monitoring of the NR-PSCCH by the second terminal device, the second terminal device normally continues monitoring of both the NR-PDCCH and the NR-PSCCH. In a case in which the NR-PDCCH destined for the second terminal device is detected, the second terminal device transitions to an uplink transmission process, a downlink reception process, or an NR-PSCCH transmission process. Otherwise, the second terminal device attempts to monitor the NR-PSCCH. In this case, in the second terminal device, candidates for a plurality of resources (candidates for the NR-PSCCH) with which there is a possibility of the NR-PSCCH transmitting is set from a high layer or set in advance. The second terminal device attempts blind decoding of the NR-PSCCH on the set candidates for the NR-PSCCH. The second terminal device is notified of setting information of the candidates for the NR-PSCCH using a dedicated RRC message in a case in which the second terminal device and the base station device are in an RRC connection state. In a case in which the second terminal device and the base station device are not in the RRC connection state, the setting information is broadcast to the second terminal device with a broadcast channel (NR-PSBCH) for sidelink of the NR transmitted by the first terminal device. The setting information included in the NR-PSBCH is information set from the base station device in a case in which the first terminal device is inside the cell. In a case in which the first terminal device is outside of the cell, the setting information included in the NR-PSBCH is information that is set in advance.

Note that the resource pool transmitted with the NR-PSBCH may also be instructed with the NR-PDCCH. A method of instructing the resource pool transmitted with the NR-PSBCH may also be similar to a method of instructing the resource pool transmitted with the NR-PSCCH.

As another example of the monitoring of the NR-PSCCH by the second terminal device, the second terminal device can receive the NR-PDCCH designated in the resource pool in a case in which the second terminal device is inside the cell. In a case in which the NR-PDCCH is received, the second terminal device attempts to decode the NR-PSCCH in the resource with which the NR-PSCCH is transmitted on the basis of information regarding the resource pool included in the NR-PDCCH. Otherwise, the second terminal device waits for a monitoring process until a subsequent unit frame. Thus, since an operation of attempting to decode the NR-PSCCH a plurality of times in one unit frame may not be performed, it is possible to expect an advantageous effect such as low power consumption of the terminal device and simplification of a receiver.

Figure 7:
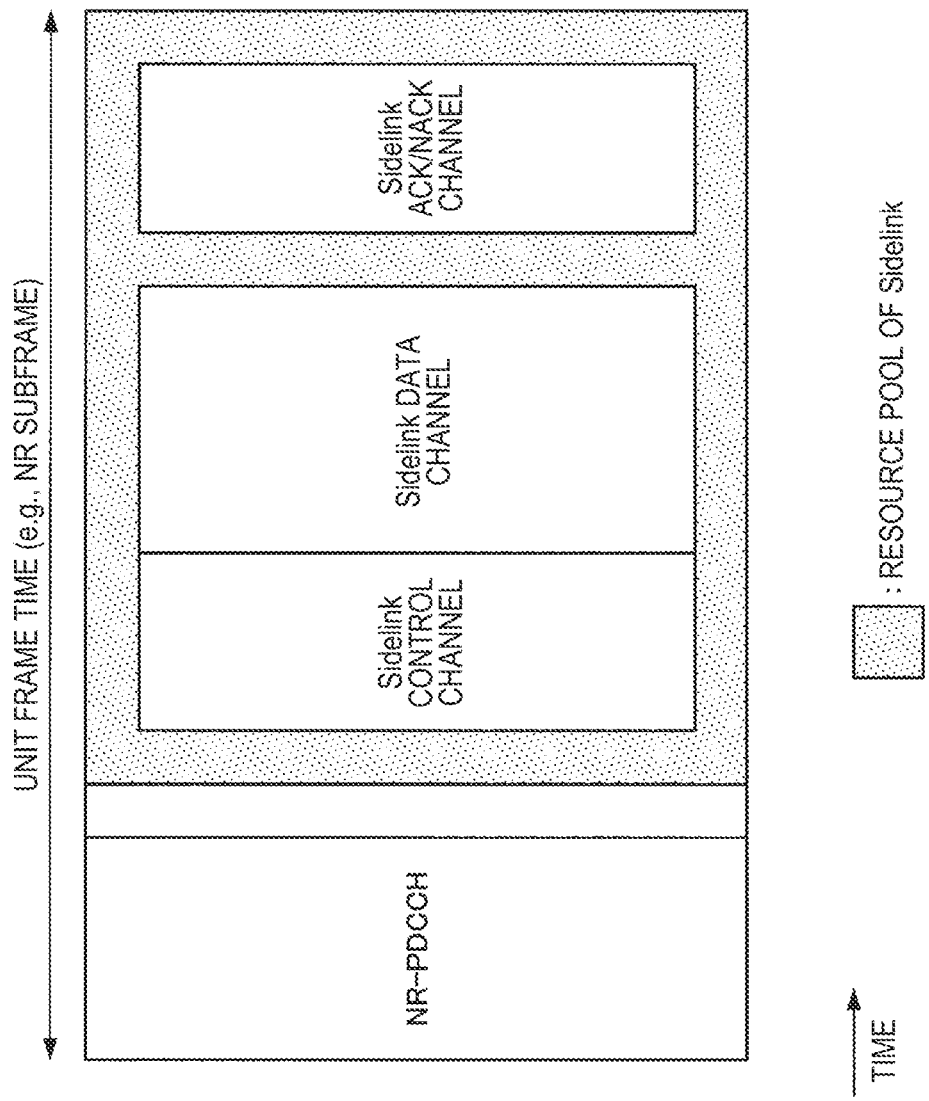
FIG. 7 is a diagram illustrating an example of dynamic resource pool allocation of a sidelink.

FIG. 7 is a diagram illustrating an example of the dynamic resource pool allocation of sidelinks. As a difference from FIG. 6, in a case in which self-contained transmission is also possible in the sidelink communication, transmission and reception of the NR-PSCCH, the NR-PSSCH, and the sidelink ACK/NACK channel can be contained by a resource pool for sidelink transmission allocated within one predetermined transceiving time (for example, a unit frame time), as illustrated in FIG. 7. The first terminal device recognizes the resource pool of the sidelink on the basis of a DCI (a first sidelink DCI) included in the NR-PDCCH and used to instruct the sidelink communication after the first terminal devices receives the NR-PDCCH. Then, the first terminal device transmits the NR-PSCCH and the NR-PSSCH using the resource pool of the sidelink instructed from the first sidelink DCI. The second terminal device attempts to decode the NR-PSSCH on the basis of information included in the NR-PSCCH after the second terminal device receives the NR-PSCCH transmitted from the first terminal device.

The first terminal device can decide a channel length of the NR-PSSCH on the basis of information regarding a time resource of the sidelink included in the first sidelink DCI. Alternatively, the first terminal device can recognize a time resource of the sidelink included in the NR-PDCCH on the basis of the information regarding a channel length of the NR-PSSCH included in the first sidelink DCI.

Thus, the self-contained transmission is also possible in the sidelink communication. By performing flexible resource control, an improvement in use efficiency of the resources in the system is favorable.

Figure 8:
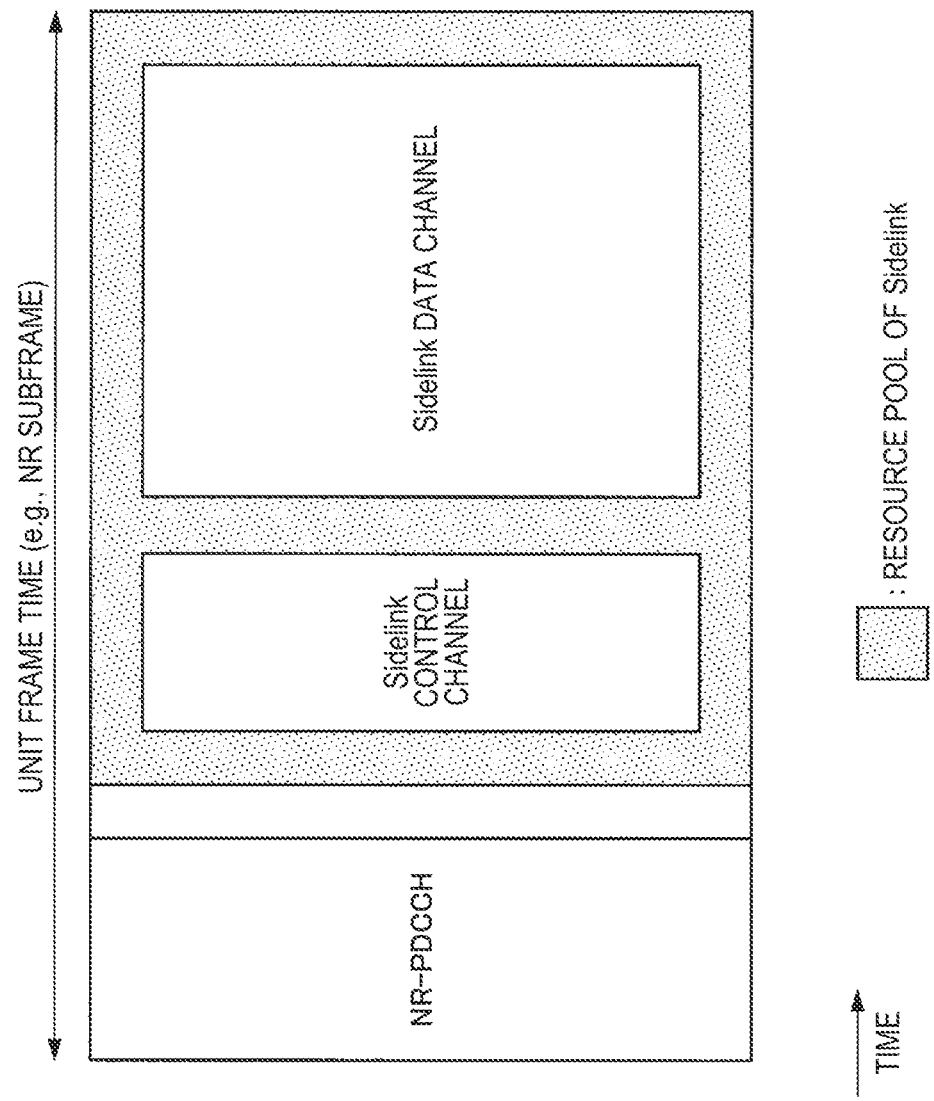
FIG. 8 is a diagram illustrating an example of dynamic resource pool allocation of a sidelink.

FIG. 8 is a diagram illustrating an example of dynamic resource pool allocation of a sidelink. The difference from FIG. 7 is that the first terminal device instructs scheduling information of NR-PSSCH transmission from the second terminal device to the second terminal device using the NR-PSCCH. The second terminal device waits for a gap time for a reception process of the NR-PSCCH and a transmission process of the NR-PSSCH and then transmits the NR-PSSCH on the basis of the information instructed using the NR-PSSCH. Accordingly, even in a case in which the second terminal device is present particularly outside a cell, the base station device can dynamically control the resource for sidelink communication used by the second terminal device through the first terminal device, and thus resource use efficiency of the system becomes satisfactory.

A DCI (a second sidelink DCI) included in the NR-PSCCH transmitted in FIG. 8 and used to instruct the sidelink communication is different from the first sidelink DCI included in the NR-PSCCH transmitted in FIG. 7 and used to instruct the sidelink communication. The DCI included in the NR-PSCCH transmitted in FIG. 7 and used to instruct the sidelink communication is a DCI for scheduling resources with which the NR-PSCCH and the NR-PSSCH are transmitted to the second terminal device by the first terminal device. The DCI included in the NR-PSCCH transmitted in FIG. 8 and used to instruct the sidelink communication is a DCI for scheduling resources with which the NR-PSCCH is transmitted to the second terminal device by the first terminal device and resources for transmitting the NR-PSSCH scheduled with the NR-PSCCH to the first terminal device by the second terminal device.

In addition, the SCI (first SCI) included in the NR-PSCCH transmitted in FIG. 7 is different from the SCI (second SCI) included in the NR-PSCCH transmitted in FIG. 8. The first SCI is used to instruct the second terminal device to receive the NR-PSSCH transmitted from the first terminal device. The second SCI is used to instruct the second terminal device to transmit the NR-PSSCH destined for the first terminal device.

Figure 9:
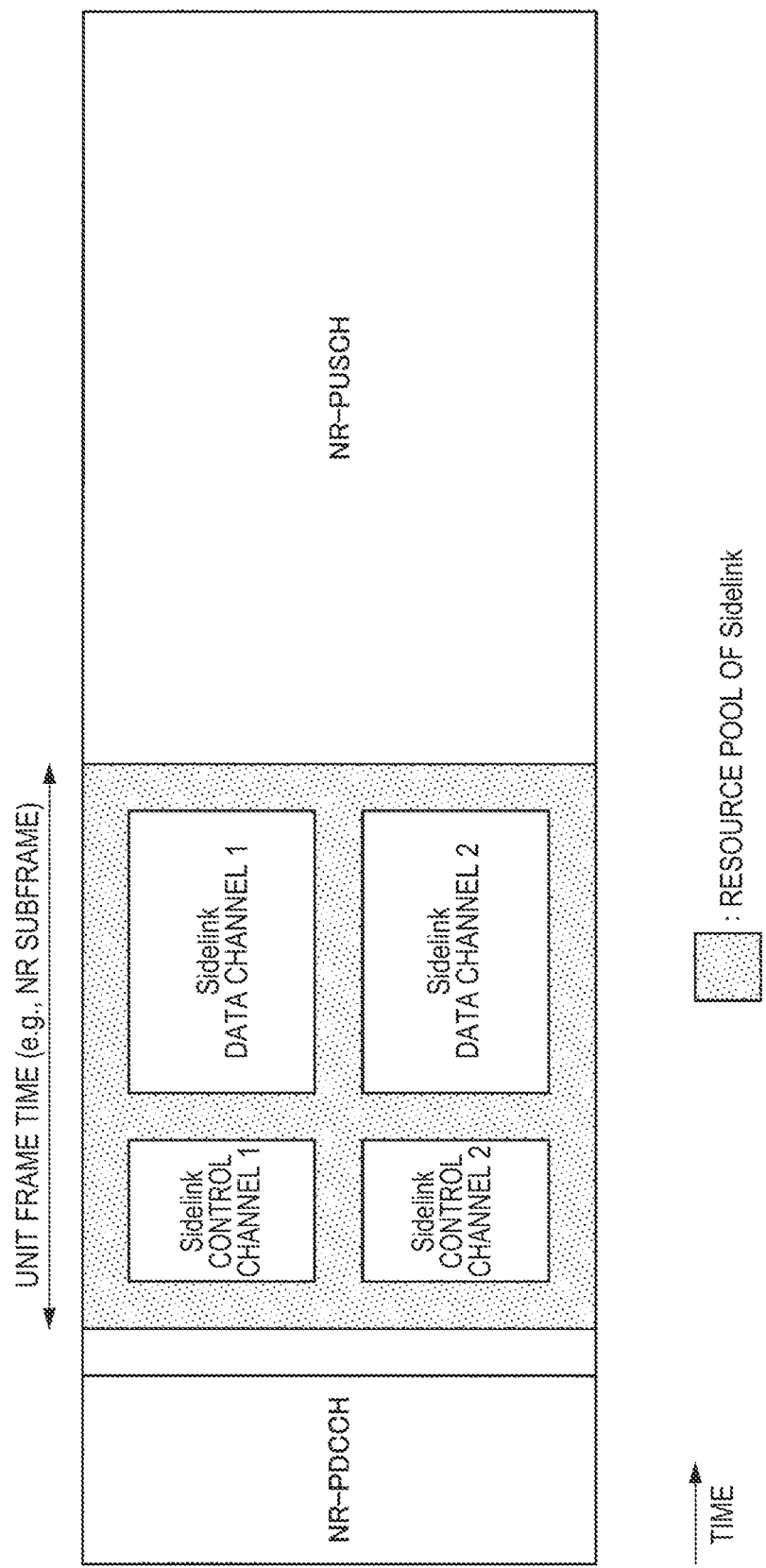
FIG. 9 is a diagram illustrating an example of dynamic resource pool allocation of a sidelink.

FIG. 9 is a diagram illustrating an example of dynamic resource pool allocation of a sidelink. FIG. 9 is on the assumption of a terminal device relay. In FIG. 9, a resource pool of the sidelink is instructed using the NR-PDCCH as in FIG. 8, and in addition, scheduling of the NR-PUSCH is performed. Similarly to FIG. 8, the first terminal device instructs transmission of the NR-PSSCH to the second terminal device and receives an SL-SCH from the second terminal device using the NR-PSCCH. Then, the first terminal device includes the received SL-SCH in the NR-PUSCH and transmits it to the base station device. Accordingly, the resource pool of the sidelink and scheduling of the NR-PUSCH can be performed with one NR-PDCCH, and thus, while overhead caused by the NR-PDCCH is reduced, a terminal device relay with low latency can be realized.

Figure 10:
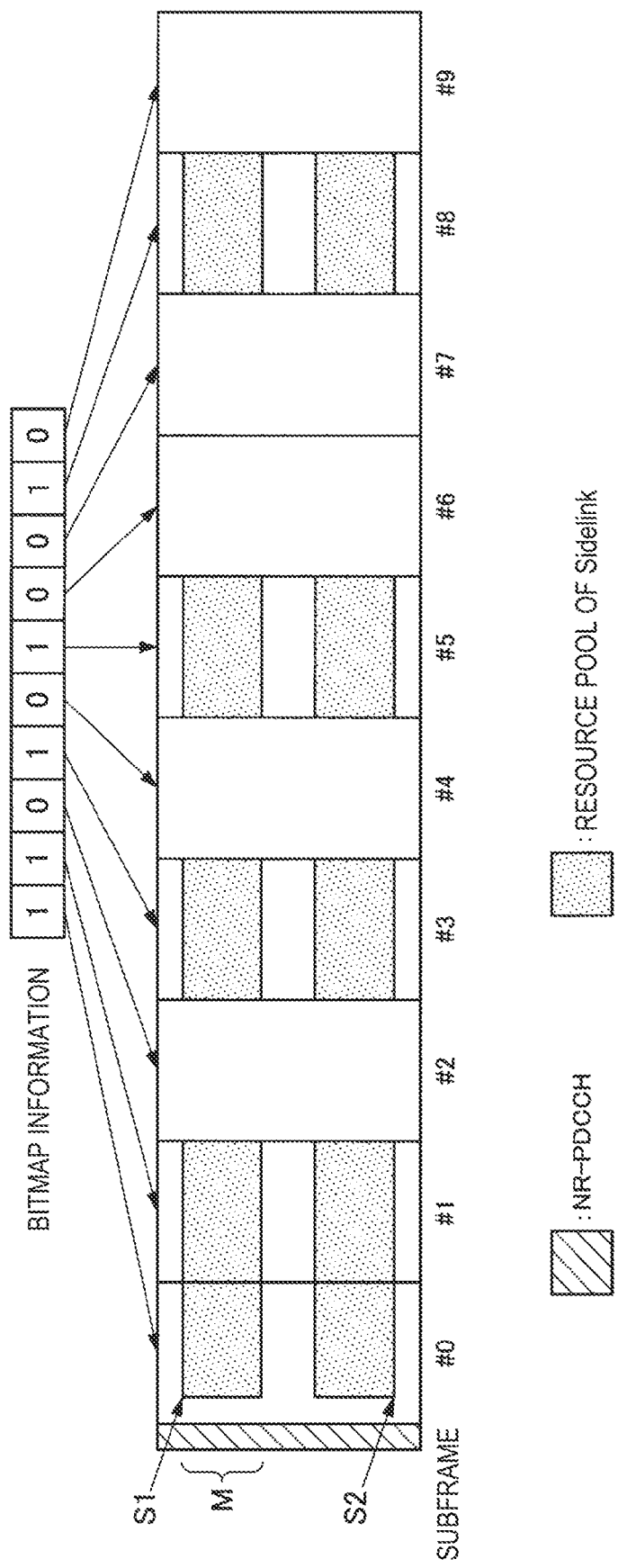
FIG. 10 is a diagram illustrating an example of dynamic resource pool allocation of a sidelink.

FIG. 10 is a diagram illustrating an example of dynamic resource pool allocation of a sidelink. In FIG. 10, resource pools of the sidelink are instructed in units of radio frames by the NR-PDCCH. Transmission is performed from subframe #0.

Information of the resource pools of the sidelink included in the NR-PDCCH is indicated using bitmap information indicating the subframe in which a resource pool of the sidelink is set by 1 or 0, a resource block start position S1, a resource block end position S2, and the number of consecutive resource blocks M.

It is preferable for the NR-PDCCH including the information of the resource pool of the sidelink to be sent to terminals to be shared. That is, it is desirable for the NR-PDCCH including the information of the resource pool of the sidelink to be placed in a search space common to terminal devices.

In a case in which the terminal device receives the NR-PDCCH including the resource pool information of the sidelink in sub frame #0, the resource pool is set between the wireless frames with which the NR-PDCCH is received using the resource pool information. On the other hand, in a case in which the terminal device the terminal device receives the NR-PDCCH including the resource pool information of the sidelink in sub frame #0, it is assumed that the resource pool is not set between the wireless frames.

<Physical Resources for Control Channel in Present Embodiment>

A resource element group (REG) is used to define mapping of the resource element and the control channel. For example, the REG is used for mapping of the PDCCH, the PHICH, or the PCFICH. The REG is constituted by four consecutive resource elements which are in the same OFDM symbol and not used for the CRS in the same resource block. Further, the REG is constituted by first to fourth OFDM symbols in a first slot in a certain subframe.

An enhanced resource element group (EREG) is used to define mapping of the resource elements and the enhanced control channel. For example, the EREG is used for mapping of the EPDCCH. One resource block pair is constituted by 16 EREGs. Each EREG is assigned the number of 0 to 15 for each resource block pair. Each EREG is constituted by 9 resource elements excluding resource elements used for the DM-RS associated with the EPDCCH in one resource block pair.

<Configuration Example of Base Station Device 1 in Present Embodiment>

Figure 11:
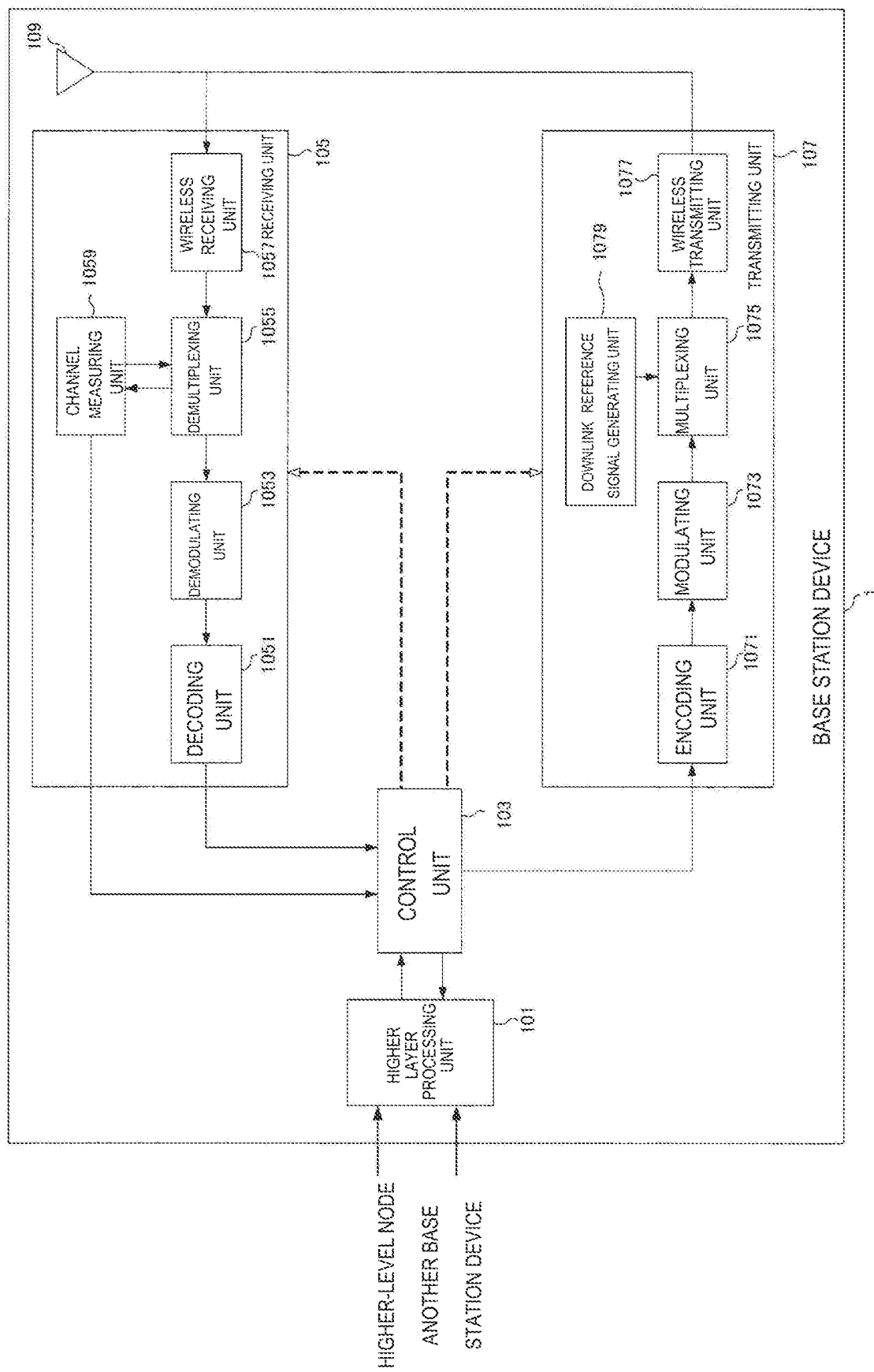
FIG. 11 is a schematic block diagram illustrating a configuration of a base station device 1 of the present embodiment.

FIG. 11 is a schematic block diagram illustrating a configuration of the base station device 1 of the present embodiment. As illustrated, the base station device 1 includes a higher layer processing unit 101, a control unit 103, a receiving unit 105, a transmitting unit 107, and a transceiving antenna 109. Further, the receiving unit 105 includes a decoding unit 1051, a demodulating unit 1053, a demultiplexing unit 1055, a wireless receiving unit 1057, and a channel measuring unit 1059. Further, the transmitting unit 107 includes an encoding unit 1071, a modulating unit 1073, a multiplexing unit 1075, a wireless transmitting unit 1077, and a downlink reference signal generating unit 1079.

As described above, the base station device 1 can support one or more RATs. Some or all of the units included in the base station device 1 illustrated in FIG. 11 can be configured individually in accordance with the RAT. For example, the receiving unit 105 and the transmitting unit 107 are configured individually in LTE and NR. Further, in the NR cell, some or all of the units included in the base station device 1 illustrated in FIG. 11 can be configured individually in accordance with a parameter set related to the transmission signal. For example, in a certain NR cell, the wireless receiving unit 1057 and the wireless transmitting unit 1077 can be configured individually in accordance with a parameter set related to the transmission signal.

The higher layer processing unit 101 performs processes of a medium access control (MAC) layer, a packet data convergence protocol (PDCP) layer, a radio link control (RLC) layer, and a radio resource control (RRC) layer. Further, the higher layer processing unit 101 generates control information to control the receiving unit 105 and the transmitting unit 107 and outputs the control information to the control unit 103.

The control unit 103 controls the receiving unit 105 and the transmitting unit 107 on the basis of the control information from the higher layer processing unit 101. The control unit 103 generates control information to be transmitted to the higher layer processing unit 101 and outputs the control information to the higher layer processing unit 101. The control unit 103 receives a decoded signal from the decoding unit 1051 and a channel estimation result from the channel measuring unit 1059. The control unit 103 outputs a signal to be encoded to the encoding unit 1071. Further, the control unit 103 is used to control the whole or a part of the base station device 1.

The higher layer processing unit 101 performs a process and management related to RAT control, radio resource control, subframe setting, scheduling control, and/or CSI report control. The process and the management in the higher layer processing unit 101 are performed for each terminal device or in common to terminal devices connected to the base station device. The process and the management in the higher layer processing unit 101 may be performed only by the higher layer processing unit 101 or may be acquired from a higher node or another base station device. Further, the process and the management in the higher layer processing unit 101 may be individually performed in accordance with the RAT. For example, the higher layer processing unit 101 individually performs the process and the management in LTE and the process and the management in NR.

Under the RAT control of the higher layer processing unit 101, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 101, generation and/or management of downlink data (transport block), system information, an RRC message (RRC parameter), and/or a MAC control element (CE) are performed.

In a subframe setting in the higher layer processing unit 101, management of a subframe setting, a subframe pattern setting, an uplink-downlink setting, an uplink reference UL-DL setting, and/or a downlink reference UL-DL setting is performed. Further, the subframe setting in the higher layer processing unit 101 is also referred to as a base station subframe selling. Further, the subframe setting in the higher layer processing unit 101 can be decided on the basis of an uplink traffic volume and a downlink traffic volume. Further, the subframe setting in the higher layer processing unit 101 can be decided on the basis of a scheduling result of scheduling control in the higher layer processing unit 101.

In the scheduling control in the higher layer processing unit 101, a frequency and a subframe to which the physical channel is allocated, a coding rate, a modulation scheme, and transmission power of the physical channels, and the like are decided on the basis of the received channel state information, an estimation value, a channel quality, or the like of a propagation path input from the channel measuring unit 1059, and the like. For example, the control unit 103 generates the control information (DCI format) on the basis of the scheduling result of the scheduling control in the higher layer processing unit 101.

In the CSI report control in the higher layer processing unit 101, the CSI report of the terminal device 2 is controlled. For example, a setting related to the CSI reference resources assumed to calculate the CSI in the terminal device 2 is controlled.

Under the control from the control unit 103, the receiving unit 105 receives a signal transmitted from the terminal device 2 via the transceiving antenna 109, performs a reception process such as demultiplexing, demodulation, and decoding, and outputs information which has undergone the reception process to the control unit 103. Further, the reception process in the receiving unit 105 is performed on the basis of a setting which is specified in advance or a setting notified from the base station device 1 to the terminal device 2.

The wireless receiving unit 1057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 109.

The demultiplexing unit 1055 separates the uplink channel such as the PUCCH or the PUSCH and/or uplink reference signal from the signal input from the wireless receiving unit 1057. The demultiplexing unit 1055 outputs the uplink reference signal to the channel measuring unit 1059. The demultiplexing unit 1055 compensates the propagation path for the uplink channel from the estimation value of the propagation path input from the channel measuring unit 1059.

The demodulating unit 1053 demodulates the reception signal for the modulation symbol of the uplink channel using a modulation scheme such as binary phase shift keying (BPSK), quadrature phase shift keying (QPSK), 16 quadrature amplitude modulation (QAM), 64 QAM, or 256 QAM. The demodulating unit 1053 performs separation and demodulation of a MIMO multiplexed uplink channel.

The decoding unit 1051 performs a decoding process on encoded bits of the demodulated uplink channel. The decoded uplink data and/or uplink control information are output to the control unit 103. The decoding unit 1051 performs a decoding process on the PUSCH for each transport block.

The channel measuring unit 1059 measures the estimation value, a channel quality, and/or the like of the propagation path from the uplink reference signal input from the demultiplexing unit 1055, and outputs the estimation value, a channel quality, and/or the like of the propagation path to the demultiplexing unit 1055 and/or the control unit 103. For example, the estimation value of the propagation path for propagation path compensation for the PUCCH or the PUSCH is measured by the channel measuring unit 1059 using the UL-DMRS, and an uplink channel quality is measured using the SRS.

The transmitting unit 107 carries out a transmission process such as encoding, modulation, and multiplexing on downlink control information and downlink data input from the higher layer processing unit 101 under the control of the control unit 103. For example, the transmitting unit 107 generates and multiplexes the PHICH, the PDCCH, the EPDCCH, the PDCCH, and the downlink reference signal and generates a transmission signal. Further, the transmission process in the transmitting unit 107 is performed on the basis of a selling which is specified in advance, a setting notified from the base station device 1 to the terminal device 2, or a setting notified through the PDCCH or the EPDCCH transmitted through the same subframe.

The encoding unit 1071 encodes the HARQ indicator (HARQ-ACK), the downlink control information, and the downlink data input from the control unit 103 using a predetermined coding scheme such as block coding, convolutional coding, turbo coding, or the like. The modulating unit 1073 modulates the encoded bits input from the encoding unit 1071 using a predetermined modulation scheme such as BPSK, QPSK, 16 QAM, 64 QAM, or 256 QAM. The downlink reference signal generating unit 1079 generates the downlink reference signal on the basis of a physical cell identification (PCI), an RRC parameter set in the terminal device 2, and the like. The multiplexing unit 1075 multiplexes a modulated symbol and the downlink reference signal of each channel and arranges resulting data in a predetermined resource element.

The wireless transmitting unit 1077 performs processes such as conversion into a signal in the time domain by inverse fast Fourier transform (IFFT), addition of the guard interval, generation of a baseband digital signal, conversion in an analog signal quadrature modulation, conversion from a signal of an intermediate frequency into a signal of a high frequency (up conversion), removal of an extra frequency component, and amplification of power on the signal from the multiplexing unit 1075, and generates a transmission signal. The transmission signal output from the wireless transmitting unit 1077 is transmitted through the transceiving antenna 109.

<Configuration Example of Base Station Device 2 in Present Embodiment>

Figure 12:
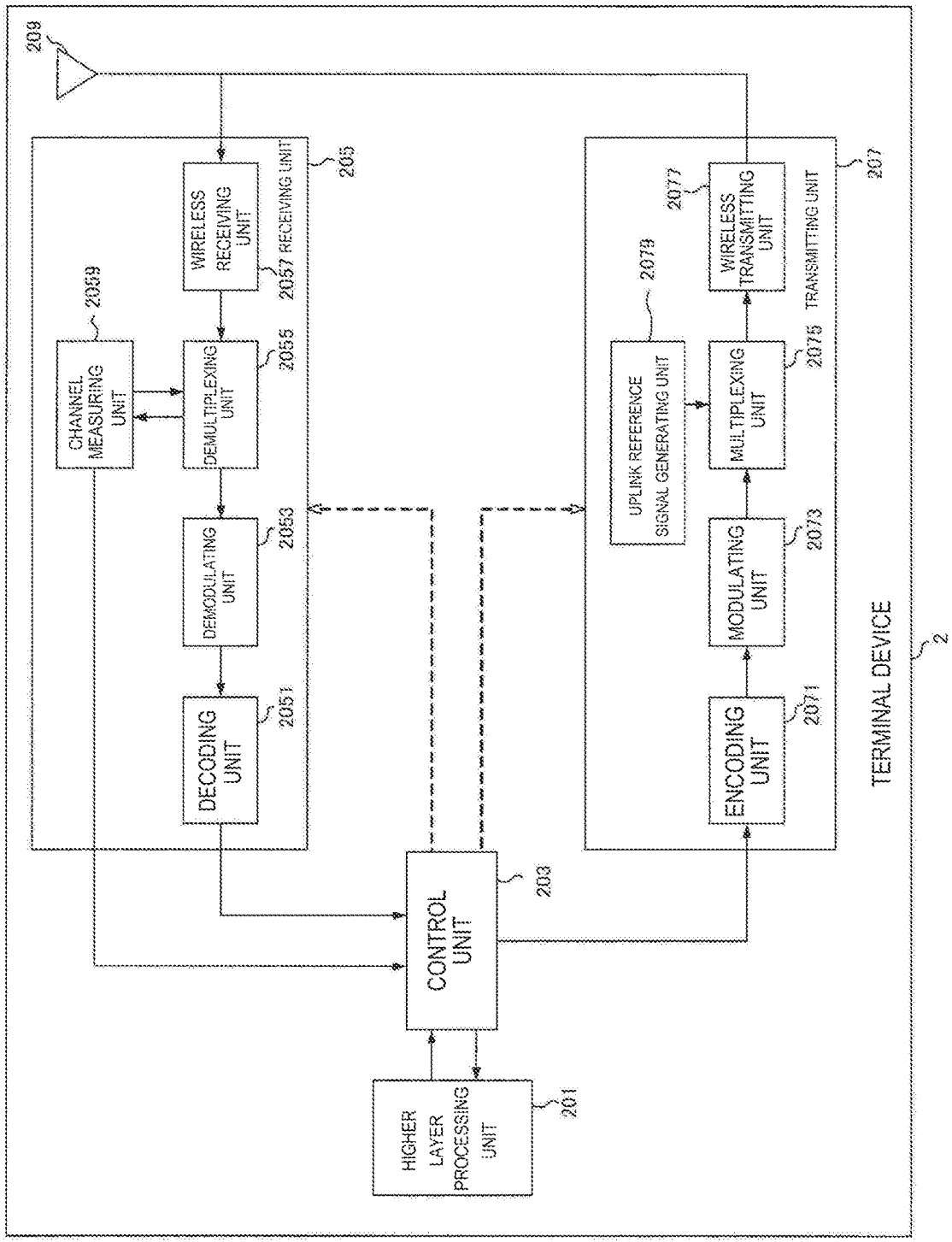
FIG. 12 is a schematic block diagram illustrating a configuration of a base station device 1 of the present embodiment.

FIG. 12 is a schematic block diagram illustrating a configuration of the terminal device 2 of the present embodiment. As illustrated, the terminal device 2 includes a higher layer processing unit 201, a control unit 203, a receiving unit 205, a transmitting unit 207, and a transceiving antenna 209. Further, the receiving unit 205 includes a decoding unit 2051, a demodulating unit 2053, a demultiplexing unit 2055, a wireless receiving unit 2057, and a channel measuring unit 2059. Further, the transmitting unit 207 includes an encoding unit 2071, a modulating unit 2073, a multiplexing unit 2075, a wireless transmitting unit 2077, and an uplink reference signal generating unit 2079.

As described above, the terminal device 2 can support one or more RATs. Some or all of the units included in the terminal device 2 illustrated in FIG. 12 can be configured individually in accordance with the RAT. For example, the receiving unit 205 and the transmitting unit 207 are configured individually in LTE and NR. Further, in the NR cell, some or all of the units included in the terminal device 2 illustrated in FIG. 12 can be configured individually in accordance with a parameter set related to the transmission signal. For example, in a certain NR cell, the wireless receiving unit 2057 and the wireless transmitting unit 2077 can be configured individually in accordance with a parameter set related to the transmission signal.

The higher layer processing unit 201 outputs uplink data (transport block) to the control unit 203. The higher layer processing unit 201 performs processes of a medium access control (MAC) layer, a packet data convergence protocol (PDCP) layer, a radio link control (RLC) layer, and a radio resource control (RRC) layer. Further, the higher layer processing unit 201 generates control information to control the receiving unit 205 and the transmitting unit 207 and outputs the control information to the control unit 203.

The control unit 203 controls the receiving unit 205 and the transmitting unit 207 on the basis of the control information from the higher layer processing unit 201. The control unit 203 generates control information to be transmitted to the higher layer processing unit 201 and outputs the control information to the higher layer processing unit 201. The control unit 203 receives a decoded signal from the decoding unit 2051 and a channel estimation result from the channel measuring unit 2059. The control unit 203 outputs a signal to be encoded to the encoding unit 2071. Further, the control unit 203 may be used to control the whole or a part of the terminal device 2.

The higher layer processing unit 201 performs a process and management related to RAT control, radio resource control, subframe setting, scheduling control, and/or CSI report control. The process and the management in the higher layer processing unit 201 are performed on the basis of a setting which is specified in advance and/or a setting based on control information set or notified from the base station device 1. For example, the control information from the base station device 1 includes the RRC parameter, the MAC control element, or the DCI. Further, the process and the management in the higher layer processing unit 201 may be individually performed in accordance with the RAT. For example, the higher layer processing unit 201 individually performs the process and the management in LTE and the process and the management in NR.

Under the RAT control of the higher layer processing unit 201, management related to the RAT is performed. For example, under the RAT control, the management related to LTE and/or the management related to NR is performed. The management related to NR includes setting and a process of a parameter set related to the transmission signal in the NR cell.

In the radio resource control in the higher layer processing unit 201, the setting information in the terminal device 2 is managed. In the radio resource control in the higher layer processing unit 201, generation and/or management of uplink data (transport block), system information, an RRC message (RRC parameter), and/or a MAC control element (CE) are performed.

In the subframe setting in the higher layer processing unit 201, the subframe setting in the base station device 1 and/or a base station device different from the base station device 1 is managed. The subframe setting includes an uplink or downlink setting for the subframe, a subframe pattern setting, an uplink-downlink setting, an uplink reference UL-DL setting, and/or a downlink reference UL-DL setting. Further, the subframe setting in the higher layer processing unit 201 is also referred to as a terminal subframe setting.

In the scheduling control in the higher layer processing unit 201, control information for controlling scheduling on the receiving unit 205 and the transmitting unit 207 is generated on the basis of the DCI (scheduling information) from the base station device 1.

In the CSI report control in the higher layer processing unit 201, control related to the report of the CSI to the base station device 1 is performed. For example, in the CSI report control, a setting related to the CSI reference resources assumed for calculating the CSI by the channel measuring unit 2059 is controlled. In the CSI report control, resource (timing) used for reporting the CSI is controlled on the basis of the DCI and/or the RRC parameter.

Under the control from the control unit 203, the receiving unit 205 receives a signal transmitted from the base station device 1 via the transceiving antenna 209, performs a reception process such as demultiplexing, demodulation, and decoding, and outputs information which has undergone the reception process to the control unit 203. Further, the reception process in the receiving unit 205 is performed on the basis of a setting which is specified in advance or a notification from the base station device 1 or a setting.

The wireless receiving unit 2057 performs conversion into an intermediate frequency (down conversion), removal of an unnecessary frequency component, control of an amplification level such that a signal level is appropriately maintained, quadrature demodulation based on an in-phase component and a quadrature component of a received signal, conversion from an analog signal into a digital signal, removal of a guard interval (GI), and/or extraction of a signal in the frequency domain by fast Fourier transform (FFT) on the uplink signal received via the transceiving antenna 209.

The demultiplexing unit 2055 separates the downlink channel such as the PHICH, PDCCH, EPDCCH, or PDSCH, downlink synchronization signal and/or downlink reference signal from the signal input from the wireless receiving unit 2057. The demultiplexing unit 2055 outputs the uplink reference signal to the channel measuring unit 2059. The demultiplexing unit 2055 compensates the propagation path for the uplink channel from the estimation value of the propagation path input from the channel measuring unit 2059.

The demodulating unit 2053 demodulates the reception signal for the modulation symbol of the downlink channel using a modulation scheme such as BPSK, QPSK, 16 QAM, 64 QAM, or 256 QAM. The demodulating unit 2053 performs separation and demodulation of a MEMO multiplexed downlink channel.

The decoding unit 2051 performs a decoding process on encoded bits of the demodulated downlink channel. The decoded downlink data and/or downlink control information are output to the control unit 203. The decoding unit 2051 performs a decoding process on the PDSCH for each transport block.

The channel measuring unit 2059 measures the estimation value, a channel quality, and/or the like of the propagation path from the downlink reference signal input from the demultiplexing unit 2055, and outputs the estimation value, a channel quality, and/or the like of the propagation path to the demultiplexing unit 2055 and/or the control unit 203. The downlink reference signal used for measurement by the channel measuring unit 2059 may be decided on the basis of at least a transmission mode set by the RRC parameter and/or other RRC parameters. For example, the estimation value of the propagation path for performing the propagation path compensation on the PDSCH or the EPDCCH is measured through the DL-DMRS. The estimation value of the propagation path for performing the propagation path compensation on the PDSCH or the PDSCH and/or the downlink channel for reporting the CSI are measured through the CRS. The downlink channel for reporting the CSI is measured through the CSI-RS. The channel measuring unit 2059 calculates a reference signal received power (RSRP) and/or a reference signal received quality (RSRQ) on the basis of the CRS, the CSI-RS, or the discovery signal, and outputs the RSRP and/or the RSRQ to the higher layer processing unit 201.

The transmitting unit 207 performs a transmission process such as encoding, modulation, and multiplexing on the uplink control information and the uplink data input from the higher layer processing unit 201 under the control of the control unit 203. For example, the transmitting unit 207 generates and multiplexes the uplink channel such as the PUSCH or the PUCCH and/or the uplink reference signal, and generates a transmission signal. Further, the transmission process in the transmitting unit 207 is performed on the basis of a setting which is specified in advance or a setting set or notified from the base station device 1.

The encoding unit 2071 encodes the HARQ indicator (HARQ-ACK), the uplink control information, and the uplink data input from the control unit 203 using a predetermined coding scheme such as block coding, convolutional coding, turbo coding, or the like. The modulating unit 2073 modulates the encoded bits input from the encoding unit 2071 using a predetermined modulation scheme such as BPSK, QPSK, 16 QAM, 64 QAM, or 256 QAM. The uplink reference signal generating unit 2079 generates the uplink reference signal on the basis of an RRC parameter set in the terminal device 2, and the like. The multiplexing unit 2075 multiplexes a modulated symbol and the uplink reference signal of each channel and arranges resulting data in a predetermined resource element.

The wireless transmitting unit 2077 performs processes such as conversion into a signal in the time domain by inverse fast Fourier transform (IFFT), addition of the guard interval, generation of a baseband digital signal, conversion in an analog signal quadrature modulation, conversion from a signal of an intermediate frequency into a signal of a high frequency (up conversion), removal of an extra frequency component, and amplification of power on the signal from the multiplexing unit 2075, and generates a transmission signal. The transmission signal output from the wireless transmitting unit 2077 is transmitted through the transceiving antenna 209.

<Signaling of Control Information in Present Embodiment>

The base station device 1 and the terminal device 2 can use various methods for signaling (notification, broadcasting, or setting) of the control information. The signaling of the control information can be performed in various layers (layers). The signaling of the control information includes signaling of the physical layer which is signaling performed through the physical layer, RRC signaling which is signaling performed through the RRC layer, and MAC signaling which is signaling performed through the MAC layer. The RRC signaling is dedicated RRC signaling for notifying the terminal device 2 of the control information specific or a common RRC signaling for notifying of the control information specific to the base station device 1. The signaling used by a layer higher than the physical layer such as RRC signaling and MAC signaling is also referred to as signaling of the higher layer.

The RRC signaling is implemented by signaling the RRC parameter. The MAC signaling is implemented by signaling the MAC control element. The signaling of the physical layer is implemented by signaling the downlink control information (DCI) or the uplink control information (UCI). The RRC parameter and the MAC control element are transmitted using the PDSCH or the PUSCH. The DCI is transmitted using the PDCCH or the EPDCCH. The UCI is transmitted using the PUCCH or the PUSCH. The RRC signaling and the MAC signaling are used for signaling semi-static control information and are also referred to as semi-static signaling. The signaling of the physical layer is used for signaling dynamic control information and also referred to as dynamic signaling. The DCI is used for scheduling of the PDSCH or scheduling of the PUSCH. The UCI is used for the CSI report, the HARQ-ACK report, and/or the scheduling request (SR).

<Details of Downlink Control Information in Present Embodiment>

The DCI is notified using the DCI format having a field which is specified in advance. Predetermined information bits are mapped to the field specified in the DCI format. The DCI notifies of downlink scheduling information, uplink scheduling information, sidelink scheduling information, a request for a non-periodic CSI report, or an uplink transmission power command.

The DCI format monitored by the terminal device 2 is decided in accordance with the transmission mode set for each serving cell. In other words, a part of the DCI format monitored by the terminal device 2 can differ depending on the transmission mode. For example, the terminal device 2 in which a downlink transmission mode 1 is set monitors the DCI format 1A and the DCI format 1. For example, the terminal device 2 in which a downlink transmission mode 4 is set monitors the DCI format 1A and the DCI format 2. For example, the terminal device 2 in which an uplink transmission mode 1 is set monitors the DCI format 0. For example, the terminal device 2 in which an uplink transmission mode 2 is set monitors the DCI format 0 and the DCI format 4.

A control region in which the PDCCH for notifying the terminal device 2 of the DCI is placed is not notified of, and the terminal device 2 detects the DCI for the terminal device 2 through blind decoding (blind detection). Specifically, the terminal device 2 monitors a set of PDCCH candidates in the serving cell. The monitoring indicates that decoding is attempted in accordance with all the DCI formats to be monitored for each of the PDCCHs in the set. For example, the terminal device 2 attempts to decode all aggregation levels, PDCCH candidates, and DCI formats which are likely to be transmitted to the terminal device 2. The terminal device 2 recognizes the DCI (PDCCH) which is successfully decoded (detected) as the DCI (PDCCH) for the terminal device 2.

A cyclic redundancy check (CRC) is added to the DCI. The CRC is used for the DCI error detection and the DCI blind detection. A CRC parity bit (CRC) is scrambled using the RNTI. The terminal device 2 detects whether or not it is a DCI for the terminal device 2 on the basis of the RNTI. Specifically, the terminal device 2 performs de-scrambling on the bit corresponding to the CRC using a predetermined RNTI, extracts the CRC, and detects whether or not the corresponding DCI is correct.

The RNTI is specified or set in accordance with a purpose or a use of the DCI. The RNTI includes a cell-RNTI (C-RNTI), a semi persistent scheduling C-RNTI (SPS C-RNTI), a system information-RNTI (SI-RNTI), a paging-RNTI (P-RNTI), a random access-RNTI (RA-RNTI), a transmit power control-PUCCH-RNTI (TPC-PUCCH-RNTI), a transmit power control-PUSCH-RNTI (TPC-PUSCH-RNTI), a temporary C-RNTI, a multimedia broadcast multicast services (MBMS)-RNTI (M-RNTI)), an eIMTA-RNTI and a CC-RNTI.

The C-RNTI and the SPS C-RNTI are RNTIs which are specific to the terminal device 2 in the base station device 1 (cell), and serve as identifiers identifying the terminal device 2. The C-RNTI is used for scheduling the PDSCH or the PUSCH in a certain subframe. The SPS C-RNTI is used to activate or release periodic scheduling of resources for the PDSCH or the PUSCH. A control channel having a CRC scrambled using the SI-RNTI is used for scheduling a system information block (SIB). A control channel with a CRC scrambled using the P-RNTI is used for controlling paging. A control channel with a CRC scrambled using the RA-RNTI is used for scheduling a response to the RACH. A control channel having a CRC scrambled using the TPC-PUSCH-RNTI is used for power control of the PUCCH. A control channel having a CRC scrambled using the TPC-PUSCH-RNTI is used for power control of the PUSCH. A control channel with a CRC scrambled using the temporary C-RNTI is used by a mobile station device in which no C-RNTI is set or recognized. A control channel with CRC scrambled using the M-RNTI is used for scheduling the MBMS. A control channel with a CRC scrambled using the eIMTA-RNTI is used for notifying of information related to a TDD UL/DL setting of a TDD serving cell in dynamic TDD (eIMTA). The control channel (DCI) with a CRC scrambled using the CC-RNTI is used to notify of setting of an exclusive OFDM symbol in the LAA secondary cell. Further, the DCI format may be scrambled using a new RNTI instead of the above RNTI.

Scheduling information (the downlink scheduling information, the uplink scheduling information, and the sidelink scheduling information) includes information for scheduling in units of resource blocks or resource block groups as the scheduling of the frequency region. The resource block group is successive resource block sets and indicates resources allocated to the scheduled terminal device. A size of the resource block group is decided in accordance with a system bandwidth.

<Details of Downlink Control Channel in Present Embodiment>

The DCI is transmitted using a control channel such as the PDCCH or the EPDCCH. The terminal device 2 monitors a set of PDCCH candidates and/or a set of EPDCCH candidates of one or more activated serving cells set by RRC signaling. Here, the monitoring means that the PDCCH and/or the EPDCCH in the set corresponding to all the DCI formats to be monitored is attempted to be decoded.

A set of PDCCH candidates or a set of EPDCCH candidates is also referred to as a search space. In the search space, a shared search space (CSS) and a terminal specific search space (USS) are defined. The CSS may be defined only for the search space for the PDCCH.

A common search space (CSS) is a search space set on the basis of a parameter specific to the base station device 1 and/or a parameter which is specified in advance. For example, the CSS is a search space used in common to a plurality of terminal devices. Therefore, the base station device 1 maps a control channel common to a plurality of terminal devices to the CSS, and thus resources for transmitting the control channel are reduced.

A UE-specific search space (USS) is a search space set using at least a parameter specific to the terminal device 2. Therefore, the USS is a search space specific to the terminal device 2, and it is possible for the base station device 1 to individually transmit the control channel specific to the terminal device 2 by using the USS. For this reason, the base station device 1 can efficiently map the control channels specific to a plurality of terminal devices.

The USS may be set to be used in common to a plurality of terminal devices. Since a common USS is set in a plurality of terminal devices, a parameter specific to the terminal device 2 is set to be the same value among a plurality of terminal devices. For example, a unit set to the same parameter among a plurality of terminal devices is a cell, a transmission point, a group of predetermined terminal devices, or the like.

The search space of each aggregation level is defined by a set of PDCCH candidates. Each PDCCH is transmitted using one or more CCE sets. The number of CCEs used in one PDCCH is also referred to as an aggregation level. For example, the number of CCEs used in one PDCCH is 1, 2, 4, or 8.

The search space of each aggregation level is defined by a set of EPDCCH candidates. Each EPDCCH is transmitted using one or more enhanced control channel element (ECCE) sets. The number of ECCEs used in one EPDCCH is also referred to as an aggregation level. For example, the number of ECCEs used in one EPDCCH is 1, 2, 4, 8, 16, or 32.

The number of PDCCH candidates or the number of EPDCCH candidates is decided on the basis of at least the search space and the aggregation level. For example, in the CSS, the number of PDCCH candidates in the aggregation levels 4 and 8 are 4 and 2, respectively. For example, in the USS, the number of PDCCH candidates in the aggregations 1, 2, 4, and 8 are 6, 6, 2, and 2, respectively.

Each ECCE includes a plurality of EREGs. The EREG is used to define mapping to the resource element of the EPDCCH. 16 EREGs which are assigned numbers of 0 to 15 are defined in each RB pair. In other words, an EREG 0 to an EREG 15 are defined in each RB pair. For each RB pair, the EREG 0 to the EREG 15 are preferentially defined at regular intervals in the frequency direction for resource elements other than resource elements to which a predetermined signal and/or channel is mapped. For example, a resource element to which a demodulation reference signal associated with an EPDCCH transmitted through antenna ports 107 to 110 is mapped is not defined as the EREG The number of ECCEs used in one EPDCCH depends on an EPDCCH format and is decided on the basis of other parameters. The number of ECCEs used in one EPDCCH is also referred to as an aggregation level. For example, the number of ECCEs used in one EPDCCH is decided on the basis of the number of resource elements which can be used for transmission of the EPDCCH in one RB pair, a transmission method of the EPDCCH, and the like. For example, the number of ECCEs used in one EPDCCH is 1, 2, 4, 8, 16, or 32. Further, the number of EREGs used in one ECCE is decided on the basis of a type of subframe and a type of cyclic prefix and is 4 or 8. Distributed transmission and localized transmission are supported as the transmission method of the EPDCCH.

The distributed transmission or the localized transmission can be used for the EPDCCH. The distributed transmission and the localized transmission differ in mapping of the ECCE to the EREG and the RB pair. For example, in the distributed transmission, one ECCE is configured using EREGs of a plurality of RB pairs. In the localized transmission, one ECCE is configured using an EREG of one RB pair.

The base station device 1 performs a setting related to the EPDCCH in the terminal device 2. The terminal device 2 monitors a plurality of EPDCCHs on the basis of the setting from the base station device 1. A set of RB pairs that the terminal device 2 monitors the EPDCCH can be set. The set of RB pairs is also referred to as an EPDCCH set or an EPDCCH-PRB set. One or more EPDCCH sets can be set in one terminal device 2. Each EPDCCH set includes one or more RB pairs. Further, the setting related to the EPDCCH can be individually performed for each EPDCCH set.

The base station device 1 can set a predetermined number of EPDCCH sets in the terminal device 2. For example, up to two EPDCCH sets can be set as an EPDCCH set 0 and/or an EPDCCH set 1. Each of the EPDCCH sets can be constituted by a predetermined number of RB pairs. Each EPDCCH set constitutes one set of ECCEs. The number of ECCEs configured in one EPDCCH set is decided on the basis of the number of RB pairs set as the EPDCCH set and the number of EREGs used in one ECCE. In a case in which the number of ECCEs configured in one EPDCCH set is N, each EPDCCH set constitutes ECCEs 0 to N−1. For example, in a case in which the number of EREGs used in one ECCE is 4, the EPDCCH set constituted by 4 RB pairs constitutes 16 ECCEs.

<Details of Resource Allocation in Present Embodiment>

The base station device 1 can use a plurality of methods as a method of allocating resources of the PDSCH and/or the PUSCH to the terminal device 2. The resource allocation method includes dynamic scheduling, semi persistent scheduling, multi subframe scheduling, and cross subframe scheduling.

In the dynamic scheduling, one DCI performs resource allocation in one subframe. Specifically, the PDCCH or the EPDCCH in a certain subframe performs scheduling for the PDSCH in the subframe. The PDCCH or the EPDCCH in a certain subframe performs scheduling for the PUSCH in a predetermined subframe after the certain subframe.

In the multi subframe scheduling, one DCI allocates resources in one or more subframes. Specifically, the PDCCH or the EPDCCH in a certain subframe performs scheduling for the PUSCH in one or more subframes which are a predetermined number after the certain subframe. The PDCCH or the EPDCCH in a certain subframe performs scheduling for the PUSCH in one or more subframes which are a predetermined number after the subframe. The predetermined number can be set to an integer of zero or more. The predetermined number may be specified in advance and may be decided on the basis of the signaling of the physical layer and/or the RRC signaling. In the multi subframe scheduling, consecutive subframes may be scheduled, or subframes with a predetermined period may be scheduled. The number of subframes to be scheduled may be specified in advance or may be decided on the basis of the signaling of the physical layer and/or the RRC signaling.

In the cross subframe scheduling, one DCI allocates resources in one subframe. Specifically, the PDCCH or the EPDCCH in a certain subframe performs scheduling for the PDSCH in one subframe which is a predetermined number after the certain subframe. The PDCCH or the EPDCCH in a certain subframe performs scheduling for the PUSCH in one subframe which is a predetermined number after the subframe. The predetermined number can be set to an integer of zero or more. The predetermined number may be specified in advance and may be decided on the basis of the signaling of the physical layer and/or the RRC signaling. In the cross subframe scheduling, consecutive subframes may be scheduled, or subframes with a predetermined period may be scheduled.

In the semi-persistent scheduling (SPS), one DCI allocates resources in one or more subframes. In a case in which information related to the SPS is set through the RRC signaling, and the PDCCH or the EPDCCH for activating the SPS is detected, the terminal device 2 activates a process related to the SPS and receives a predetermined. PDSCH and/or PUSCH on the basis of a setting related to the SPS. In a case in which the PDCCH or the EPDCCH for releasing the SPS is detected when the SPS is activated, the terminal device 2 releases (inactivates) the SPS and stops reception of a predetermined PDSCH and/or PUSCH. The release of the SPS may be performed on the basis of a case in which a predetermined condition is satisfied. For example, in a case in which a predetermined number of empty transmission data is received, the SPS is released. The data empty transmission for releasing the SPS corresponds to a MAC protocol data unit (PICU) including a zero MAC service data unit (SDU).

Information related to the SPS by the RRC signaling includes an SPS C-RNTI which is an SPN RNTI, information related to a period (interval) in which the PDSCH is scheduled, information related to a period (interval) in which the PUSCH is scheduled, information related to a setting for releasing the SPS, and/or the number of the HARQ process in the SPS. The SPS is supported only in the primary cell and/or the primary secondary cell.

<HARQ in Present Embodiment>

In the present embodiment, the HARQ has various features. The HARQ transmits and retransmits the transport block. In the HARQ, a predetermined number of processes (HARQ processes) are used (set), and each process independently operates in accordance with a stop-and-wait scheme.

In the downlink, the HARQ is asynchronous and operates adaptively. In other words, in the downlink, retransmission is constantly scheduled through the PDCCH. The uplink HARQ-ACK (response information) corresponding to the downlink transmission is transmitted through the PUCCH or the PUSCH. In the downlink, the PDCCH notifies of a HARQ process number indicating the HARQ process and information indicating whether or not transmission is initial transmission or retransmission.

In the uplink, the HARQ operates in a synchronous or asynchronous manner. The downlink HARQ-ACK (response information) corresponding to the uplink transmission is transmitted through the PHICH. In the uplink HARQ, an operation of the terminal device is decided on the basis of the HARQ feedback received by the terminal device and/or the PDCCH received by the terminal device. For example, in a case in which the PDCCH is not received, and the HARQ feedback is ACK, the terminal device does not perform transmission (retransmission) but holds data in a HARQ buffer. In this case, the PDCCH may be transmitted in order to resume the retransmission. Further, for example, in a case in which the PDCCH is not received, and the HARQ feedback is NACK, the terminal device performs retransmission non-adaptively through a predetermined uplink subframe. Further, for example, in a case in which the PDCCH is received, the terminal device performs transmission or retransmission on the basis of contents notified through the PDCCH regardless of content of the HARQ feedback.

Further, in the uplink, in a case in which a predetermined condition (setting) is satisfied, the HARQ may be operated only in an asynchronous manner. In other words, the downlink HARQ-ACK is not transmitted, and the uplink retransmission may constantly be scheduled through the PDCCH.

In the HARQ-ACK report, the HARQ-ACK indicates ACK, NACK, or DTX. In a case in which the HARQ-ACK is ACK, it indicates that the transport block (codeword and channel) corresponding to the HARQ-ACK is correctly received (decoded). In a case in which the HARQ-ACK is NACK, it indicates that the transport block (codeword and channel) corresponding to the HARQ-ACK is not correctly received (decoded). In a case in which the HARQ-ACK is DTX, it indicates that the transport block (codeword and channel) corresponding to the HARQ-ACK is not present (not transmitted).

A predetermined number of HARQ processes are set (specified) in each of downlink and uplink. For example, in FDD, up to eight HARQ processes are used for each serving cell. Further, for example, in TDD, a maximum number of HARQ processes is decided by an uplink/downlink setting. A maximum number of HARQ processes may be decided on the basis of a round trip time (RTT). For example, in a case in which the RTT is 8 TTIs, the maximum number of the HARQ processes can be 8.

In the present embodiment, the HARQ information is constituted by at least a new data indicator (NDI) and a transport block size (TBS). The NDI is information indicating whether or not the transport block corresponding to the HARQ information is initial transmission or retransmission. The TBS is the size of the transport block. The transport block is a block of data in a transport channel (transport layer) and can be a unit for performing the HARQ. In the DL-SCH transmission, the HARQ information further includes a HARQ process ID (a HARQ process number). In the UL-SCH transmission, the HARQ information further includes an information bit in which the transport block is encoded and a redundancy version (RV) which is information specifying a parity bit. In the case of spatial multiplexing in the DL-SCH, the HARQ information thereof includes a set of NDI and TBS for each transport block.

<Details of Downlink Resource Elements Mapping of NR in Present Embodiment>

Figure 13:
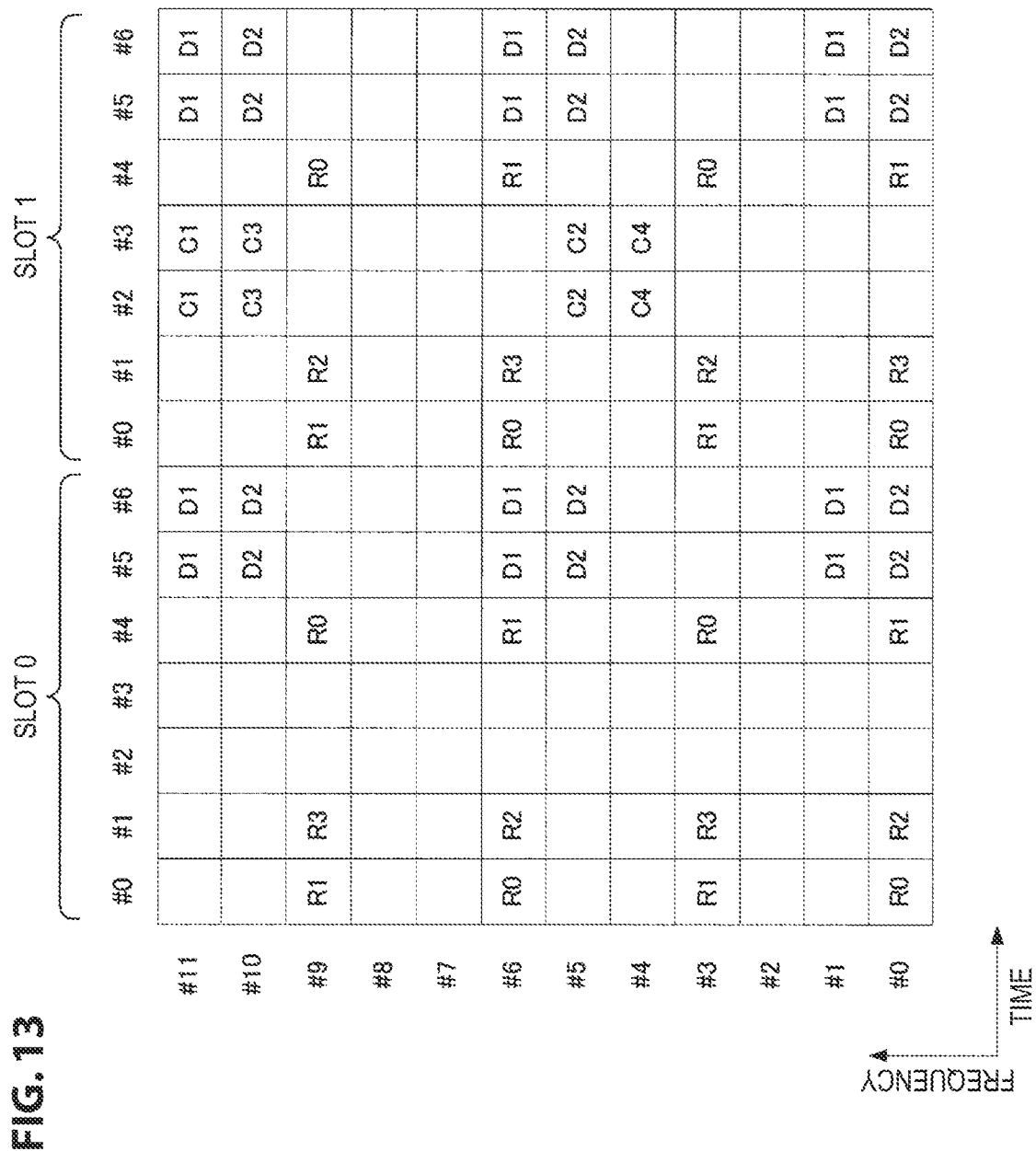
FIG. 13 is a diagram illustrating an example of downlink resource element mapping of NR according to the present embodiment.

FIG. 13 is a diagram illustrating an example of the downlink resource element mapping of NR according to the present embodiment. FIG. 13 illustrates a set of resource elements in the predetermined resources in a case in which parameter set 0 is used. The predetermined resources illustrated in FIG. 13 are resources formed by a time length and a frequency bandwidth such as one resource block pair in LTE.

In NR, the predetermined resource is referred to as an NR resource block (NR-RB). The predetermined resource can be used for a unit of allocation of the NR-PDSCH or the NR-PDCCH, a unit in which mapping of the predetermined channel or the predetermined signal to a resource element is defined, or a unit in which the parameter set is set.

In the example of FIG. 13, the predetermined resources include 14 OFDM symbols indicated by OFDM symbol numbers 0 to 13 in the time direction and 12 subcarriers indicated by subcarrier numbers 0 to 11 in the frequency direction. In a case in which the system bandwidth includes the plurality of predetermined resources, subcarrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

Figure 14:
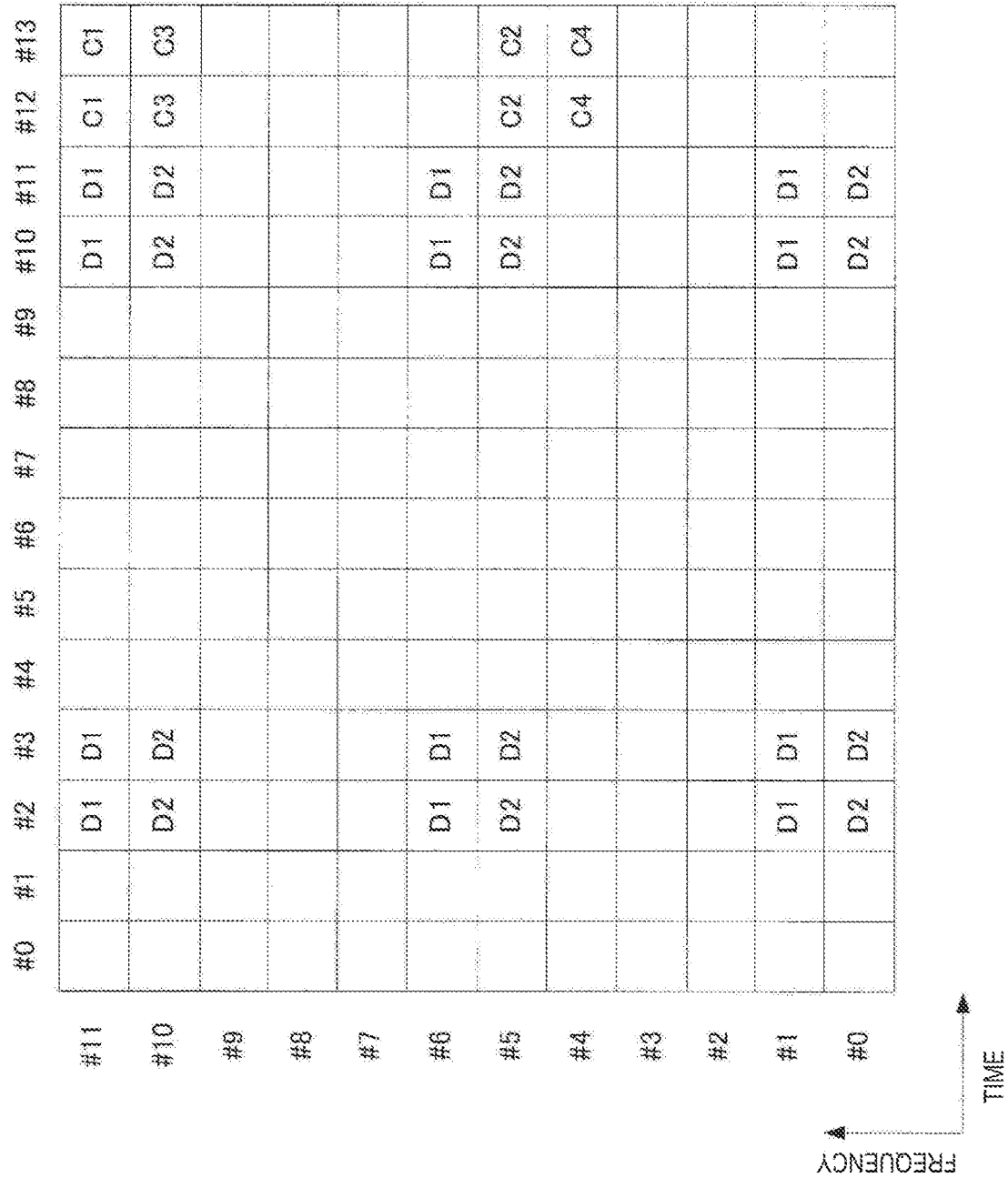
FIG. 14 is a diagram illustrating an example of downlink resource element mapping of NR according to the present embodiment.

FIG. 14 is a diagram illustrating an example of the downlink resource element mapping of NR according to the present embodiment. FIG. 14 illustrates a set of resource elements in the predetermined resources in a case in which parameter set 1 is used. The predetermined resources illustrated in FIG. 14 are resources formed by the same time length and frequency bandwidth as one resource block pair in LTE.

In the example of FIG. 14, the predetermined resources include 7 OFDM symbols indicated by OFDM symbol numbers 0 to 6 in the time direction and 24 subcarriers indicated by subcarrier numbers 0 to 23 in the frequency direction. In a case in which the system bandwidth includes the plurality of predetermined resources, subcarrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

Figure 15:
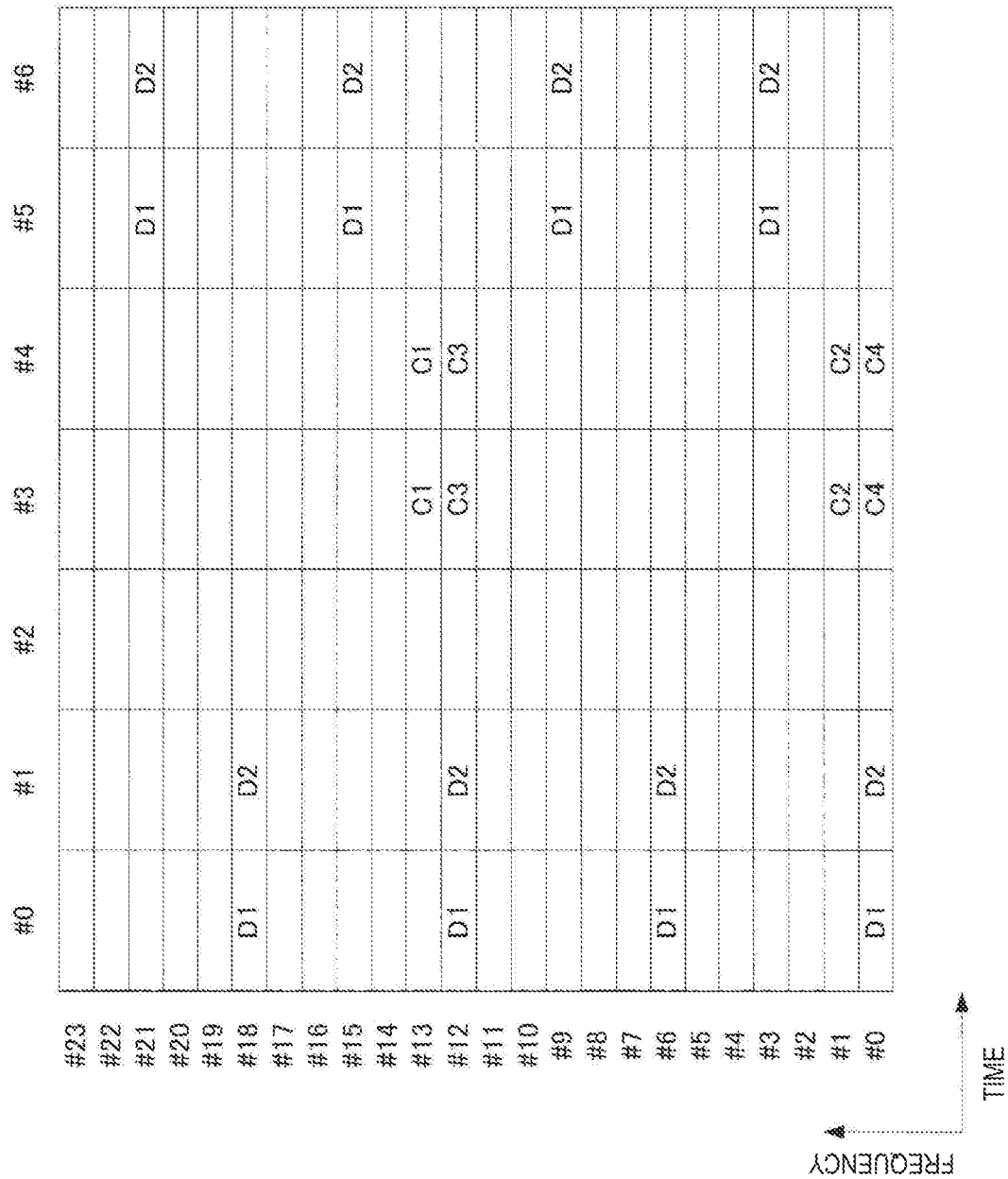
FIG. 15 is a diagram illustrating an example of downlink resource element mapping of NR according to the present embodiment.

FIG. 15 is a diagram illustrating an example of the downlink resource element mapping of NR according to the present embodiment. FIG. 15 illustrates a set of resource elements in the predetermined resources in a case in which parameter set 1 is used. The predetermined resources illustrated in FIG. 15 are resources formed by the same time length and frequency bandwidth as one resource block pair in LTE.

In the example of FIG. 15, the predetermined resources include 28 OFDM symbols indicated by OFDM symbol numbers 0 to 27 in the time direction and 6 subcarriers indicated by subcarrier numbers 0 to 6 in the frequency direction. In a case in which the system bandwidth includes the plurality of predetermined resources, subcarrier numbers are allocated throughout the system bandwidth.

Resource elements indicated by C1 to C4 indicate reference signals (CSI-RS) for measuring transmission path states of the antenna ports 15 to 22. Resource elements indicated by D1 and D2 indicate DL-DMRS of CDM group 1 and CDM group 2, respectively.

<Physical Sidelink Channel>

For the purpose of performing inter-device (device-to-device (D2D), sidelink (SL), proximity services (ProSe)) communication in the cellular mobile communication system, it is necessary to secure resources for physical sidelink channels from physical radio resources of a cellular mobile communication system. Physical radio resources typically include frequency resources and time resources, and further include a space, a symbol, power, interleave, and the like. As physical resources of a cellular mobile communication system, uplink radio resources and downlink radio resources are exemplified. The resources are classified into, for example, a case in which different frequency resources are prepared in the FDD scheme and a case in which different time resources are prepared in the TDD scheme.

In addition, when a sidelink channel is set, a case in which a sidelink channel is set in uplink radio resources of a cellular mobile communication system or set in the form in which some of the uplink radio resources overlap, a case in which a sidelink channel is set in downlink radio resources of the cellular mobile communication system or set in the form in which some of the downlink radio resources overlap, and a case in which a sidelink channel is set in radio resources of an unlicensed band (here also including, for example, industrial-scientific-and-medical (ISM) bands such as a 900 MHz frequency band, a 2.4 GHz frequency band, a 5 GHz frequency band, a 60 GHz frequency band, and the like, a frequency band for dedicated short range communications (DSRC), a frequency band for TV white spaces (TVWS), a frequency band for licensed shared access (LSA), a frequency band for federal spectrum access system (SAS), and the like) are conceivable.

Figure 16:
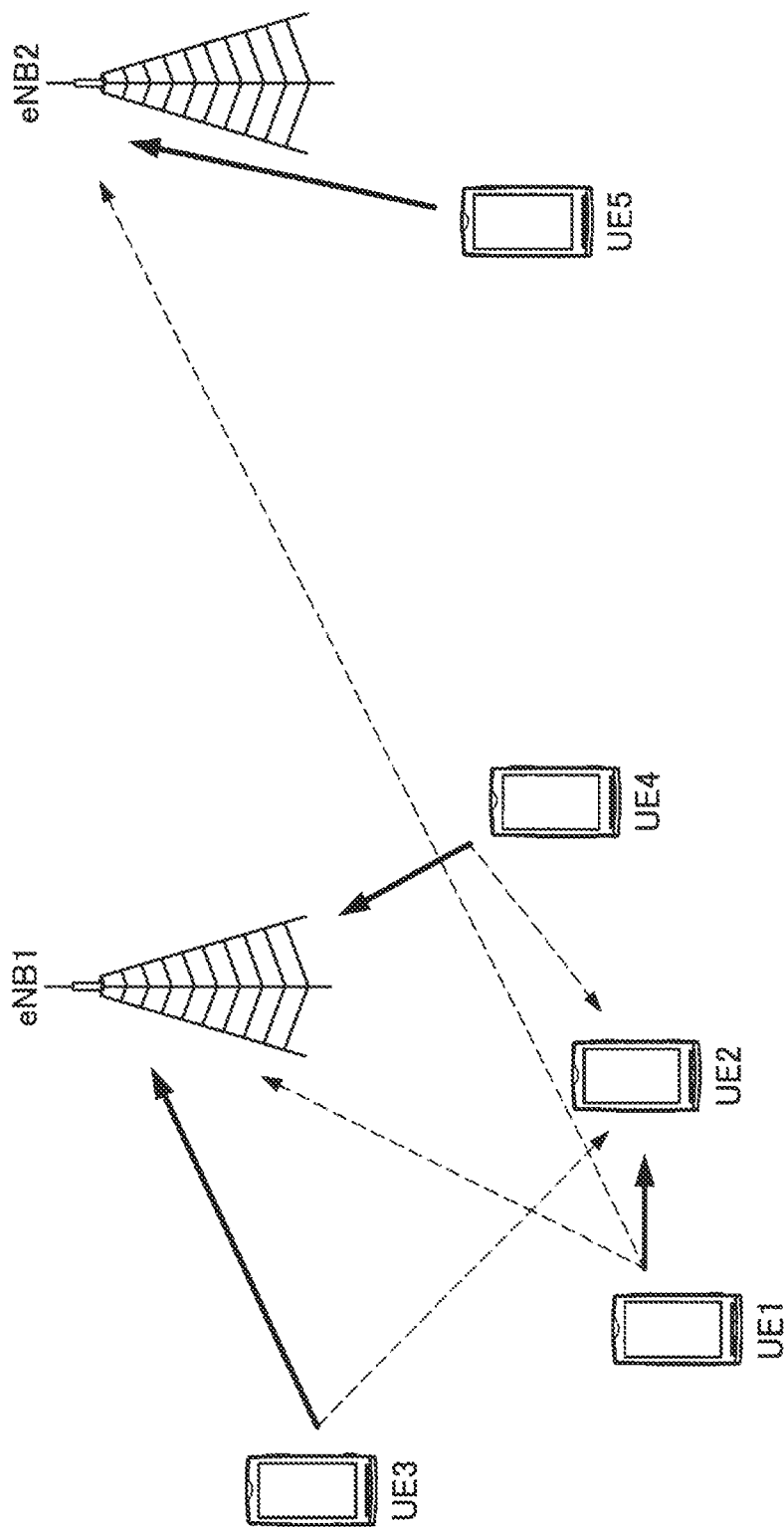
FIG. 16 is an explanatory diagram illustrating a state in which sidelink signals also reach base station devices receiving uplink channels in a case in which a sidelink channel is set in uplink radio resources.
Figure 17:
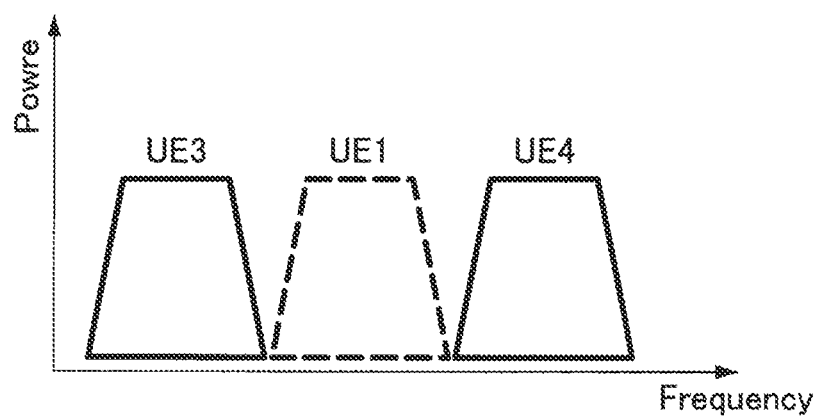
FIG. 17 is an explanatory diagram illustrating an example of reception power of the eNB1 illustrated in FIG. 16.

FIG. 16 is an explanatory diagram illustrating a state in which sidelink signals also reach base station devices receiving uplink channels in a case in which a sidelink channel is set in uplink radio resources. In addition, FIG. 17 is an explanatory diagram illustrating an example of reception power of the eNB1 illustrated in FIG. 16.

In the case in which a sidelink channel is set in uplink radio resources, sidelink channels and sidelink signals transmitted and received between terminal devices are likely to also reach base station devices receiving uplink channels, and the sidelink channels and signals are likely to interfere with uplink channels and uplink signals. On the other hand, even if the sidelink channels and signals do not directly interfere with uplink channels and uplink signals, in a case in which reception power of a base station with respect to sidelink channels and sidelink signals is excessively large, it causes an effective dynamic range of the reception function of the base station device to decrease and the reception performance with respect to uplink channels and uplink signals to deteriorate. As a method for avoiding such interference and deterioration, there is a method of applying transmission power control equivalent to transmission power of uplink channels and uplink signals to sidelink channels and sidelink signals. When a terminal device performs such transmission power control, reception power of a base station device for each of channels and signals can be substantially equivalent.

Figure 18:
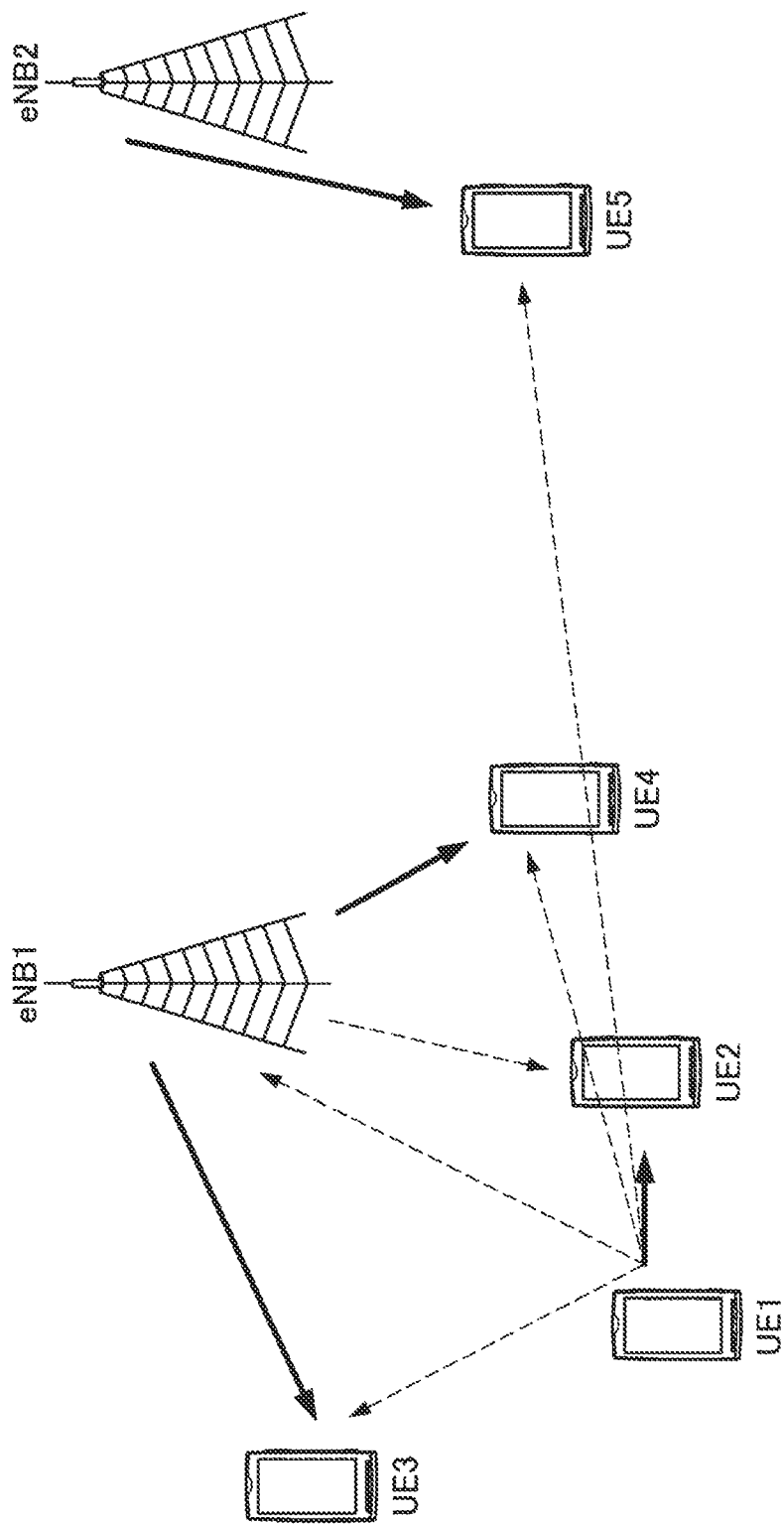
FIG. 18 is an explanatory diagram illustrating a state in which sidelink signals also reach terminal devices receiving downlink channels in a case in which a sidelink channel is set in downlink radio resources.
Figure 19:
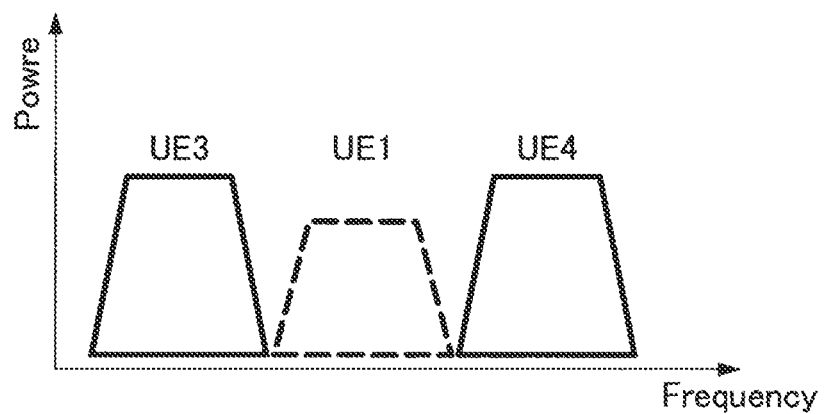
FIG. 19 is an explanatory diagram illustrating an example of reception power of the UE3 illustrated in FIG. 18.
Figure 20:
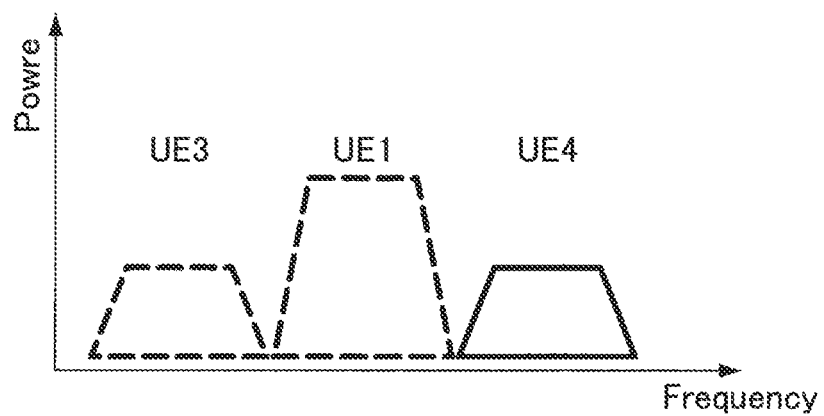
FIG. 20 is an explanatory diagram illustrating an example of reception power of the UE4 illustrated in FIG. 18.

FIG. 18 is an explanatory diagram illustrating a state in which sidelink signals also reach terminal devices receiving downlink channels in a case in which a sidelink channel is set in downlink radio resources. In addition, FIG. 19 is an explanatory diagram illustrating an example of reception power of the UE3 illustrated in FIG. 18. In addition, FIG. 20 is an explanatory diagram illustrating an example of reception power of the UE4 illustrated in FIG. 18.

Meanwhile in the case in which a sidelink channel is set in downlink radio resources, sidelink channels and sidelink signals transmitted and received between terminal devices are likely to also reach base station devices receiving downlink channels, and similar interference and deterioration to those in the previous example are likely to be applied to downlink channels and downlink signals. It is very difficult to avoid such interference and deterioration using similar transmission power control to that of the previous example. In a case in which there are a plurality of terminal devices receiving downlink channels and downlink signals, for example, even if transmission power control is performed with reference to reception power of a certain terminal device, reception power of other terminal devices is likely to be inappropriate, and as a result, interference and deterioration may occur.

Figure 21:
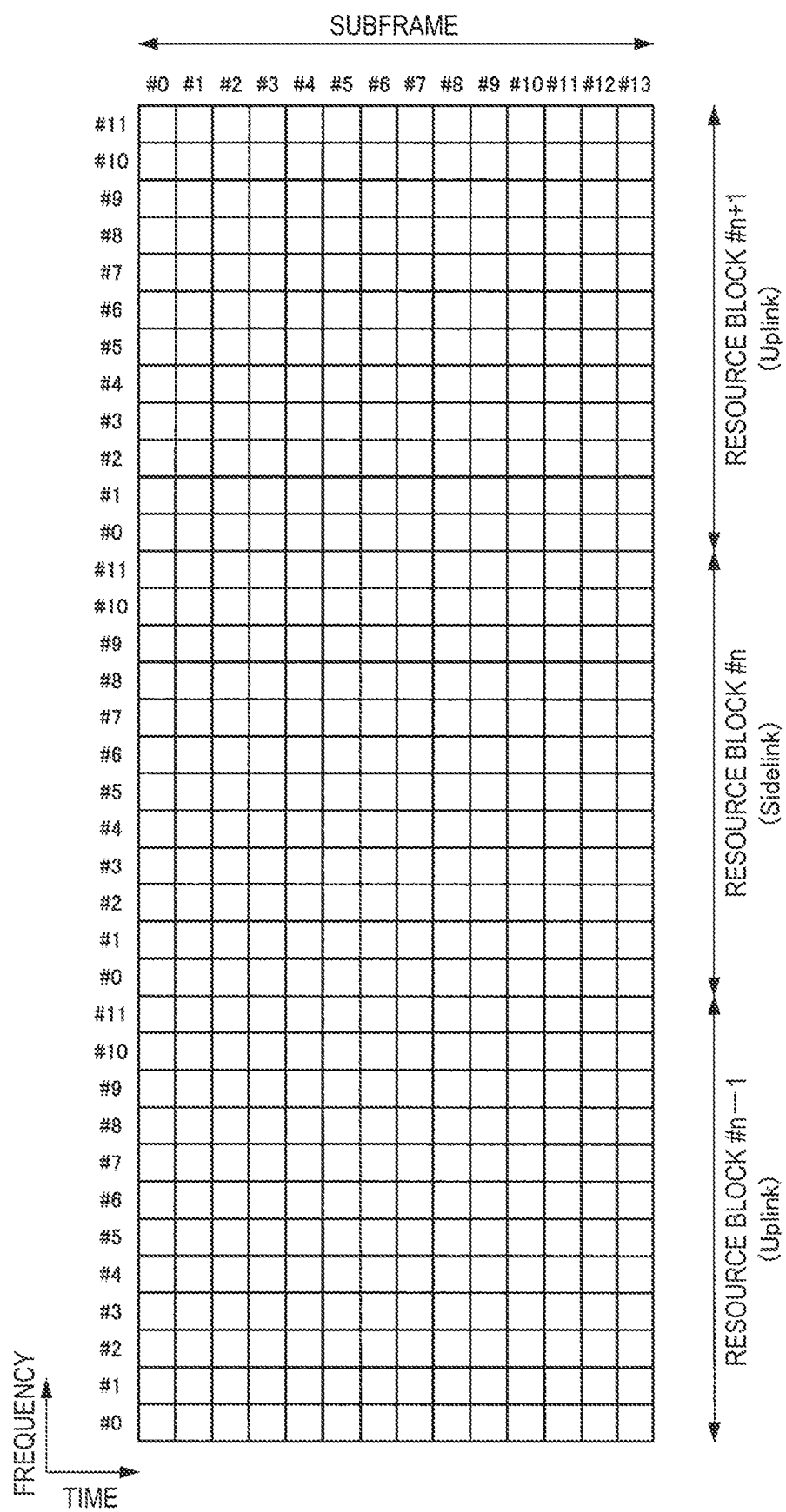
FIG. 21 is an explanatory diagram illustrating an example of placement of frequency-time resources.

As described using FIG. 16 and FIG. 17, since terminal devices basically have frequency synchronization and time synchronization with base station devices in the case in which a sidelink channel is set in uplink resources, a radio resource gap (e.g., a frequency resource gap (a gap carrier) or a time resource gap) may not be inserted between uplink channels and sidelink channels. That is, the reason for this is that both a case in which all uplink resources are used as uplink channels and a case in which some of the uplink resources are used as sidelink channels are the same for a transmission device. FIG. 21 is an explanatory diagram illustrating an example of placement of frequency-time resources in a case in which uplink, sidelink, and uplink channels are set in resource blocks that are continuous in the frequency direction. As illustrated in FIG. 21, no radio resource gap may be provided on the boundaries on which different channels (here, uplink channels and sidelink channels) are set.

<Introduction of Radio Resource Gap for Physical Sidelink Channel in Present Embodiment>

Figure 22:
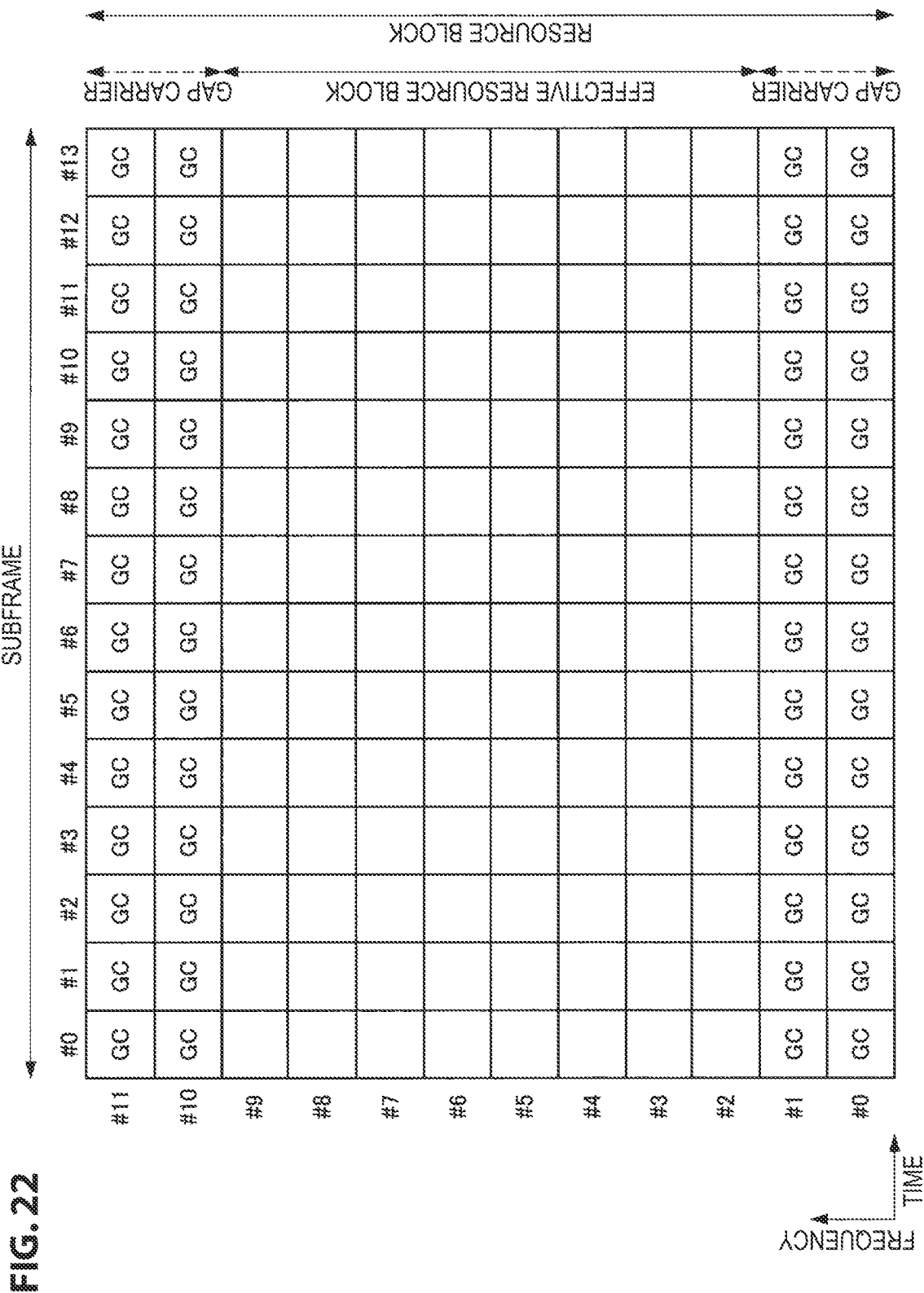
FIG. 22 is an explanatory diagram illustrating an example in which gap carriers (GCs) are introduced at ends of a predetermined frequency resource unit (resource block).

In the present embodiment, radio resource gaps are provided to avoid or reduce interference of sidelink channels with uplink channels, downlink channels, and other sidelink channels. FIG. 22 is an explanatory diagram illustrating an example in which gap carriers (GCs) are introduced at ends of a predetermined frequency resource unit (resource block). Radio resource gaps include gap carriers introduced into frequency resources (gap frequencies, band gaps, gap subcarriers, blank subcarriers, null bands, null carriers, null subcarriers, and the like) and gap symbols introduced into time resources (gap intervals, band intervals, null intervals, null symbol, and the like). Gap carriers and gap symbols correspond to a case in which power allocated to a corresponding frequency resource and time resource is zero, that is, no signal is allocated. In addition, as another example, they also correspond to a case in which, although power is allocated to a corresponding frequency resource and time resource, the power is lower than that allocated to other frequency resources and time resources.

In a case in which gap carriers are introduced into sidelink channels, it is desirable for the gap carriers to be introduced at ends of a mass of predetermined frequency resources, for example, a resource block in the frequency direction or the time direction. The reason for this is to avoid or reduce interference with other uplink channels, downlink channels, and sidelink channels that are likely to be adjacent to the channels in the frequency direction or the time direction. In addition, it is desirable for a bandwidth of gap carriers to be a bandwidth that is an integer multiple of subcarrier spacing serving as a base. The reason for this is that, in a case in which a resource block is set to be an integer multiple of subcarrier spacing serving as a base, for example, frequency resources other than gap carriers can be used as sidelink channels without waste. In addition, gap carriers may be introduced into sidelink channels only in a case in which a sidelink channel is set in downlink resources.

Figure 23:
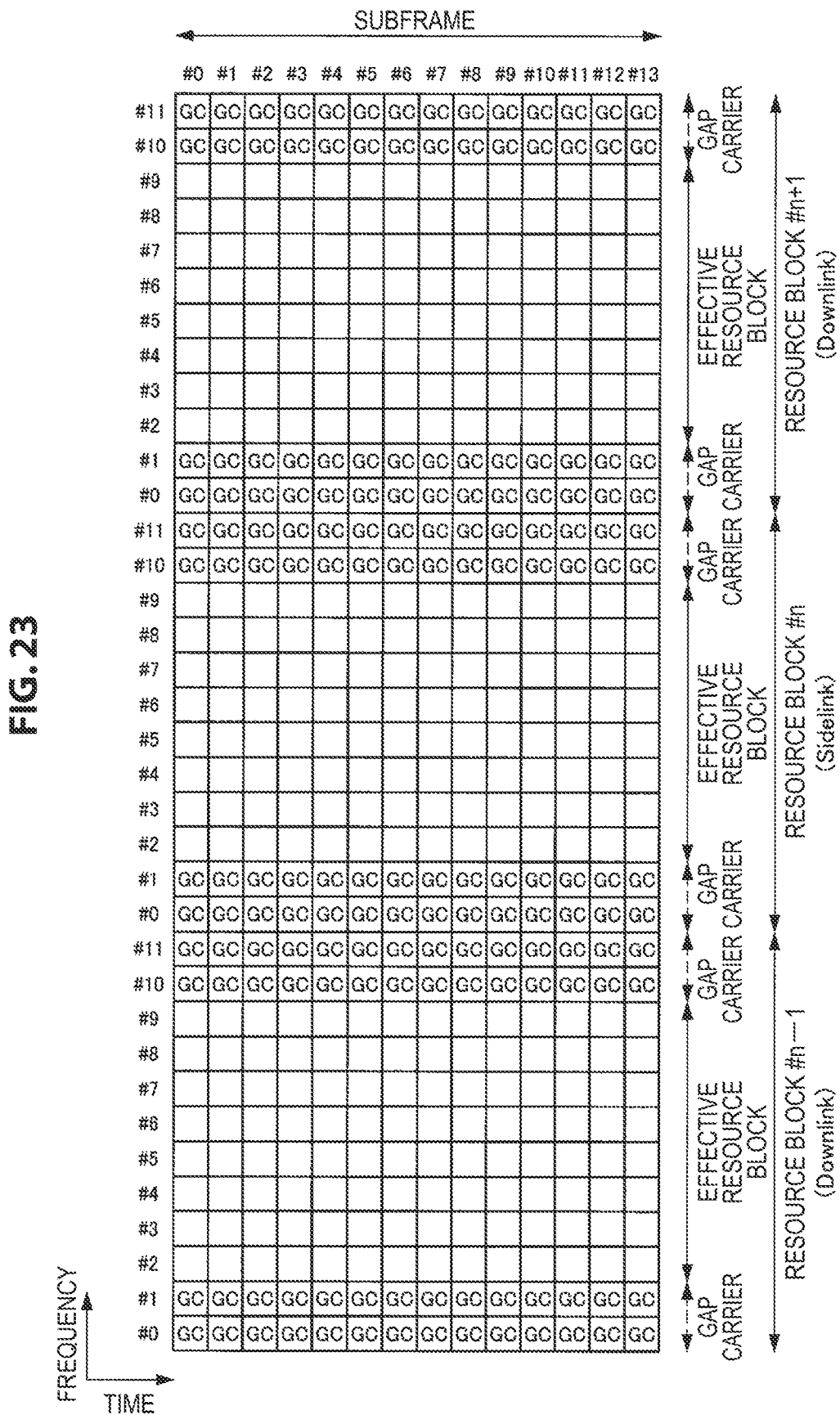
FIG. 23 is an explanatory diagram illustrating an example of placement of frequency-time resources.

FIG. 23 is an explanatory diagram illustrating an example of placement of frequency-time resources in the case in which a sidelink channel is set in downlink resources. FIG. 23 illustrates an example of placement of frequency-time resources in a case in which radio resource gaps are inserted between the downlink and the sidelink. As illustrated in FIG. 23, it is also possible to avoid or reduce interference of the sidelink channel with the downlink channels by inserting radio resource gaps between the downlink and the sidelink.

As another example of a case in which gap carriers are introduced into a sidelink channel, a case in which a plurality of resource blocks that are continuous in the frequency direction is associated with sidelink channels of the same terminal device is conceivable. In this case, as one example of the introduction of gap carriers, gap carriers can be introduced at both ends of each resource block. In addition, as another example, the number (bandwidth) of gap carriers can also be reduced at boundary resource parts of resource blocks that are continuous in the frequency direction. Furthermore, in the case in which the number (bandwidth) of gap carriers at boundary resource parts of resource blocks that are continuous in the frequency direction is reduced, a value thereof can also be set to zero.

Figure 24:
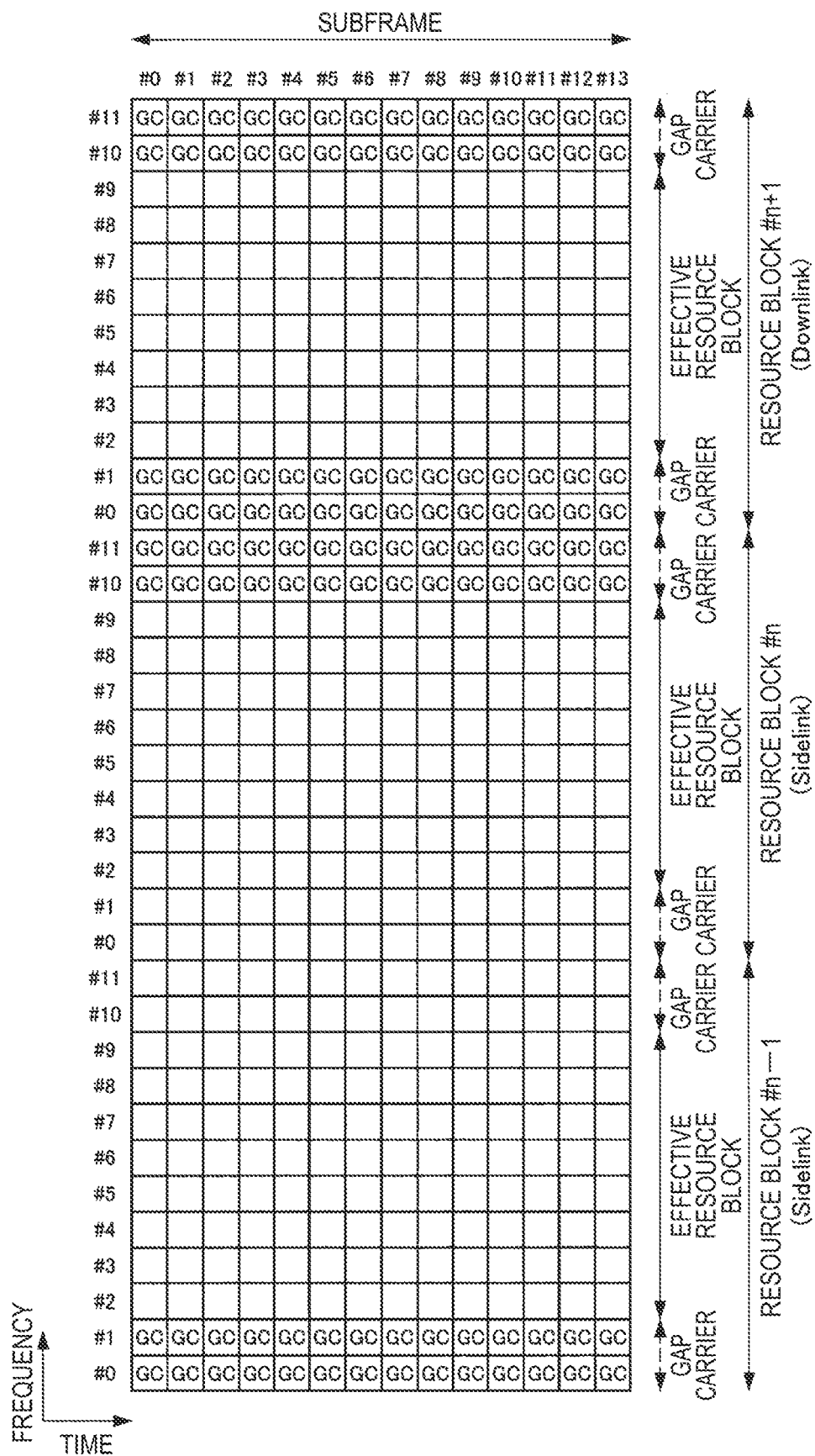
FIG. 24 is an explanatory diagram illustrating an example of placement of frequency-time resources.

FIG. 24 is an explanatory diagram illustrating an example of placement of frequency-time resources in the case in which sidelink channels are set in downlink resources. FIG. 24 illustrates an example of the introduction of gap carriers in a case in which resource blocks that are continuous in the frequency direction are set to sidelink channels and associated with the same terminal device, in which the number of gap carriers at the boundary part continuous in the frequency direction is zero. In a case in which continuous resource blocks are associated with the same terminal device, interference hardly occurs between the corresponding resource blocks, and thus the number of gap carriers at the boundary part continuous in the frequency direction may be set to zero.

Figure 25:
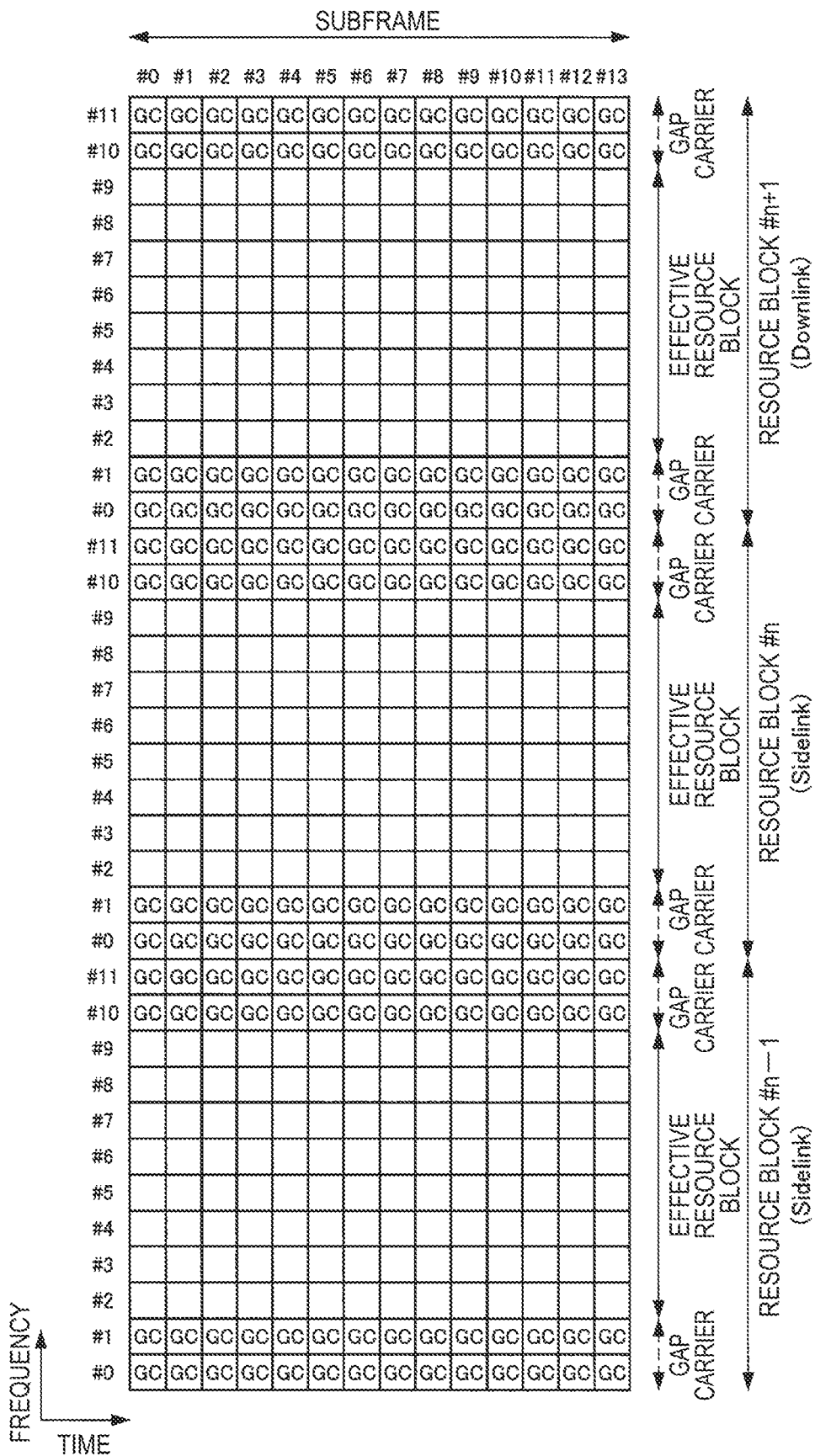
FIG. 25 is an explanatory diagram illustrating an example of the introduction of gap carriers.

Also in the case in which sidelink channels are set in resource blocks continuous in the frequency direction, in a case in which the consecutive sidelink channels are each associated with a different terminal device, radio resource gaps are inserted into the boundaries thereof. FIG. 25 is an explanatory diagram illustrating an example of the introduction of gap carriers in a case in which resource blocks that are continuous in the frequency direction are set to sidelink channels and each associated with different terminal devices. FIG. 25 illustrates an example in which gap carriers are also inserted into the boundary parts of the sidelink channels that are consecutive in the frequency direction. In FIG. 25, resource blocks #n−1 and #n are set as sidelinks. Here, the difference from FIG. 24 described above is that the sidelink of the resource block #n−1 and the sidelink of the resource block #n are each associated with different terminal devices. The terminal devices are likely not to have synchronization in transmission on downlink resources, and thus, in a case in which downlink resources are used for the sidelinks, resistance to interference attributable to an offset of the synchronization is improved by inserting radio resource gaps (gap carriers).

A value of the number (bandwidth) of gap carriers can be introduced by setting a predetermined value in advance and implicitly associating the gap carriers with sidelink channels. In other words, when a sidelink channel is transmitted or received, a terminal device performs transmission and reception on the premise that there are a predetermined number of gap carriers.

As another example of a value of the number (bandwidth) of gap carriers, the value can also be introduced by being clearly set by the base station device 2 providing a cell of an area (in-coverage, in-network-coverage) in which the terminal device 2 is located. In this case, the gap carriers can be notified of and set as system information (system information) using a downlink channel from the base station device 1 with respect to the terminal device 2.

A value of the number (bandwidth) of gap carriers can be independently set and introduced into each of a sidelink channel set in uplink resources and a sidelink channel set in downlink resources. In this case, it is desirable for the value of the number (bandwidth) of gap carriers introduced into the sidelink channel set in the downlink resources to be greater than or equal to the value of the number (bandwidth) of gap carriers introduced into the sidelink channel set in the uplink resources. The reason for this is that, in the case in which a sidelink channel is set in downlink resources, it is relatively difficult to avoid and reduce interference and deterioration, as described above.

Figure 26:
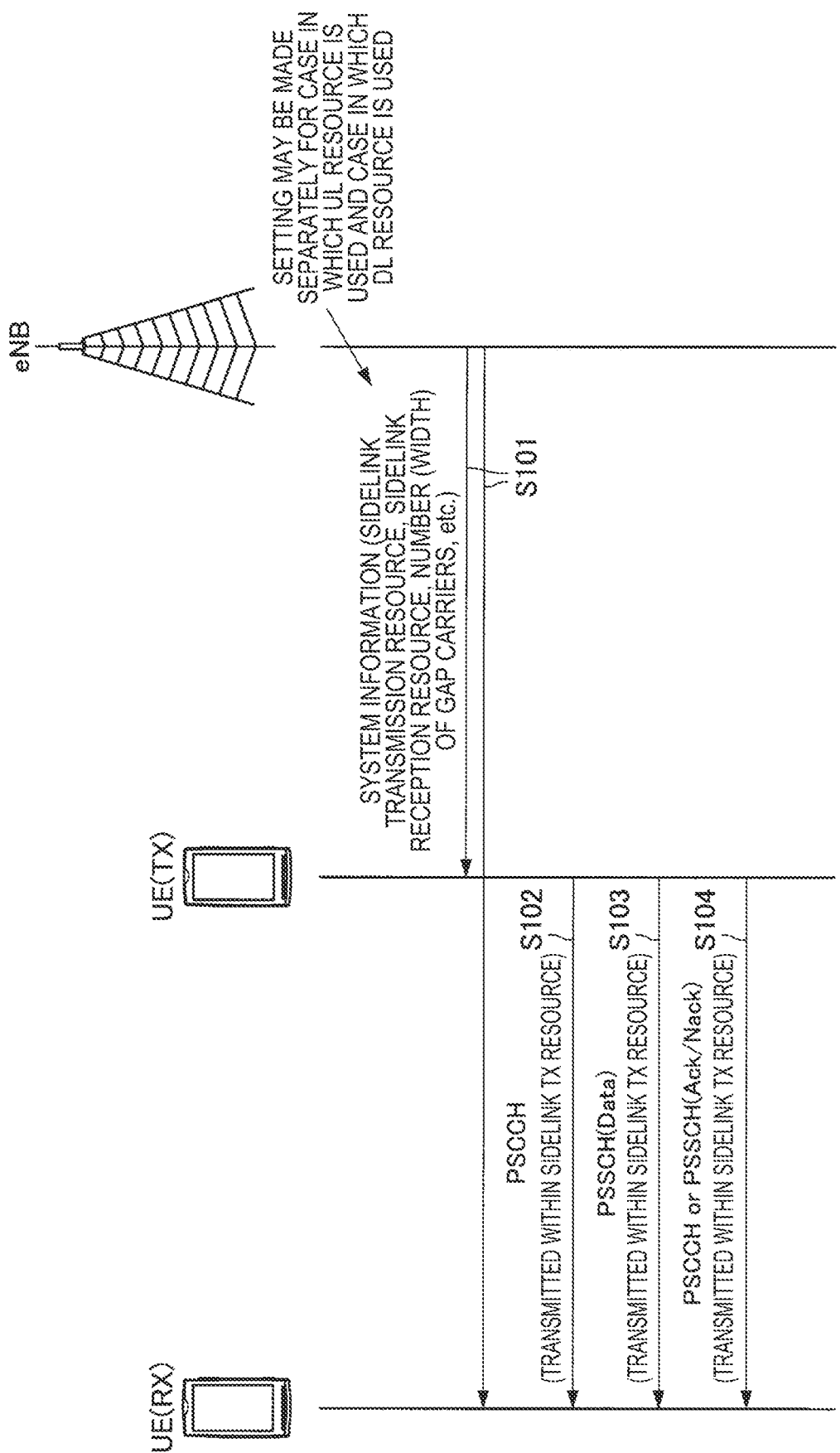
FIG. 26 is a flowchart showing an example of a procedure of setting resources and gap carriers for a sidelink.

FIG. 26 is a flowchart showing an example of a procedure of setting resources and gap carriers for a sidelink. An eNB transmits information of sidelink transmission resources, sidelink reception resources, and the number (bandwidth) of gap carriers to each UE using system information (Step S101). Note that the eNB may set the information separately for a case in which the sidelink uses uplink (UL) resources and a case in which the sidelink uses downlink (DL) resources.

When UE on the transmission side on a sidelink acquires information from the eNB, it transmits a PSCCH within the sidelink transmission resources to UE on the reception side on the sidelink (Step S102), and transmits a PSSCH within sidelink transmission resources (Step S103).

When the UE on the reception side on the sidelink receives the PSCCH and PSSCH from the UE on the transmission side, it transmits ACK or NACK to the UE on the transmission side using the PSCCH or PSSCH (Step S104).
3).

As gaps in the time direction, gap symbols (GSs) for inserting gaps (null symbols or zero symbols) may be introduced into each subframe or TTI in units of symbols.

Figure 27:
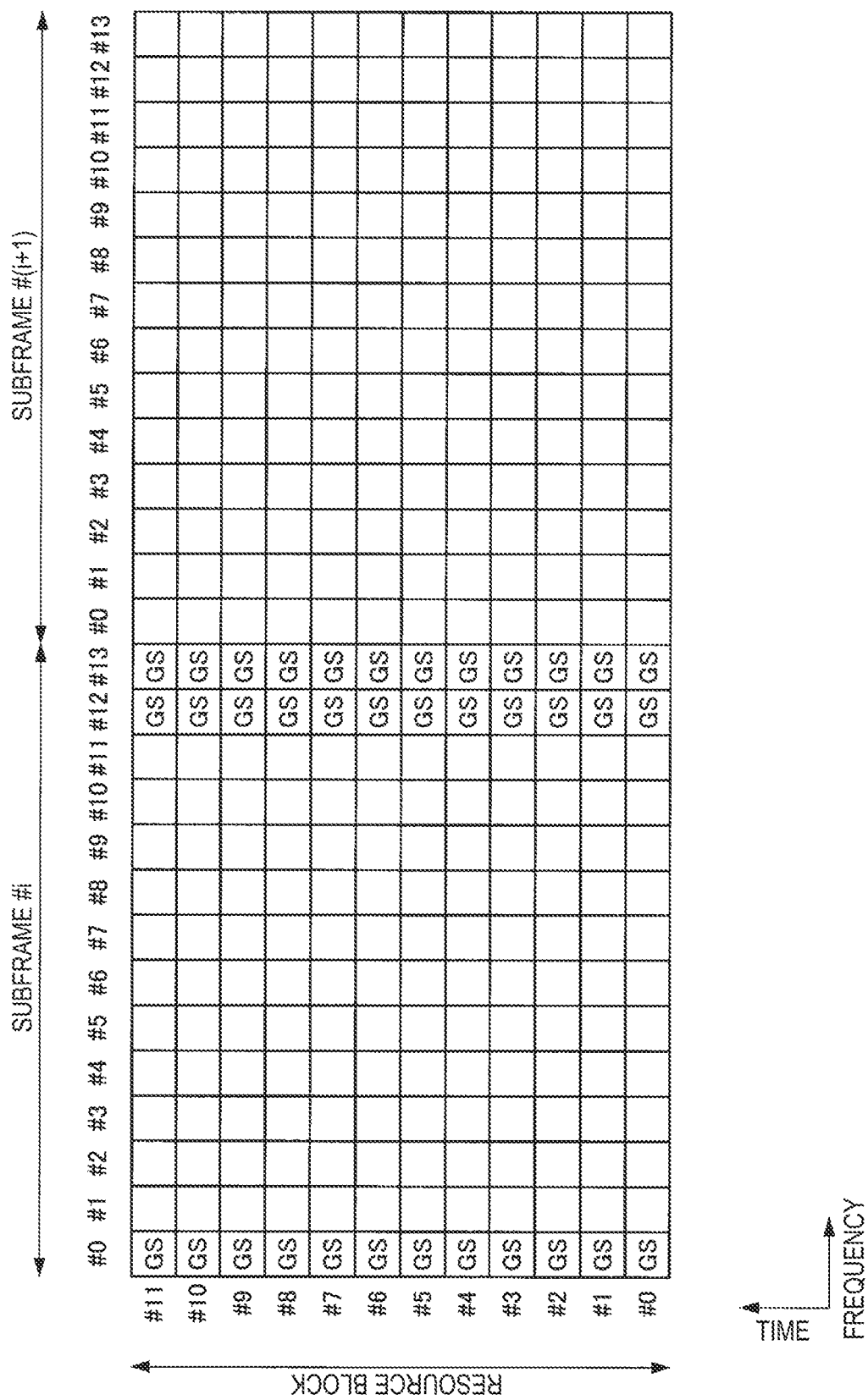
FIG. 27 is an explanatory diagram illustrating an example of insertion of gap symbols.

FIG. 27 is an explanatory diagram illustrating an example of insertion of gap symbols. As illustrated in FIG. 27, gap symbols are inserted in the front and rear of each of subframes or TTIs. The number of gap symbols in each may be set to be different. For example, since interference of a sidelink channel with a rear channel (a subframe or TTI) is a more important problem, the number of rear gap symbols may be set to be greater than or equal to the number of front gap symbols. In addition, since interference of a sidelink channel with a temporally earlier channel (a subframe or TTI) than that hardly occurs, the number of front gap symbols may be set to zero. In addition, in a case in which temporally consecutive subframes or TTIs are associated with the same terminal device 2 and set as sidelink channels, the number of gap symbols on the boundaries of the consecutive subframes or TTIs may be set to zero. In a case in which temporally consecutive subframes or TTIs are associated with different terminal devices, the number of gap symbols on the boundaries of the consecutive subframes or TTIs is set to a value greater than zero. In a case in which a sidelink channel and an uplink channel, or a sidelink channel and a downlink channel are temporally continuous, it is desirable to insert gap symbols into resources of the sidelink channel side. In a case in which a plurality of resource blocks that are consecutive in the time direction is associated with the same device, gap symbols may be set at the ends of the plurality of consecutive resource blocks.

With respect to a value of the number of gap symbols, a predetermined value may be set (preconfigured, predetermined, or predefined) in advance and the gap symbols may be implicitly associated with and introduced into sidelink channels. In other words, when a sidelink channel is transmitted or received, the terminal device 2 performs transmission and reception on the premise that there are a predetermined number of gap symbols.

As another example of a value of the number of gap symbols, gap symbols may also be introduced by being explicitly set by the base station device 1 providing a cell of an area (in-coverage, in-network-coverage) in which the terminal device 2 is located. In this case, the gap symbols can be notified of and set as system information (system information) using a downlink channel from the base station device 1 with respect to the terminal device 2.

A value of the number of gap symbols can be independently set and introduced into each of a sidelink channel set in uplink resources, a sidelink channel set in downlink resources, and a sidelink channel set in resources of an unlicensed band. In this case, it is desirable for the value of the number of gap symbols introduced into the sidelink channel set in the downlink resources to be greater than or equal to the value of the number of gap symbols introduced into the sidelink channel set in the uplink resources. The reason for this is that, in the case in which a sidelink channel is set in downlink resources, it is relatively difficult to avoid and reduce interference and deterioration as described above.

Note that the above-described gaps in the frequency direction and gaps in the time direction may be introduced separately or together.

<Introduction of Transmission Timing Control into Physical Downlink Channel Physical Sidelink Channel in Present Embodiment>

The occurrence of interference in the time direction can be avoided when a sidelink channel is transmitted by introducing transmission timing control.

With respect to conventional uplink channels, a mechanism of transmission timing control called timing advance (TA) has been introduced. This corresponds to advancing a transmission tinting of an uplink beyond a reference timing for a terminal device side. The reference timing is normally a timing of a downlink synchronization signal. When the base station device gives a notification of a TA command to the terminal device, the terminal device can ascertain an amount of timing advance.

Here, introducing transmission timing control even when a sidelink channel is transmitted is conceivable. At this time, different timing control quantities can be notified of and set from the base station device to the terminal device for a sidelink using uplink resources and a sidelink using downlink resources. Since interference to be considered varies in situations of each of the sidelink using uplink resources and the sidelink using downlink resources, the control can be performed in accordance with each situation by individually setting the control quantities.

Figure 28:
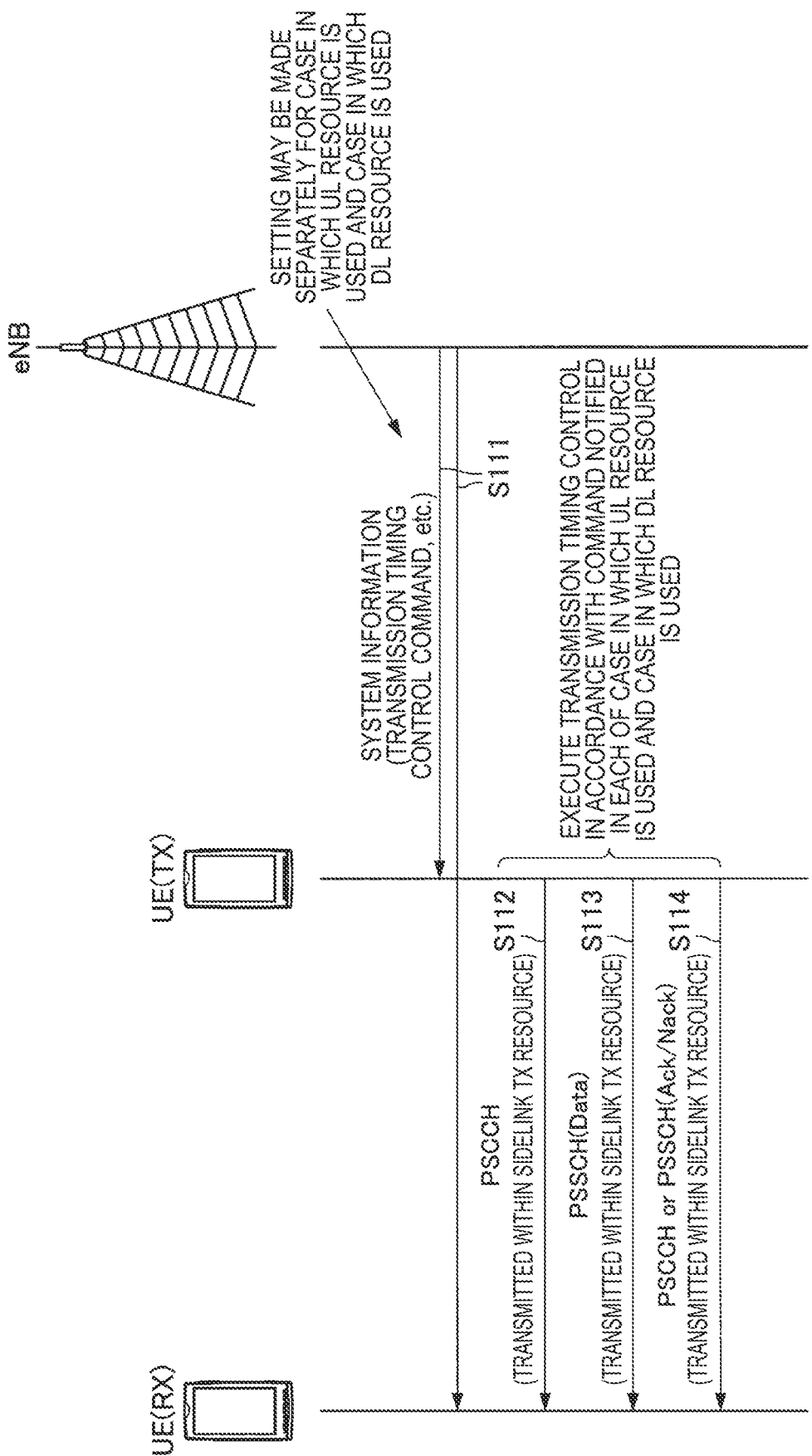
FIG. 28 is a flowchart showing an example of a setting procedure of resources and gap carriers for a sidelink.

FIG. 28 is a flowchart showing an example of a procedure of setting resources and gap carriers for a sidelink. An eNB transmits a transmission timing control command for controlling a transmission timing to each UE using system information (Step S111). Note that the eNB may set transmission timings separately for a case in which the sidelink uses uplink (UL) resources and a case in which the sidelink uses downlink (DL) resources.

When UE on the transmission side on a sidelink acquires information from the eNB, it transmits a PSCCH within the sidelink transmission resources to UE on the reception side on the sidelink (Step S112), and transmits a PSSCH within sidelink transmission resources (Step S113).

When the UE on the reception side on the sidelink receives the PSCCH and PSSCH from the UE on the transmission side, it transmits ACK or NACK to the UE on the transmission side using the PSCCH or PSSCH (Step S114).

Figure 29:
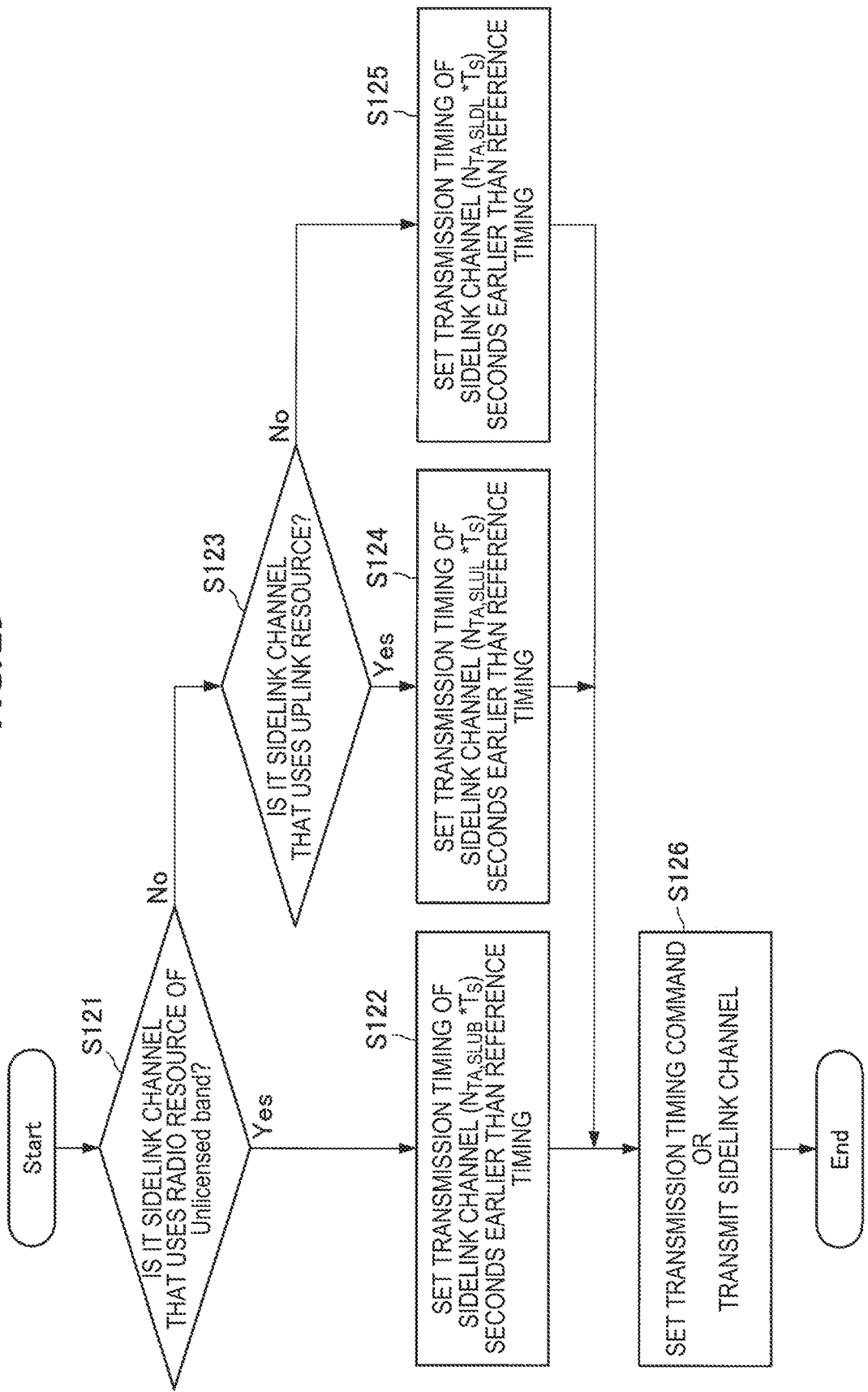
FIG. 29 is a flowchart showing an operation example when control over different transmission timings is set on a sidelink using an uplink resource and a sidelink using a downlink resource.

FIG. 29 is a flowchart showing an operation example when control over different transmission timings is set on a sidelink using an uplink resource and a sidelink using a downlink resource.

As an example, a transmission timing of a sidelink channel that uses uplink resources can be set to be controlled to be earlier than a reference, and a transmission timing of a sidelink channel that uses downlink resources can be set to be controlled to be later than the reference.

In a case in which the channel is a sidelink channel that uses resources of an unlicensed band (Yes in Step S121), a reference transmission timing of the sidelink channel is advanced (Step S122). The amount of the advance in Step S122 will be described below.

In a case in which the channel is not a sidelink channel that uses resources of an unlicensed band (No in Step S121), but uplink resources are used for the sidelink (Yes in Step S123), the interference of the sidelink affects reception of the base station device, and thus the transmission timing is advanced similarly to transmission of an uplink channel (Step S124). This advance can achieve a reduction of interference. On the other hand, in a case in which downlink resources are used for the sidelink (No in Step S123), it is necessary to consider the interference of the sidelink channel with the terminal device receiving the downlink channel. Taking the fact that the reference timing is a timing based on the boundary of downlink synchronization signals or downlink frames (frame boundary or frame alignment) into account, if the timing is advanced similarly to transmission tuning control of the uplink, the interference of the sidelink reaches the terminal device too early, and thus the interference is likely to appear very seriously. In addition, considering the distance between the base station device and a terminal device receiving a downlink channel and the distance between a terminal device receiving a sidelink channel and the terminal device receiving the downlink channel of the base station, the latter is more likely to be closer than the former. Thus, the transmission timing of the sidelink channel is made later than the reference (Step S125). By making the timing later as described above, it is possible to get the timings at which the downlink channel and the sidelink channel reach the terminal device closer to each other.

In addition, the terminal device that performs sidelink transmission sets a transmission timing command or transmits the sidelink channel at the set transmission timing (Step S126).

Figure 30:
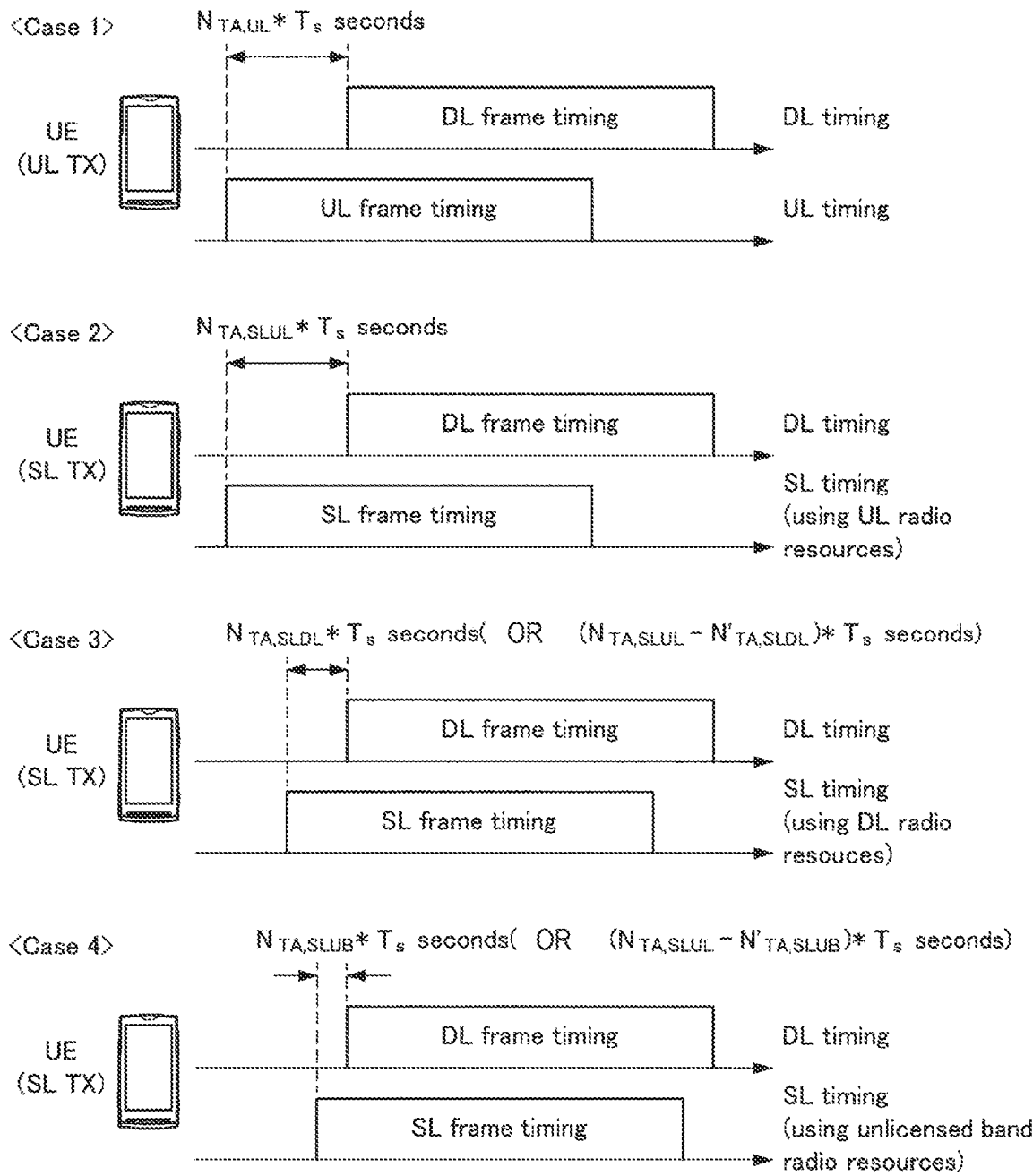
FIG. 30 is a flowchart showing an example of a setting of control over transmission timings.

FIG. 30 is an explanatory diagram illustrating an example in which different quantities of transmission timing control are provided for each type of radio resource used by a sidelink channel. Four cases are illustrated in FIG. 30. Case 1 is an example in which the downlink is transmitted after delaying it ($N_{TA,UL}*T_s$) seconds from the transmission of the uplink. Case 2 is an example in which the downlink is transmitted after delaying it ($N_{TA,SLUL}*T_s$) seconds from the transmission of the sidelink that uses uplink resources. Case 3 is an example in which the downlink is transmitted after delaying it ($N_{TA,SLDL}*T_s$) or (($N_{TA,SLuL}-N'_{TA,SLDL})*T_s$) seconds from the transmission of the sidelink that uses downlink resources. Case 4 is an example in which the downlink is transmitted after delaying it ($N_{TA,SLUB}*T_s$) or (($N_{TA,SLuL}-N'_{TA,SLDB})*T_s$) seconds from the transmission of the sidelink that uses resources of an unlicensed band.

For the sidelink channel that uses uplink radio resources, the set value $N_{TA,SLuL}$ shown in FIG. 30 may be the same value as the set value $N_{TA,UL}$ for the uplink channel or one common value may be used for both parameters. In addition, the values $N_{TA,SLUL}$ and $N_{TA,UL}$ may be set (user-specifically) for each terminal device.

For the sidelink channel that uses downlink radio resources, the set value $N_{TA,SLDL}$ may have an absolute value or may be set as a relative value (the difference with $N_{TA,SLUL}$) $N'_{TA,SLDL}$ to the value set in the case in which uplink resources are used. In addition, the value $N_{TA,SLDL}$ or $N'_{TA,SLDL}$ may be set (user-specifically) for each terminal device, for each base station device, or (cell-specifically) for each cell managed by the base station device.

For the sidelink channel that uses the radio resources of an unlicensed band, the set value $N_{TA,SLUB}$ may have an absolute value or may be set as a relative value (the difference with $N_{TA,SLUL}$) $N'_{TA,SLUB}$ to the value set in the case in which uplink resources are used. In addition, the value $N_{TA,SLUB}$ or $N'_{TA,SLUB}$ may be set (user-specifically) for each terminal device, for each base station device, or (cell-specifically) for each cell managed by the base station device.

Various parameters $N_{TA}$ with respect to transmission timing control may be set by the base station device for each terminal device under the base station or the cell, or for each cell. In a case in which $N_{TA,SLDL,m}$ is set for a terminal device of an identifier (e.g., radio network temporal identifier (RNTI)) m, a value thereof may be calculated using the following formula 1.

[Math. 1]

$$N_{TA,SLDL,m} = \frac{1}{M} \sum_{m' \in \Omega_M} N_{TA,SLUL,m'} \qquad \text{(Formula 1)}$$

Here, m denotes the number of terminal devices under the base station or the cell, and $\Omega_M$ denotes a set of identifiers of the terminal devices. This is resultingly equivalent to having the average of values of transmission timing control of the uplink. In this case, the value may be set cell-specifically. In addition, in a case in which a relative value is set, the value may be calculated using the following formula 2.

[Math. 2]

$$N'_{TA,SLDL,m} = \frac{1}{M} \sum_{m' \in \Omega_M} N_{TA,SLUL,m'} - N_{TASLUL,m} \qquad \text{(Formula 2)}$$

In this case, the value may be set user-specifically.

In addition, a maximum value of the set range of each value may vary for easy type of radio resource to be used. For example, absolute values with respect to the transmission timing control may have the magnitude relation of the following formula 3.

[Math. 3]

$$\max\{N_{TA,SLUB}\} \leq \max\{N_{TA,SLDL}\} \leq \max\{N_{TA,SLUL}\} \leq \max\{N_{TA,UL}\} \qquad \text{(Formula 3)}$$

In a case in which a terminal device of out-of-coverage transmits a signal in a sidelink channel, the transmission may be performed with NTA set to zero.

In the case in which downlink resources are used for the sidelink, there is also a possibility of a plurality of terminal devices to consider the influence of interference. Thus, delaying the transmission timing of the sidelink channel through transmission timing control can contribute to reduction of differences in an average arrival timing of all terminal devices.

<Transmission Power Control for Physical Sidelink Channel in Present Embodiment>

Interference can be reduced and avoided by introducing transmission power control (Transmit Power Control) of the terminal device 2 into transmission of a sidelink channel. In addition, in a method of transmission power setting, transmission power can be set individually in accordance with radio resources used by the sidelink.

As an example, in addition to uplink resources and downlink resources, use resources of an unlicensed band for a sidelink, is also conceivable. In the case of an unlicensed band, the influence of interference can be less considered than in the case in which other resources are used, and thus, pre-specified transmission power, for example, can as well be used for a sidelink channel. Alternatively, transmission power can also be calculated on the basis of path loss that occurs between a transmission terminal device and a reception terminal device. In a case in which uplink radio resources are used for the sidelink channel, transmission power can be calculated on the basis of path loss that occurs between a terminal device 2 serving as a transmission terminal and a base station device 1. In the case in which downlink resources are used for the sidelink channel, it is conceivable to calculate transmission power based on path loss between a terminal device 2 serving as a transmission terminal (transmission terminal device) and another terminal device 2 serving as a reception terminal (reception terminal device).

Figure 31:
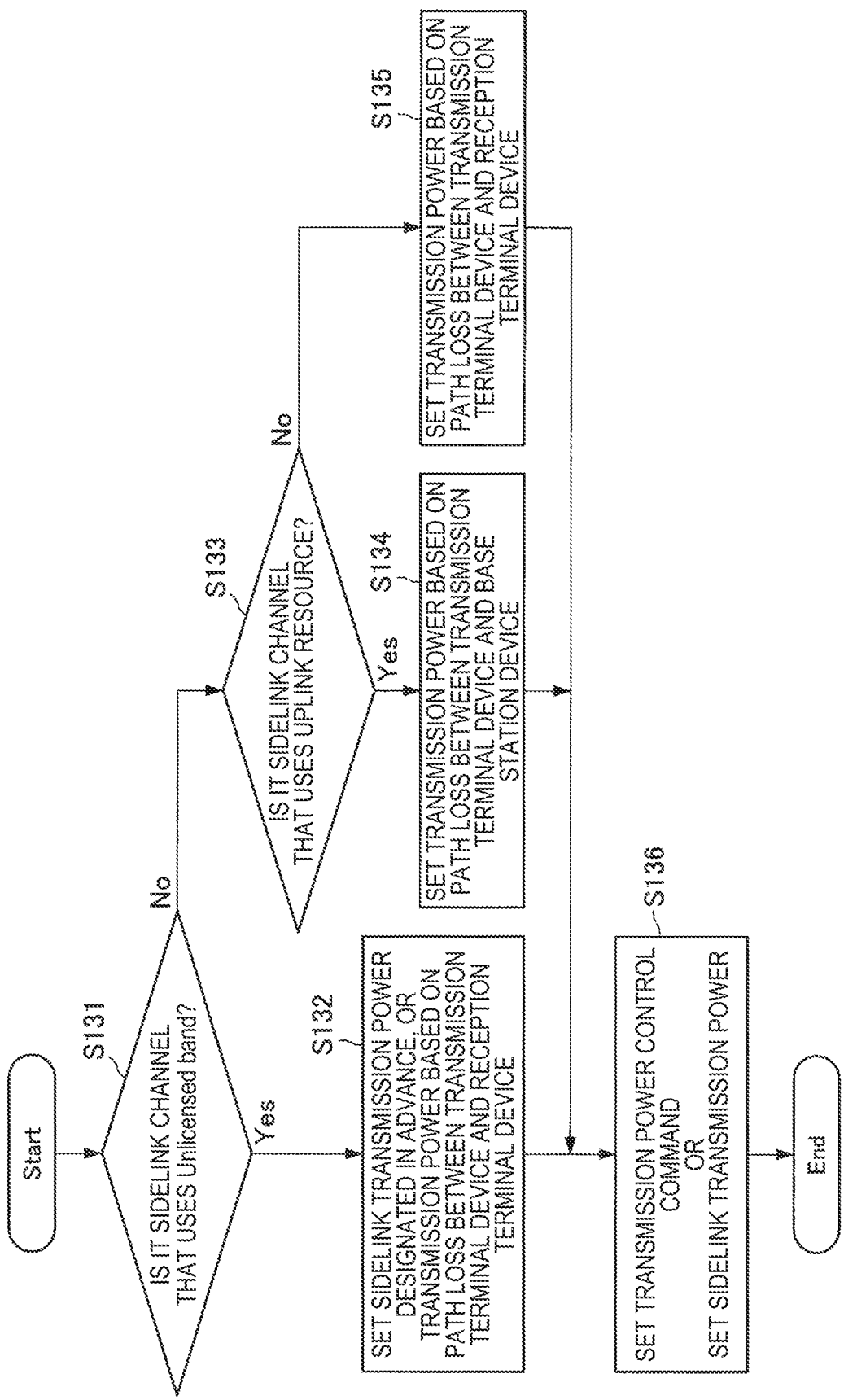
FIG. 31 is a flowchart showing an example of a setting of transmission power with respect to a sidelink channel.

FIG. 31 is a flowchart showing an example of a setting of transmission power with respect to a sidelink channel that uses resources of an unlicensed band, uplink resources, and downlink resources. If the channel is a sidelink channel that uses an unlicensed band (Yes in Step S131), the base station device 1 sets sidelink transmission power designated in advance, or transmission power based on path loss between a transmission terminal device and a reception terminal device (Step S132).

On the other hand, if the channel is not a sidelink channel that uses an unlicensed band (No in Step S131) but a sidelink channel that uses uplink resources (Yes in Step S133), the base station device 1 sets transmission power based on path loss between the transmission terminal device and the base station device 1 (Step S134). If the channel is not a sidelink channel that uses uplink resources, that is, it is a sidelink channel that uses downlink resources (No in Step S133), the base station device 1 sets transmission power based on path loss between the transmission terminal device and the reception terminal device (Step S135). If the channel is a sidelink channel that uses downlink resources, the base station device 1 may set power obtained by adding a predetermined offset to the power set in the case of the sidelink channel that uses uplink resources as transmission power.

Then, the terminal device that performs sidelink transmission sets a transmission power control command or sidelink transmission power (Step S136).

Figure 32:
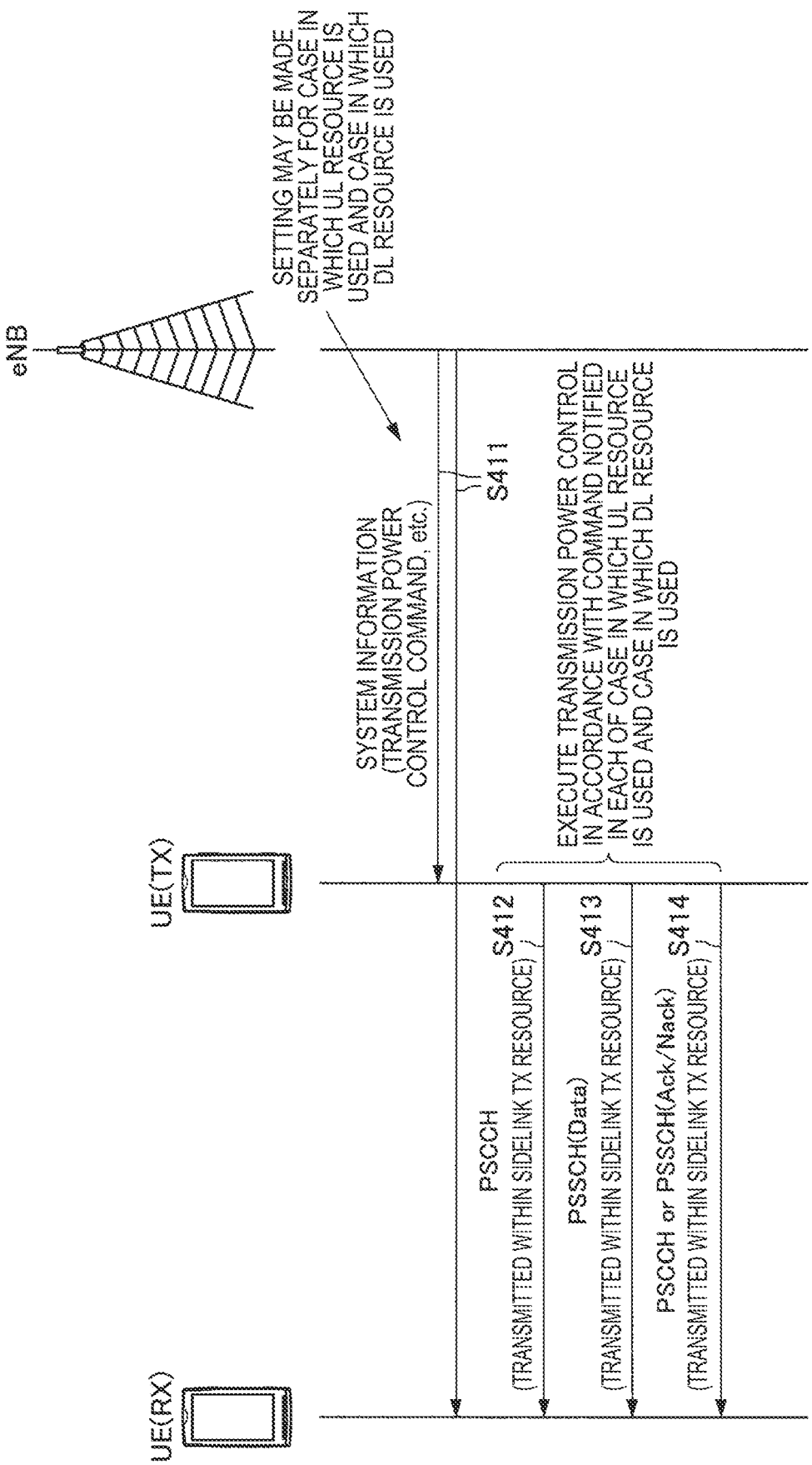
FIG. 32 is a flowchart showing an example of a setting procedure of resources and gap carriers for a sidelink.

FIG. 32 is a flowchart showing an example of a procedure of setting resources and gap carriers for a sidelink. An eNB transmits a transmission power control command for controlling transmission power to each UE using system information (Step S141). Note that the eNB may set transmission timings separately for a case in which the sidelink uses uplink (UL) resources and a case in which the sidelink uses downlink (DL) resources.

When UE on the transmission side on a sidelink acquires information from the eNB, it transmits a PSCCH within the sidelink transmission resources to UE on the reception side on the sidelink (Step S142), and transmits a PSSCH within sidelink transmission resources (Step S143).

When the UE on the reception side on the sidelink receives the PSCCH and PSSCH from the UE on the transmission side, it transmits ACK or NACK to the UE on the transmission side using the PSCCH or PSSCH (Step S144).

The transmission-side UE and the reception-side UE execute transmission power control in accordance with each of commands notified in the case in which uplink resources are used and the case in which downlink resources are used.

As another example of the setting of transmission power of the sidelink channel, setting different values of transmission power in accordance with the presence or absence of a channel simultaneously scheduled with the sidelink channel is also conceivable.

Figure 33:
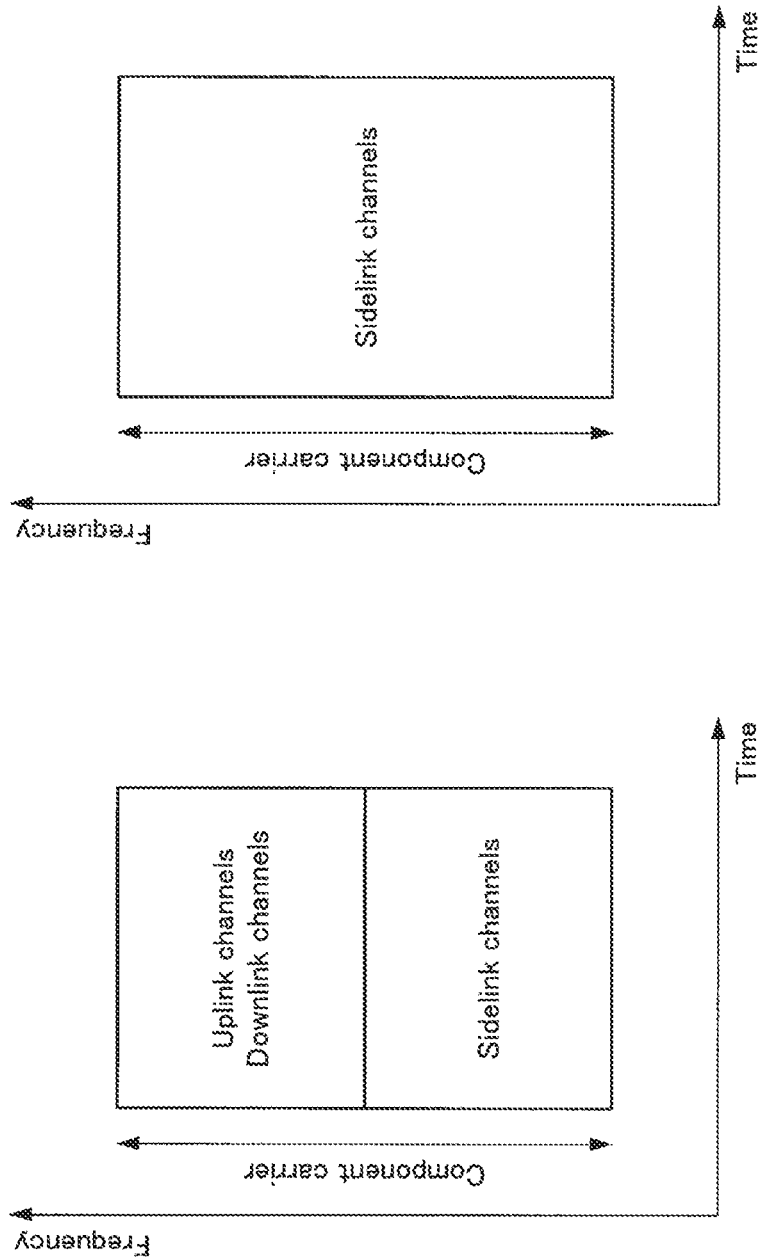
FIG. 33 is an explanatory diagram illustrating an example in which a sidelink channel and other channels are scheduled in the frequency direction.
Figure 34:
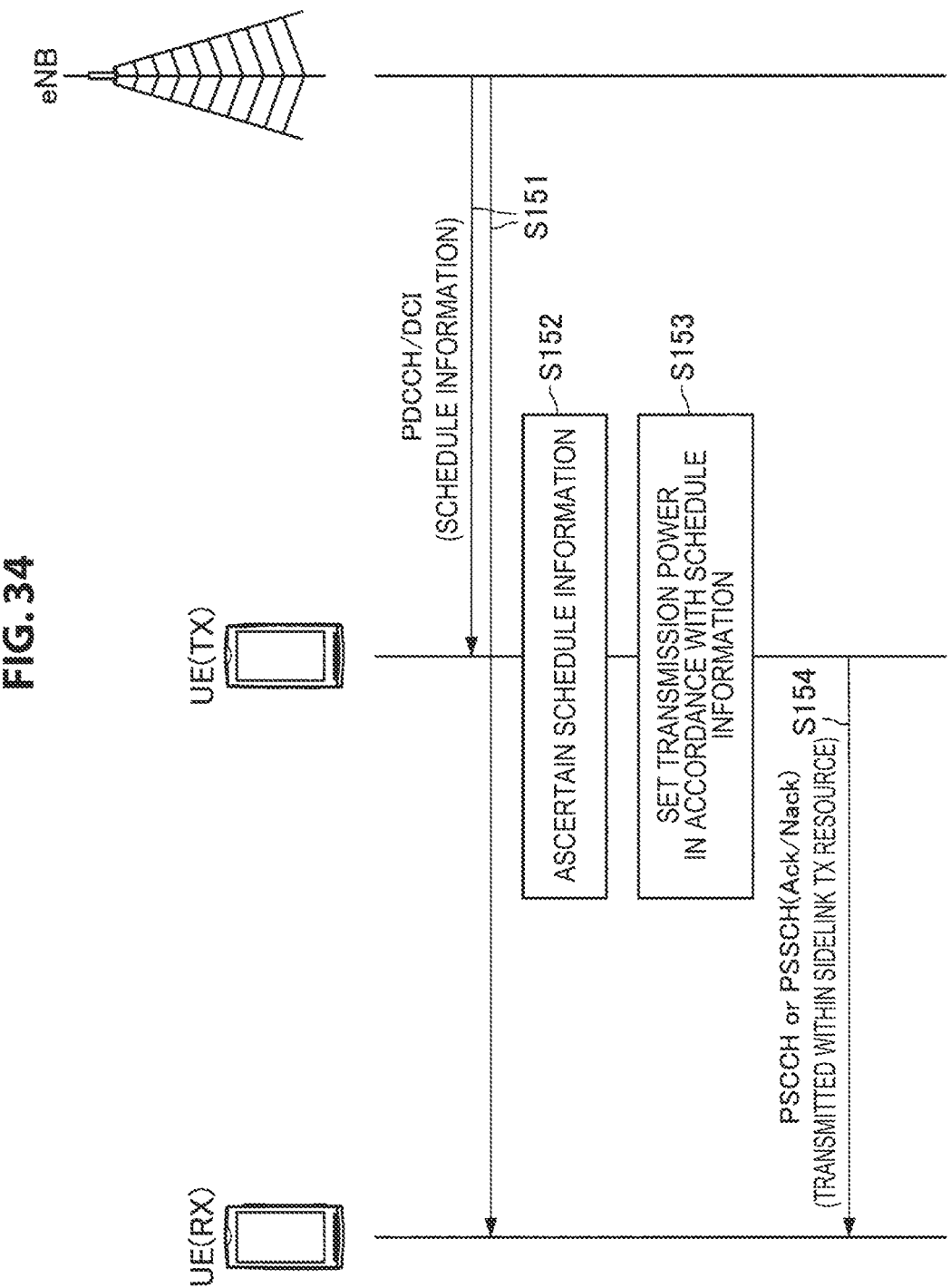
FIG. 34 is an explanatory diagram illustrating an example of a procedure for acquiring schedule information in a case in which transmission power is set in accordance with the schedule information.

FIG. 33 is an explanatory diagram illustrating an example in which a sidelink channel and other channels are scheduled in the frequency direction. An example in which a sidelink channel and an uplink channel or a downlink link channel are simultaneously scheduled in the frequency direction is illustrated on the left side of FIG. 33. An example in which only a sidelink channel is scheduled is illustrated on the right side of FIG. 33. As a scheduling situation to be considered, the case in which the sidelink channel and an uplink or a downlink channel are scheduled in the resource of the same time in the frequency direction as illustrated on the right side of FIG. 33 is conceivable. In such a case, there is concern of interference of the sidelink with the frequency adjacent thereto occurring due to in-band emission. Thus, a terminal device 2 using the sidelink sets to lower transmission power of the sidelink channel in such a case. On the other hand, in a case in which only a sidelink channel is set on the resource of the same time, the terminal device 2 using the sidelink sets not to lower the transmission power.

An example of a procedure of a terminal device 2 for ascertaining schedule information in a case in which transmission power control is executed in accordance with a schedule will be introduced. HG 34 is an explanatory diagram illustrating an example of a procedure for acquiring schedule information in a case in which transmission power is set in accordance with the schedule information. The base station device 1 gives a notification of the schedule information using DCI on a PDCCH (Step S151). Thus, by acquiring the DCI, the terminal device 2 can ascertain a schedule of the terminal device 2 itself and surrounding radio resources (frequency resources and time resources) (Step S152).

In addition, the transmission-side terminal device 2 sets transmission power in accordance with the schedule information (Step S153), and transmits a PSCCH or a PSSCH within sidelink transmission resources to the reception-side terminal device 2 (Step S154).

By preparing a plurality of specific power calculation methods for transmission power control of a sidelink channel, the calculation methods can be switched in accordance with situations. Specifically, (1) transmission power based on path loss between a transmission terminal device and a base station device, (2) transmission power based on path loss between the transmission terminal device and a reception terminal device, and (3) pre-specified (pre-defined or pre-configured) transmission power are conceivable. Of course, transmission power of a sidelink channel can also be calculated using a method other than the three methods.

In the case in which transmission power based on path loss between a transmission terminal device and a base station device is to be set, it can be calculated using the following formula 4.

[Math. 4]

$$P_{dBm}=\min\{P_{max,dBm}, P_{calc,eNB,dBm}\}, P_{calc,eNB,dBm}=10\log_{10}(M_c)+P_{target,RB,c,dBm}+\alpha_c PL_{c,dB}+\Delta_{TF,c}+f_c \quad \text{(Formula 4)}$$

In the formula 4, $P_{max,dBm}$ denotes maximum power allowed for a terminal device 2 (a value pre-set for the terminal device 2 or a value set by a base station device as a cell-specific or a UE-specific value for a terminal device), $M_c$ denotes the number of resource blocks to be used, $P_{target,RB,c,dBm}$ denotes target reception power of a base station device 1 per resource block (value set by the base station device 1 as a cell-specific value for the terminal device 2), $PL_c$ denotes path loss between a transmission terminal device and the base station device 1, $\alpha_c$ denotes a coefficient of path loss (normally a value that is greater than or equal to 0 and equal to or smaller than 1 and a value set by the base station device 1 as a cell-specific value for the terminal device 2), $\Delta_{TF,c}$ denotes a correction factor in accordance with a modulation and coding set (MCS, or a combination of modulation of PSK/QAM, or the like and an error correction method-coding rate) at the time of transmission (a value with a pre-set range for the terminal device 2), and $f_c$ denotes a closed-loop-type correction factor between the transmission terminal device and the base station device 1 (a value set by the base station device 1 as a UE-specific (and dynamic) value for the terminal device 2).

In addition, in a case in which a gap frequency is set in radio resources of a physical channel transmitted by the terminal device 2, interference can also be further reduced, considering a correction value for the gap frequency as shown in the following formula 5.

[Math. 5]

$$P_{dBm} = \min\{P_{max,dBm}, P_{calc,eNB,dBm}\}, \quad \text{(Formula 5)}$$
$$P_{calc,eNB,dBm} = 10\log_{10}(M_c) + P_{target,RB,c,dBm} + 10\log_{10}\left(\frac{N_{GC}}{N_{SC}}\right) + \alpha_c PL_{c,dB} + \Delta_{TF,c} + f_c$$

$N_{SC}$,RB in the above formula denotes the number of subcarriers in transmission (including subcarriers and gap carriers actually used), and $N_{GC}$ denotes the number of gap carriers. In addition, the following formula 6 can also be obtained to consider the correction value for the gap frequency.

[Math. 6]

$$P_{dBm} = \min\{P_{max,dBm}, P_{calc,eNB,dBm}\} + 10\log_{10}\left(\frac{N_{GC}}{N_{SC}}\right), \quad \text{(Formula 6)}$$
$$P_{calc,eNB,dBm} = 10\log_{10}(M_c) + P_{target,RB,c,dBm} + \alpha_c PL_{c,dB} + \Delta_{TF,c} + f_c$$

In the case in which transmission power based on path loss between a transmission terminal device and a reception terminal device is to be set, it can be calculated using the following formula 6.

[Math. 7]

$$P_{dBm}=\min\{P_{max,dBm}, P_{calc,UE,dBm}\}, P_{calc,UE,dBm}=10\log_{10}(M_u)+P_{target,RB,u,dBm}+\alpha_u PL_{u,dB}+\Delta_{TF,u}+f_u+S_u \quad \text{(Formula 7)}$$

In the formula 7, $P_{max,dBm}$ denotes maximum power allowed for the terminal device 2 (a pre-set value for the terminal device or a value set by the base station device as a cell-specific or UE-specific value for the terminal device), $M_u$ denotes the number of resource blocks to be used, $P_{target,RB,u,dBm}$ denotes target reception power of the reception terminal device per resource block (a value set by the base station device 1 as a cell-specific value for the terminal device 2), $PL_u$ denotes path loss between the transmission terminal device and the reception terminal device, $\alpha_u$ denotes a coefficient of path loss (normally a value that is greater than or equal to 0 and equal to or smaller than 1 or a value set by the base station device 1 as a cell-specific value for the terminal device 2), $\Delta_{TF,u}$ denotes a correction factor in accordance with an MCS at the time of transmission (a value with a pre-set range for the terminal device), $f_u$ denotes a closed-loop-type correction factor between the transmission terminal device and the reception terminal device (a value set by the reception terminal device as a UE-specific (and dynamic) value for the transmission terminal device), and $S_u$ denotes a correction factor in accordance with a scheduling situation of surrounding radio resources of the sidelink channel (a value set by the base station device as a cell-specific value for the terminal device). It is desirable for $S_u$ to have different values due to the above-described different situations as illustrated in FIG. 33. It is desirable to have a negative value in the case on the left side of the drawing (i.e., calculation for lowering transmission power is employed). On the other hand, it is desirable to have a greater value in the case on the right side of the drawing than in the case on the left side of the drawing. In addition, as another example of the value, it is desirable to set zero for $S_u$ in the case on the right side of the drawing.

Note that it is also possible to perform transmission power control as shown in the following formulas 8 and 9 to consider the correction value when the gap frequency is set, similarly to the above.

[Math. 8]

$$P_{dBm} = \min\{P_{max,dBm}, P_{calc,UE,dBm}\}, \quad \text{(Formula 8)}$$
$$P_{calc,UE,dBm} = 10\log_{10}(M_u) + P_{target,RB,u,dBm} + 10\log_{10}\left(\frac{N_{GC}}{N_{SC}}\right) + \alpha_u PL_{u,dB} + \Delta_{TF,u} + f_u + S_u$$

[Math. 9]

$$P_{dBm} = \min\{P_{max,dBm}, P_{calc,UE,dBm}\} + 10\log_{10}\left(\frac{N_{GC}}{N_{SC}}\right), \quad \text{(Formula 9)}$$
$$P_{calc,UE,dBm} = 10\log_{10}(M_u) + P_{target,RB,u,dBm} + \alpha_u PL_{u,dB} + \Delta_{TF,u} + f_u + S_u$$

In the case in which pre-specified (pre-defined or pre-configured) transmission power is to be set, it can be calculated using the following formula 10.

[Math. 10]

$$P_{dBm}=P_{pre,dBm} \quad \text{(Formula 10)}$$

In the formula 10, $P_{pre,dBm}$ denotes pre-specified (pre-defined or pre-configured) transmission power (a pre-set value for the terminal device 2 or a value set by the base station device as a cell-specific or UE-specific value for the terminal device).

Note that transmission power control is also possible using the following formula 11 to consider the correction value when the gap frequency is set, similarly to the above.

[Math. 11]

$$P_{dBm} = P_{pre,dBm} + 10\log_{10}\left(\frac{N_{GC}}{N_{SC}}\right) \quad \text{(Formula 11)}$$

Figure 35:
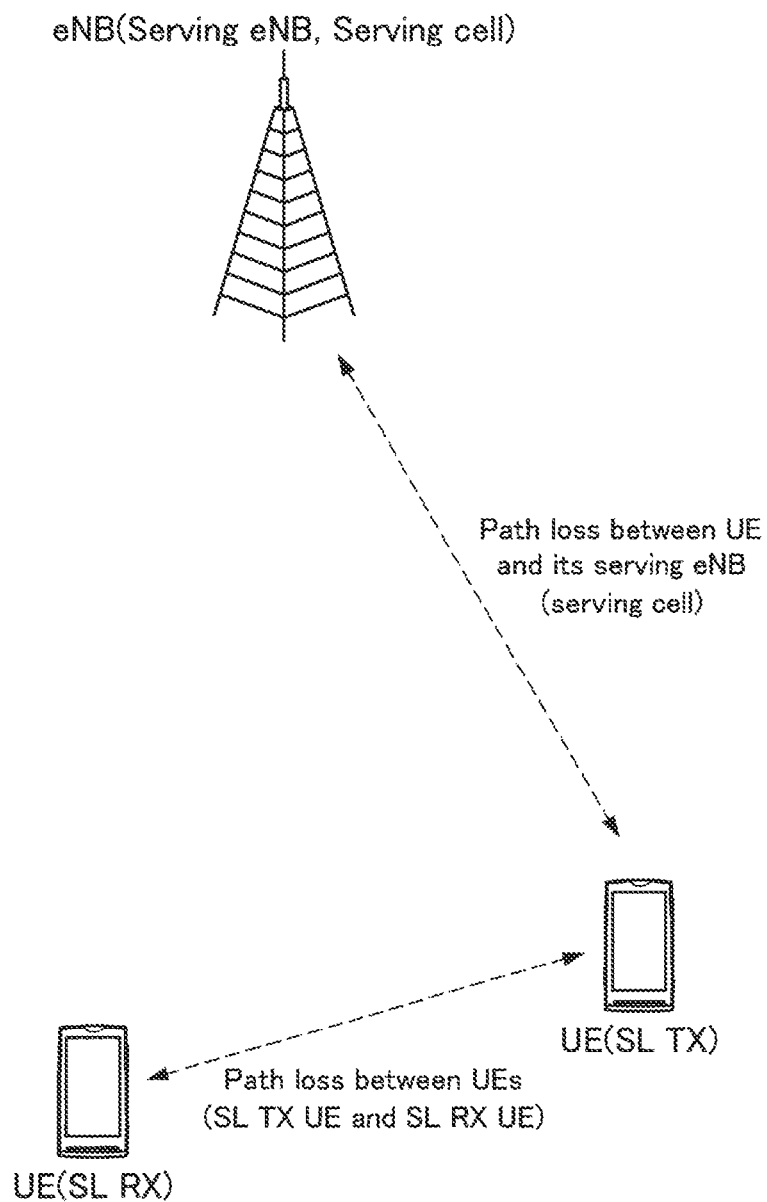
FIG. 35 is an explanatory diagram illustrating an example of path loss referred to in transmission power control of a sidelink channel.

FIG. 35 is an explanatory diagram illustrating an example of path loss to be referred to in transmission power control of a sidelink channel.

It is desirable for the final calculation of the transmission power using each of methods to be executed by the transmission terminal device. In addition, it is desirable for various variables, coefficients, and the like to be used in the calculation of the transmission power to be set in advance for the transmission terminal device or cell-specifically (Cell-specific) or terminal-specifically (UE-specific) by the base station device. In addition, with respect to the variables, coefficients, and the like of the above-described (1) and (2), it is also desirable to set individual values of (1) and (2) for variables and coefficients having similar meanings.

<Configuration of L1 and L2 in Present Embodiment>

It is likely that a sidelink channel on uplink resources and a sidelink channel on downlink resources have different communication qualities due to different situations such as interference. In such situations, behaviors of Layer 2 (L2) may be isolated in each of sidelink channels in the present embodiment. By isolating behaviors of L2 in each of sidelink channels as described above, it is possible to avoid mixed communication qualities and to stably use the sidelink in each of resources.

Figure 36:
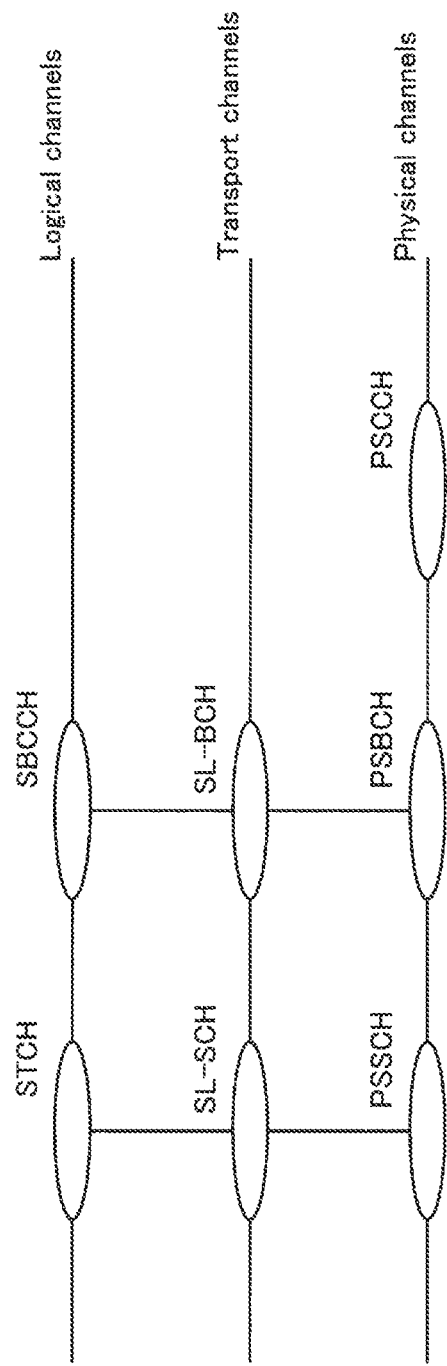
FIG. 36 is an explanatory diagram illustrating an example of a case in which one channel is set as L2.

FIG. 36 is an explanatory diagram illustrating an example of a case in which one channel is set as L2, not depending on uplink resources and downlink resources. In this case, physical channels are set, not depending on an uplink and downlink as well.

Figure 37:
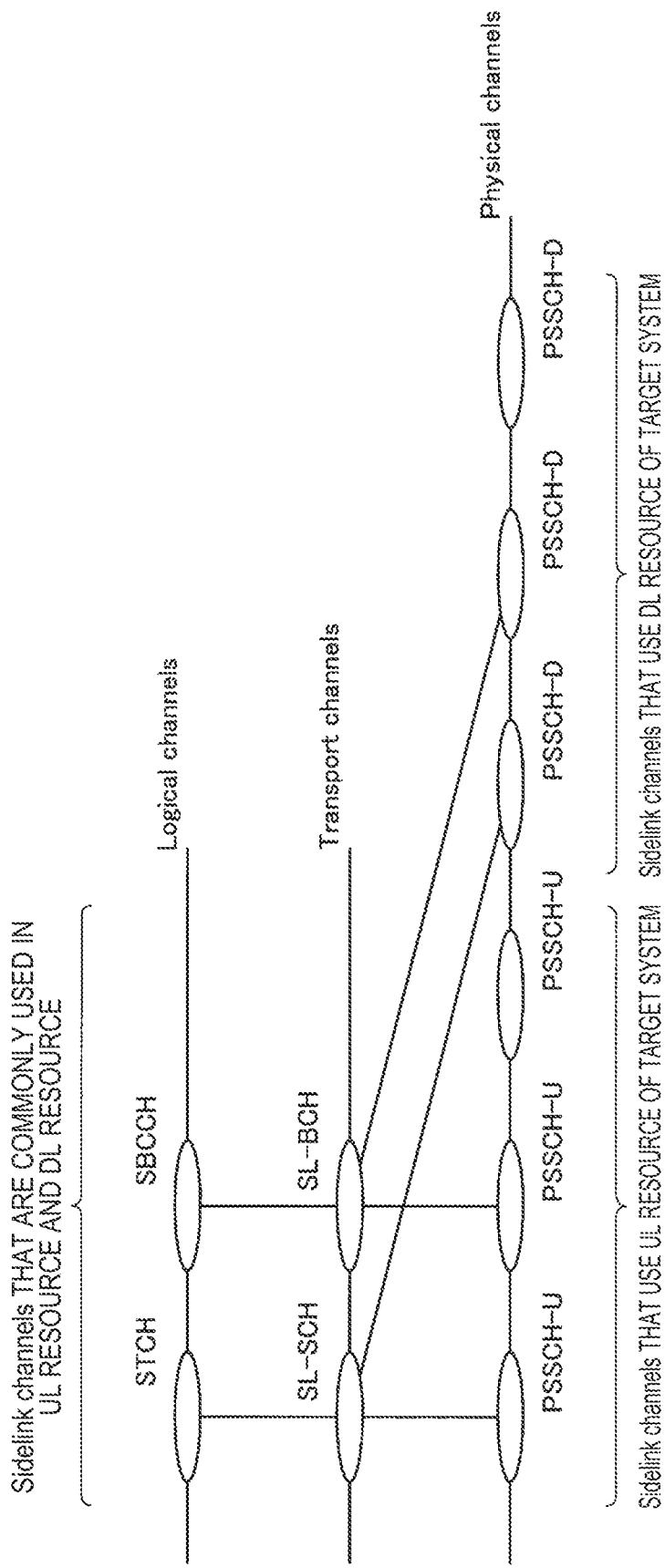
FIG. 37 is an explanatory diagram illustrating another example of the case in which one channel is set as L2.

FIG. 37 is an explanatory diagram illustrating another example of the case in which one channel is set as L2. In this case, while physical channels are set individually for the uplink and downlink, transport channels and the above channels are set in common. By setting transport channels in common, the transport channels can operate for an HARQ regardless of UL resources and DL resources.

Figure 38:
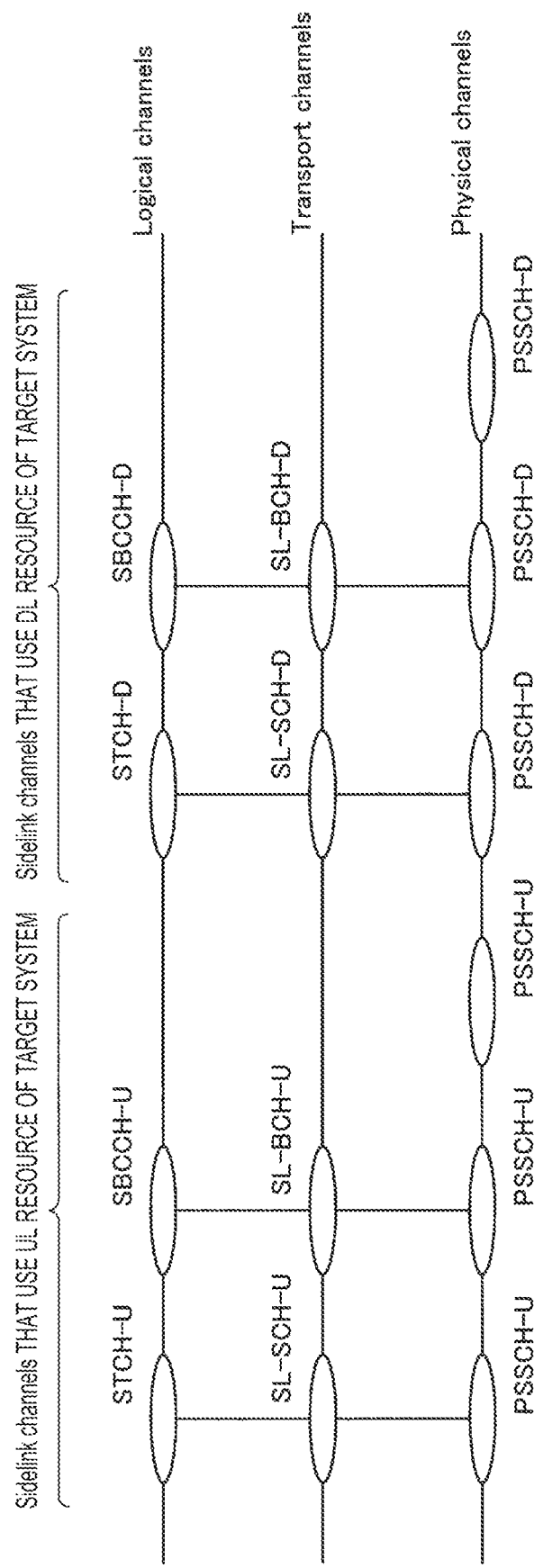
FIG. 38 is an explanatory diagram illustrating an example of a case in which two different L2 channels are set on a sidelink on uplink resources and a sidelink on downlink.

FIG. 38 is an explanatory diagram illustrating an example of a case in which two different L2 channels are set on a sidelink on uplink resources and a sidelink on downlink. In this case, not only physical channels but also transport channels and logical channels are also set individually for UL resources and DL resources. Since transport channels are set individually as described above, the transport channels operate for an HARQ individually as well.

Figure 39:
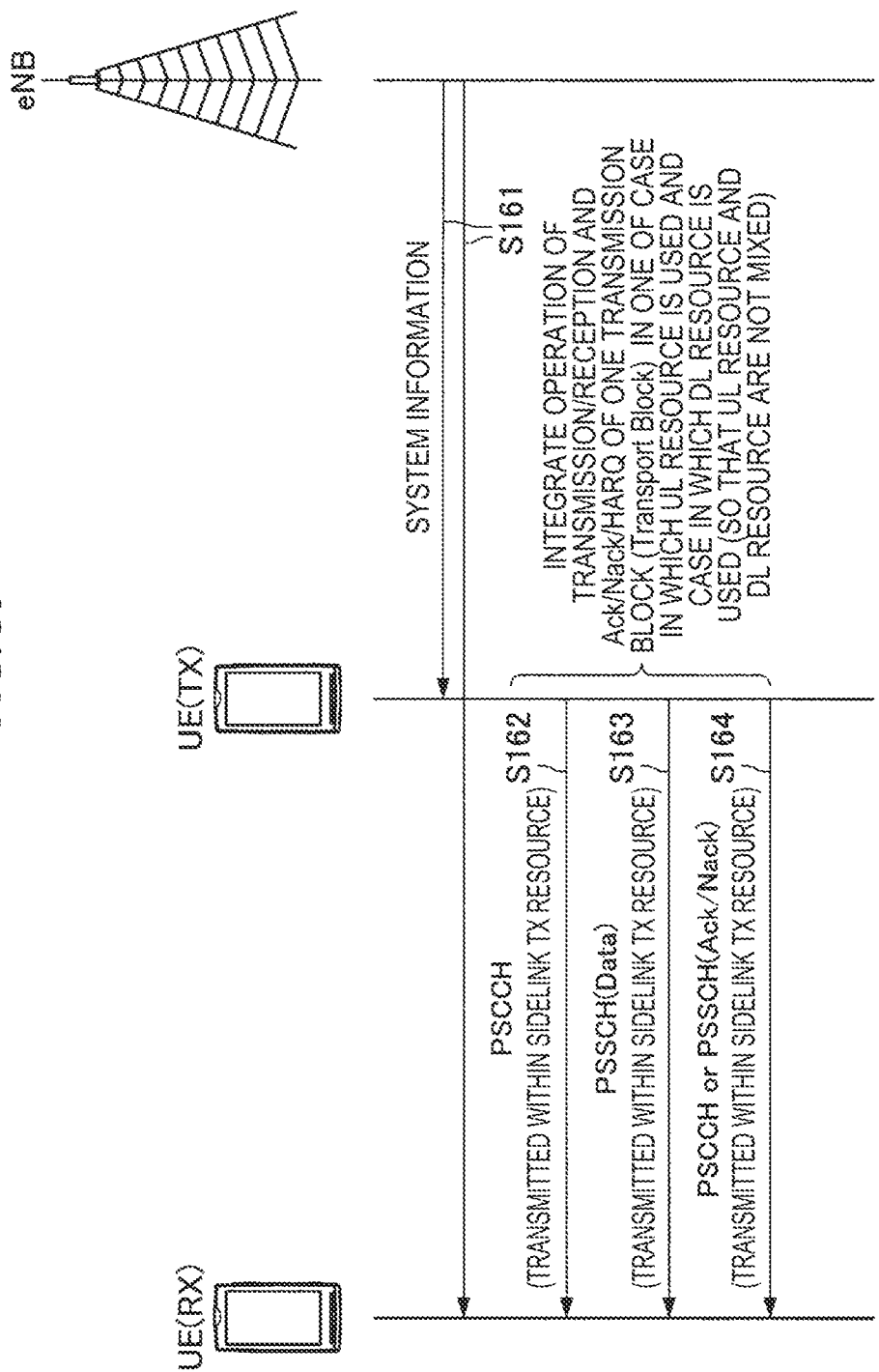
FIG. 39 is a flowchart showing an operation example of a case in which an L2 function is made independent in a case in which uplink resources are used and a case in which downlink resources are used.

In a case in which uplink radio resources and downlink radio resources are configured for TDD, the base station device 1 may set a timing of an HARQ of a sidelink channel in association with a frame configuration of TDD. FIG. 39 is a flowchart showing an operation example of transmission and reception of one transport block, ACK/NACK, and an HARQ in a case in which an L2 function is made independent in a case in which uplink resources are used and a case in which downlink resources are used.

The eNB transmits system information to each UE (Step S161). When UE on the transmission side on a sidelink acquires information from the eNB, it transmits a PSCCH within the sidelink transmission resources to UE on the reception side on the sidelink (Step S162), and transmits a PSSCH within sidelink transmission resources (Step S163).

When the UE on the reception side on the sidelink receives the PSCCH and PSSCH from the UE on the transmission side, it transmits ACK or HACK to the UE on the transmission side using the PSCCH or PSSCH (Step S164).

The technology for avoiding deterioration of a communication quality between the base station device and terminal devices when sidelink channels are set has been described above. In the above-described embodiment, processes executed by the base station device 1 may be executed by, for example, the control unit 103 illustrated in FIG. 11, and processes executed by the terminal device 2 may be executed by, for example, the control unit 203 illustrated in FIG. 12. Of course, the base station device 1 or the terminal device 2 may be configured such that constituent elements other than the base station device 1 or the terminal device 2 execute any of the processes described in the above embodiment.

<Setting of Gap Carrier in Case in which Uplink Channel and Downlink Channel are Multiplexed within Same Frequency Channel in Frequency Direction>

Next, a case in which an uplink channel and a downlink channel are multiplexed within the same frequency channel in the frequency direction will be described.

Figure 44:
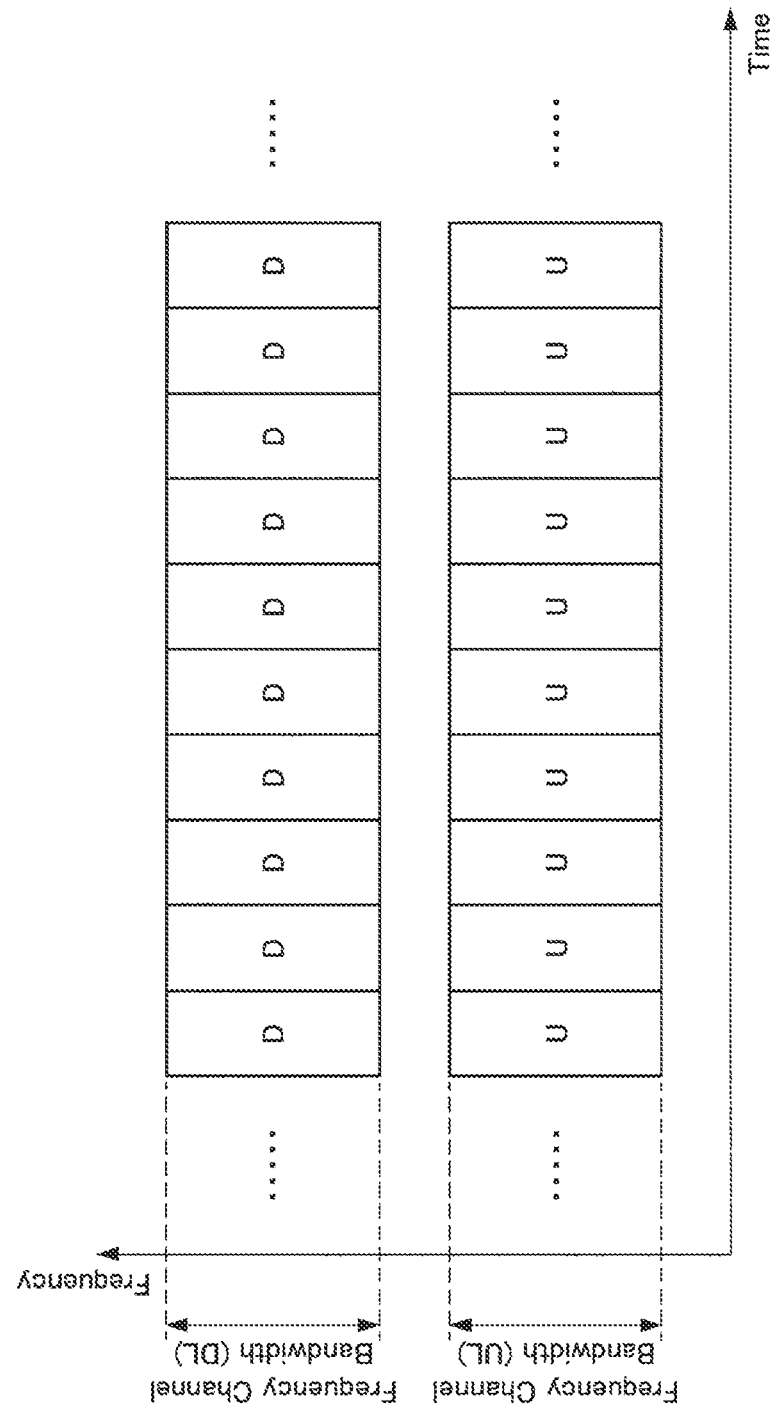
FIG. 44 is an explanatory diagram illustrating a state in which uplink and downlink radio resources are secured using FDD.
Figure 45:
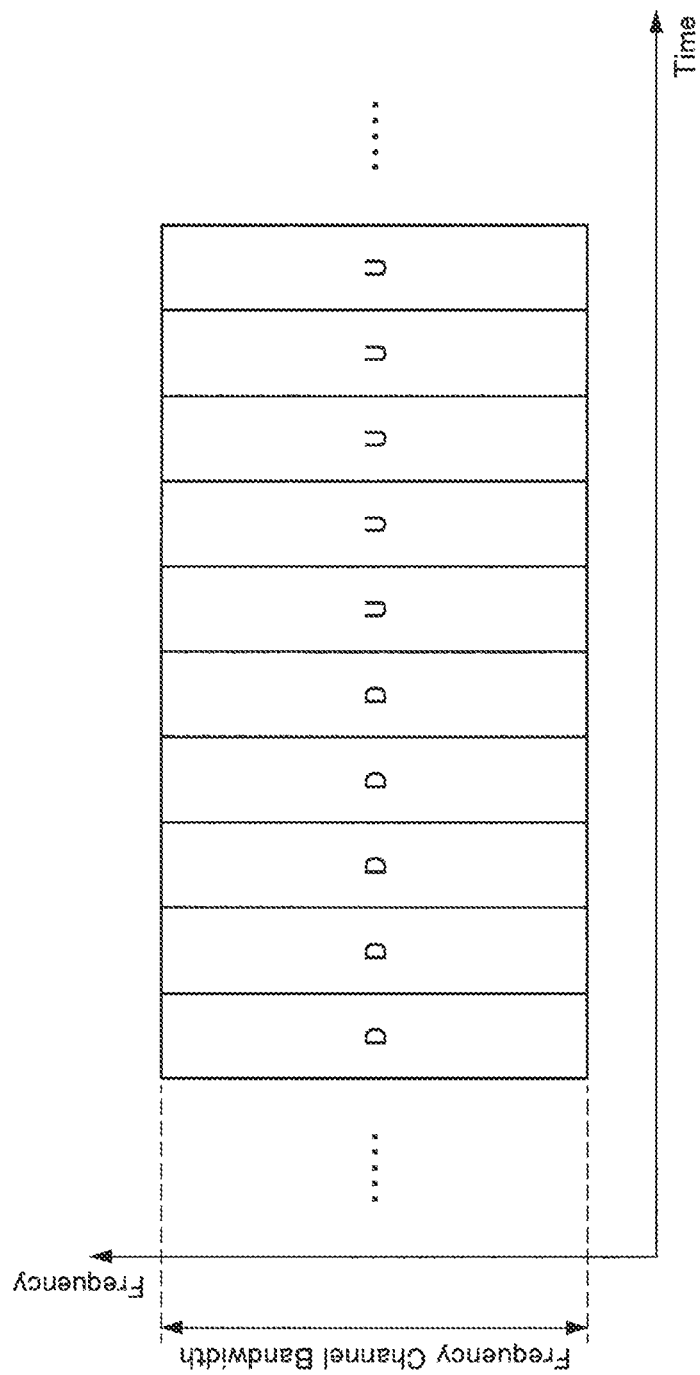
FIG. 45 is an explanatory diagram illustrating a state in which uplink and downlink radio resources are secured using TDD.

As a past method of securing and multiplexing uplink and downlink radio resources, Frequency Division Duplex (FDD) and Time Division Duplex (TDD) are known. FIG. 44 is an explanatory diagram illustrating a state in which uplink and downlink radio resources are secured using FDD. FDD includes preparing a plurality of frequency channels (or a paired spectrum band) having different frequencies and using one of the frequency channels for an uplink ("U" in the drawing) and the other one for a downlink ("D" in the drawing) as illustrated in FIG. 44. FIG. 45 is an explanatory diagram illustrating a state in which uplink and downlink radio resources are secured using TDD. TDD includes preparing a certain frequency channel (or an unpaired spectrum band) and an uplink and a downlink are set in the frequency channel in the time direction as illustrated in FIG. 45.

In FDD, while uplink and downlink radio resources can be prepared at all times, to put it the other way, a plurality of (two or more) frequency channels is necessary to prepare the uplink and the downlink. In addition, in FDD, a ratio of uplink and downlink radio resources is fixed. Thus, it is hard to say that frequencies can be effectively used therein.

In TDD, it is possible to set an uplink and a downlink only in a single frequency channel, and a radio of uplink and downlink radio resources can be dynamically set. On the other hand, since TDD includes multiplexing in the time direction, a delay to wait for a transmission opportunity occurs between transmission and reception devices.

Figure 46:
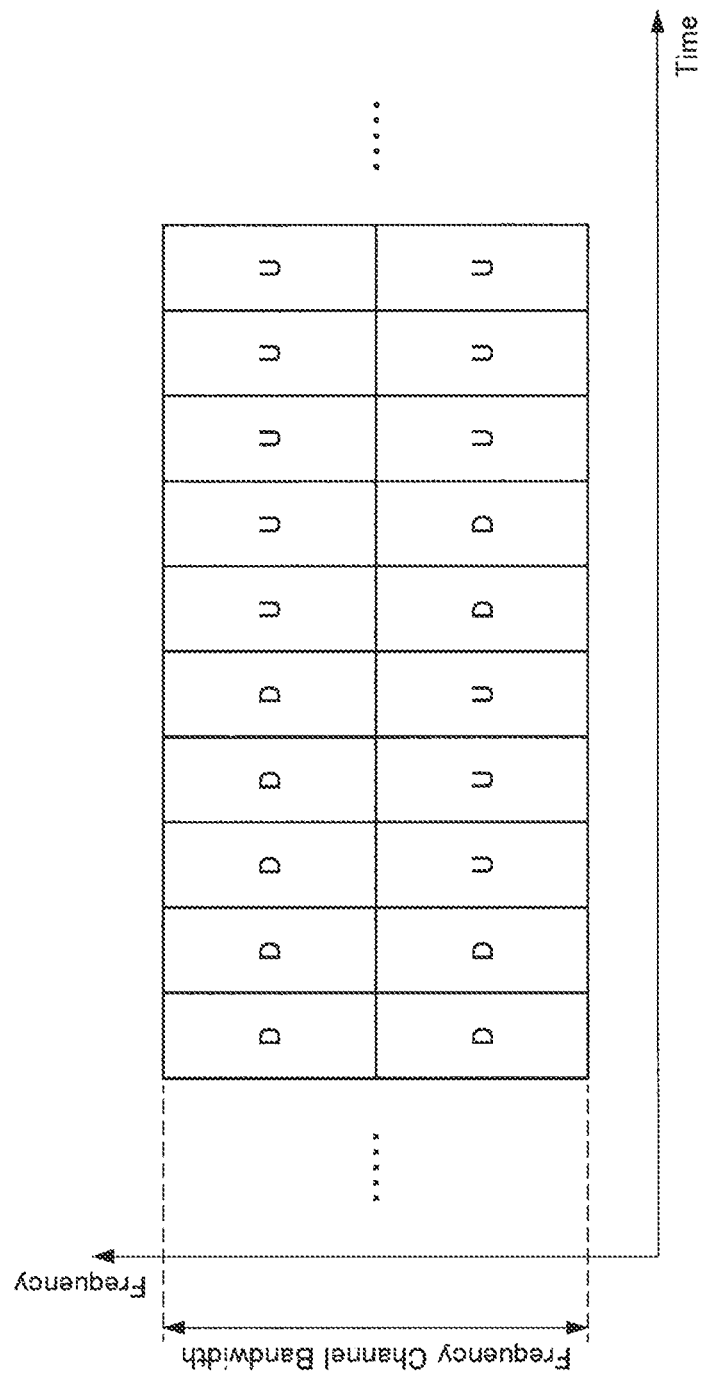
FIG. 46 is an explanatory diagram illustrating an example of multiplexing of uplink channels and downlink channels.

Therefore, in the present embodiment, uplink and downlink radio resources are each set in the time direction and frequency direction in a certain frequency channel, unlike in conventional FDD and TDD. FIG. 46 is an explanatory diagram illustrating an example of multiplexing of an uplink channel and a downlink channel in the present embodiment. In the present embodiment, a frequency channel is divided into two in the frequency direction and each of the divided channels is further set for the uplink and the downlink in the time direction as illustrated in FIG. 46. A case in which the uplink and the downlink are differently set in the frequency direction when a subframe of a certain time is focused on is also included.

Figure 47:
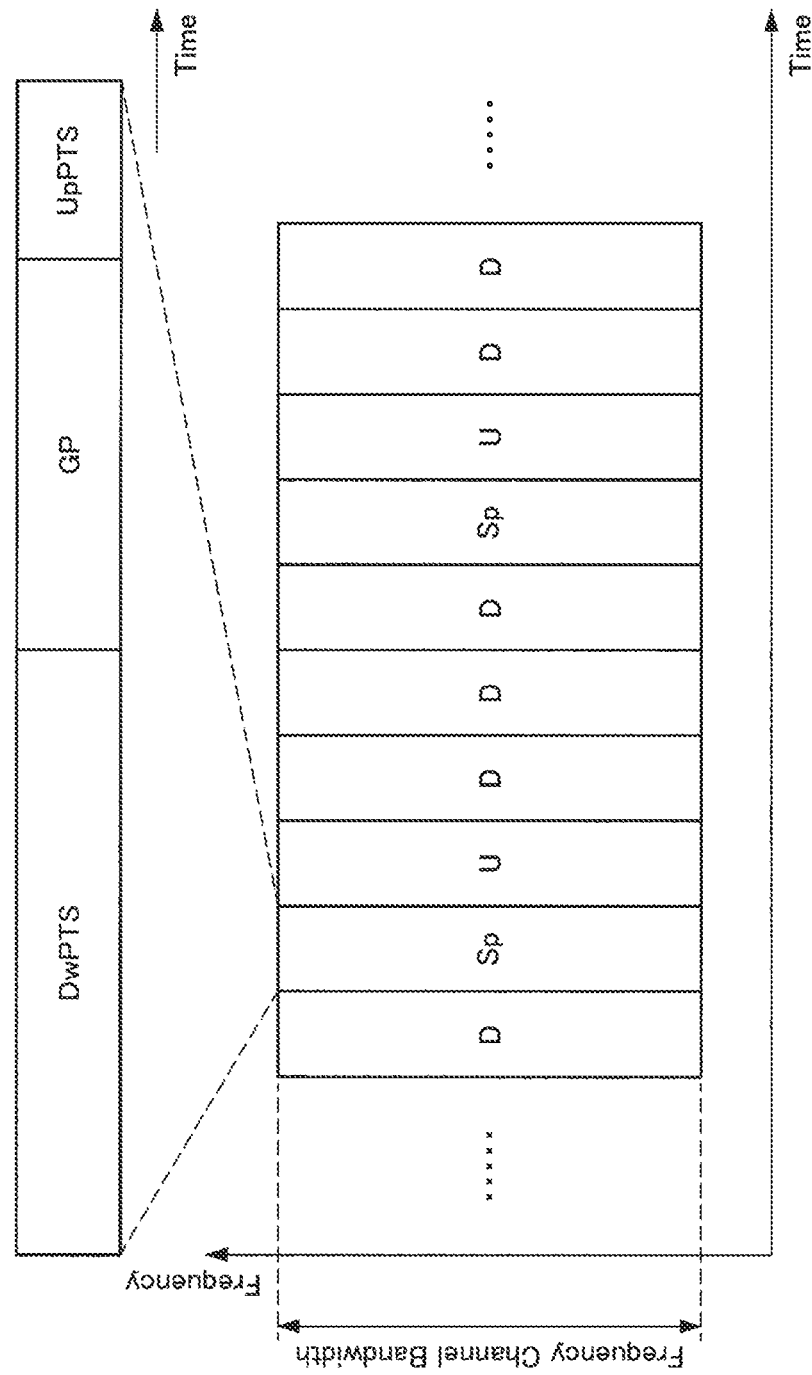
FIG. 47 is an explanatory diagram illustrating an example of multiplexing including special subframes in conventional TDD.
Figure 48A:
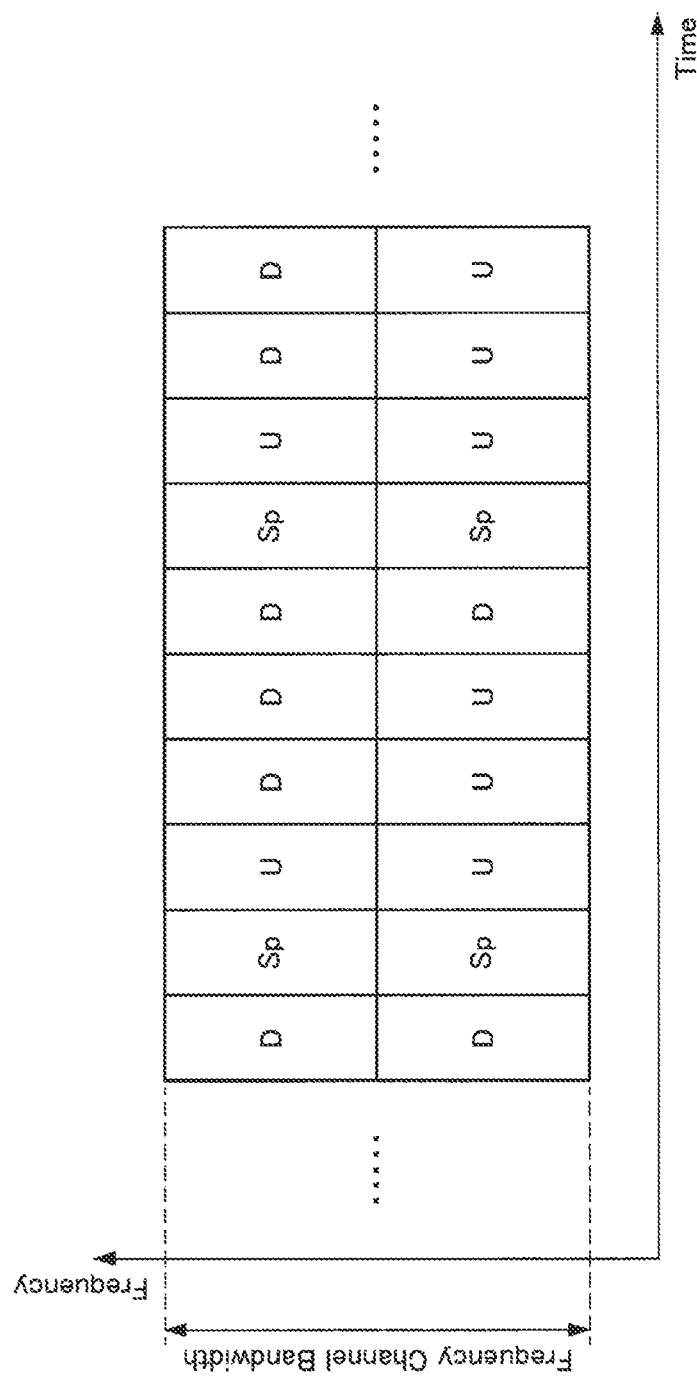
FIG. 48A is an explanatory diagram illustrating an example of multiplexing including special subframes according to the embodiment.

In addition, another subframe may be added, in addition to the uplink and downlink. For example, a subframe including a downlink pilot time slot (DwPTS), a guard period (GP), and an uplink pilot time slot (UpPTS) (special subframe) may be added. FIG. 47 is an explanatory diagram illustrating an example of multiplexing including special subframes in conventional TDD, and FIG. 48A is explanatory diagram illustrating an example of multiplexing including special subframes according to the embodiment. "Sp" in FIGS. 47 and 48A is a subframe corresponding to a special subframe.

In the present embodiment, in addition to the downlink, the uplink and the special subframe, a sidelink can further be multiplexed in the frequency and time directions. FIG. 48B is an explanatory diagram illustrating an example of multiplexing a sidelink in the frequency and time directions, in addition to a downlink, an uplink and a special subframe. In the example illustrated in FIG. 48B, the sidelink enables multiplexing of sidelink resources by setting at least some of resources (subframes and resource blocks) set as the downlink, uplink, and special subframe for the sidelink (e.g., a resource pool for the sidelink). In addition, although the sidelink is set on the special subframe in the example illustrated in FIG. 48B, the special subframe is further divided into a DwPTS, a GP, and an UpPTS therein, and thus it is also effective to limit the setting of the sidelink only to the uplink or downlink resources in order to avoid complexity.

A subframe of the uplink and the downlink may be set for each subframe or a mass of a plurality of subframes (e.g., radio frames). In addition, in the case in which a subframe is set for each radio frame, a combination of a plurality of UL-DL frame configurations can be set as shown in the following table and one can be selected from the combination.

TABLE 1

(An example of a combination of UL-DL frame configurations of TDD)

| UL-DL Con-figuration | DL-to-UL Switch Point periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 msec | D | S | U | U | U | D | S | U | U | U |
| 1 | 5 msec | D | S | U | U | D | D | S | U | U | D |
| 2 | 5 msec | D | S | U | D | D | D | S | U | D | D |
| 3 | 10 msec | D | S | U | U | U | D | D | D | D | D |
| 4 | 10 msec | D | S | U | U | D | D | D | D | D | D |
| 5 | 10 msec | D | S | U | D | D | D | D | D | D | D |
| 6 | 5 msec | D | S | U | U | U | D | S | U | U | D |
| 7 | 10 msec | D | S | U | U | U | U | U | U | U | U |
| 8 | — | D | D | D | D | D | D | D | D | D | D |

(D: downlink subframe, U: uplink subframe, S: special subframe)

By setting the uplink and downlink radio resources in a certain one frequency channel each in the time direction and frequency direction as described above, the uplink and the downlink can be set in only a single frequency channel. In addition, a ratio of the uplink and downlink radio resources can be dynamically set. In addition, the uplink and downlink radio resources can be prepared at all times (or substantially at all times). Therefore, this method can be said to be a multiplexing method with a combination of the advantages of FDD and TDD.

Figure 49:
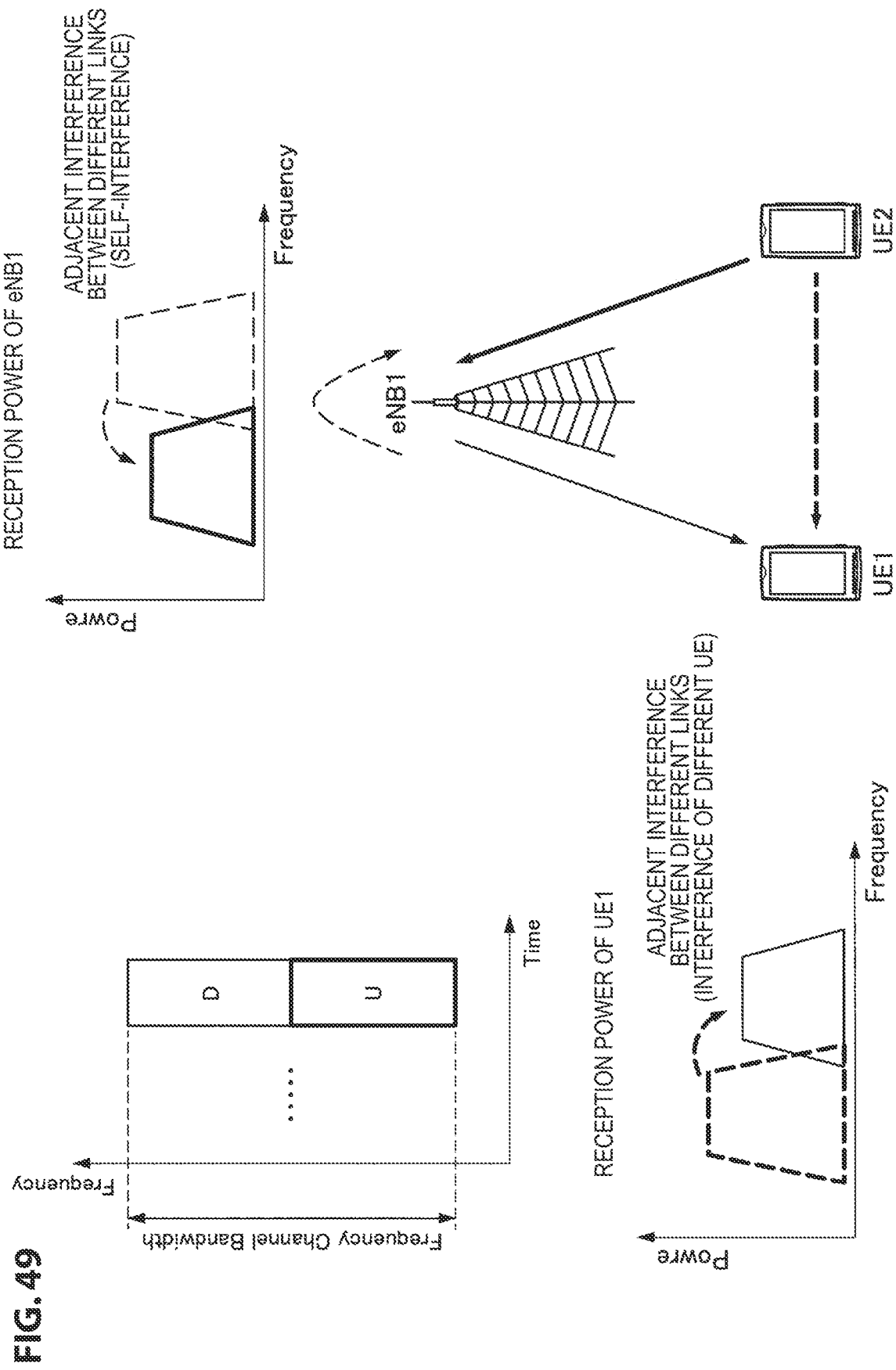
FIG. 49 is an explanatory diagram illustrating an example of interference that is likely to occur due to multiplexing of different links.

However, interference is likely to occur between different links even within the same cell by setting uplink and downlink radio resources in a certain frequency channel in the frequency direction. FIG. 49 is an explanatory diagram illustrating an example of interference that is likely to occur due to multiplexing of different links. In FIG. 49, an example of a case in which an uplink and a downlink are present in different frequencies (resource blocks) at the same time (subframe) in a certain frequency channel within a cell is illustrated. In this example, the downlink is set for (allocated to) the UE1, and the uplink is allocated to the UE2 (in the lower right side of FIG. 49). In FIG. 49, in-band emission may turn into interference since the uplink and the downlink are adjacent to each other in the frequency direction. For example, in-band emission of uplink signals of the UE2 may cause inter-link interference of the UE1 (on the lower left side of FIG. 49). In addition, the eNB1 is likely to cause self-interference due to downlink signals transmitted by the eNB1 itself (on the upper right side of FIG. 49). Since interference of the UE2 with the UE1 is related to a positional relation between the UE1 and the UE2, and the like, the amount of interference can be a problem in a case in which both of them are positioned in proximity. The amount of self-interference of the eNB1 can be a problem likewise since a signal with very large power goes around the eNB1 itself.

Therefore, in the case in which different links are multiplexed in a certain frequency channel in the frequency direction in the present embodiment, a gap resource (specifically, a gap band, a gap subcarrier, a blank subcarrier, etc. is inserted between radio resources to be used by each link in order to reduce or avoid the above-described interference. Since interference that is likely to be caused by multiplexing of different links is interference caused by in-band emission, the amount of interference can be reduced or the interference can be avoided by providing a gap between radio resources to be used by each link as will be described below.

Figure 50:
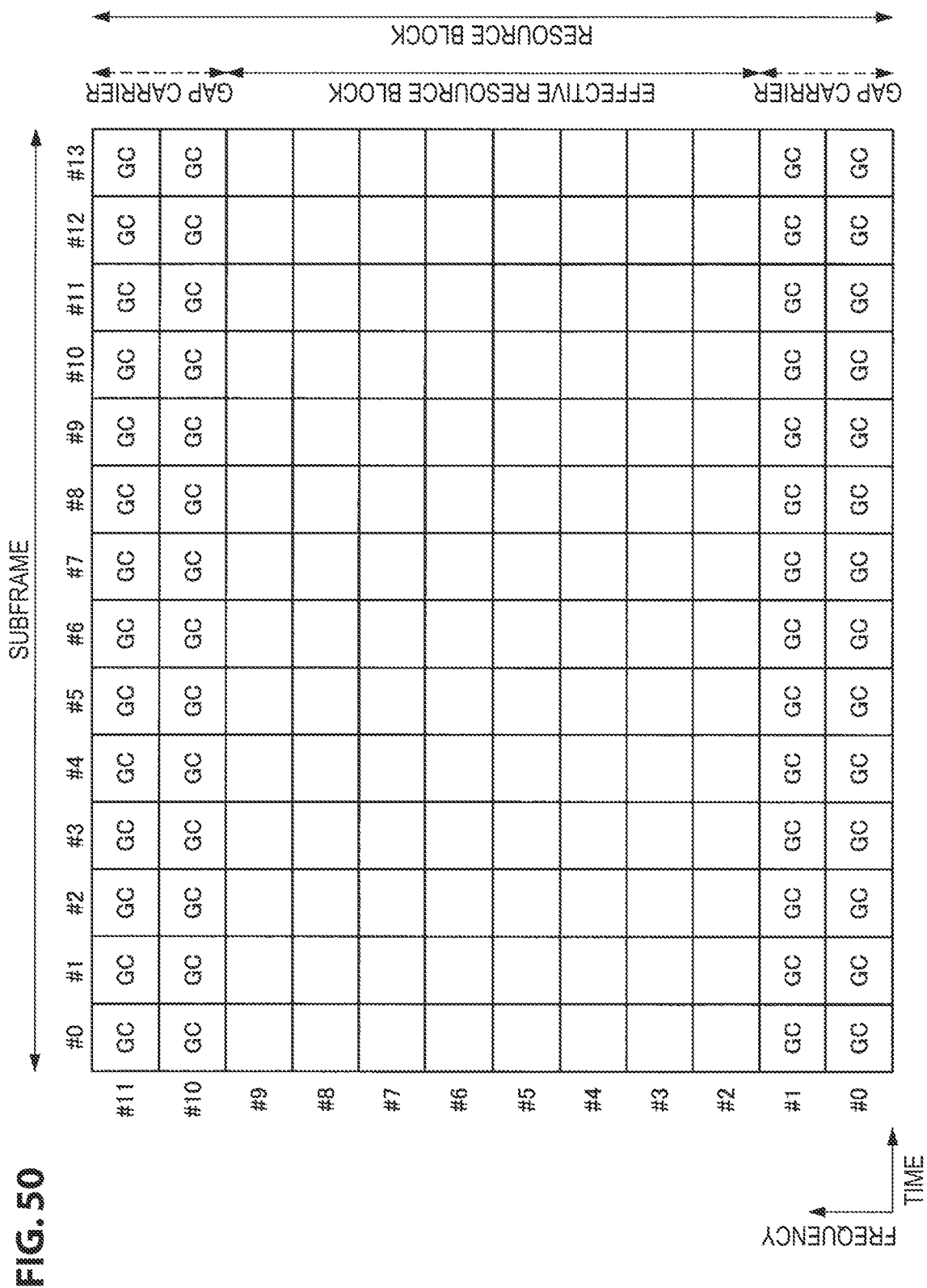
FIG. 50 illustrates an example in which gap carriers are set in the frequency direction of a predetermined radio resource unit.

An uplink and a downlink are assumed to be performed in minimum units of radio resources including subframe defined with a predetermined number of symbols or a predetermined time length in the time direction and resource blocks defined with a predetermined number of subcarriers or a predetermined frequency bandwidth in the frequency direction. The basic idea is to place gap subcarriers (null subcarriers, blank subcarriers, subcarriers without data symbols, etc.) in the radio resources. FIG. 50 illustrates an example in which gap carriers are set in the frequency direction of a predetermined radio resource unit. It is desirable for gap carriers to be set at both ends or one end of a target radio resource. The reason for this is that setting gap carriers on the boundaries of the links (uplink, downlink, sidelink, etc.) is effective for reducing or avoiding interference since the type of link is likely to change in units of predetermined radio resources.

Figure 51:
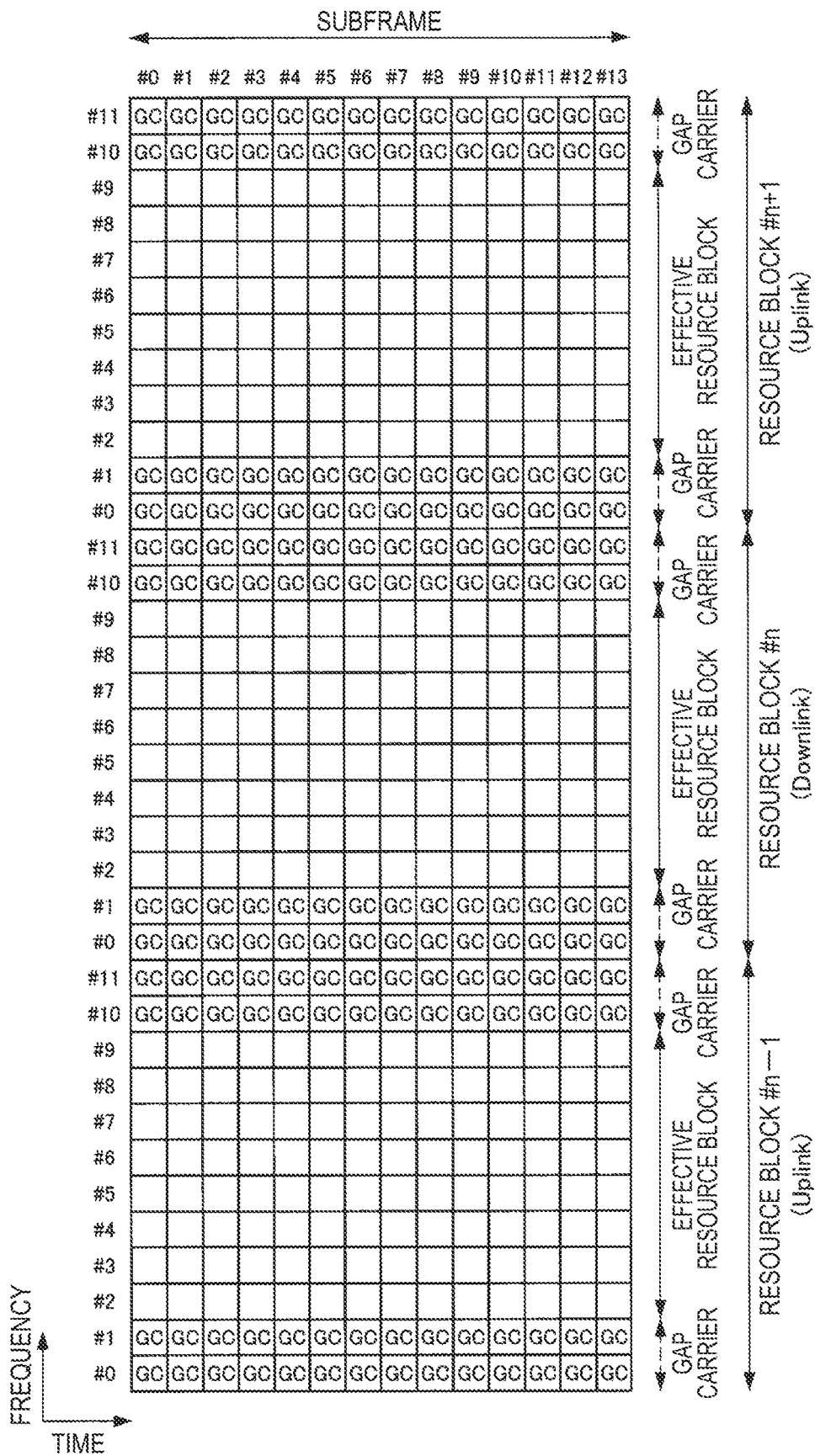
FIG. 51 is an explanatory diagram illustrating an example of a setting of gap carriers in a case in which an uplink and a downlink are multiplexed in the frequency direction at the same time.

FIG. 51 is an explanatory diagram illustrating an example of a setting of gap carriers in a case in which an uplink and a downlink are multiplexed in the frequency direction at the same time. In the example illustrated in FIG. 51, gap carriers are set on the boundaries of the uplink and downlink radio resources. By setting gap carriers on the boundaries of the uplink and downlink radio resources, interference between the uplink and downlink can be reduced or avoided.

Figure 52:
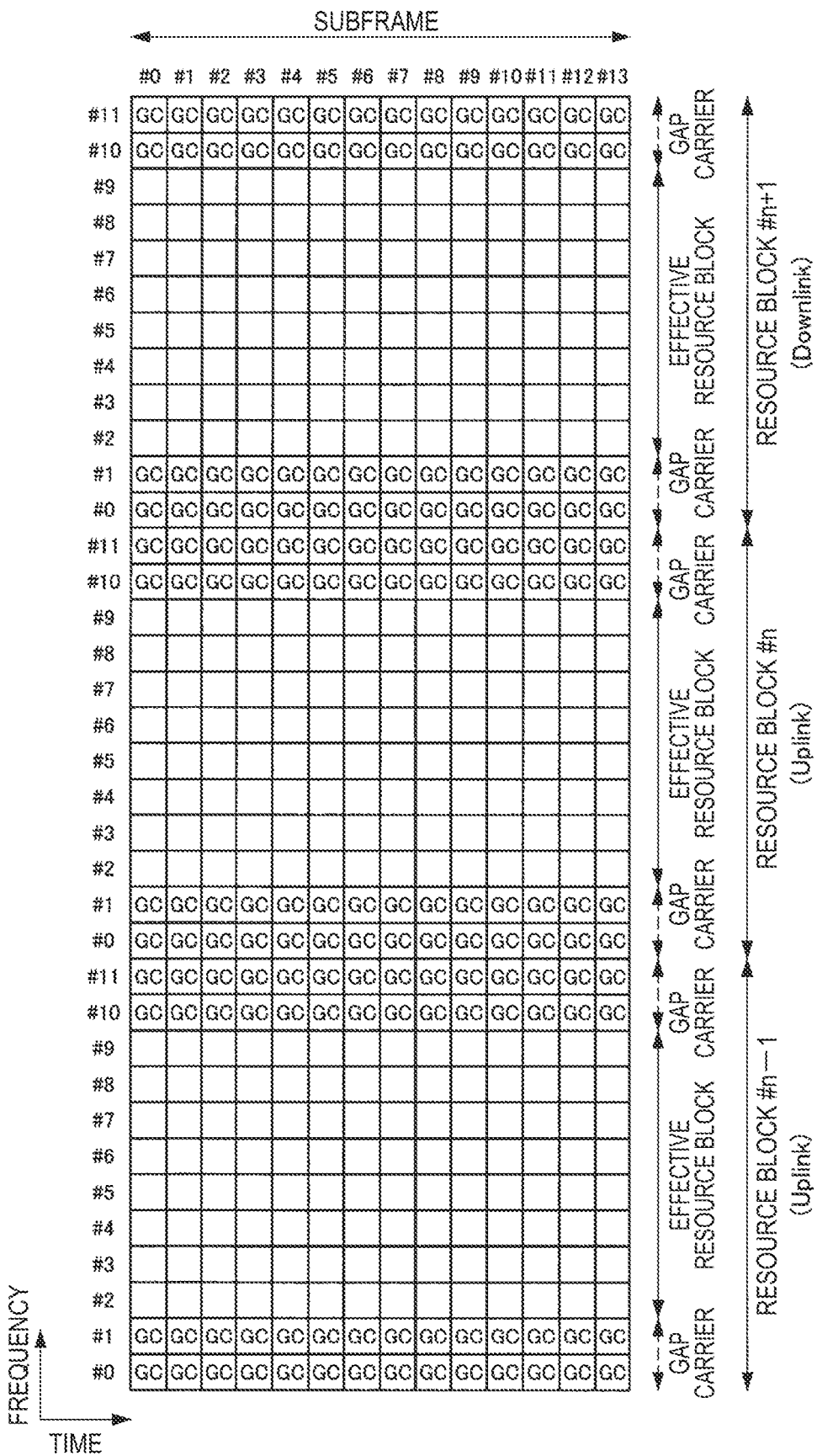
FIG. 52 is an explanatory diagram illustrating an example of a setting of gap carriers in a case in which an uplink and a downlink are multiplexed in the frequency direction at the same time.

FIG. 52 is an explanatory diagram illustrating an example of a setting of gap carriers in a case in which an uplink and a downlink are multiplexed in the frequency direction at the same time. In FIG. 52, another example in which gap carriers are set between the uplink and downlink radio resources multiplexed in the frequency direction is illustrated, and an example of a case in which gap carriers are set in all links in a case in which links of the same type are continuous in the frequency direction is illustrated.

However, in the case in which gap carriers are set, it is not necessary to set gap carriers in units of all minimum radio resources. For example, in a case in which links of the same type are set to be continuous in the frequency direction as illustrated in FIG. 52 (the uplink continues in a plurality of resource blocks in FIG. 52), there is little influence of interference between the links of the same type. Thus, gap carriers may be removed or reduced on the boundaries of the links of the same type. By removing or reducing gap carriers as described above, use efficiency of radio resources can be improved.

Figure 53:
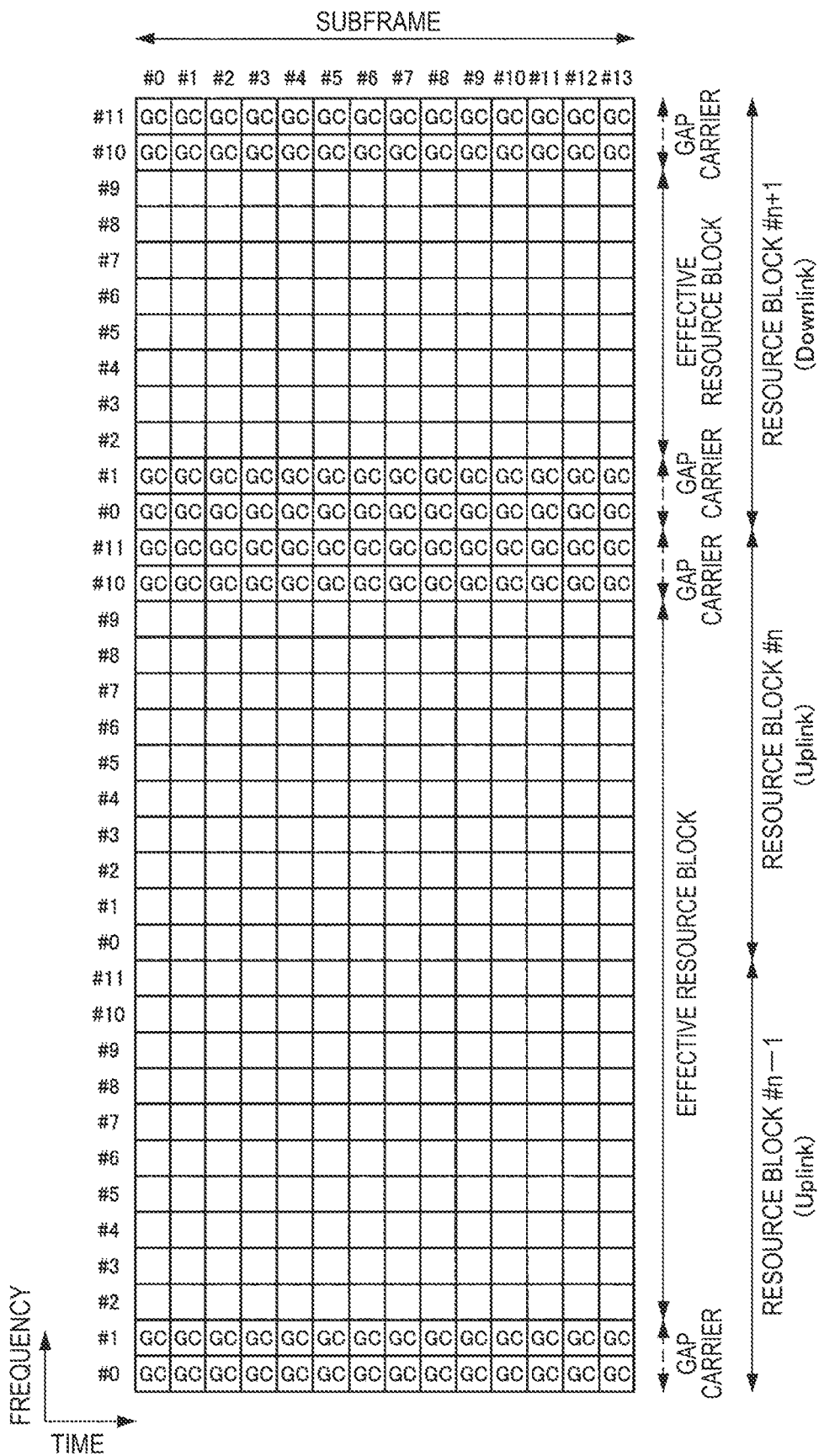
FIG. 53 is an explanatory diagram illustrating an example of a setting of gap carriers in a case in which an uplink and a downlink are multiplexed in the frequency direction at the same time.

FIG. 53 is an explanatory diagram illustrating an example of a setting of gap carriers in a case in which an uplink and a downlink are multiplexed in the frequency direction at the same time. In FIG. 53, a state in which gap carriers are set between the uplink and downlink radio resources multiplexed in the frequency direction and no gap carriers are set in the case in which links of the same type (uplinks in the example of FIG. 53) are continuous is illustrated. Of course, also in a case in which downlinks are continuous, rather than uplinks, no gap carriers can be set or a smaller number of gap carriers can be set on the boundary of the downlinks.

Figure 54A:
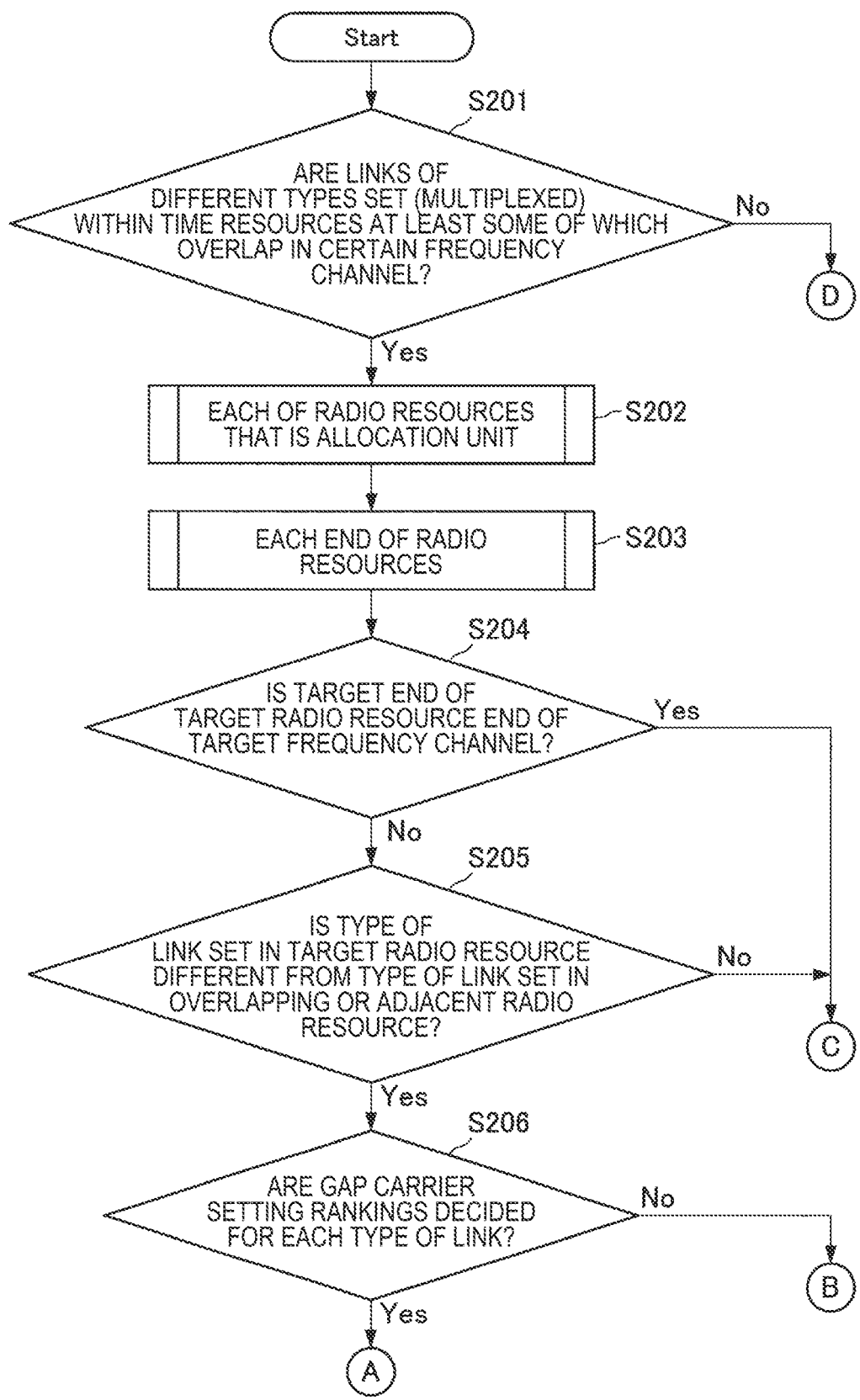
FIG. 54A is a flowchart showing an operation example of the base station device 1 according to the embodiment.

In the case in which gap carriers are set as described above, it is conceivable that the base station device 1 determines a setting of gap carriers. FIGS. 54A and 54B are flowcharts showing an operation example of the base station device 1 according to the present embodiment. The flowcharts shown in FIGS. 54A and 54B are for an operation example of the base station device 1 when determining a setting of gap carriers.

The base station device 1 can determine gap carriers to be set in a certain frequency channel for each of radio resources (e.g., each resource block) that is an allocation unit and each end of the radio resources. The base station device 1 first determines whether links of different types are set (multiplexed) within time resources at least some of which links of different types overlap in a certain frequency channel (Step S201). If links of different types are set (Yes in Step S201), the base station device 1 executes a determination process for each of radio resources that is an allocation unit (Step S202) and for each end of the radio resources (Step S203).

The base station device 1 next determines whether the target radio resource and the target end is an end of the frequency channel (Step S204). In a case in which the target radio resource and the target end are not an end of the frequency channel (No in Step S204), the base station device 1 then determines whether the type of link set in the target radio resource is different from the type of link set in the overlapping or adjacent radio resource (Step S205). If the type of link is different from the type of link set in the overlapping or adjacent radio resources (Yes in Step S205), the base station device 1 then determines whether gap carrier setting rankings are decided for the types of link (Step S206). Table 2 shows an example of the gap carrier setting rankings,

TABLE 2

Example of Gap carrier setting rankings

| Gap carrier setting rankings | Types of link |
|---|---|
| 1 | Sidelink |
| 2 | Uplink |
| 3 | Downlink |

Here, the reason for the lowered ranking of the downlink is that communication efficiency increases when no gap carriers are set due to a large amount of data on the downlink.

If the gap carrier setting rankings are decided for the types of link (Yes in Step S206), the base station device 1 then determines whether the gap carrier setting ranking of the type of link set in the target radio resource is higher than the gap carrier setting ranking of the type of link set in the overlapping or adjacent radio resources (Step S207). In a case in which the gap carrier setting ranking of the type of link set in the target radio resource is higher (Yes in Step S207), the base station device 1 sets a predetermined number of gap carriers or gap carriers having a predetermined width at an end of the target radio resource (Step S208). On the other hand, in a case in which the target radio resource and the target end are an end of the frequency channel (Yes in Step S204), a case in which the type of link is not different from the type of link set in the overlapping or adjacent radio resources (No in Step S205), or a case in which the gap carrier setting ranking of the type of link set in the target radio resource is lower than or the same as the gap carrier setting ranking of the type of link set in the overlapping or adjacent radio resources (No in Step S207), the base station device 1 does not set a predetermined number of gap carriers or gap carriers having a predetermined width at an end of the target radio resource (Step S209).

In addition, in a case in which links of different types are not set within time resources at least some of which links of different types overlap in the certain frequency channel (No in Step S201), the base station device 1 may not set gap carriers (Step S210) or may set gap carriers under another rule. For example, in a case in which subcarrier spacing to be used varies between overlapping or adjacent radio resources, the base station device 1 may set gap carriers at the overlapping or adjacent ends.

The base station device 1 can complete the setting of gap carriers in certain time resources by executing the series of processes for each of radio resources and each end of the radio resources.

Figure 55:
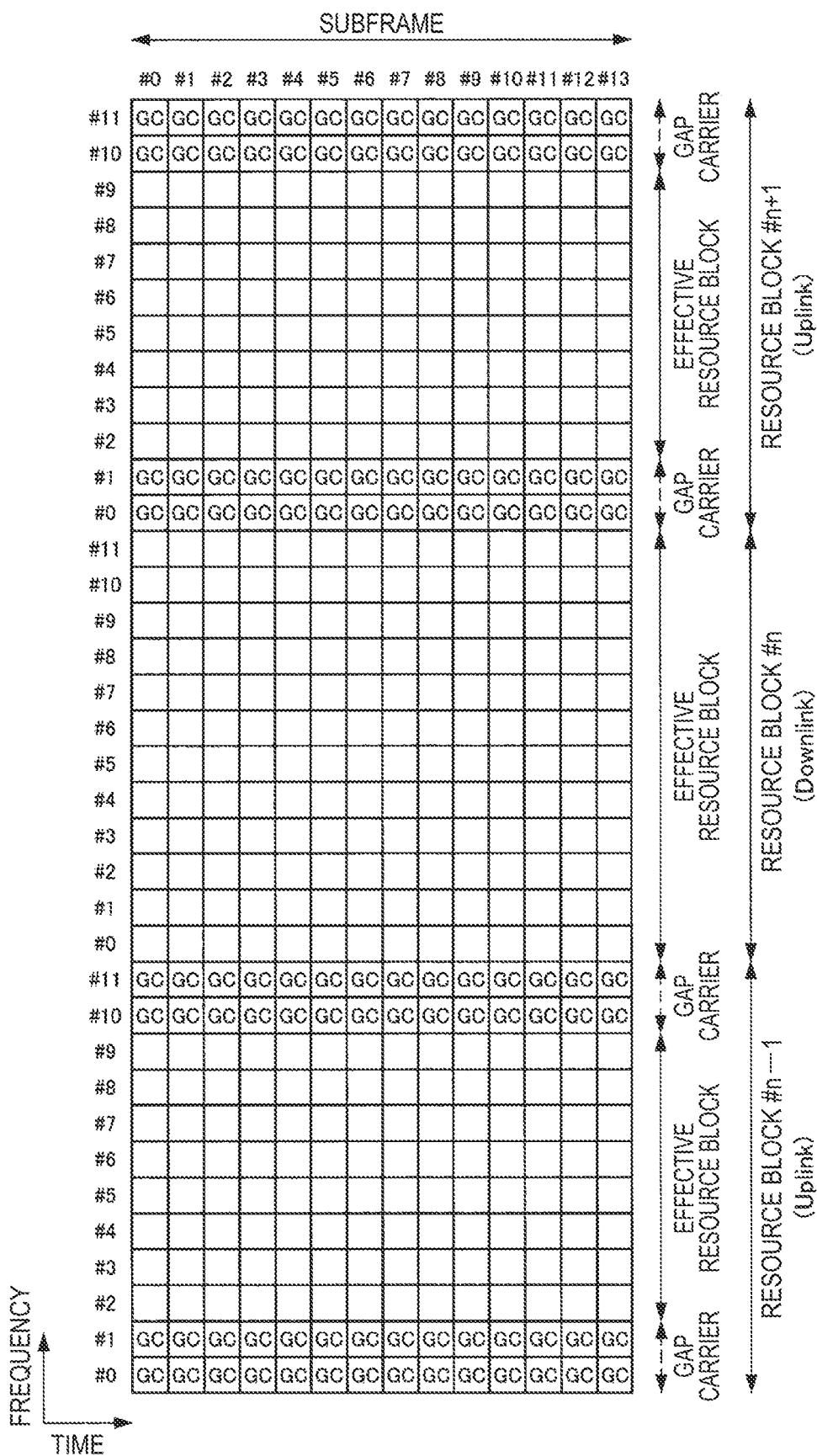
FIG. 55 is an explanatory diagram illustrating a state in which gap carriers are set in certain time resources on the basis of the operation examples illustrated in FIGS. 54A and 54B.

FIG. 55 is an explanatory diagram illustrating a state in which gap carriers are set in certain time resources on the basis of the operation examples illustrated in FIGS. 54A and 54B. In the example illustrated in FIG. 55, a state in which gap carriers are set considering setting rankings is illustrated. In FIG. 55, a state in which no gap carriers are set at the ends of the resource block in which downlink data is transmitted is illustrated. By setting gap carriers in consideration of setting rankings as described above, the base station device 1 can effectively utilize resources.

When the base station device 1 notifies the terminal device 2 of information of the UL-DL frame configurations shown in Table 1, the base station device can cause the terminal device 2 to ascertain which resource block is which type of link.

Figure 56:
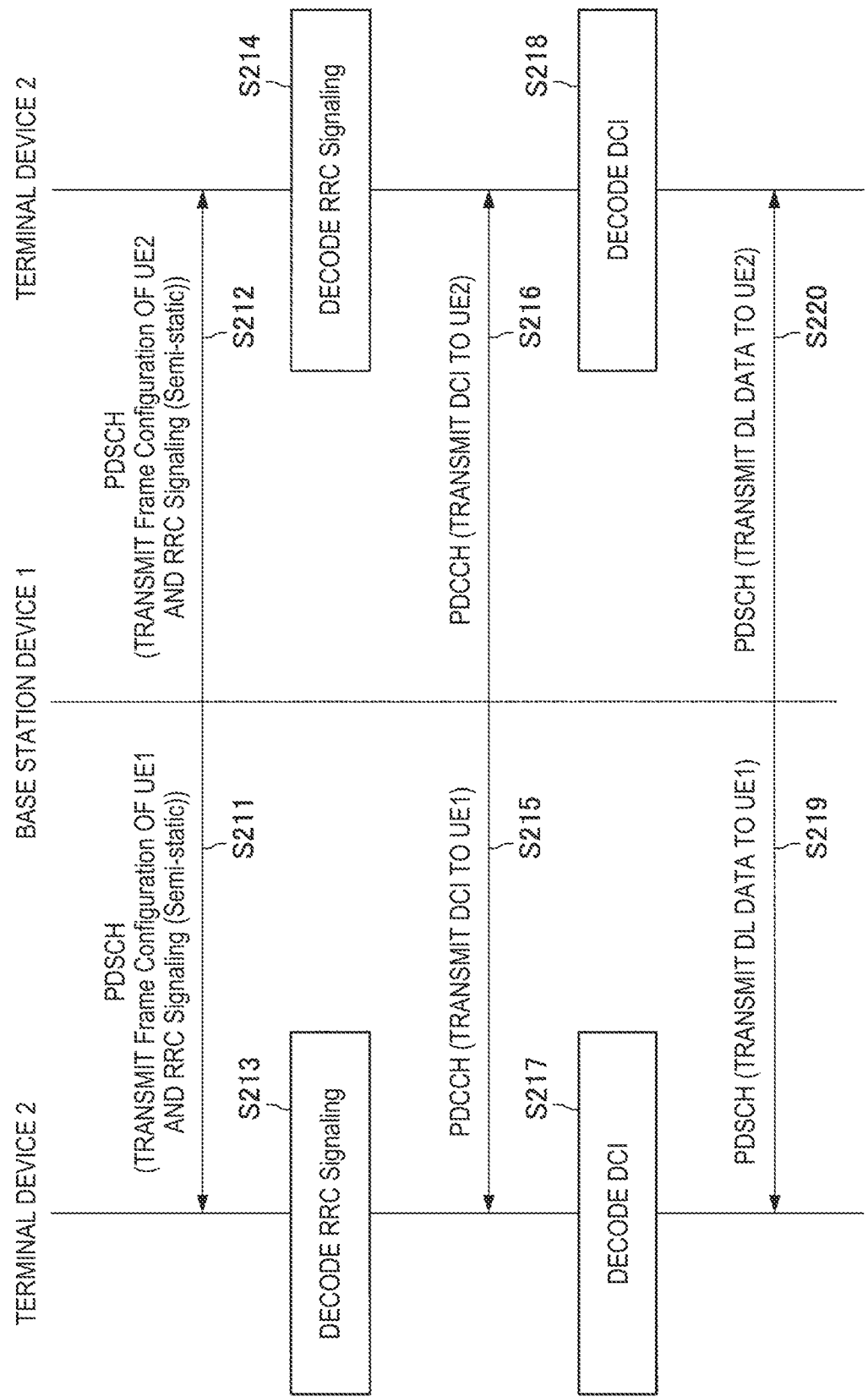
FIG. 56 is a flowchart showing an operation example of the base station device 1 and a terminal device 2 according to the embodiment.

FIG. 56 is a flowchart showing an operation example of the base station device 1 and the terminal devices 2 according to the embodiment of the present disclosure. In FIG. 56, an example of notification of information of UL-D1, frame configurations from the base station device 1 to two terminal devices 2 (UE1 and UE2) is illustrated. In the example of FIG. 56, the base station device 1 sets each of a downlink for the UE1 and an uplink for the UE2.

The base station device 1 notifies the terminal devices 2 of the information of frame configurations indicating a setting of links using PDSCHs (Steps S211 and S212). It is desirable for the frame configurations to indicate a setting of links of subframes equivalent to a predetermined number or a predetermined time length. It is desirable for the predetermined number to be information of, for example, every 10 subframes (or a set of a predetermined number of subframes such as one radio frame). It is desirable for the predetermined time length to be an integer multiple of a reference time unit (e.g., subframe). In addition, it is desirable for the information of the frame configurations to be set for each of the terminal devices 2, rather than being common information for each base station device 1 (or a cell set by the base station device 1). In other words, the frame configurations are allowed to have different contents for the respective terminal devices 2. In addition, it is necessary to be careful that the terminal devices 2 each need not be simultaneously notified of RRC signaling for notifying the information of the frame configurations at all times as illustrated in FIG. 56. The terminal devices 2 decode the RRC signaling notified by the base station device 1 (Steps S213 and 214) and ascertain frame configurations set for the terminal devices 2.

Then, the base station device 1 sets a communication opportunity (Grant, Allocation, etc.) for each radio resource unit (e.g., subframe) or each terminal device 2 for a predetermined time (Steps S215 and S216). This setting is realized by transmitting downlink control information (DCI) using physical downlink control channels (PDCCHs). The DCI includes information for setting which frequency resource e.g., resource block) is to be used in the target time resource, which modulation and coding scheme (MCS) is to be used, which precoding matrix indicator (PMI) is to be used, which redundancy version (RV) is to be used, how transmission power will be set, and the like. The terminal devices 2 decode the DCI (Steps S217 and S218), receive a signal on designated radio resources on the basis of conditions notified and set in the DCI (Step S219) or transmit a signal on the designated radio resources (Step S220).

In the present embodiment, the following patterns are conceivable as method of setting types of links (a downlink, an uplink, a sidelink, a backhaul link, etc.) or frame configurations or the like by the base station device with respect to the terminal devices.
(1) Regarding Setting Ranges
  (i) The setting can be made individually for each terminal device (UE-specific).
  (ii) The setting can be made for each base station device (or for each cell, each transmission and reception point (TRP), etc.) (cell-specific or TRP-specific).
(2) Regarding Setting Timings
  (i) The setting can be made at a timing of each unit time resource (e.g., a subframe, a slot, etc.) (dynamic).
  (ii) The setting can be made at a timing of each of predetermined plurality of unit time resources (several subframes, one radio frame, etc.) (semi-static and periodic).
  (iii) The setting can be made at aperiodic timings (semi-static and aperiodic).

Figure 57:
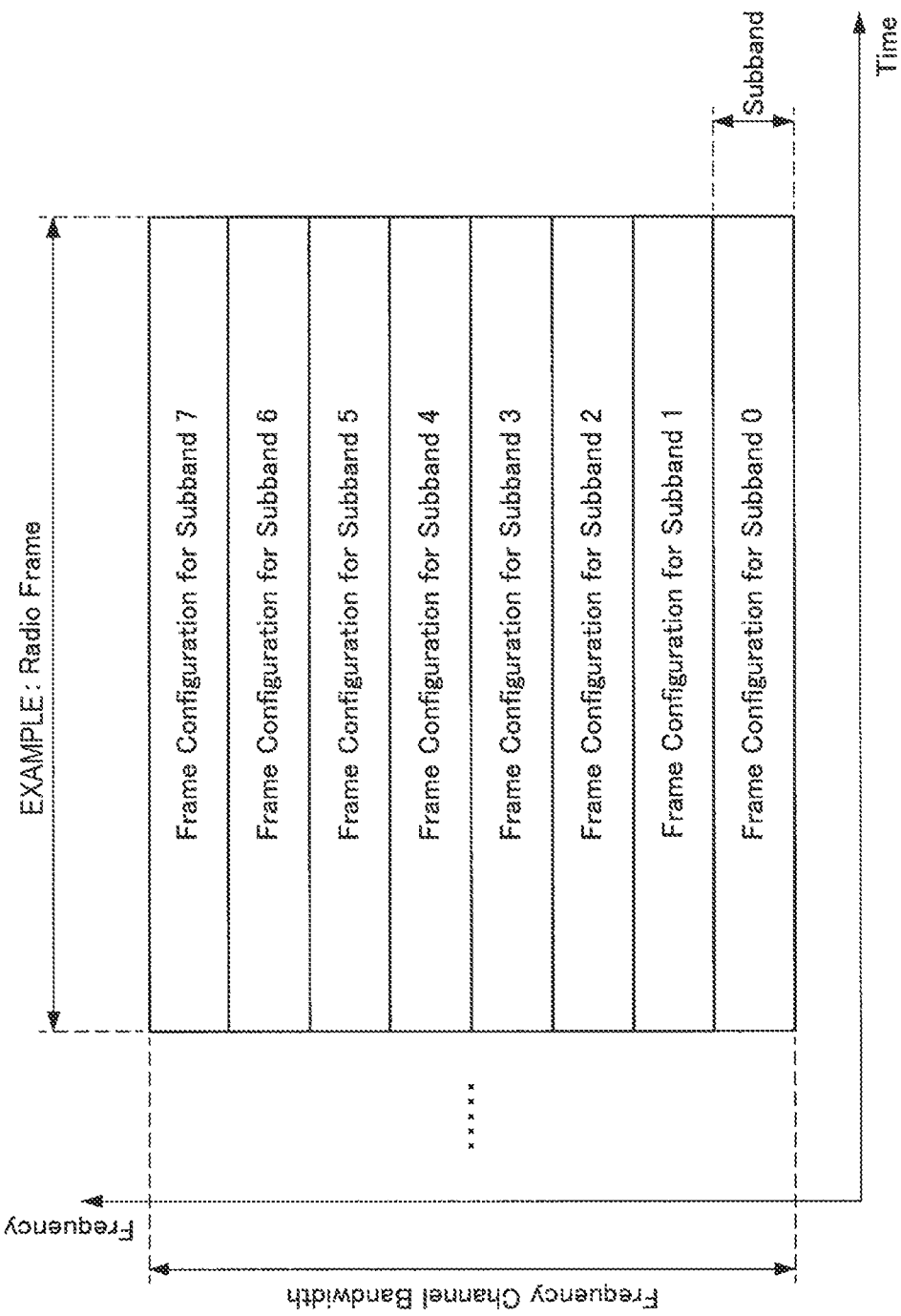
FIG. 57 is an explanatory diagram illustrating an example in which the setting range of the types of link is set for each base station device, each cell, and each TRP.

With respect to the setting range in the above description, it is desirable to make the setting individually for each terminal device as described in (1)-(i) from the viewpoint of flexibility in use of radio resources. In the present embodiment, however, the setting can be made for each base station device, each cell, and each TRP as described in (1)-(ii). FIG. 57 is an explanatory diagram illustrating an example in which the setting range of the types of link is set for each base station device, each cell, and each TRP. In FIG. 57, one frequency channel is divided into a plurality of frequency domains (which is referred to as a subband in the present embodiment), and a frame configuration is set for each subband. Further, a subband may be constituted by a plurality of unit frequency resources (resource blocks, etc.).

In the case in which a frame configuration is set for each subband, the base station device 1 can reduce a load of transmission/reception processes (particularly a reception process) of the terminal device 2 by imposing the following limitations on allocation of radio resources to the terminal device 2.

The base station device 1 allocates a frequency resource to any one of subbands thereto within a certain unit time resource. However, a case in which frequency hopping is performed within the unit time resource is excluded. In addition, the base station device 1 may allocate frequency resources to different subbands thereto between different time resources.

In addition, gap carriers are set on the boundaries of subbands in a case in which the method of setting frequency gaps is used as illustrated in FIG. 53 or FIG. 55. The base station device 1 may not provide gap carriers between unit frequency resources within subbands.

In a case in which a frame configuration is set for each subband, an upgrading timing of the frame configuration can be made at individual timings in frequency channels, however, it is desirable to make simultaneous upgrading in the frequency channels for the sake of simplicity. In the latter case, it is desirable for frame configuration information of each subband to be notified of and set using the same system information and RRC signaling. The case in which the frame configuration information of each subband is notified and set using system information and RRC signaling includes a case in which radio resources on which the system information and RRC signaling are transmitted and received are placed in frequency radio resources of each subband and a case in which the radio resources are placed in some predetermined frequency radio resources. In the former case, it is desirable for the system information and RRC signaling including the frame configuration information of each subband to be transmitted and received on frequency radio resources of a corresponding subband. On the other hand, in the latter case, the system information and RRC signaling including the frame configuration information of each subband are transmitted and received on the predetermined some frequency radio resources. It is desirable for the predetermined some frequency radio resources to be some of the center of target frequency channels in the frequency direction. In the latter case, it is necessary for the terminal device to receive and decode signals on the predetermined some frequency radio resources to ascertain the frame configuration information of each subband.

Figure 58A:
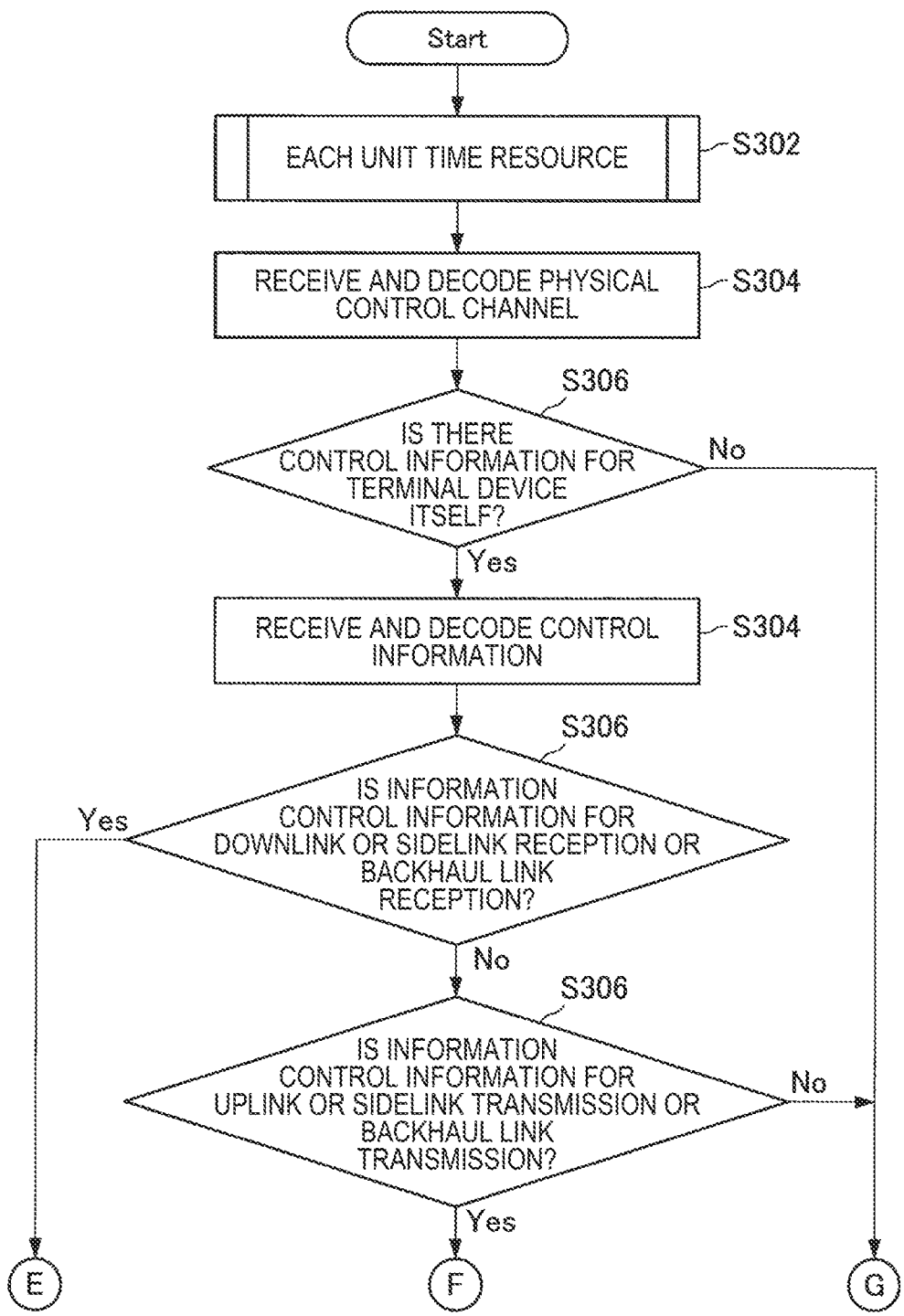
FIG. 58A is a flowchart showing an operation example of the terminal device 2 according to the embodiment.
Figure 58B:
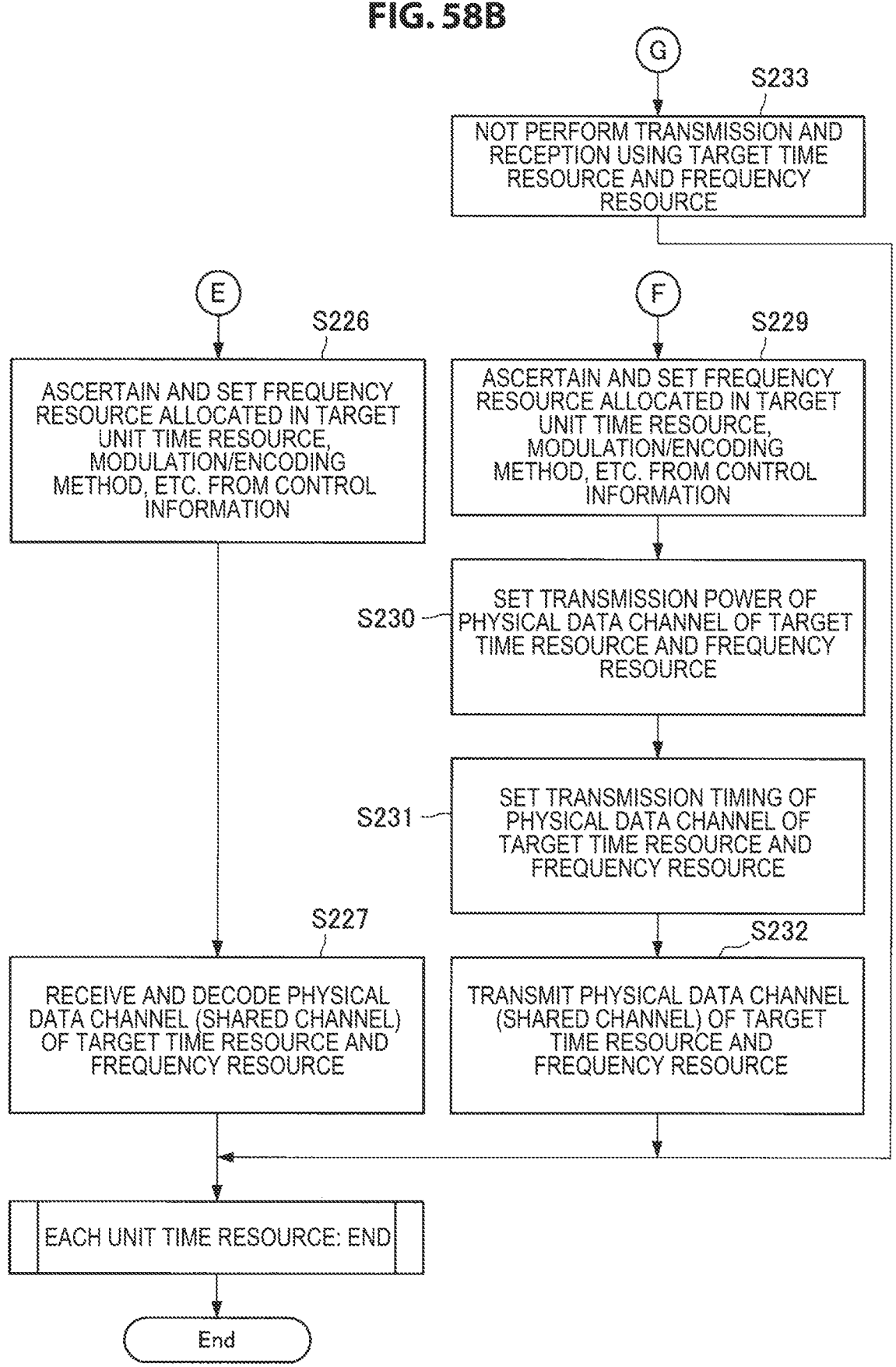
FIG. 58B is a flowchart showing an operation example of the terminal device 2 according to the embodiment.

FIGS. 58A and 58B are flowcharts showing an operation example of the terminal device 2 according to the embodiment of the present disclosure. FIGS. 58A and 58B illustrate an operation example of the terminal device 2 receiving a setting of types of link from the base station device 1.

The terminal device 2 executes a series of processes for each unit time resource (e.g., subframe, slot, etc.) (Step S221). The terminal device 2 receives and decode a physical control channel transmitted from the base station device 1 (Step S222). The terminal device 2 determines whether there is control information for the device itself in control information such as downlink control information (DCI) using the decoding result (Step S223).

If there is control information for the device itself (Yes in Step S223), the terminal device 2 then receives and decodes control information of the device itself (Step S224). Then, the terminal device 2 determines whether the information is control information for downlink or sidelink reception or backhaul reception as a result of the decoding (Step S225).

If the information is control information for downlink or sidelink reception or backhaul reception (Yes in Step S225), the terminal device 2 then ascertains the frequency resource allocated in the target unit time resource, a modulation/encoding method, and the like from the decoded control information and sets them for the device itself (Step S226). Then, the terminal device 2 receives and decodes a physical data channel (shared channel) of the target time resource and frequency resource (Step S227).

On the other hand, if the information is not control information for downlink or sidelink reception or backhaul reception (No in Step S225), the terminal device 2 then determines whether the information is control information for uplink or sidelink transmission or backhaul transmission as a result of the decoding of Step S224 (Step S228).

If the information is control information for uplink or sidelink transmission or backhaul transmission (Yes in Step S228), the terminal device 2 then ascertains the frequency resource allocated in the target unit time resource, a modulation/encoding method, and the like from the decoded control information and sets them for the device itself (Step S229). In addition, the terminal device 2 sets transmission power of a physical data channel of the target time resource and frequency resource (Step S230). In addition, the terminal device 2 sets a transmission timing of the physical data channel of the target time resource and frequency resource (Step S231). Then, the terminal device 2 transmits the physical data channel (shared channel) of the target time resource and frequency resource (Step S232).

Note that, if there is no control information for the device itself in the determination of Step S223 (No in Step S223), or if the information is not control information for uplink or sidelink transmission or backhaul transmission in the determination of Step S228 (No in Step S228), the terminal device 2 does not perform transmission and reception using the target time resource and frequency resource (Step S233).

By executing the series of operations, the terminal device 2 can ascertain the frequency resource allocated in the target unit time resource and the modulation method for the types of link.

Figure 59A:
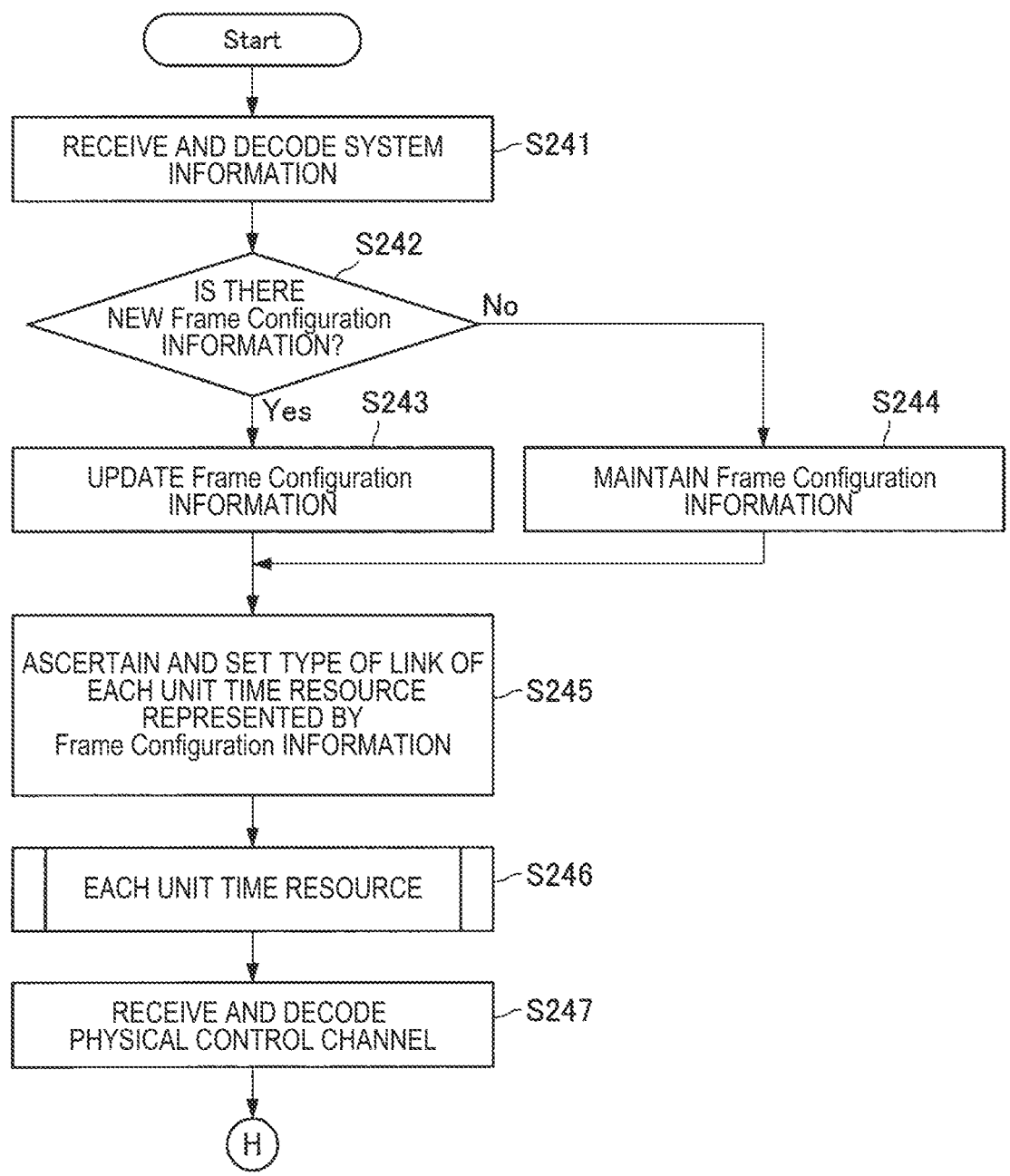
FIG. 59A is a flowchart showing an operation example of the terminal device 2 according to the embodiment.
Figure 59B:
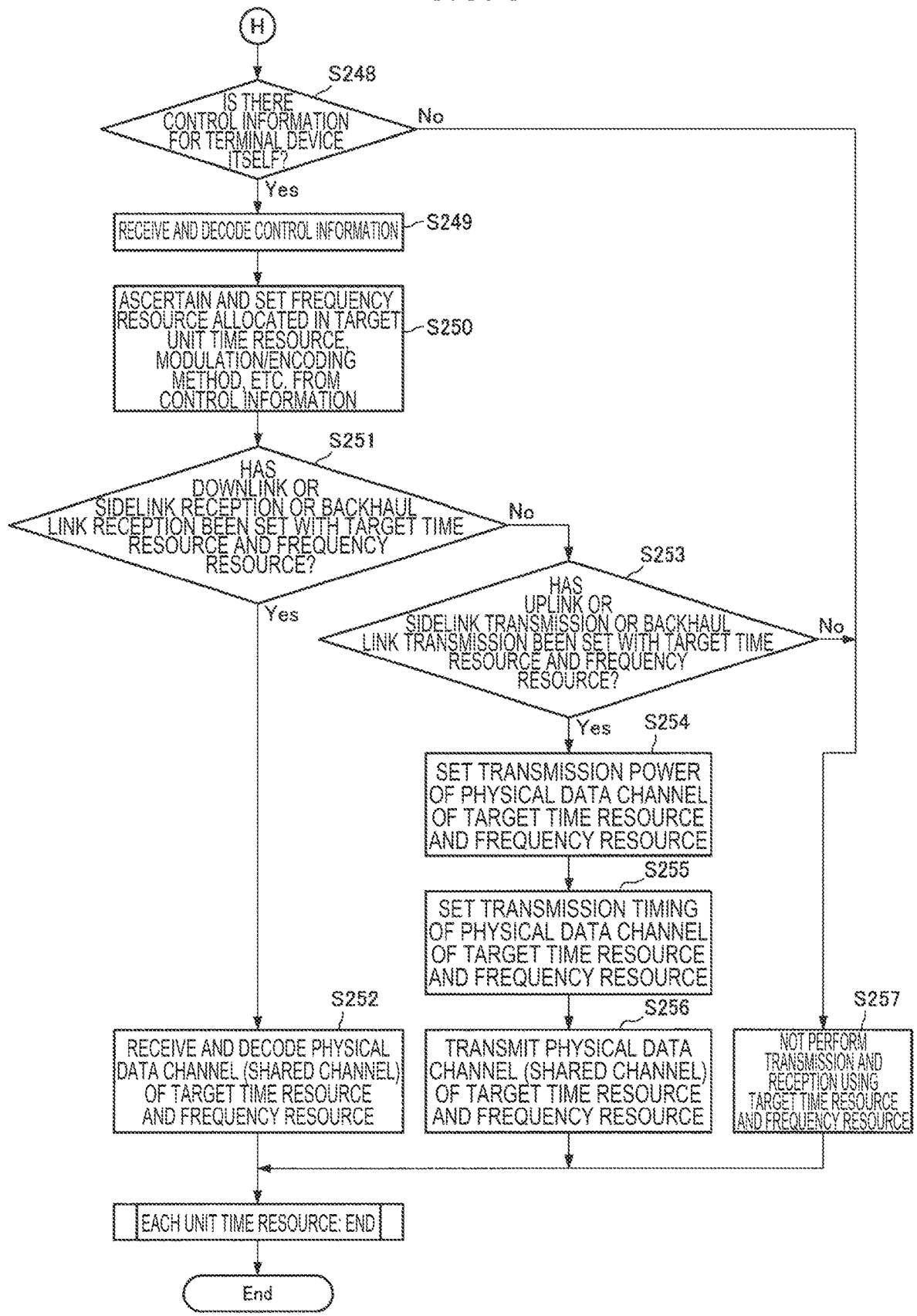
FIG. 59B is a flowchart showing an operation example of the terminal device 2 according to the embodiment.

FIGS. 59A and 59B are flowcharts showing an operation example of the terminal device 2 according to the embodiment of the present disclosure. FIGS. 59A and 59B illustrate another operation example of the terminal device 2 receiving a setting of types of link from the base station device 1.

In the example illustrated in FIGS. 59A and 59B, a frame configuration is set for the terminal device 2 using system information and RRC signaling. The setting can also be made UE-specifically, cell-specifically, and TRP-specifically.

The terminal device 2 receives and decodes the system information from the base station device 1 (Step S241). Then, the terminal device 2 determines whether there is new frame configuration information using the decoding result of the system information (Step S242).

If there is new frame configuration information (Yes in Step S242), the terminal device 2 updates the frame configuration information of the device itself with the new frame configuration information (Step S243). On the other hand, if there is not new frame configuration information (No in Step S242), the terminal device 2 maintains the frame configuration information of the device itself (Step S244).

Then, the terminal device 2 ascertains the type of link of each unit time resource (e.g., subframe, slot, etc.) represented by the frame configuration information of the device itself and sets the type for the device itself (Step S245). Note that the frame configuration information may be set for each subband.

Afterward, the terminal device 2 executes a series of processes for each unit time resource (Step S246). The terminal device 2 receives and decode a physical control channel transmitted from the base station device 1 (Step S247). The terminal device 2 determines whether there is control information for the device itself in control information such as downlink control information (DCI) using the decoding result (Step S248).

If there is control information for the device itself (Yes in Step S248), the terminal device 2 then receives and decodes the control information of the device itself (Step S249). In addition, the terminal device 2 ascertains the frequency resource allocated in the target unit time resource, a modulation/encoding method, and the like from the decoded control information and sets them for the device itself (Step S250). Then, the terminal device 2 determines whether the information is control information for downlink or sidelink reception or backhaul reception as a result of the decoding of Step S249 (Step S251).

If the information is control information for downlink or sidelink reception or backhaul reception (Yes in Step S251), the terminal device 2 receives and decodes a physical data channel (shared channel) of the target time resource and frequency resource (Step S252).

On the other hand, if the information is not control information for downlink or sidelink reception or backhaul reception (No in Step S251), the terminal device 2 then determines whether the information is control information for uplink or sidelink transmission or backhaul transmission as a result of the decoding of Step S249 (Step S253).

If the information is control information for uplink or sidelink transmission or backhaul transmission (Yes in Step S253), the terminal device 2 then sets transmission power of the physical data channel of the target time resource and frequency resource (Step S254). In addition, the terminal device 2 sets a transmission timing of the physical data channel of the target time resource and frequency resource (Step S255). Then, the terminal device 2 transmits the physical data channel (shared channel) of the target time resource and frequency resource (Step S256).

Note that, if there is no control information for the device itself in the determination of Step S248 (No in Step S248), or if the information is not control information for uplink or sidelink transmission or backhaul transmission in the determination of Step S253 (No in Step S253), the terminal device 2 does not perform transmission and reception using the target time resource and frequency resource (Step S257).

In the above-described example, each of the method of semi-statically selling a frame configuration using system information and RRC signaling and a method of dynamically setting a frame configuration using a PDCCH and DCI has been described. Further, in the present embodiment, a case in which the two methods are mixed is also conceivable. As an example of the mixed case, it is conceivable to execute communication in an exceptional frame configuration that is different from a semi-static setting in a case in which new data (particularly, data requiring urgency or data requiring low latency) suddenly occurs while the semi-static setting is maintained in a medium to long term.

Figure 60:
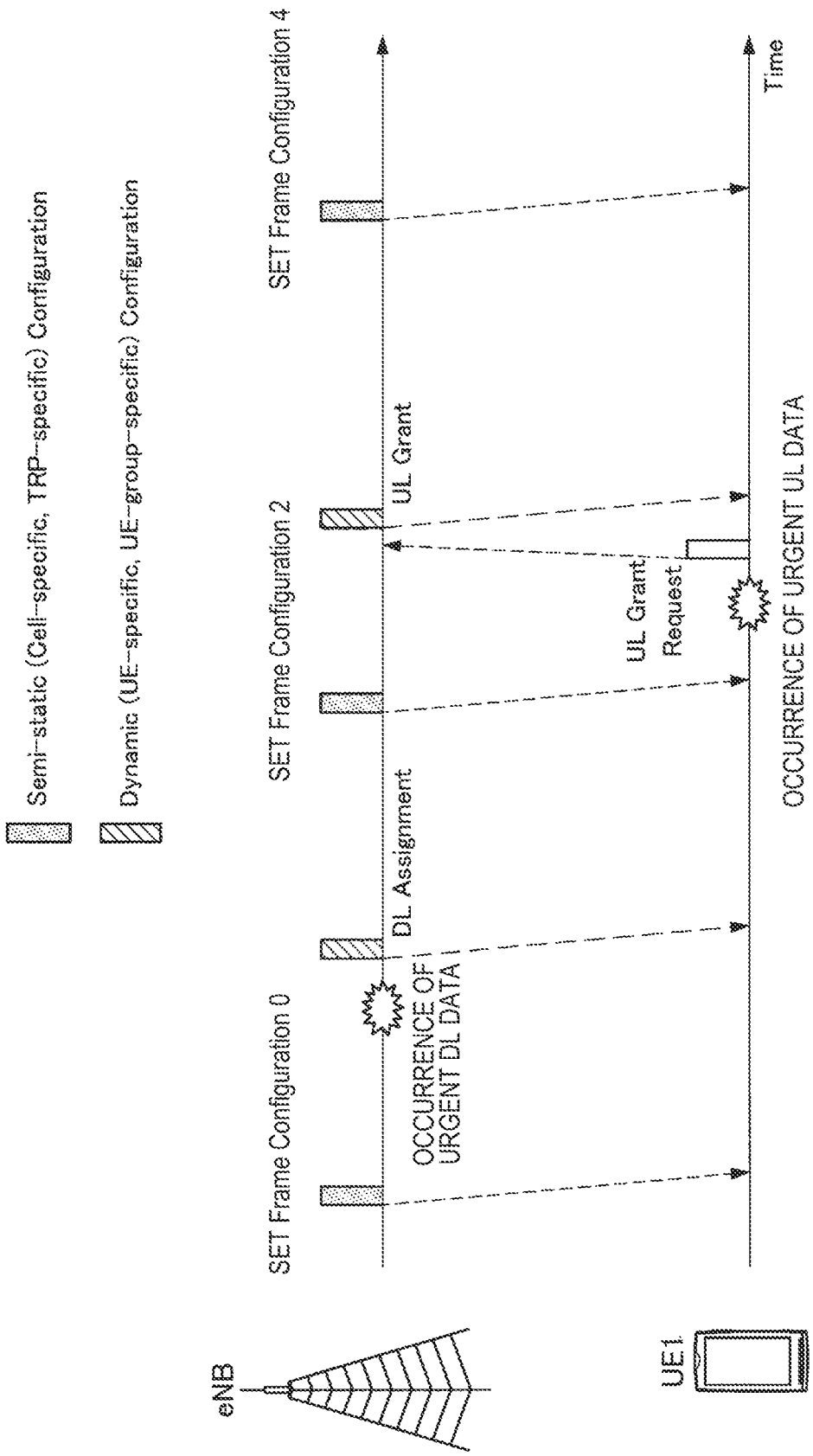
FIG. 60 is an explanatory diagram illustrating an example in which a semi-static configuration and a dynamic configuration are mixed.
Figure 61:
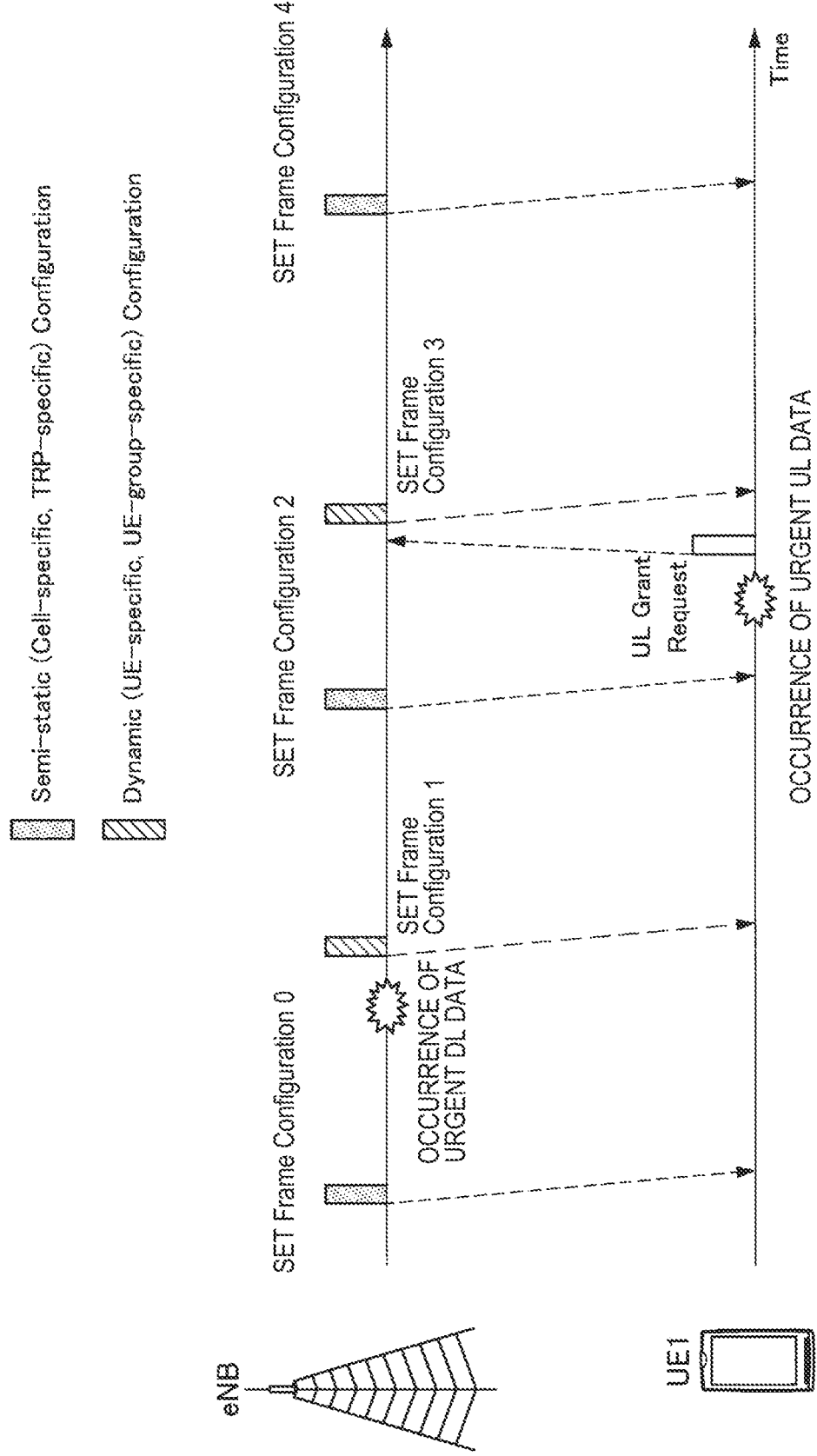
FIG. 61 is an explanatory diagram illustrating an example in which a semi-static configuration and a dynamic configuration are mixed.

FIGS. 60 and 61 are explanatory diagrams each illustrating an example in which a semi-static configuration and a dynamic configuration are mixed. In FIGS. 60 and 61, a case in which sudden data (or other data that needs low latency) occurs in each of a downlink and an uplink is assumed. As a method of making a(an) (exceptional) change to a semi-static configuration, a case in which a change is made only to as many subframes as requiring a change as illustrated in FIG. 60, and a case in which a change is added in units of frame configurations of a predetermined time resource group (e.g., radio frame) as illustrated in FIG. 61 are conceivable. In the example illustrated in FIG. 61, an example in which the configuration of one radio frame is dynamically changed is illustrated.

FIGS. 62A to 62D are flowcharts showing an operation example of the terminal device 2 according to an embodiment of the present disclosure. FIGS. 62A to 62D illustrate another operation example of the terminal device 2 receiving a setting of types of link from the base station device 1 in a case in which a semi-static configuration and a dynamic configuration are mixed.

The terminal device 2 receives and decodes the system information from the base station device 1 (Step S261). Then, the terminal device 2 determines whether there is new frame configuration information using the decoding result of the system information (Step S262).

If there is new frame configuration information (Yes in Step S262), the terminal device 2 updates the frame configuration information of the device itself with the new frame configuration information (Step S263). On the other hand, if there is not new frame configuration information (No in Step S262), the terminal device 2 maintains the frame configuration information of the device itself (Step S264).

Then, the terminal device 2 ascertains the type of link of each unit time resource (e.g., subframe, slot, etc.) represented by the frame configuration information of the device itself and sets the type for the device itself (Step S265). Note that the frame configuration information may be set for each subband.

Afterward, the terminal device 2 executes a series of processes for each unit time resource (Step S266). The terminal device 2 receives and decode a physical control channel transmitted from the base station device 1 (Step S267). The terminal device 2 determines whether there is control information for the device itself in control information such as downlink control information (DCI) using the decoding result (Step S268).

If there is control information for the device itself (Yes in Step S268), the terminal device 2 then receives and decodes the control information of the device itself (Step S269). Then, the terminal device 2 determines whether the type of link according to the control information is different from the type of link set in the system information (Step S270).

In a case in which a different type of link is designated (Yes in Step S270), the terminal device 2 operates in accordance with the type of link set in the control information (Step S271). The terminal device 2 determines whether the information is control information for downlink or sidelink reception or backhaul reception as a result of the decoding of Step S269 (Step S272). If the information is control information for downlink or sidelink reception or backhaul reception (Yes in Step S272), the terminal device 2 then ascertains the frequency resource allocated in the target unit time resource, a modulation/encoding method, and the like from the decoded control information and sets them for the device itself (Step S273). Then, the terminal device 2 receives and decodes a physical data channel (shared channel) of the target time resource and frequency resource (Step S274). If the information is not control information for downlink or sidelink reception or backhaul reception (No in Step S272), the terminal device 2 then determines whether the information is control information for uplink or sidelink transmission or backhaul transmission as a result of the decoding of Step S269 (Step S275).

If the information is control information for uplink or sidelink transmission or backhaul transmission (Yes in Step S275), the terminal device 2 then sets transmission power of the physical data channel of the target time resource and frequency resource (Step S276). In addition, the terminal device 2 sets a transmission timing of the physical data channel of the target time resource and frequency resource (Step S277). Then, the terminal device 2 transmits the physical data channel (shared channel) of the target time resource and frequency resource (Step S278).

Note that, if there is no control information for the device itself in the determination of Step S268 (No in Step S268), or if the information is not control information for uplink or sidelink transmission or backhaul transmission in the determination of Step S275 (No in Step S275), the terminal device 2 does not perform transmission and reception using the target time resource and frequency resource (Step S280).

In a case in which a different type of link is not designated in the above-described determination of Step S270 (No in Step S270), the terminal device 2 operates in accordance with the type of link set in the system information (Step S281). The terminal device 2 ascertains the frequency resource allocated in the target unit time resource, a modulation/encoding method, and the like from the decoded control information and sets them for the device itself (Step S282).

Then, the terminal device 2 determines whether downlink or sidelink reception or backhaul reception has been set in the target time resource and frequency resource (Step S283). If downlink or sidelink reception or backhaul reception is set (Yes in Step S283), the terminal device 2 shifts to the process of Step S274.

If downlink or sidelink reception or backhaul reception is not set (No in Step S283), the terminal device 2 determines whether uplink or sidelink transmission or backhaul transmission has been set in the target time resource and frequency resource (Step S284). If uplink or sidelink transmission or backhaul transmission is set (Yes in Step S284), the terminal device 2 shifts to the process of Step S277. If uplink or sidelink transmission or backhaul transmission is not set (No in Step S284), the terminal device 2 shifts to the process of Step S280.

A setting of a different type of link can be indicated in a semi-static setting and a dynamic setting. In this case, a frame configuration and the type of link can be flexibly reset in accordance with any setting under a predetermined rule. In the example illustrated in FIGS. 62A to 62D, a dynamic setting is adopted by priority. By prioritizing the dynamic setting, the type of link can be reset for generated data traffic in real time and only for a terminal device requiring a reset.

Figure 62A:
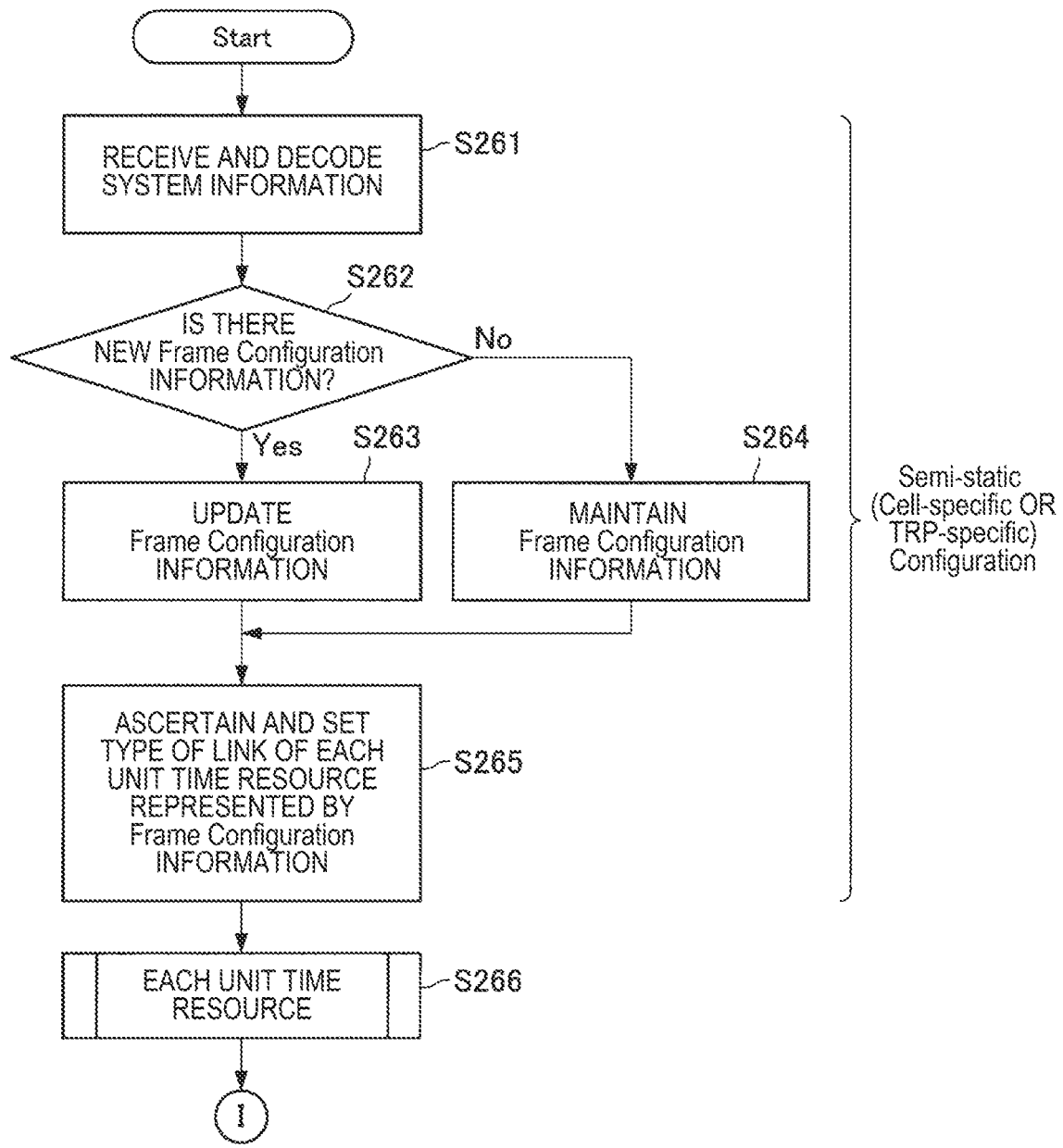
FIG. 62A is a flowchart showing an operation example of the terminal device 2 according to the embodiment.
Figure 62B:
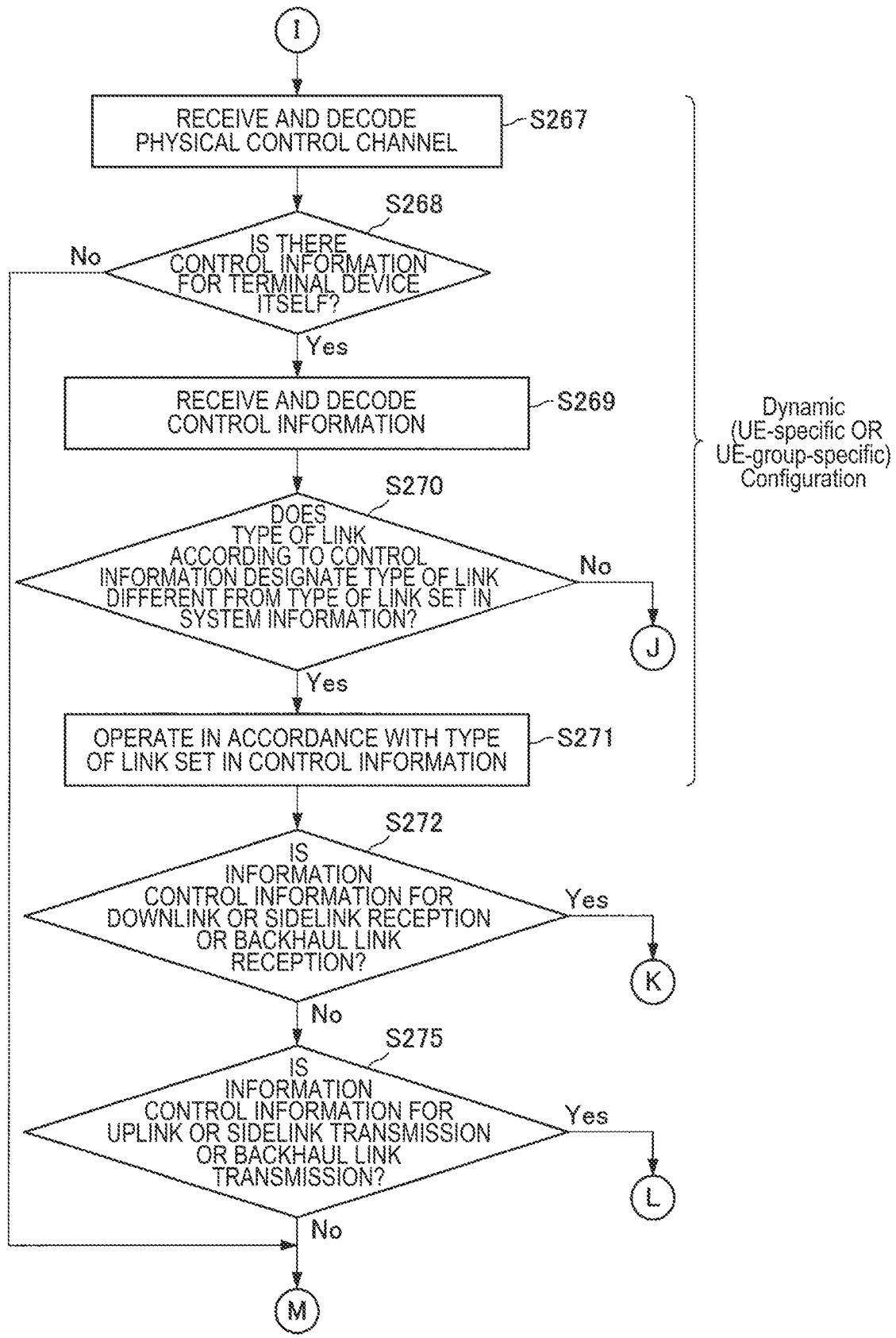
FIG. 62B is a flowchart showing an operation example of the terminal device 2 according to the embodiment.
Figure 62C:
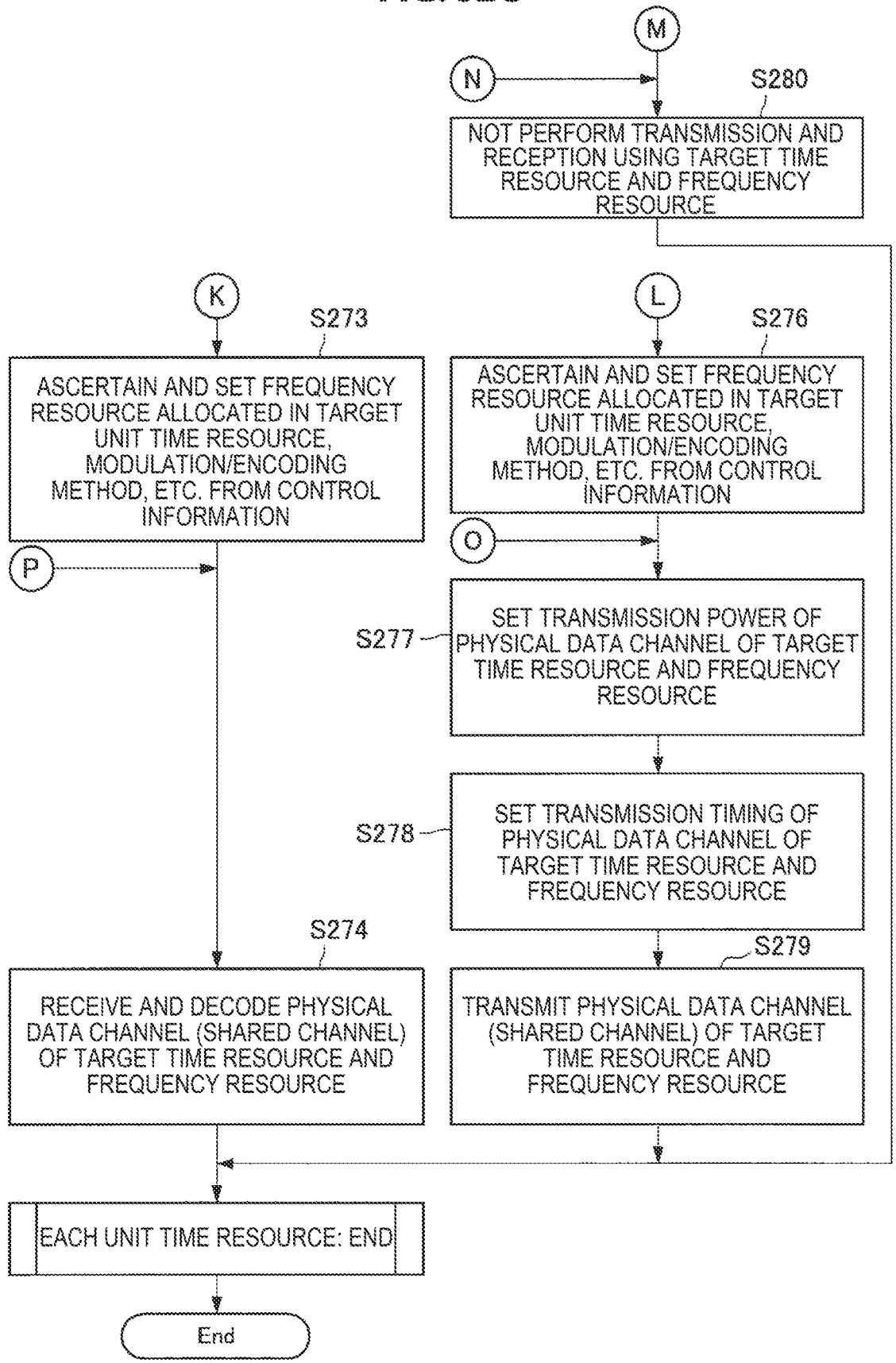
FIG. 62C is a flowchart showing an operation example of the terminal device 2 according to the embodiment.
Figure 62D:
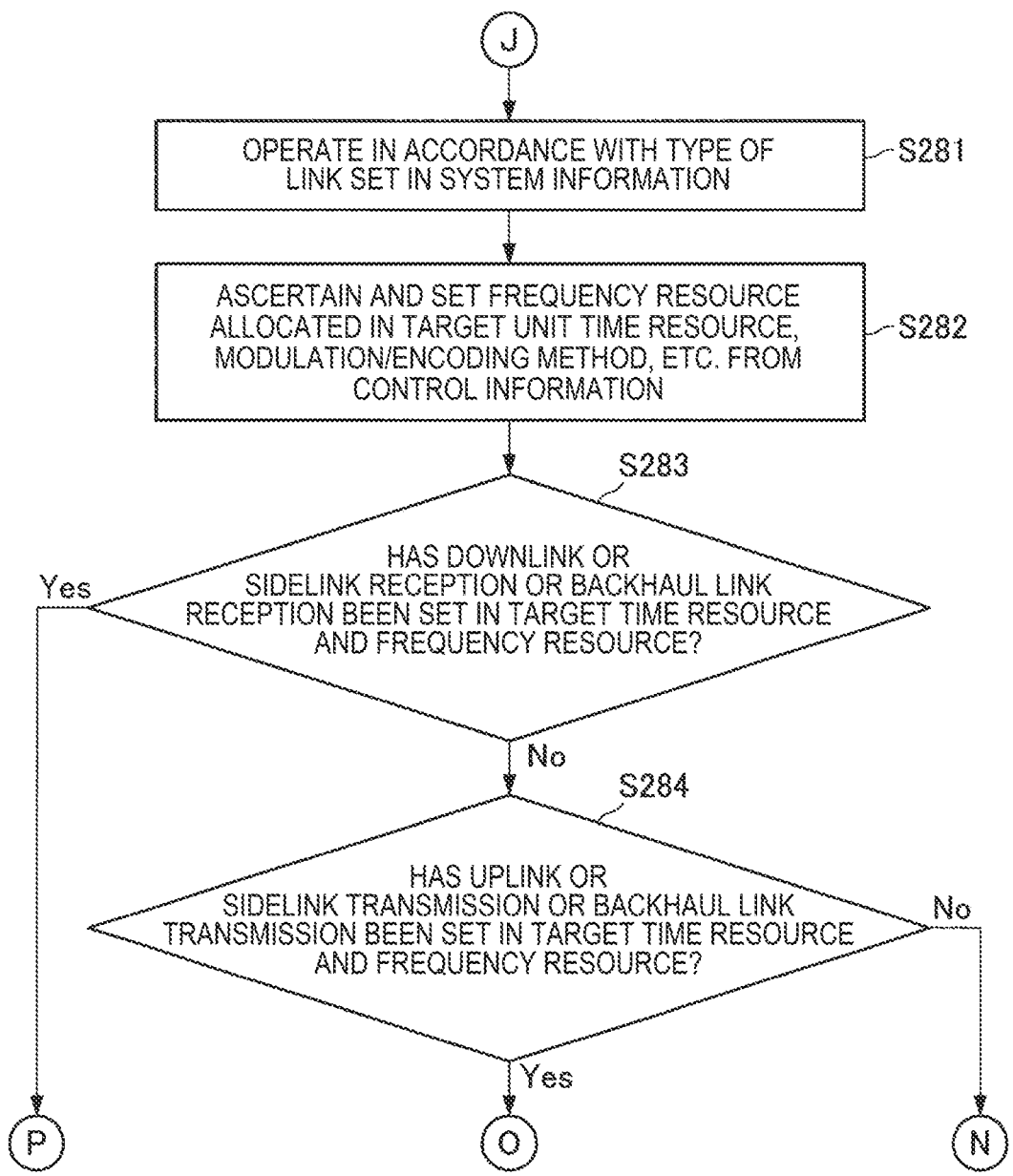
FIG. 62D is a flowchart showing an operation example of the terminal device 2 according to the embodiment.

In a case in which gap carriers are set when transmission power of the physical data channel of the target time resource and frequency resource is set in FIG. 58B, FIG. 59B, and FIG. 62C, interference can be further reduced considering a correction value for the gap frequency, similarly to the above description.

APPLICATION EXAMPLES

The technology according to the present disclosure can be applied to various products. For example, the base station device 1 may be realized as any type of evolved Node B (eNB) such as a macro eNB or a small eNB. The small eNB may be an eNB that covers a cell, such as a pico eNB, a micro eNB, or a home (femto) eNB, smaller than a macro cell. Instead, the base station device 1 may be realized as another type of base station such as a NodeB or a base transceiver station (BTS). The base station device 1 may include a main entity (also referred to as a base station device) that controls wireless communication and one or more remote radio heads (RRHs) disposed at different locations from the main entity. Further, various types of terminals to be described below may operate as the base station device 1 by performing a base station function temporarily or permanently.

Further, for example, the terminal device 2 may be realized as a mobile terminal such as a smartphone, a tablet personal computer (PC), a notebook PC, a portable game terminal, a portable/dongle mobile router or a digital camera, or an in-vehicle terminal such as a car navigation device. Further, the terminal device 2 may be realized as a terminal that performs machine to machine (M2M) communication (also referred to as a machine type communication (MTC) terminal). Moreover, the terminal device 2 may be a wireless communication module mounted on the terminal (for example, an integrated circuit module configured on one die).

Application Examples for Base Station

First Application Example

Figure 40:
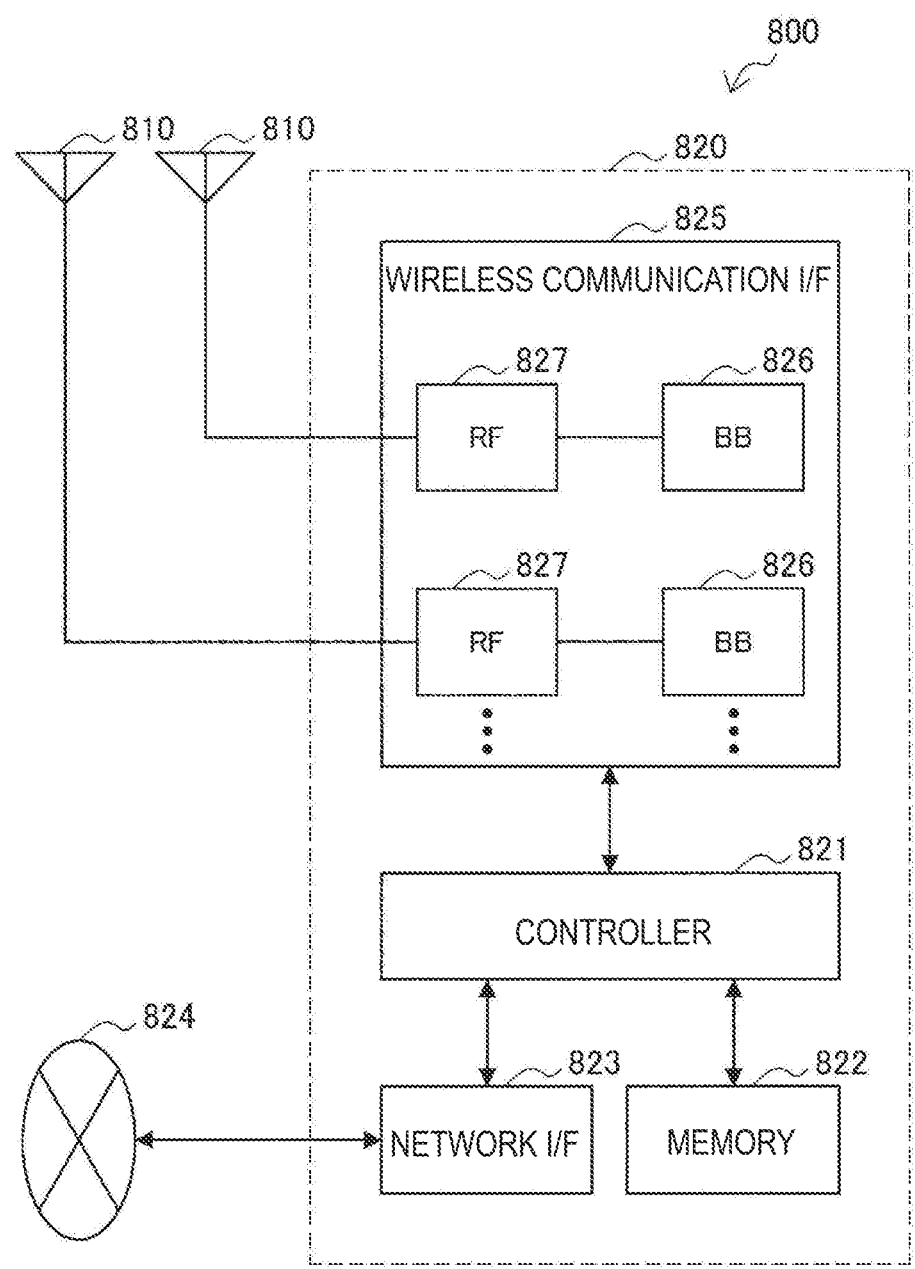
FIG. 40 is a block diagram illustrating a first example of a schematic configuration of an eNB to which the technology according to the present disclosure may be applied.

FIG. 40 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a AMMO antenna) and is used for the base station apparatus 820 to transmit and receive a wireless signal. The eNB 800 may include the plurality of the antennas 810 as illustrated in FIG. 40, and the plurality of antennas 810 may, for example, correspond to a plurality of frequency bands used by the eNB 800. It should be noted that while FIG. 40 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of base band processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RAM and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a base band (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 40, and the plurality of BB processors 826 may, for example, correspond to a plurality of frequency bands used by the eNB 800. Further, the wireless communication interface 825 may also include a plurality of the RF circuits 827, as illustrated in FIG. 40, and the plurality of RF circuits 827 may, for example, correspond to a plurality of antenna elements. Note that FIG. 40 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 40, one or more constituent elements included in the base station device 1 (the higher layer processing unit 101 and/or the control unit 103) described with reference to FIG. 11 may be implemented in the wireless communication interface 825. Alternatively, at least some of the constituent elements may be implemented in the controller 821. As one example, a module including a part or the whole of (for example, the BB processor 826) of the wireless communication interface 825 and/or the controller 821 may be implemented on the eNB 800. The one or more constituent elements in the module may be implemented in the module. In this case, the module may store a program causing a processor to function as the one more constituent elements other words, a program causing the processor to execute operations of the one or more constituent elements) and execute the program. As another example, a program causing the processor to function as the one or more constituent elements may be installed in the eNB 800, and the wireless communication interface 825 (for example, the BB processor 826) and/or the controller 821 may execute the program. In this way, the eNB 800, the base station device 820, or the module may be provided as a device including the one or more constituent elements and a program causing the processor to function as the one or more constituent elements may be provided. In addition, a readable recording medium on which the program is recorded may be provided.

Further, in the eNB 800 illustrated in FIG. 40, the receiving unit 105 and the transmitting unit 107 described with reference to FIG. 11 may be implemented in the wireless communication interface 825 (for example, the RF circuit 827). Further, transceiving antenna 109 may be implemented in the antenna 810. In addition, an interface between the higher layer processing unit 101 and a higher node or another base station device may be mounted on the controller 821 and/or the network interface 823.

Second Application Example

Figure 41:
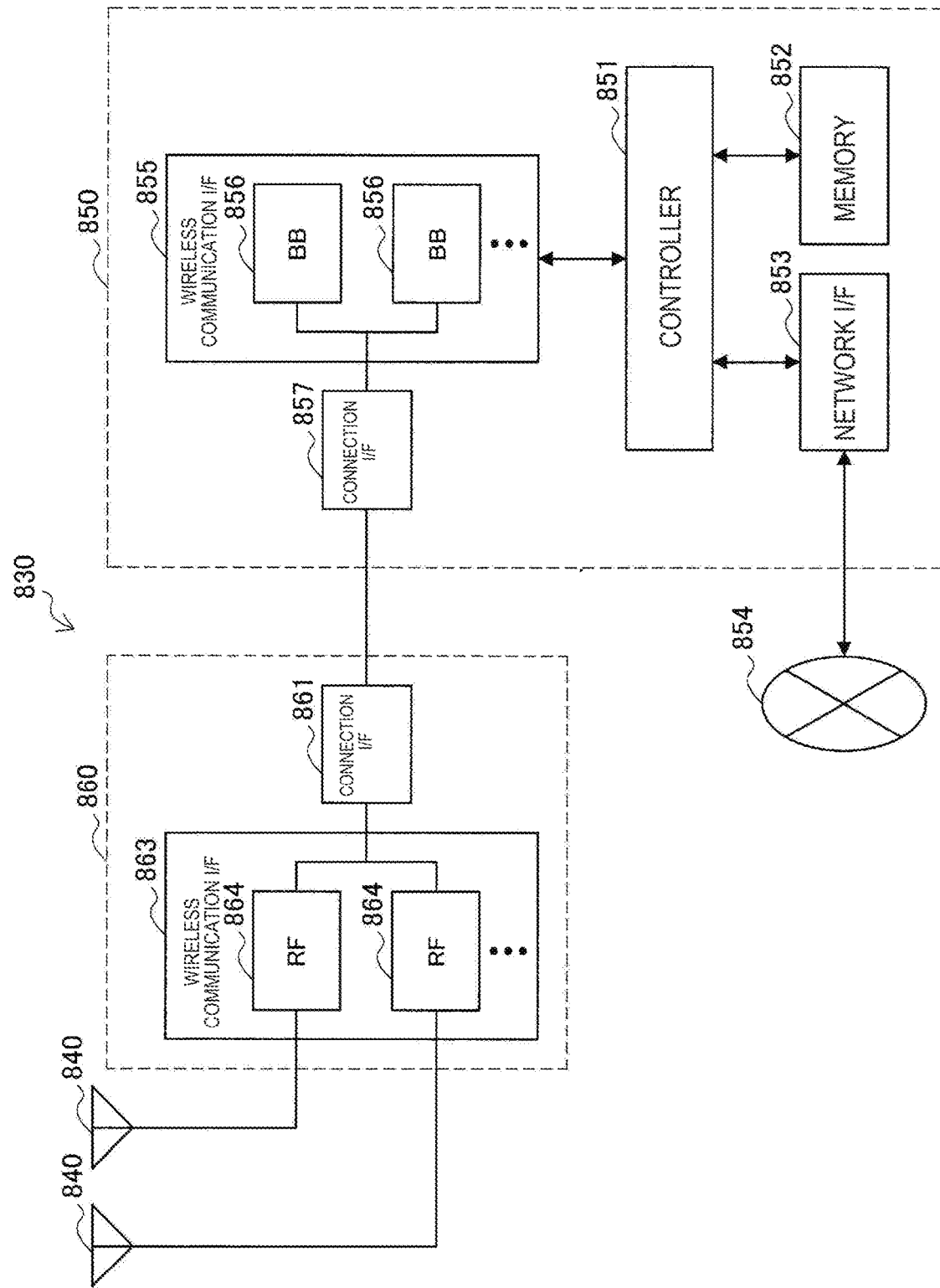
FIG. 41 is a block diagram illustrating a second example of the schematic configuration of the eNB to which the technology according to the present disclosure may be applied.

FIG. 41 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 41, and the plurality of antennas 840 may, for example, correspond to a plurality of frequency bands used by the eNB 830. Note that FIG. 41 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 32.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 40 except that the BB processor 856 is connected to an RF circuit 864 of the RRH 860 via the connection interface 857. The wireless communication interface 855 may include a plurality of the BB processors 856, as illustrated in FIG. 41, and the plurality of BB processors 856 may, for example, correspond to a plurality of frequency bands used by the eNB 830. Note that FIG. 41 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 41, and the plurality of RF circuits 864 may, for example, correspond to a plurality of antenna elements. Note that FIG. 41 illustrates an example in which the wireless communication interface 863 includes the plurality of RF circuits 864, but the wireless communication interface 863 may include the single RF circuit 864.

In the eNB 830 illustrated in FIG. 41, one or more constituent elements included in the base station device 1 (the higher layer processing unit 101 and/or the control unit 103) described with reference to FIG. 11 may be implemented in the wireless communication interface 855 and/or the wireless communication interface 863. Alternatively, at least some of the constituent elements may be implemented in the controller 851. As one example, a module including a part or the whole of (for example, the BB processor 856) of the wireless communication interface 855 and/or the controller 851 may be implemented on the eNB 830. The one or more constituent elements may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the eNB 830, and the wireless communication interface 855 (for example, the BB processor 856) and/or the controller 851 may execute the program. In this way, the eNB 830, the base station device 850, or the module may be provided as a device including the one or more constituent elements and a program causing the processor to function as the one or more constituent elements may be provided. In addition, a readable recording medium on which the program is recorded may be provided.

Further, in the eNB 830 illustrated in FIG. 41, for example, the receiving unit 105 and the transmitting unit 107 described with reference to FIG. 11 may be implemented in the wireless communication interface 863 (for example, the RF circuit 864). Further, the transceiving antenna 109 may be implemented in the antenna 840. In addition, an interface between the higher layer processing unit 101 and a higher node or another base station device may be mounted on the controller 851 and/or the network interface 853.

Application Examples for Terminal Apparatus

First Application Example

Figure 42:
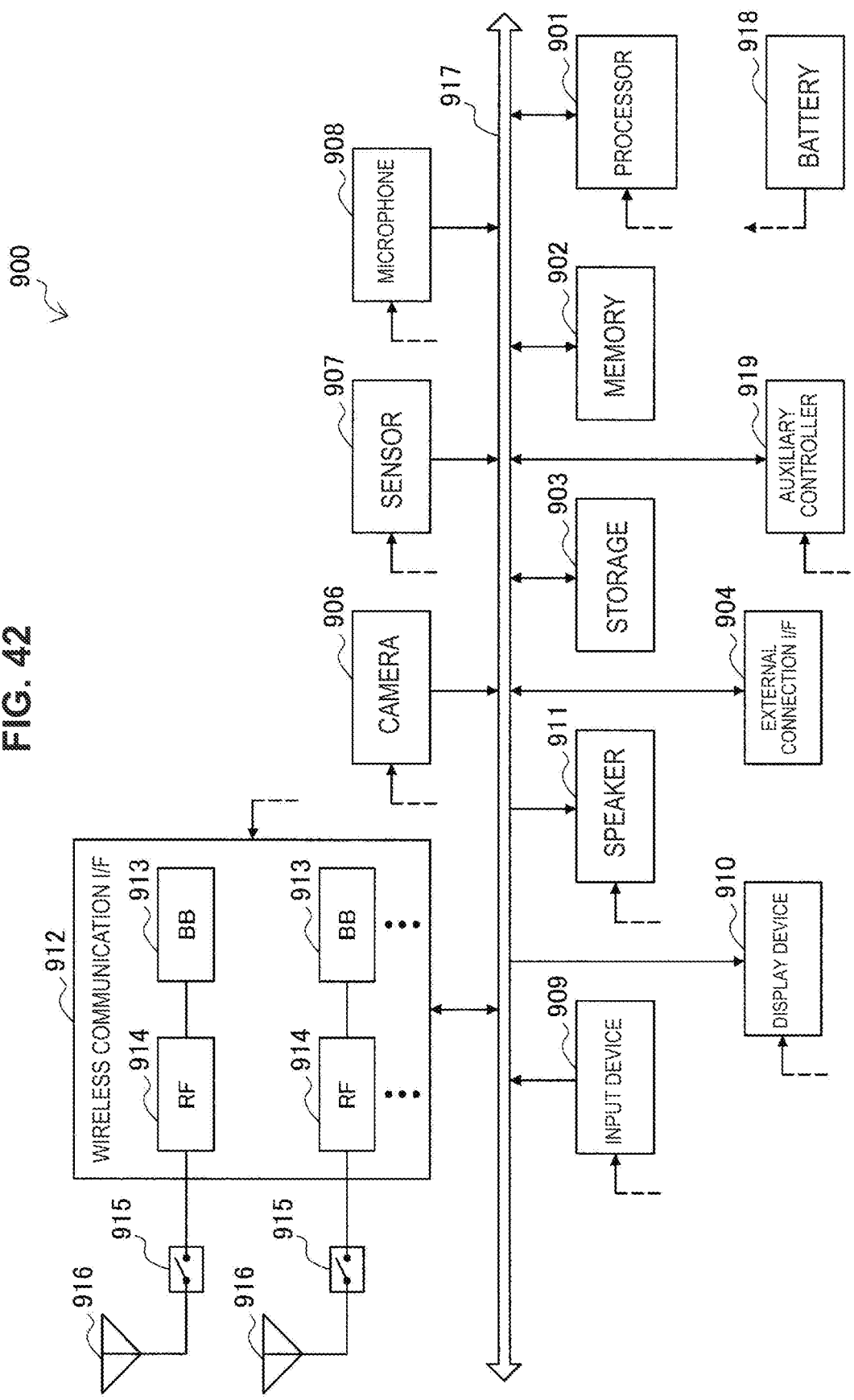
FIG. 42 is a block diagram illustrating an example of a schematic configuration of a smartphone 900 to which the technology according to the present disclosure may be applied.

FIG. 42 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLEIC) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 42. Note that FIG. 42 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a AMMO antenna) and is used for transmission and reception of the wireless signal by the wireless communication interface 912. The smartphone 900 may include a plurality of antennas 916 as illustrated in FIG. 42. Note that FIG. 42 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies electric power to each block of the smartphone 900 illustrated in FIG. 42 via a feeder line that is partially illustrated in the figure as a dashed line. The auxiliary controller 919, for example, operates a minimally necessary function of the smartphone 900 in a sleep mode.

In the smartphone 900 illustrated in FIG. 42, one or more constituent elements included in the terminal device 2 (the higher layer processing unit 201 and/or the control unit 203) described with reference to FIG. 12 may be implemented in the wireless communication interface 912. Alternatively, at least some of the constituent elements may be implemented in the processor 901 or the auxiliary controller 919. As one example, a module including a part or the whole of (for example, the BB processor 913) of the wireless communication interface 912, the processor 901, and/or the auxiliary controller 919 may be implemented on the smartphone 900. The one or more constituent elements may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the smartphone 900, and the wireless communication interface 912 (for example, the BB processor 913), the processor 901, and/or the auxiliary controller 919 may execute the program. In this way, the smartphone 900 or the module may be provided as a device including the one or more constituent elements and a program causing the processor to function as the one or more constituent elements may be provided. In addition, a readable recording medium on which the program is recorded may be provided.

Further, in the smartphone 900 illustrated in FIG. 42, for example, the receiving unit 205 and the transmitting unit 207 described with reference to FIG. 12 may be implemented in the wireless communication interface 912 (for example, the RF circuit 914). Further, the transceiving antenna 209 may be implemented in the antenna 916.

Second Application Example

Figure 43:
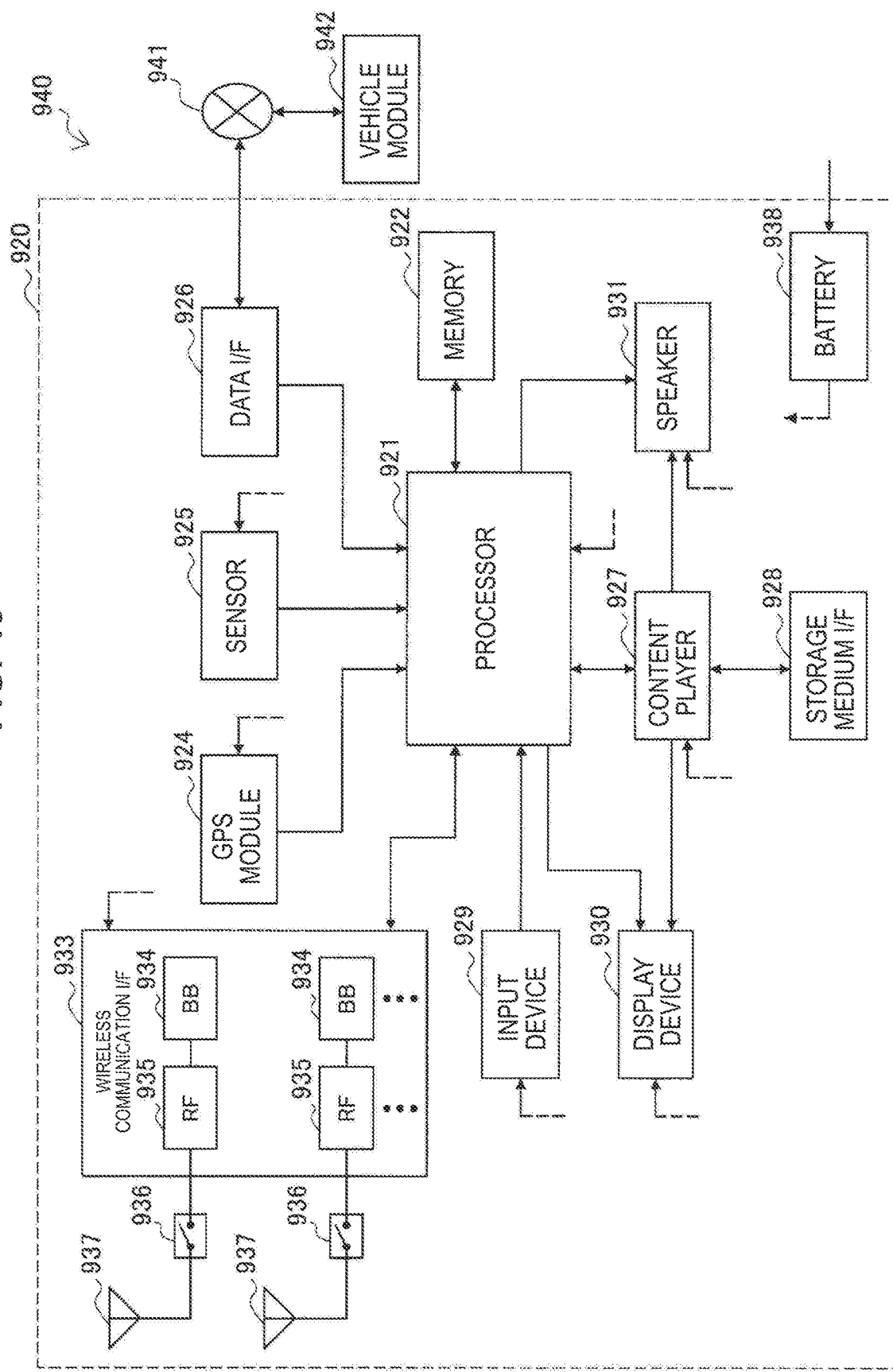
FIG. 43 is a block diagram illustrating an example of a schematic configuration of a car navigation apparatus 920.

FIG. 43 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RE circuits 935 as illustrated in FIG. 43. Note that FIG. 43 illustrates an example in which the wireless communication interface 933 includes a plurality of BB processors 934 and a plurality of RF circuits 935, hut the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 43. Note that FIG. 43 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 43 via a feeder line that is partially illustrated in the figure as a dashed line. Further, the battery 938 accumulates the electric power supplied from the vehicle.

In the car navigation 920 illustrated in FIG. 22, one or more constituent elements included in the terminal device 2 (the higher layer processing unit 201 and/or the control unit 203) described with reference to FIG. 12 may be implemented in the wireless communication interface 933. Alternatively, at least some of the constituent elements may be implemented in the processor 921. As one example, a module including a part or the whole of (for example, the BB processor 934) of the wireless communication interface 933 and/or the processor 921 may be implemented on the car navigation 920. The one or more constituent elements may be implemented in the module. In this case, the module may store a program causing a processor to function as the one more constituent elements (in other words, a program causing the processor to execute operations of the one or more constituent elements) and execute the program. As another example, a program causing the processor to function as the one or more constituent elements may be installed in the car navigation 920, and the wireless communication interface 933 (for example, the BB processor 934) and/or the processor 921 may execute the program. In this way, the car navigation 920 or the module may be provided as a device including the one or more constituent elements and a program causing the processor to function as the one or more constituent elements may be provided. In addition, a readable recording medium on which the program is recorded may be provided.

Further, in the car navigation 920 illustrated in FIG. 43, for example, the receiving unit 205 and the transmitting unit 207 described with reference to FIG. 12 may be implemented in the wireless communication interface 933 (for example, the RF circuit 935). Further, the transceiving antenna 209 may be implemented in the antenna 937.

The technology of the present disclosure may also be realized as an in-vehicle system (or a vehicle) 940 including one or more blocks of the car navigation apparatus 920, the in-vehicle network 941, and a vehicle module 942. The vehicle module 942 generates vehicle data such as vehicle speed, engine speed, and trouble information, and outputs the generated data to the in-vehicle network 941.

2. CONCLUSION

According to the embodiment of the present disclosure described above, it is possible to avoid deterioration in a communication quality between a base station device and a terminal device when a sidelink channel is set.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally conic under the technical scope of the present disclosure.

In the processes described with reference to the flowcharts and the sequence diagrams in the present specification may not necessarily be performed in the sequences illustrated in the drawings. Several processing steps may be performed in parallel. In addition, additional processing steps may be adopted or some of the processing steps may be omitted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication device including:

a control unit configured to allocate a predetermined gap to a boundary of a resource of a channel to be used in inter-device communication with a resource other than the resource of the channel in a communication system in which signals from different transmission sources are mixed and placed.

(2)

The communication device according to (1), in which the control unit sets the channel to be used in the inter-device communication using at least part of an uplink radio resource, a downlink radio resource, and a radio resource of an unlicensed band in the communication system.

(3)

The communication device according to (2), in which the control unit allocates the gap to the channel to be used in the inter-device communication only in the downlink radio resource.

(4)

The communication device according to 1), in which the control unit sets the gap at an end of a plurality of unit frequency resources that are continuous in a frequency direction in a case in which the plurality of unit frequency resources that are continuous are associated with a same device.

(5)

The communication device according to (1), in which the control unit sets a bandwidth of the gap to an integer multiple of subcarrier spacing to be used in a corresponding unit frequency resource.

(6)

The communication device according to (1), in which the control unit sets the gap at an end of a plurality of unit time resources that are continuous in a time direction in a case in which the plurality of unit time resources that are continuous are associated with a same device.

(7)

The communication device according to any of (1) to (6), in which the control unit performs control of giving notification of a setting of the gap through system information.

(8)

The communication device according to any of (1) to (6), in which the control unit performs control of giving notification of a setting of the gap through downlink control information.

(9)

A communication device including:

a control unit configured to control communication using a resource to which a predetermined gap is allocated on a boundary of a channel to be used in inter-device communication with a resource other than a resource of the channel in a communication system in which signals from different transmission sources are mixed and placed.

(10)

A communication device including:

a control unit configured to perform control of transmission at a time obtained by adding a predetermined offset to a timing designated by a base station when inter-device communication is performed using a downlink radio resource in a communication system in which signals from different transmission sources are mixed and placed.

(11)

The communication device according to (10), in which the control unit performs control of transmission at a time obtained by adding a predetermined offset to a timing designated by a base station when inter-device communication is performed using an uplink radio resource in the communication system.

(12)

The communication device according to (10), in which the control unit performs control of transmission at a time obtained by adding a predetermined offset to a timing designated by a base station when inter-device communication is performed using a radio resource of an unlicensed band in the communication system.

(13)

The communication device according to (10), in which the control unit performs control of transmission at a time obtained by adding a predetermined offset to a timing designated by a base station when inter-device communication is performed using at least any of an uplink radio resource, a downlink radio resource, or a radio resource of an unlicensed band in the communication system, and an amount of the offset differs in each of the uplink radio resource, the downlink radio resource, and the radio resource of the unlicensed band in the communication system.

(14)

The communication device according to (13), in which an amount of the offset when inter-device communication is performed using a radio resource of an unlicensed band is equal to or smaller than an amount of the offset when inter-device communication is performed using a downlink radio resource, and the amount of the offset when inter-device communication is performed using the downlink radio resource is equal to or smaller than an amount of the offset when inter-device communication is performed using an uplink radio resource.

(15)

The communication device according to (11), in which, when inter-device communication is further performed using an uplink radio resource in the communication system, an amount of the offset when inter-device communication is performed using a downlink radio resource is set as a value relative to an amount of the offset when inter-device communication is performed using an uplink radio resource.

(16)

A communication device including:

a control unit configured to set transmission power individually in each of an uplink radio resource, a downlink radio resource, and a radio resource of an unlicensed band when a channel to be used in inter-device communication is set using at least part of the uplink radio resource, the downlink radio resource, and the radio resource of the unlicensed band in a communication system in which signals from different transmission sources are mixed and placed.

(17)

The communication device according to (16), in which the control unit sets transmission power by adding a predetermined offset to a value set when the channel is set using the uplink radio resource when the channel is set using the downlink radio resource.

(18)

The communication device according to (16), in which the control unit sets transmission power in accordance with presence or absence of scheduling of a downlink of resources adjacent in a frequency direction when the channel is set using the downlink radio resource.

(19)

The communication device according to (16), in which the control unit sets transmission power on the basis of path loss of a transmission side and a reception side.

(20)

A communication device including:

a control unit configured to set a control channel individually in each of an uplink radio resource, a downlink radio resource, and a radio resource of an unlicensed band when a channel to be used in inter-device communication is set using at least part of the uplink radio resource, the downlink radio resource, and the radio resource of the unlicensed band in a communication system in which signals from different transmission sources are mixed and placed.

(21)

The communication device according to (20), in which, in a case in which an uplink radio resource and a downlink radio resource are configured according to time division duplex (TDD), the control unit sets a timing of HARQ of a sidelink channel in association with a frame configuration of TDD.

(22)

A communication method including:

allocating a predetermined gap to a boundary of a resource of a channel to be used in inter-device communication with a resource other than the resource of the channel in a communication system in which signals from different transmission sources are mixed and placed.

(23)

A communication method including:

controlling communication using a resource to which a predetermined gap is allocated on a boundary of a channel to be used in inter-device communication with a resource other than a resource of the channel in a communication system in which signals from different transmission sources are mixed and placed.

(24)

A communication method including:

performing control of transmission at a time obtained by adding a predetermined offset to a timing designated by a base station when inter-device communication is performed using a downlink radio resource in a communication system in which signals from different transmission sources are mixed and placed.

(25)

A communication method including:

setting transmission power individually in each of an uplink radio resource, a downlink radio resource, and a radio resource of an unlicensed band when a channel to be used in inter-device communication is set using at least part of the uplink radio resource, the downlink radio resource, and the radio resource of the unlicensed band in a communication system in which signals from different transmission sources are mixed and placed.

(26)

A communication method including:

setting a control channel individually in each of an uplink radio resource, a downlink radio resource, and a radio resource of an unlicensed band when a channel to be used in inter-device communication is set using at least part of the uplink radio resource, the downlink radio resource, and the radio resource of the unlicensed band in a communication system in which signals from different transmission sources are mixed and placed.

(27)

A communication device including:

a control unit configured to allocate a predetermined gap to a boundary of resources adjacent in a frequency direction in a communication system in which signals from different transmission sources are multiplexed in the frequency direction within one frequency channel.

(28)

The communication device according to (27), in which, in a case in which signals corresponding to the resources adjacent in the frequency direction are signals in a same direction, the control unit does not allocate the predetermined gap to an association of the resources.

(29)

The communication device according to (27) or (28), in which the control unit causes an uplink radio resource and a downlink radio resource to be multiplexed within the one frequency channel.

(30)

The communication device according to (29), in which the control unit notifies a terminal device of a setting pattern of a link within the one frequency channel.

(31)

The communication device according to (30), in which the control unit gives notification of the setting pattern for each subframe.

(32)

The communication device according to (30), in which the control unit gives notification of the setting pattern for every predetermined number of subframes.

(33)

The communication device according to any of (29) to (32), in which the control unit further causes resources of a channel to be used in inter-device communication to be multiplexed within the one frequency channel.

(34)

The communication device according to any of (27) to (33), in which the control unit sets transmission power in consideration of the predetermined gap.

(35)

A communication control method including:

allocating a predetermined gap to a boundary of resources adjacent in a frequency direction in a communication system in which signals from different transmission sources are multiplexed in the frequency direction within one frequency channel.

REFERENCE SIGNS LIST 1 base station device
101 higher layer processing unit
103 control unit
105 receiving unit
1051 decoding unit
1053 demodulating unit
1055 demultiplexing unit
1057 wireless receiving unit
1059 channel measuring unit
107 transmitting unit
1071 encoding unit
1073 modulating unit
1075 multiplexing unit
1077 wireless transmitting unit
1079 downlink reference signal generating unit
109 transceiving antenna
2 terminal device
201 higher layer processing unit
203 control unit
205 receiving unit
2051 decoding unit
2053 demodulating unit
2055 demultiplexing unit
2057 wireless receiving unit
2059 channel measuring unit
207 transmitting unit
2071 encoding unit
2073 modulating unit
2075 multiplexing unit
2077 wireless transmitting unit
2079 uplink reference signal generating unit
209 transceiving antenna

The invention claimed is:

1. A communication device comprising:
  circuitry configured to allocate a resource block comprising a resource gap at each end of the resource block of a channel to be used in inter-device communication in a communication system in which signals from different transmission sources are mixed and placed,
  wherein the channel is a sidelink channel used for communications between the communication device and at least one terminal device,
  wherein the resource gap is a frequency resource gap between the sidelink channel and a downlink channel, and the downlink channel is used for communications between the communication device and a base station,
  wherein gap carriers are scheduled during the resource gap, a first amount of power allocated to the gap carriers is lower than a second amount of power allocated to other resources in the resource block, and the first amount of power is non-zero, and
  wherein the circuitry is configured to set a bandwidth of the resource gap to an integer multiple of subcarrier spacing to be used in a corresponding frequency resource.

2. The communication device according to claim 1, wherein the circuitry sets the channel to be used in the inter-device communication using at least part of an uplink radio resource, a downlink radio resource, and a radio resource of an unlicensed band in the communication system.

3. The communication device according to claim 2, wherein the circuitry allocates the resource block to the channel to be used in the inter-device communication only when the downlink radio resource is used to set the channel to be used in the inter-device communication.

4. The communication device according to claim 1, wherein the circuitry sets the resource gap at an end of a plurality of unit frequency resources that are continuous in a frequency direction in a case in which the plurality of unit frequency resources that are continuous are associated with a same device.

5. The communication device according to claim 1, wherein the circuitry performs control of giving notification of a setting of the resource gap through system information or downlink control information.

6. A communication device comprising:
  circuitry configured to control communication using a resource block comprising a resource gap at each end of the resource block of a channel to be used in inter-device communication in a communication system in which signals from different transmission sources are mixed and placed,
  wherein the channel is a sidelink channel used for communications between the communication device and at least one terminal device,
  wherein the resource gap is a frequency resource gap between the sidelink channel and a downlink channel, and the downlink channel is used for communications between the communication device and a base station,
  wherein gap carriers are scheduled during the resource gap, a first amount of power allocated to the gap carriers is lower than a second amount of power allocated to other resources in the resource block, and the first amount of power is non-zero, and
  wherein the circuitry is configured to set a bandwidth of the resource gap to an integer multiple of subcarrier spacing to be used in a corresponding frequency resource.

7. A communication method comprising:
  allocating a resource block comprising a resource gap at each end of the resource block of a channel to be used in inter-device communication in a communication system in which signals from different transmission sources are mixed and placed; and
  setting a bandwidth of the resource gap to an integer multiple of subcarrier spacing to be used in a corresponding frequency resource,
  wherein the channel is a sidelink channel used for communications between a plurality of terminal devices,
  wherein the resource gap is a frequency resource gap between the sidelink channel and a downlink channel, and the downlink channel is used for communications with a base station, and
  wherein gap carriers are scheduled during the resource gap, a first amount of power allocated to the gap carriers is lower than a second amount of power allocated to other resources in the resource block, and the first amount of power is non-zero.

8. A communication device comprising:
  circuitry configured to allocate a resource block comprising a resource gap at each end of the resource block in a frequency direction in a communication system in which signals from different transmission sources are multiplexed in the frequency direction within one frequency channel, wherein the frequency channel is a sidelink channel used for communications between the communication device and at least one terminal device, wherein the resource gap is a frequency resource gap between the sidelink channel and a downlink channel, and the downlink channel is used for communications between the communication device and a base station, wherein gap carriers are scheduled during the resource gap, a first amount of power allocated to the gap carriers is lower than a second amount of power allocated to other resources in the resource block, and the first amount of power is non-zero, and wherein the circuitry is configured to set a bandwidth of the resource gap to an integer multiple of subcarrier spacing to be used in a corresponding frequency resource.

9. The communication device according to claim 8, wherein, in a case in which signals corresponding to the resource block and to an adjacent resource block in the frequency direction are signals in a same direction, the not allocate the resource block comprising the resource gap at each end of the resource block.

10. The communication device according to claim 8, wherein the circuitry causes an uplink radio resource and a downlink radio resource to be multiplexed within the one frequency channel.

11. The communication device according to claim 10, wherein the-circuitry notifies a terminal device of a setting pattern of a link within the one frequency channel.

12. The communication device according to claim 11, wherein the circuitry gives notification of the setting pattern for every predetermined number of subframes.

13. The communication device according to claim 10, wherein the circuitry further causes resources of a channel to be used in inter-device communication to be multiplexed within the one frequency channel.

14. The communication device according to claim 8, wherein the circuitry sets transmission power in consideration of the resource gap.

15. A communication control method comprising:

allocating a resource block comprising a resource gap at each end of the resource block in a frequency direction in a communication system in which signals from different transmission sources are multiplexed in the frequency direction within one frequency channel; and setting a bandwidth of the resource gap to an integer multiple of subcarrier spacing to be used in a corresponding frequency resource, wherein the frequency channel is a sidelink channel used for communications between a plurality of terminal devices, wherein the resource gap is a frequency resource gap between the sidelink channel and a downlink channel, and the downlink channel is used for communications with a base station, and wherein gap carriers are scheduled during the resource gap, a first amount of power allocated to the gap carriers is lower than a second amount of power allocated to other resources in the resource block, and the first amount of power is non-zero.

\* \* \* \* \*